US005526050A

United States Patent [19]
King et al.

[11] Patent Number: 5,526,050
[45] Date of Patent: Jun. 11, 1996

[54] METHODS AND APPARATUS FOR CONCURRENTLY ACQUIRING VIDEO DATA FROM MULTIPLE VIDEO DATA SOURCES

[75] Inventors: David R. King, Norfolk; Robert Wolff, Sherborn, both of Mass.

[73] Assignee: Cognex Corporation, Natick, Mass.

[21] Appl. No.: 220,555

[22] Filed: Mar. 31, 1994

[51] Int. Cl.[6] .............................. H04N 7/60; H04N 7/18
[52] U.S. Cl. ............................................. 348/387; 348/91
[58] Field of Search .................................. 348/385, 387, 348/465, 467, 216, 91, 92, 159; H04N 7/18, 7/60

[56] References Cited

U.S. PATENT DOCUMENTS

| | | | |
|---|---|---|---|
| 5,090,576 | 2/1992 | Menten | 348/91 |
| 5,115,309 | 5/1992 | Hang | 348/387 |
| 5,216,503 | 6/1993 | Paik | 348/385 |
| 5,315,388 | 5/1994 | Shen et al. | 348/718 |
| 5,319,457 | 6/1994 | Nakahashi et al. | 348/387 |

FOREIGN PATENT DOCUMENTS 0527632  2/1993  European Pat. Off. ............... 348/387

Primary Examiner—Victor R. Kostak
Attorney, Agent, or Firm—Choate, Hall & Stewart

[57] ABSTRACT

The invention provides apparatus and methods for concurrently acquiring video data from multiple video data sources. The invention comprises an asynchronous interface that collects pixel data from multiple video data sources. A packet manager collects the pixel data and generates a packet data signal that represents the pixel data collected from the multiple video data sources. The packet manager transmits the packet data signal to a pixel buffer memory that includes an address generator that separates out the pixel data associated with each of the video data sources and that stores the pixel data in a video memory in a manner suitable for video display.

11 Claims, 8 Drawing Sheets

METHODS AND APPARATUS FOR CONCURRENTLY ACQUIRING VIDEO DATA FROM MULTIPLE VIDEO DATA SOURCES

FIELD OF THE INVENTION

The present invention relates to methods and apparatus for video data processing and, more particularly, to methods and apparatus for concurrently acquiring multiple video signals.

BACKGROUND OF THE INVENTION

There are a wide variety of machine vision applications that require multiple cameras. An automated inspection system, for example, can require a first camera to determine the placement of an object relative to a workstation and a second camera, located at the workstation, to visually inspect the product to detect defects in manufacture. Regardless of the application, the machine vision system must acquire each video signal generated by each camera before the vision system can process all the video data and determine the content of the images.

The acquisition of multiple video data signals is a complex task. The task is complicated in many of these multiple camera applications because not only do the cameras capture different images, but they typically capture images during the same time periods. Therefore the machine vision system must concurrently acquire the different video images.

The art has responded by providing machine vision systems that incorporate distinct vision acquisition and processing systems for each camera used in the application. Although this approach is often quite adequate, the expense of providing multiple acquisition and processing systems is considerable. Furthermore, the system requires additional hardware and software to coordinate the operation of multiple video acquisition channels.

Although these system limit the problems with coordinating the acquisition of multiple video data signals, there are multiple camera applications that require a cameras that generate images at different data rates. For example, an automated inspection process may require a high speed camera that generates image data of complex objects, such as an integrated circuit, and a second conventional camera that generates images of large, slowly moving objects, such as the circuit board to which the integrated circuit is connected. For these applications, the vision system must acquire multiple video data signals produced at different rates.

The art has responded by providing video acquisition channels that can be operated at different rates. In one type of this system, the video acquisition channel connects to two cameras, each running at a different rate. The acquisition system is switch selectable to acquire data at a first rate from one of the cameras and to acquire data at a second rate from the second camera. Although these systems limit the problem with acquiring data generated at different rates, they are not particularly well suited to acquiring concurrently video data signals from different cameras, and they are not readily adaptable to cameras that generate data at a rate different from the rates expected.

In view of the foregoing, an object of the invention is to provide improved methods and apparatus for data processing and, more particularly, improved methods and apparatus for concurrently acquiring multiple video signals.

Another object is to provide an improved mechanism for acquiring multiple video signals generated at different rates.

Still another object of the present invention is to provide more economical systems and methods for acquiring multiple video signals.

These and other objects of the invention are evident in the sections that follow.

SUMMARY OF THE INVENTION

The aforementioned objects are obtained by the present invention which provides, in one aspect, a video data acquisition system that acquires the video image signals generated from plural video data sources (e.g., video cameras) and that generates from these video data signals a synchronous video data packet signal that represents the plural video signals acquired from the video data sources.

The acquisition system includes a camera interface that couples to the video data sources and that digitally encodes each video signal generated from the video data sources. The encoded video signal is a series of video pixel signals that represent the video pixels that make up the video signal.

The video pixel signals are stored in multiple data buffers, such a FIFO memories. Each data buffer stores the pixel signals generated from an associated video data source. The system also includes a packet manager, that couple to the camera interface and that generates the synchronous video data packet signal. The packet manager includes a packet counter that monitors each of the data buffers and keeps count of the number of pixel signals that are stored in each of the data buffers. The packet counter generates a packet available signal for each of the buffer elements. The packet available signal represents the number of packets stored in the associated buffer. A packet can be a preselected quantity of pixels signals.

An output element that couples to the packet counter and the data buffers monitors the packet available signals associated with each of the data buffers. In response to a packet available signal indicating the presence of at least a packet of data, the output element reads a plurality of pixel signals from the data buffer associated with that packet available signal. The output element also generates video packet signal that represents the pixels that were represented by the pixel signals read form the buffer. The output element synchronously generates the video packet signal.

In one aspect of the invention, the buffer elements can be asynchronous memories, such as FIFO memories, that can be written into and read from at different rates.

In another aspect of the invention, each video data source connects to a camera interface that generates a format signal for each of the video data sources connected to that interface. The format signal represents the video acquisition controls signals (e.g., horizontal reset, vertical reset, field, write enable, pixel clock, etc.) that the camera generated concurrent with generating the associated pixel signals. The packet manager means can include a reset element that responds to the format signal or portions of the format signal (e.g., horizontal reset, vertical reset). The reset element can clear the data buffers associated with the format signal. A clear data buffer ensures that at known points of the video acquisition process the data buffer is empty and provide a reference point to begin tracking the data subsequently written into the buffer.

In another aspect of the invention, the acquisition system can include a virtual frame buffer that can store the video data packet signals generated by the packet manager. The virtual frame buffer can accept address locations for the video packet signals so that the packet signals are stored in the addressable memory to represent the separate video images generated by the video data source. The virtual frame buffer can include a video address generator that can generate address locations for each packet signal that stores the packet signal in the appropriate position within the stored image. The address generator can generate the address locations as a function of a channel number that identifies the video data source that generated the pixel information encoded in the packet signal being stored and as function of the video acquisition control signals, such as the horizontal reset and the vertical reset.

The video address generator can include mapping elements for selectively arranging how the multiple images are positioned in the memory. A contiguous mapping element can generate address locations so that the packet signals associated with one of the video data sources are stored in contiguous address locations. An adjacent mapping element can generate addresses that locate two images in adjacent portions of the memory. An interlacing element can generate addresses suitable for storing an image generated by an interlaced video data source. The interlacing element can interleave the two fields on an interlaced camera by skipping storage locations as the addresses for the first field are generated. The interlacing element can store the second filed in the gaps created by the skipped storage locations.

In still other aspects, the invention provides methods paralleling the operation of these apparatus. These and other aspects of the invention are evident in the drawings and in the detailed description which follows.

BRIEF DESCRIPTION OF THE DRAWINGS

The foregoing and other aspects of the invention may be more fully understood from the following description, when read together with the accompanying drawings in which like reference number indicate like parts in the several figures, and in which.

DETAILED DESCRIPTION OF THE ILLUSTRATED EMBODIMENT

Figure 1:
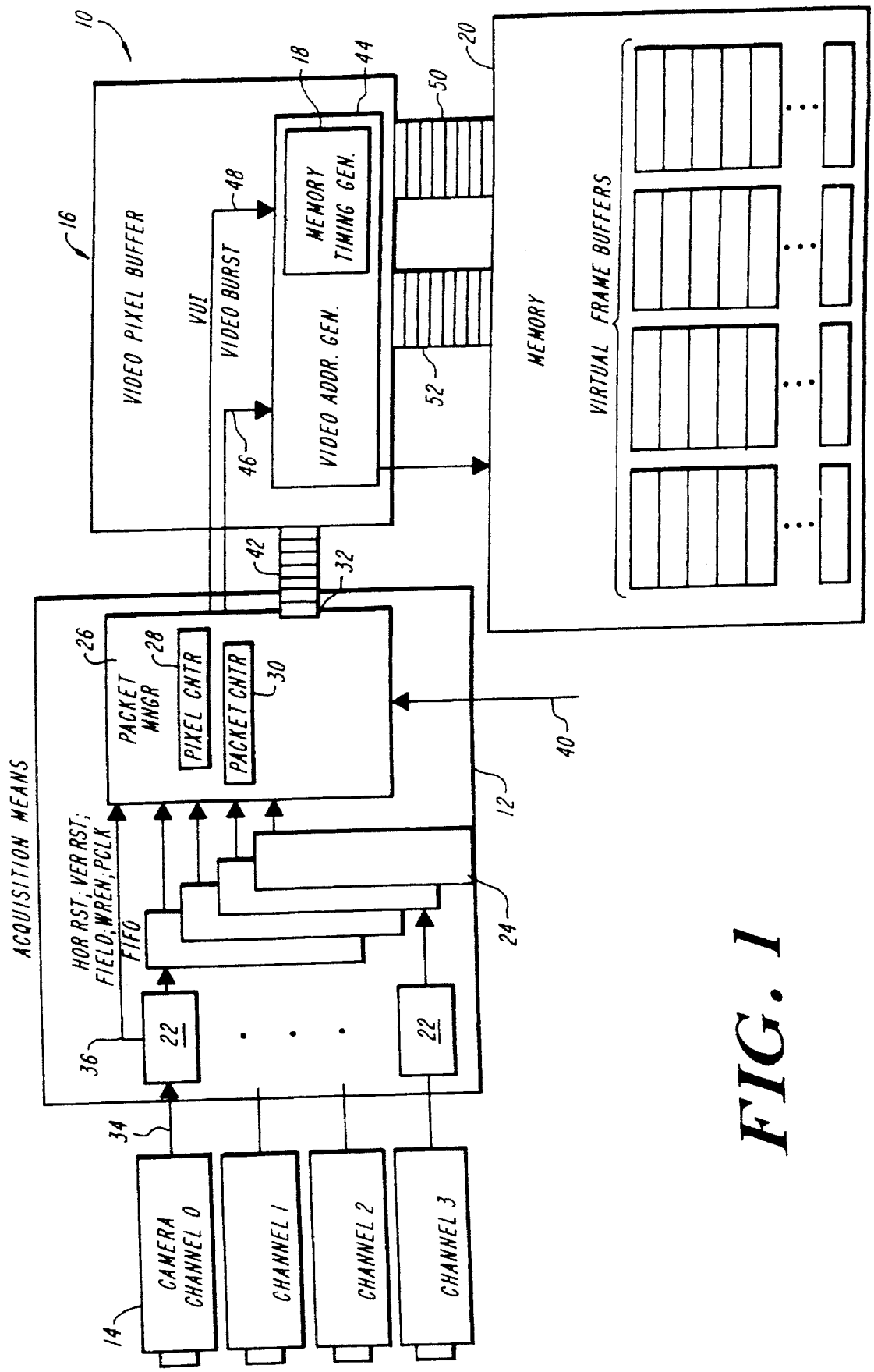
FIG. 1 illustrates a schematic block diagram of a video acquisition system constructed according to the present invention.
Figure 1A:
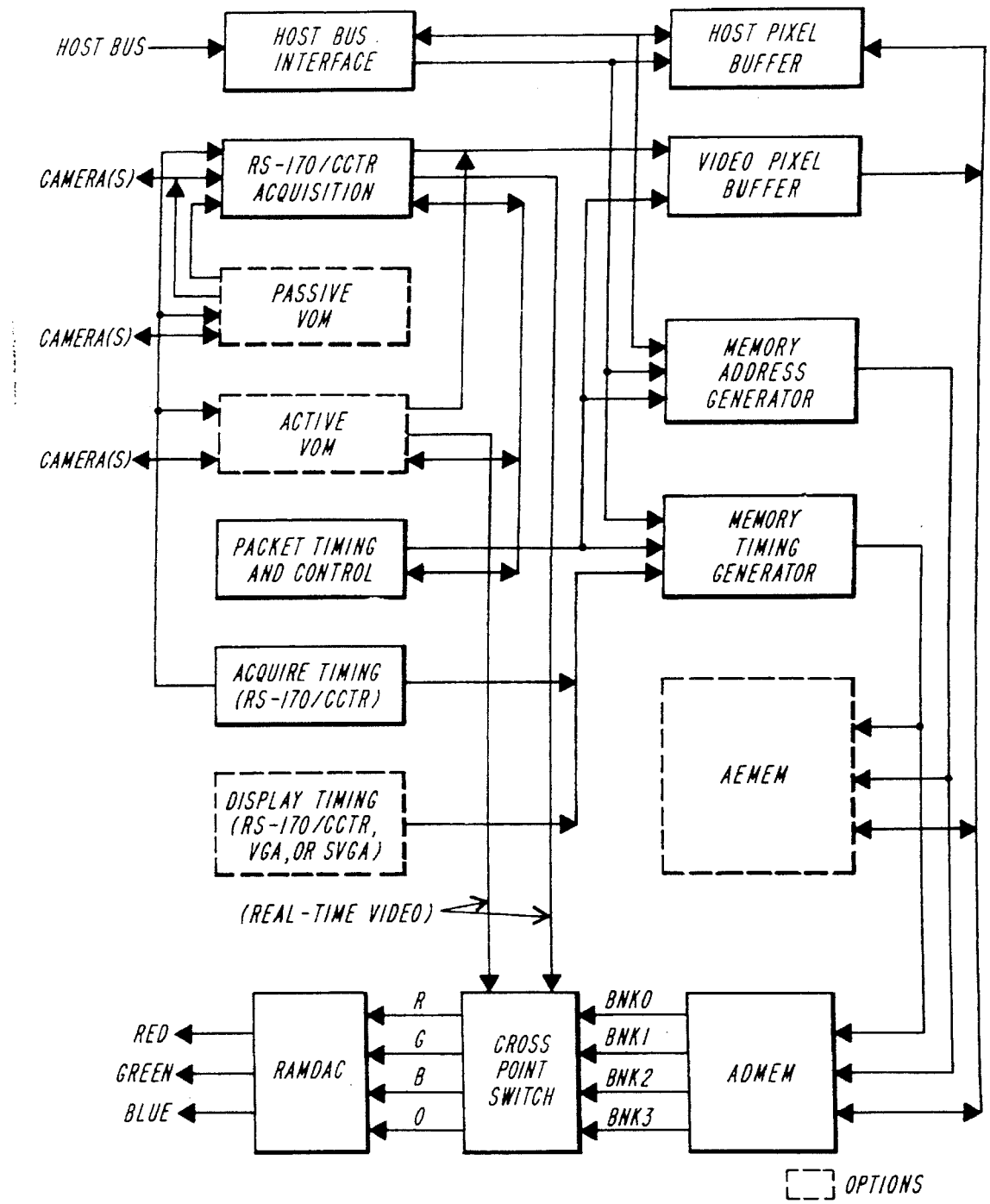
FIG. 1A illustrates a system level block diagram of a video acquisition system constructed according to the present invention.

FIG. 1 illustrates one embodiment of a video acquisition system 10 constructed according to the present invention. The video acquisition system 10 includes an acquisition means 12, video data sources 14, a video pixel buffer 16, a memory timing generator 18, and a virtual frame buffer memory 20.

The illustrated acquisition system 12 includes multiple camera interfaces 22, multiple data buffers 24, a packet manager 26, that includes a packet counter 30 and a pixel counter 28. Each of the illustrated camera interfaces 22 connect between one of the video data sources 14 and one of the data buffers 24. The camera interface 22 couples each of the data buffers 22 to a separate one of the video data sources 14. The data path formed by a camera 14 a camera interface 22 and a data buffers 12 is typically referred to as a channel, and is identified by a channel number that uniquely identifies each channel of the acquisition system 10. In the depicted system 10 the channel number are 0, 1, 2, 3.

In the illustrated embodiment 26 each of the data buffers 24 outputs data to the packet manager 26. The packet manager 26 controls a reading of data from the data buffers 24 onto the output port 32. Generally, the packet manager 26 monitors the acquisition of video data from each of the data sources 14 as the data is moved from the data sources 14 through the camera interfaces 32 and into the buffers 24. The packet manager 26 monitors the amount of data that has been stored in each of the data buffers 24 and, as will be explained in greater detail hereinafter, synchronously reads select quantity of pixel data from each of the data buffers 24. The packet manager 26 connects to the output port 32. The illustrated output port 32 has a 32 bit bus 42 for transmitting collected video data to the pixel buffer 16.

In the embodiment illustrated in FIG. 1, the video data sources 14 are video cameras of the type generally used to acquire images for machine vision systems. The cameras 14 can be any of the type of video cameras that capture image data that is representable by pixel data. The camera produces an analog video signal 34 that encodes the pixel data. The video signal 34 can be formatted in any of the conventional video formats including RS-170/CCIR or any proprietary video format. The analog signal 34 carries the encoded pixel data to the camera interface 22. The illustrated camera interface 22 can be any of the conventional camera interfaces that can receive a video data signal and generate a digital signal that represents the pixel content of the video data signal 34 and that can preferably generate a series of video acquisition control signals 36. In the illustrated embodiment the video data acquisition signals includes a horizontal reset, a vertical reset, a field, a write enable and a pixel clock signal. The camera interface can be any of the commercially available camera interfaces that produce the necessary video acquisition control signals. Such systems are available from the Cognex Corporation, the Assignee hereof, and some are sold under the trademark of LSO-1000.

The data buffers 24 receive data from each of the camera interfaces 22. In one preferred embodiment, camera interfaces transmits data into the buffer 24 as a data stream of continuous lines of pixel data. The pixel data is transmitted as serial data with 8 bits of information encoding each pixel of the video image. The illustrated interface 22 generates the pixel data as a digital signal which is transferred to the buffers 24 of the associated channel, and the pixel clock toggles the write input of the buffer 24 to write the data into the buffer 24. In the depicted system 10 the video data signal 34 generated by the camera 14 is stored in the data buffer 24 of its associated channel at the native rate of the camera 14. This preferable configuration allows each of the multiple cameras 14 to input data into the acquisition means 12 at its native rate. The camera interface 22 generates video data as pixel signals and generates a pixel clock that can drive the data into the buffers 24 according to the rate at which the video data is acquired by the cameras 14. In one particular embodiment of the illustrated video acquisition system 10, the data buffers 24 are FIFO memories of the type sold by the IDT Company. The FIFO memories are selected to buffer a select number of pixel signals transferred from the camera interface 22. In the illustrated embodiment the FIFO's are selected to store up to seven sets of data packets. Each data packet represents thirty-two pixels and each pixel is represented by eight bits of data. In the illustrated embodiment the data buffer 24 is selected to be a FIFO having 512 bytes of memory.

The packet manager 26 in the illustrated embodiment connects to the output paths of each of the data buffers 24 and connects to the video acquisition control signals 36 of each of the camera interfaces 22. For clarity, in the depicted embodiment, only the video control acquisition signal 36 from the camera interface 22 on channel zero is illustrated. The illustrated packet manager 26 is a synchronous device driven by the system clock 40 that connects to the packet manager 26.

In a preferred embodiment of the invention the packet manager 26 is a field programmable gate array (FPGA). The packet manager 26 monitors the data and control signals from each of the video channels connected to the acquisition means 12. The packet manager 26 contains a state machine that maintains four pixel counters. Each of the pixel counters is associated with one of the data buffers 24. The pixel counter keeps count of the number of pixel signals stored in the data buffer 24. The state machine includes a bi-directional packet counter for each of the data buffers 24. The bi-directional packet counters maintains a count of the number of packets of video data stored in the associated data buffer 24. In one embodiment of the invention a data packet is represented by thirty-two pixels, and each pixel is represented by eight bits of data.

As will be explained in greater detail hereinafter with reference to one particular example of the video acquisition system 10, the pixel counter of an associated data buffer is incremented by the pixel clock and gated with the write enable signal generated from the camera interface 22 of the associated channel. The pixel counter can be a module 32 counter that rolls over on the count of thirty-two. The pixel counter 28 connects to the packet counter 30 of the associated data buffer 24 and increments the packet counter each time the pixel counter rolls over. In one embodiment, the packet manager 26 includes a second state machine that monitors the packet counter. The second state machine has a logical state that looks for pixel counters greater than zero. A pixel counter 28 greater than zero sends the state machine into a second logical state that reads pixel signals from the data buffer 24 associated with the packet counter 30 that has indicated a packet of data is available. The state machine has a logical state that reads a packet of data from the data buffer 24. A packet of data is thirty-two pixels. The state machine reads the thirty-two pixels from the associated data buffer 24 eight bits at a time. After reading a packet of data from the associated data buffer 24, the packet manager 26 outputs the data packet as one thirty-two bit word on output bus 42. In a preferred but optional embodiment, the state machines are synchronous state machines and the packet of pixel data is read out four pixels at a time along the thirty-two bit output bus 42. A packet of data represents eight long words, where a long word represents four pixels.

With reference again to FIG. 1, the packet signal is transferred to the video pixel buffer 16. The state machine in the packet manager 26 decrements the packet counter of the associated data buffer upon transfer of a packet of data to the video pixel buffer 16. The video pixel 16 has a memory for temporarily storing the packet signal. In one embodiment the video pixel buffer can be a FIFO memory. The video pixel buffer 16 stores the data packet during the time that the video address generator 44 generates an address for storing the data packet within the memory 22. The video address generator 44 is coupled to the packet manager 26 and receives from the packet manager a video burst signal 46 and VUI signal 48. The VUI signal 48 is the video micro interrupt signal generated by the packet manager. The VUI signal encodes type information and channel information. The channel information is the unique channel number that identifies the data source 14 that generated the associated packet signal. The type information encodes the acquisition control signal 36 and identifies the type of data of the packet signal.

In one embodiment, the packet manager 26 generates the type information by examining the horizontal reset, vertical reset and field signals. In one embodiment the packet manager 26 monitors the horizontal reset signal to determine if it is asserted. If the horizontal reset signal is asserted the associated packet is identified as the beginning of a new line. If the horizontal reset and the vertical signal are asserted, than the associated data packet is identified as data of a new field. If the field signal is logical low than the data is identified as associated with an even field. If the field signal is logical high the data packet is associated with an odd field. If no signal is asserted the data packet is identified as thirty-two pixels continuing a previously identified line. The generation of the VUI signal 48, and the generation of the type data and channel data will be explained in greater detail herein after with reference to one embodiment of the present invention. In a further optional feature of the packet manager 26, With reference to FIG. 5, one embodiment of the video address generator 44 constructed according to the present invention can be described. In the illustrated embodiment, the video address generator 44 is a hardware address generator that includes a series of start address registers and line index registers, a series of address counters, an adder, gating logic and a control logic state machine. The control logic state connects to the muxes, the address counters, and the adder. At the beginning of an address generation a software module, which will be described in greater detail hereinafter loads each start address register with an initial address.

In one preferred embodiment, the video address generator 44 is an FPGA that includes the control logic state machine connected to the packet manager 26 by the transmission wire that carries the VUI signal 48. The VUI signal 48 encodes the type information. In a preferred embodiment of the invention, the control logic state machine is a synchronous state machine that includes a logical state for monitoring the VUI signal 48. Responsive to the VUI signal 48, the control logic state machine configures the memory address generator 44 for an address generation operation appropriate to the type of data being stored in the video memory 20.

In the illustrated embodiment, the software module stores the start address for each image in the start address register of the associated channel. If the video channel is acquiring an interlaced signal then a line index parameter is loaded into the associated line index register. The line index parameter represents the number of pixels per line. As will be explained in greater detail hereinafter, the line index parameter is used by the video address generator 16 to store interlaced signals in the memory 20.

In one illustrative example, a start address is loaded by the software module into the start address register of the channel associated with the packet signal being stored. The control logic state machine reads the VUI signal. If the type of the data packet indicates that the data packet is the start of a new line of an even field, the control logic state machine configures the address generator to store the first data packet of an interlaced image. The control logic activates the pathways between the address counters and the adder, to load the current address into the adder. The control logic concurrently activates the pathways between the line index register associated with the data packet and the adder. The line index parameter is loaded into the adder and the current address and line index parameter are added together and loaded into the address counter. The new address generated by the address counter 44 is offset by the line index amount for appropriately storing a long word of the packet data into the memory 20. In a further illustrative example, a data packet that represents continuing pixel data from the same line, is indicated by the type data as continuing data. The control logic state machine configures the address generator 44 to generate a new address for this continuing data by incrementing the address currently stored in the address counter. As will be described in greater detail hereinafter, and particularly with reference to FIG. 6, the contol logic state machine can include logic states to map data packets into contigous address locations. additionally, as can be seen from the above description, the address generator 44 and the software module, can generate address locations for storing images associated with seperate channels into adjacent address locations. additionally, the address generator 44 state machine can include logic states for storing non-interlaced video signals, and for example a state machine that does not include a logical state for adding a line index parameter to the current address location.

The start address can be generated from a priori understanding of the size of the video image to be stored in the memory 20 or can be adaptively generated by providing for a dummy acquire step. During the dummy acquire step the number of pixels acquired is counted by the packet manager 26 while the video acquisition control signals are monitored. In one example the memory requirements of a non-interlaced video image are determined by packet manager 26, by monitoring the number of pixel signals written into a buffer memory, between the occurrence of two video reset signals. The packet manager 26 can include a state machine that responds to the acquisition control signal 36, to count the number of pixels in a generated image. The pixel count is transmitted to the address generator. The address generator includes a processing unit to generate, as a function of the pixel count, a start address location. The start address location is loaded into the start address register of an appropriate video channel. Other variations for generating start address locations as functions of the video image size are within the skill of one of ordinary skill in the art of electronic design, and do not depart from the scope of this invention.

The video address generator 44 can also include a memory timing generator 18. The memory timing generator 18 is a conventional memory control circuit that generates the control signals necessary to read and write packet data into the memory 20. These control signals typically include a RAS, CAS, write enable and read enable signal. When the video address generator 44 provides a video address on bus 50, the memory timing generator 18 generates the appropriate timing signals so that the data on video pixel buffer bus 52 is stored in the selected address location.

The video memory 20 can be a conventional memory system of the type that typically includes addressable DRAM and VRAM memory circuits. In one perferred embodiment, the video memory 20 includes a first display memory, ADMEM, that stores the images generated by the data sources 14 in a format suitable for display on a monitor, and a second expanded memory, AEMEM, that stores image data in continuously logically adjacent memory locations in order to use the memory space as efficiently as possible. Typically AEMEM, does not containe data packets stored in a format readily suitable for display purposes.

The invention will be further understood by reference by the following which is included for purposes of illustration and is not to be used to limit the scope or practice of the present invention.

This example will describe one preferred embodiment of a video acquisition system constructed according to the present invention and will describe the capabilities of one video acquisition system, the 4800.

The 4800 is intended to support a superset of the 4400 video capabilities. In some cases this requires an additional Video Option Module (VOM). Some examples would include:

- The 4400 supports simultaneous acquisition of 4 channels. The 4800 base board supports only a single acquisition channel. Additional RS-170 or CCIR (normal or wide) or full color capabilities require a multi-channel VOM.
- The 4400 digital video connector can be used for taking input from a Megaplus camera. A very simple passive VOM could be used to connect a Megaplus to the 4800.
- The 4400 digital video connector can also be used to connect to the LSO-1000. We could design a fairly simple LSO1 VOM that would allow the 4800 to connect to the LSO-1000. It would consist single FIFO plus some simple control logic. The maximum image size would be limited by the LSO-1000 to 4096 pixels by 4096 lines. Typically, it would be paired with an AEMEM of 4 MBytes or more. While it would also be possible to do software assisted acquires with this setup, the 4800 architecture is intended to eliminate this mode of operation.
- In the long term, line scan capabilities will be integrated into the 4800 family via an LSO2 VOM. This module will provide a superset of the LSO-1000 capabilities.

NOTE

Note: We are not currently committed to any VOM design. The initial 4800 application on turret mounters will not require a VOM. Follow-on applications will require some kind of line scan VOM.

2. Architecture

Since 4800 based vision systems are intended to address a broad scope of OEM (i.e SMD) and end-user (i.e. Checkpoint) applications, the video acquisition and display capabilities must extend beyond those currently available on existing Cognex products. The list of desirable new features includes:

Support for multiple acquisition formats within a single system (e.g. non-standard and either RS-170 or CCIR).

Support for independent acquisition and display time bases.

Support for "rapid reset" of acquisition timing.

Simultaneous acquisition into and display from different areas of memory regardless of acquisition and display formats.

Support for non-destructive graphics overlays.

Full color display support for "wide" formats (640 pixels by 480 lines and 768 pixels by 512 lines).

Optional non-standard image acquisition (line scan, large format and fast frame area scan).

Optional full color image acquisition with color space conversion.

Optional non-interlaced display support (VGA and SVGA).

Support for monochrome and full color real-time display with graphic overlays

FIG. 1 contains a top level block diagram of the acquisition and display module. It is comprised of eleven (11) basic functional blocks plus three (3) optional elements. The basic functions include the Host Bus interface for communicating with the host processor; an acquisition RS-170/CCIR timing generator coupled with a basic 1 of 4 RS-170/CCIR acquisition channel; the video packetizing control and timing which supports a maximum of four (4) active video channels; host and video pixel buffers which are necessary to support burst mode read and write cycles to and from ADMEM and AEMEM; the memory timing generator processes all requests for access to ADMEM and AEMEM and also controls the VRAM serial ports; the memory address generator calculates the required video addresses and maps ADMEM and AEMEM into their respective Host Bus address spaces; the cross point switch allows each of the red, green, blue, and overlay inputs into the RAMDAC to be sourced from any bank of ADMEM.

The optional elements include a separate display timing generator to support either a second RS-170/CCIR timebase or VGA or SVGA and a video option module (VOM). The use of various option modules allows the video acquisition capabilities of the 4800 to be customized for a particular application. The second RS-170/CCIR timing generator allows a stable display timebase to be maintained even if the acquisition timing is being interrupted (i.e. using rapid reset for low latency image acquisitions). This timing generator can also be used to support either VGA or SVGA non-interlaced display formats. These extend the display capabilities beyond those currently available with any Cognex VMEBus product.

FIG. 1 illustrates an Acquisition and Display Top Level Block Diagram.

3. Features

This section will summarize the basic features of each major element of the 4800 video acquisition and display sub-system.

3.1 Video Memory

ADMEM is used to acquire and display images using the same or different video timing. It supports multiple formats which allow standard or large format images to be captured and displayed. Images residing in ADMEM can be accessed by the host processor using either normal or burst mode Host Bus cycles. Burst mode read cycles facilitate high-speed data transfers during image analysis. AEMEM allows images of any arbitrary format to be acquired. Images residing in this memory can be accessed by the host processor using normal or burst mode Host Bus cycles. Burst mode read cycles facilitate high-speed data transfers during image analysis. In order to view an image (or part of an image) which is stored in AEMEM, it must first be copied into ADMEM under host processor control. The performance of this image copying operation can be optimized by performing burst mode read cycles from AEMEM followed by burst mode write cycles to ADMEM.

As illustrated in the top level block diagram, ADMEM and AEMEM share all memory resources. These include acquisition and host address and timing; video data; and host data. This means that access to ADMEM or AEMEM cycles must be shared between the host processor, video acquisition, refresh, and video refresh read transfers.

ADMEM

Up to 2.0 MBytes of VRAM.

32 bit (4 pixel) long word data structure compatible with Motorola big-endian format.

Organized as four (4) 1024 pixel by 512 line banks. Each bank is capable of storing 512 KBytes and requires four (4) 128 KByte×8 bit VRAMs.

While the design allows 1, 2, 3, or 4 banks to be populated, a reasonable alternative would be to support either 2 banks (1.0 MByte) or 4 banks (2.0 MBytes).

Time multiplexed multiple port operation allows host read and write cycles to be interleaved with video acquisition write, memory refresh, and read transfer cycles.

VRAM serial ports are used to support continuous display refresh regardless of acquisition format or status.

Supports both normal and burst mode Host Bus read and write cycles.

Supports acquisition of multiple image formats:

RS-170 and CCIR Narrow 1.0 MByte configuration allows up to four (4) images to be stored. However, the memory organization allows only two of these images to be accessed at any time for display purposes. This limits the supportable display options to monochrome or pseudo-color plus a non-destructive graphic overlay using RS-170, CCIR, or VGA timing. A special 512 pixel by 480 line VGA display mode will be implemented by extending the horizontal blank by 64 pixels at the start and end of each active scan line.

2.0 MByte configuration allows up to eight (8) images to be stored. A maximum of four images are now simultaneously accessible for display. This configuration supports monochrome, pseudo-color, or full color display with non-destructive graphic overlays using RS-170, CCIR, or VGA timing. A special 512 pixel by 480 line VGA display mode will be implemented by extending the horizontal blank by 64 pixels at the start and end of each active scan line.

RS-170 Wide and CCIR Wide 1.0 MByte configuration allows two (2) images to be stored. Display options include monochrome or pseudo-color plus a non-destructive graphic overlay using RS-170, CCIR, or VGA timing.

2.0 MByte configuration allows up to four (4) images to be stored. Display options include monochrome, pseudo-color, or full color with non-destructive graphic overlays using RS-170, CCIR, or VGA timing.

Half Resolution RS-170 and CCIR (Narrow or Wide)

1.0 MByte configuration allows up to sixteen (16) images to be stored. However, the memory organization allows only two of these images to be accessed at any time for display purposes. This limits the supportable display options to monochrome or pseudo-color plus a non-destructive graphic overlay using RS-170 or CCIR timing.

2.0 MByte configuration allows up to thirty-two (32) images to be stored. This configuration supports monochrome, pseudo-color, or full color display with non-destructive graphic overlays using RS-170 or CCIR timing

NOTE

When displaying half resolution images, the contents of the graphic overlay will also be pixel and field replicated. This must be taken into account when using overlays in conjunction with a half resolution display.

NOTE

While it is theoretically possible to utilize either VGA or SVGA timing to display half resolution images, the applications which usually work with this reduced resolution do not necessarily require a flicker-free non-interlaced display format.

Large Format 1.0 MByte configuration allows a single (1) large format image of up to 1024 pixels by 1024 lines to be stored. Supports monochrome and pseudo-color display using either RS-170, RS-170 Wide, CCIR, CCIR Wide, VGA, or SVGA timing. No overlays are supported.

2.0 MByte configuration allows a maximum of two (2) large format images of up to 1024 pixels by 1024 lines to be stored. Supports monochrome and pseudo-color display using either RS-170, RS-170 Wide, CCIR, CCIR Wide, VGA, or SVGA timing. If overlays are required then only a single image can be stored.

AEMEM (Optional) 4.0, 8.0, or 16.0 MBytes of DRAM 32 bit (4 pixel) long word data structure compatible with Motorola big-endian format.

Implemented using a single 1M, 2M, or 4M by 32 bit (4 byte) SIMM.

1.0 MByte SIMM yields the 4.0 MByte configuration.

2.0 MByte SIMM yields the 8.0 MByte configuration.

4.0 MByte SIMM yields the 16.0 MByte configuration.

Time multiplexed multiple port operation allows host read and write cycles to be interleaved with video acquisition write, and memory refresh cycles.

Supports both normal and burst mode Host Bus read and write cycles.

Image buffer configuration is defined by software and allows dense packing of images regardless of horizontal and vertical resolution.

3.2 Video Acquisition

In order to support multiple acquisition channels, incoming video streams are first assembled into video packets. A 4800 video packet is comprised of 32 pixels. Video packets are then transferred to the Video Pixel Buffer using a 40.0 MHz clock. The time required to transfer a packet is 800 nanoseconds (ns). Once a complete packet has been placed in the pixel buffer, the Packet Timing and Control logic issues a video micro interrupt to the Address Generator and a video burst write cycle request to the Timing Generator. Upon receipt of the video burst write cycle request, the Timing Generator will copy the packet from the Video Pixel Buffer into either ADMEM or AEMEM as soon as the current memory cycle if any) is complete. The duration of a video burst write memory cycle is 500 ns. Therefore, even with an aggregate video bandwidth of 40 MHz, there will be a 300 ns window between each successive video burst write cycle during which a refresh, video refresh read transfer, or Host Bus normal or burst mode memory cycle can be executed.

Software has to manage a number of resources on the 4800 in order to perform an acquire. The various control registers for all the resources must be set up consistently. The available resources include:

1. Video source

The baseboard has a single A/D converter proceeded by a 4:1 analog multiplexer as a source of video data. There can be multiple sources associated with a VOM.

2. Timebase

The baseboard has a single acquisition timing generator associated with the video source. Pixels are written into a FIFO during the active video interval when acquisition is enabled. A simple. VOM may use the baseboard timing, a more complex one would have its own timebase.

3. FIFO

All video data must go through a packetizing FIFO prior to being written into either ADMEM or AEMEM. There is a single FIFO on the baseboard. A VOM may contain up to four (4) FIFOs.

4. Channel

The output of a FIFO must be assigned to a channel to actually acquire the data. These are specialized DMA channels that control where in memory the data is written. There are a total of four (4) channels available. Depending upon the aggregate video data rate, one (1) to four (4) channels may be active simultaneously.

Although there can be up to five (5) FIFOs available as data sources (assuming 4 on the VOM plus the one on the baseboard), the Packet Timing and Control logic only supports a maximum of four (4) simultaneous channels. The aggregate normalized video bandwidth can not exceed 40 MHz. For any channel, the data being written into a FIFO from a video source is allowed to get ahead of the data being read out and written to memory, as long as the channel catches up by the end of the next horizontal blank interval. The normalized pixel clock rate can be determined by multiplying the number of active pixels per line times the line rate.

$$PCLK_{eff} = \text{Active Pixels} \times \text{Line Rate}$$

For example, an RS-170 video line is comprised of 512 active pixels and 266 blank pixels and has a clock rate of 12.2535 MHz (15.750 KHz line rate). The normalized pixel rate is 8.06 MHz (512×15.75 KHz), allowing up to 4 simultaneous acquisition DMA channels. Note that neither the vertical blanking time or the number of active vertical lines enter into the calculation. This is because the FIFOs are only large enough to hold a portion of a single video line. Table 1 illustrates the effective pixel clock rates for some typical acquisition formats.

TABLE 1

Effective Pixel Rates For Typical Video Formats

| FORMAT | Line Rate (KHz) | Pixel Rate (MHz) | Active Pixels/Line | Effective Pixel Rate (MHz) | Total Active Channels |
|---|---|---|---|---|---|
| RS-170 Narrow | 15.750 | 12.2535 | 512 | 8.06 | 4 |
| RS-170 Wide | 15.750 | 12.2535 | 640 | 10.08 | 3 |
| CCIR Narrow | 15.625 | 14.7384 | 512 | 7.99 | 4 |
| CCIR WIDE | 15.625 | 14.7384 | 768 | 11.99 | 3 |
| YD2048 Line Scan | 4.762 | 10.0000 | 2000 | 9.52 | 4 |
| FT2048 Line Scan | 9.524 | 20.0000 | 2000 | 19.05 | 2 |

However, this effective pixel rate computation is not necessarily enough. Even if the 4800 supports the average rate it must also never get so far behind as to overflow the FIFO or fail to empty the FIFO before the end of the next horizontal blank. Proper operation of each acquisition channel is guaranteed if:

The aggregate BURST rate<40 MHz

-or-

The aggregate Burst rate>40 MHz but the Effective rate<40 MHz (See NOTE below)

Acquisition is impossible if:

The aggregate EFFECTIVE rate>40 MHz.

NOTE

High aggregate effective rate acquires coupled with long lines (e.g. line scan, MegaPlus) must be analyzed in more detail to determine whether operation is guaranteed under all circumstances.

Since the Video Option Module can support a maximum of four (4) acquisition channels, the total number of channels, including the Base acquisition input, is five (5). The Packet timing and Control logic supports a maximum of four (4) simultaneous channels so long as the aggregate normalized video bandwidth does not exceed 40 MHz. The term "normalized" simply refers to the actual video pixel clock rate scaled by the number of active pixels per line divided by the total number of pixels per line. For example, an RS-170 video line is comprised of 512 active pixels and 266 blank pixels and has a clock rate of 12.25 MHz. Without normalization, the maximum number of concurrent acquisition channels would appear to be three (40.0/12.23=3.27). However, since the normalized pixel rate is only 8.06 MHz (12.25×(512/778)), the maximum number of concurrent acquisition channels is actually 4.0 (40.0/8.06=4.96).

Determining which of the five (5) possible acquisition channels is currently in use is controlled by the mapping logic contained within the Packet Timing and Control. Simply put, the mapping logic allows any four of the five possible video sources to be active at any one time.

An important feature of the 4800 video acquisition is its' ability to support concurrent acquisitions of multiple video formats. This means that a standard RS-170 Wide acquisition could be overlapped with a line scan acquisition using an LSO style VOM. Although simple, this example highlights the power of this video acquisition architecture. In the extreme case, all four channels could be acquiring using different video formats and pixel clock rates.

The 4800 will support three acquisition timing modes; genlock, phase lock, and external. In genlock mode the 4800 derives the RS-170 or CCIR video timing using an internal crystal to provide the pixel clock. Horizontal and vertical drive signals (BASEHDRIVE_L and BASEVDRIVE_L) can be used to synchronize camera(s) connected to either the base video input and/or a VOM. Two time bases are supported, 60 Hz RS-170 and 50 Hz CCIR. Each will require that a unique program be loaded into the Xilinx based acquisition timing generator. However, switching between normal (512 pixels per line) or wide (640 or 768 pixels per line at 60 or 50 Hz respectively) will be software selectable. The 4800 will use a programmable oscillator to derive the various acquisition pixel clock frequencies.

In genlock mode, the 4800 will also support "rapid reset" of the acquisition timing generator and camera. This feature will allow cameras which support this feature to be coupled with the 4800 in situations where the latency from a "part in position" command or external trigger until the acquisition commences must be minimized. Upon receipt of a reset command, the acquisition timing generator will be reset to a user-definable vertical line number at the end of the current scan line. This method will maintain the stability of the horizontal timing while achieving a worst case latency of one line time from the assertion of the "rapid reset" reset command.

In phase lock mode, the timing generator is synchronized to the camera source using a phase-lock-loop. The input to the phase lock loop is a composite synchronization signal which is either stripped from the incoming analog video or taken as an external input. The 4800 will contain a single phase-lock-loop (PLL) circuit which will be located on the baseboard. The composite synchronization signal required to bring the PLL into lock can be obtained from the base board video channel or from a VOM. Two time bases are supported, 60 Hz RS-170 and 50 Hz CCIR. Each will require that a unique program be loaded into the Xilinx based acquisition timing generator. However, switching between normal (512 pixels per line) or wide (640 or 768 pixels per line at 60 or 50 Hz respectively) will be selected via software. The pixel clock frequency will be derived from the voltage controlled oscillator (VCO) contained within the phase-lock-loop.

External timing mode requires that the camera provide horizontal and vertical drive. In this mode the camera can also provide a pixel clock or use the programmable oscillator to generate a pixel clock. A third acquisition timing generator Xilinx program will use the horizontal and vertical drive signals together with hardware area-of-interest techniques to determine the active video region. The external horizontal and vertical timing signals and the pixel clock (if supplied by the camera) can be taken from either a sensor attached to the base video connector or from a VOM. If the video signal level output by the camera is compatible with the analog to digital (A/D) converter used on the baseboard, then the camera can be attached directly to the base acquisition input connector. However, if the video signal level is too different, or if the camera outputs digital data, a "passive" VOM (discussed later) will be required.

The 4800 acquisition logic will support both full and half resolution formats. In half resolution mode the image will be comprised of every other pixel of whichever field (odd or even) is active after the acquire command is issued by the CPU.

The baseboard acquisition channel, referred to as BASE, contains a single video digitizer plus a 4:1 analog multiplexer. This channel can therefore acquire from one of four area scan cameras in any of the three timing modes in either full or half resolution. Support for area-scan cameras with non-standard video signal levels or digital video outputs can be achieved by adding a passive VOM.

In summary, the acquisition capabilities include:

A maximum of four (4) acquisition channels so long as the aggregate normalized video rate does not exceed 40 MHz.

Channel allocation is software controlled.

Base video acquisition capability is a single channel sourced from a maximum of four (4) cameras.

Normal and half resolution acquisition modes are supported. Half resolution images are defined to consist of only a single field (2:1 vertical sub-sampling) and every other pixel within a scan line (2:1 horizontal sub-sampling).

Analog video is digitized to eight (8) bits (256 grey levels.)

Input look-up-table is provided for BASE video channel.

Three timing modes are supported:

In genlock mode the 4800 is the master timing source to which all cameras must be slaved.

In phase lock mode the current camera (or an external composite synchronization waveform) is the master timing source to which the 4800 acquisition timing generator must be slaved. The pixel clock is derived via a VCO.

In external mode the camera directly controls the 4800 acquisition timing generator by providing horizontal and vertical drive signals.

The pixel clock can come from either the camera or the internal programmable oscillator.

"Rapid reset" of acquisition timing is supported when operating in genlock mode.

Genlock mode horizontal and vertical drive signals can be used to synchronize camera(s) connected to the base video input and/or a VOM.

Composite synchronization waveform required for phase lock mode can be obtained from the BASE video channel or a VOM.

External mode horizontal and vertical drive signals together with an external pixel clock (if supplied by the camera) can be obtained from the BASE video camera connector or the VOM camera connector.

Area-scan camera with either non-standard video signal levels or digital video can be supported using a passive VOM.

3.3 Video Display

Any images to be viewed must reside within ADMEM. For display purposes, ADMEM is viewed as being four banks of memory, with each bank being capable of providing a maximum of 1024 pixels and 512 lines. The actual resolution is determined by either the acquisition RS-170/CCIR or optional display (RS-170/CCIR, VGA, or SVGA) timing generator. A programmable oscillator will be used to derive the various display pixel clock frequencies. Each display resolution will require a different program to be loaded into the Xilinx based display timing generator.

The format (i.e monochrome/pseudo-color or full color) of the display together with the presence or absence of any graphic overlays is controlled via software, which determines the connectivity of the Cross Point Switch. The Cross Point Switch allows any bank of ADMEM to be connected to either the Red, Green, Blue, or OVR (overlay) inputs of the RAMDAC. The OVR bus is only a nibble wide. Since serial data sourced by ADMEM is byte wide, the upper nibble (bits 4 to 7) is not used. The graphics "blink" function can be supported by updating the RAMDACs look-up-tables during vertical blank (as is currently done on the 4400).

Since the maximum size of ADMEM is 2.0 MBytes, support for full color (i.e. 24 bit RGB) displays are limited to RS-170, RS-170 Wide, CCIR, CCIR Wide, and VGA. SVGA (800 pixels by 600 lines) can only be used to display monochrome, pseudo-color, or reduced resolution (e.g. 4-2-2 RGB) images. Since the generation of the reduced resolution RGB image in done using the CPU, any algorithm may be used. ADMEM based graphic overlays are supported for any of these modes.

As mentioned earlier, a special VGA mode will be created to allow standard (512 pixel per line) images to be viewed. This mode will extend the horizontal blanking interval by 64 pixels at the beginning and end of each line. This will "center" the 512 pixel line within the nominal VGA active horizontal region.

VGA or SVGA can be used to combine menu and status icons and/or text with images which were acquired using any horizontal and vertical resolution. This can be done by using a dedicated graphics overlay plane to switch between video and graphics, requiring the CPU to update a single buffer within ADMEM whenever the overlay needs to be updated.

When operating with either RS-170, CCIR or VGA timing, images acquired using half resolution will be properly displayed. Pixel and line replication will be used to "fill in" the missing data in both the horizontal and vertical directions. This function will support both standard (512 pixels per line) or wide (640 pixels per line at 60 Hz or 768 pixels per line at 50 Hz) image formats. When displaying half resolution images, any data residing in a graphic overlay buffer will also be pixel and line replicated. This must be taken into account when using graphic overlays in conjunction with the display of half resolution images.

The 4800 also supports monochrome and full-color display of real time data. Real time data is displayed without first being written into ADMEM, bypassing the memory altogether. Real time display mode requires the display and acquisition timing to be synchronous and in systems which do not contain the optional display timing generator, this will always be the case. However, in those configurations where a display timing generator is available, a method of synchronizing the acquisition and display timing is required. This is accomplished by "turning off" the display timing generator via software. Once the display timing generator is off, the 4800 automatically derives the display timing using the acquisition timing generator, guaranteeing lock. The 4800 also allows graphic overlays contained within ADMEM to be merged with real time display data.

In summary, the display capabilities include:

Supports display of full or half resolution images.

RS-170 or RS-170 Wide monochrome, pseudo-color, or full color (24 bit RGB) with independent graphic overlays.

CCIR or CCIR Wide monochrome, pseudo-color, or full color (24 bit RGB) with independent graphic overlays.

VGA used to display RS-170 Wide monochrome, pseudo-color, or full color (24 bit RGB) with independent graphic overlays.

Reduced horizontal resolution VGA used to display RS-170 monochrome, pseudo-color, or full color (24 bit RGB) with independent graphic overlays.

SVGA used to display RS-170 or RS-170 Wide monochrome, pseudo-color, or reduced resolution (i.e. 4-2-2 RGB) full color with independent graphic overlays used to implement text and graphics for menus and status. A single SVGA image requires two (2) banks of ADMEM (0:1 or 2:3).

Supports monochrome or full color real time display of video data

Graphic overlays can be driven directly from ADMEM and merged with either real time or stored images.

Display format is determined by the current program residing in the display timing generator Xilinx together with the pixel frequency selected using a programmable oscillator. If no optional timing generator is present, then the display format equals that currently selected for the acquisition timing (i.e either RS-170 or CCIR).

3.4 Host Bus Interface

The Host Bus Interface allows the video acquisition and display module to communicate with the host processor without requiring any VMEBus bandwidth. A maximum of four (4) video modules can be resident on the Host Bus. This requires that each video board contain a two (2) position DIP switch which is used to map each video module into a distinct portion of the host bus video address space.

All configuration registers, even those residing on a Video Option Module, are programmed via the Host Bus using normal (i.e. single read or write) cycles. Burst read and write operations are not supported for configuration registers. This also includes any static RAM (SRAM) used to implement point transform look-up-tables. All look-up-tables will be accessed using an address pointer register plus a data port. The address pointer register will automatically increment after any read or write cycle.

ADMEM and AEMEM support both normal and burst mode read and write cycles. Supporting normal read cycles allows pixel data from ADMEM or AEMEM to be streamed by Cognex's proprietary vision co-processors; VC1 (and its' replacement VC3) and VC2. This feature will be useful in applications were image analysis must be overlapped with acquisition. Burst read and write cycles are useful when large quantities of data must be moved from either ADMEM or AEMEM into main (host processor) memory or when copying a new display image from either main memory or AEMEM into ADMEM. Burst mode write access to ADMEM is also useful when updating graphic overlay information.

As illustrated in the top level block diagram, ADMEM and AEMEM share all memory resources address, timing, and data resources. This means that ADMEM or AEMEM cycles must be shared between the host processor, video acquisition, refresh, and video refresh read transfers. The net effect is that the amount of memory bandwidth available for read or write operations by the host processor is very dependent upon the amount of video bandwidth necessary to service any concurrent active acquisition channels. This subject will be covered in greater detail in a later section.

At a minimum, the video module will interrupt the host processor at the beginning of every vertical blank time for the acquisition and display timing generators. Additional interrupts may be provided to support key base board or Video Option Module timing marks. An interrupt vector will be provided during a Host Bus interrupt acknowledge cycle. A read-only status register will provide additional information about the pending video interrupt(s). All interrupts will be level sensitive and be of the release on register access (RORA) variety. The interrupt generator will properly handle interrupts from multiple sources to insure that no timing marks are missed.

In summary, the capabilities of the Host Bus Interface are:

Configuration registers support only normal read or write Host Bus cycles.

Look-up-tables are accessed using an address pointer register coupled with a bidirectional data port and support only normal Host Bus read or write cycles.

ADMEM and AEMEM support both normal and burst mode read or write cycles.

The performance of read or write operations involving either ADMEM or AEMEM is a function of the amount of memory bandwidth required to support any currently active video acquisition channel(s).

The video module and all Video Option Modules will contain a read-only identification register which will contain the module type, revision number, and installed options (where applicable). This register will always be located at Host Bus address offset zero for either a base board or VOM.

The video module will provide acquisition and display video timing RORA interrupts to the host processor. A read-only interrupt vector plus an interrupt status register will also be provided.

3.5 Video Option Modules

As previously mentioned, additional video acquisition capabilities will be offered via video option modules. Two types of VOMs will be supported, active and passive. Active VOMs will contain on-board video timing, analog-to-digital (A/D) converters, and data packetizing first-in first-out memories (FIFOs). An example of this type of VOM would include the line scan option (LSO).

A passive VOM merely performs video data translation. Its' analog output conforms to that required by the video A/D converter located on the baseboard. Alternatively, a digital output path can be connected directly to the packetizing FIFO located on the baseboard. This digital path can be used to support digital output cameras or to allow a video signal which cannot easily be formatted to baseboard A/D specification to be digitized on the VOM. These types of VOMs will be used to interface with area-scan cameras whose timing can be supported via the acquisition timing generator which resides on the baseboard, but whose video data (either analog or digital) does not directly conform to the requirements for a direct connection to either the A/D converter or packetizing FIFO.

All VOMs will share a common interface for access via the Host Bus. Address, timing, and data information will be provided by the Host Bus Interface located on the video baseboard. The VOM Host Bus interface will include:

Sixteen (16) bits of Host Bus Data; HBD(31:16)

Host Bus read and write enables; HBWREN_L, and HBRDEN_L;

Host Bus byte 0 and 1 enables; HBB0EN_L and HBB1EN_L.

Eight (8) bits of registered Host Bus address; HBA(9:2).

VOMs can have a maximum of sixty-four (128) word-wide (16 bit) registers which reside from HBA(9:0)= $100_h$ to HBA(9:0)=1FC$_h$.

Connections between the camera(s) and a VOM will be made through a high density 44 pin D-Sub style connector. The specific pinout for this connector will be determined by the functionality of the VOM. The connector will attach directly to the VOM and fit within a designated opening in the video module from panel. In no VOM is present, this opening will be sealed with a filler plate.

A common video interface, henceforth referred to as the VOM Video Bus, will be used between all VOM designs and the main video board. This interface will support a maximum a four (4) channels of video data, limiting a single VOM to four (4) parallel acquisition channels. This number was selected based upon two requirements. The first is a high frame area-scan camera being developed by EG&G reticon which segments a 512 pixel by 512 line CCD into four 128 pixel by 512 line sub-sensors for video output. High frame rates are achieved by outputting simultaneously from each 128 pixel segment, required that the digitizer support four (4) parallel video channels. The second is a high speed line scan camera available from Dalsa. This camera segments a 2048 pixel sensor into either eight (8) 256 pixel segments or four (4) 512 pixel segments. Again, in order to support this camera a minimum of four (4) parallel video channels are required.

The VOM Video Bus interface will support acquisition clock rates up to 20 MHz and will include:

Active VOM

A single 8-bit wide data path, PKTDATA(7:0), which contains data destined for the video pixel buffer (VPB).

Three 8-bit data paths; RED(7:0), GRN(7:0), and BLUD(7:0) which are used to allow real time display of VOM data. Alternatively, RED(7:0) can be sourced via the baseboard digitizer.

Four video acquisition clocks; VOMCH0CLK, VOMCH1CLK, VOMCH2CLK, and VOMCH3CLK, which can be derived from internal VOM timing or be obtained directly from the camera(s).

Four video acquisition horizontal reset signals; VOMCH0HRST_L, VOMCH1HRST_L, VOMCH2HRST_L, and VOMCH3HRST_L, Four video acquisition vertical reset signals; VOMCH0VRST_L, VOMCH1VRST_L, VOMCH2VRST_L, and VOMCH3VRST_L.

Four acquisition field indication signals; VOMCH0FIELD, VOMCH1FIELD, VOMCH2FIELD, and VOMCH3FIELD.

Four acquisition FIFO write control signals; VOMCH0FIFOWR_L, VOMCH1FIFOWR_L, VOMCH2FIFOWR_L, and VOMCH3FIFOWR_L.

A single composite synchronization output signal which can be used to control the phase-lock-loop located on the baseboard in phase lock mode; VOMCSYNC_L.

One set of horizontal and vertical drive output signals which can be used to control the acquisition timing generator located on the video baseboard in external timing mode; VOMHDRIVE_L and VOMVDRIVE_L.

A single composite synchronization input signal which can be used to control the camera(s) in genlock mode; BASECSYNC_L.

One set of horizontal and vertical drive input signals which can be used to control the camera(s) in either genlock or external timing mode; BASEHDRIVE_L and BASEDRIVE_L.

A single RORA interrupt

Passive VOM

A single analog video path; VOMAVID.

A single 8-bit digital data path for driving the input of the packetizing FIFO located on the baseboard; VOMDVID(7:0).

A single video acquisition clock; VOMCLK, which can be obtained from the acquisition timing generator located on the base board or be obtained directly from the camera(s).

An acquisition horizontal reset signal; VOMHRST_L.

An acquisition vertical reset signal; VOMVRST_L.

An acquisition field indication signal; VOMFIELD.

An acquisition FIFO write control signal; VOMFIFOWR_L.

A single composite synchronization output signal which can be used to control the phase-lock-loop located on the baseboard in phase lock mode; VOMCSYNC_L.

One set of horizontal and vertical drive output signals which can be used to control the acquisition timing generator located on the video baseboard in external timing mode; VOMHDRIVE_L and VOMVDRIVE_L.

A single composite synchronization input signal which can be used to control the camera(s) in genlock mode; BASECSYNC_L.

One set of horizontal and vertical drive input signals which can be used to control the camera(s) in either genlock or external timing mode; BASEHDRIVE_L and BASEDRIVE_L.

Mapping logic contained within the Acquisition Packet Timing and Control section will allow any active VOM video channel(s) to be combined with the baseboard video channel. When using a Passive VOM, multiplexers located on the base board will determine the data and timing sources for the packetizing logic. Analog video from a Passive VOM will be digitized using the A/D converter located on the base board whereas digital video data will be supplied directly to the packetizing FIFO. With a Passive VOM, the mapping logic located within the Packet Timing and Control logic will always be selecting the base board as the source of all acquisition data and timing.

4. Physical Description 4.1 Base Board

The base module conforms to the VMEBus 6U standard (9.187 inches by 6.299 inches). Although 96 pin DIN P1 and P2 connector s provided for physical mating with the VMEBus backplane, only power (+5, +12, and −12 VDC) and ground (GND) are used.

The video acquisition and display card also has a 96 pin DIN press fit P3 connector for implementing the Host Bus. A pair of 15 pin D-Sub connectors will be used to connect the base board video acquisition circuit with up to four cameras. A 9 pin D-Sub connector will be used for connecting the display. High-density mezzanine bus connectors will be used to implement the VOM Host Bus and the VOM Video Bus interfaces.

4.1.1 Camera Interface

The pin definitions for the camera connectors is provided in Table 2.

TABLE 2

Pin Definition For Camera Connectors (J4 and J5)

| Pin Number | Camera 1 and 2 (J5) | Pin Number | Camera 3 and 4 (J4) |
|---|---|---|---|
| 1 | EXTPIXCLK | 1 | ANALOG GROUND |
| 2 | CAM2HDRIVE | 2 | CAM4HDRIVE |
| 3 | CAM2CNTRL1 | 3 | CAM4CNTRL1 |
| 4 | CAM1HDRIVE_L | 4 | CAM3HDRIVE_L |
| 5 | CAM1CNTRL0 | 5 | CAM3CNTRL0 |
| 6 | ANALOG GROUND | 6 | ANALOG GROUND |
| 7 | CAM2CNTRL0 | 7 | CAM4CNTRL0 |
| 8 | +12 VDC | 8 | +12 VDC |
| 9 | CAM1CNTRL1 | 9 | CAM3CNTRL1 |
| 10 | CAM2VDRIVE_L | 10 | CAM4VDRIVE_L |
| 11 | ANALOG GROUND | 11 | ANALOG GROND |
| 12 | CAM2VDRIVE_L | 12 | CAM3VDRIVE_L |
| 13 | CAM1VIDEO | 13 | CAM3VIDEO |
| 14 | CAM2VIDEO | 14 | CAM4VIDEO |
| 15 | EXTHDRIVE_L | 15 | EXTUDRIVE_L |

4.1.2 Display Interface

The pin definition for the display connector is provided in Table 2.

TABLE 3

Pin Definition For Display Connector (J6)

| Pin Number | LSO1 VOM input |
|---|---|
| 1 | RED |
| 2 | GREEN |
| 3 | BLUE |
| 4 | HDRIVE_L |
| 5 | VDRIVE_L |
| 6 | ANALOG GROUND |
| 7 | ANALOG GROUND |
| 8 | ANALOG GROUND |
| 9 | ANALOG GROUND |
|  | ANALOG GROUND |

4.2 Video Option Modules

Each video option module will be approximately 3.5 inches by 8.9 inches. High-density mezzanine bus connectors will be used to implement the VOM Host Bus Interface and the VOM Video Bus. These connectors are labeled J1, J2 and J3. External camera connections will be made using a 44 pin high density D-Sub style connector located on the VOM. Table 4 contains the pinout for this interface. Those signals required to support the LSO1 VOM are marked with an asterisk (*).

TABLE 4

Pin Definition for VOM Interface Connectors

| Pin Number | VOM Interface J1 | VOM Interface J2 | VOM Interface J3 |
|---|---|---|---|
| 1 | VOMCH0CQCLK | VIDEORST_L | BASEACQCLK |
| 2 | Digital Ground | HBWREN_L | Digital Ground |
| 3 | VOMCH1ACQCLK | HBRDEN_L | BASEACQCSYNC_L |
| 4 | Digital Ground | BYTE0EN_L | Digital Ground |
| 5 | VOMCH0ACQHRST_L | BYTE1EN_L | BASEACQHDRIVE |
| 6 | VOM0ACQVRST_L | HBXCVREN_L | BASEACQVDRIVE |
| 7 | VOM0CH1ACQHRST_L | HBXCVRDIR | Digital Ground |
| 8 | VOMCH1ACQVRST_L | REALTIMERED | BASEACQHSYNC |
| 9 | Digital Ground | REALTIMEGRN | BASEACQCLAMP |
| 10 | VOMCH0ACQPKTWR_L | REALTIMEBLU | Digital Ground |
| 11 | VOMCH1ACQPKTWR_L | REALTIMEREDSEL | Digital Ground |
| 12 | Digital Ground | Digital Ground | BLU0 |
| 13 | VOMCH0FIFORD_L | VHBA2 | BLU1 |
| 14 | VOMCH0FIFOOE_L | VHBA3 | BLU2 |
| 15 | Digital Ground | VHBA4 | BLU2 |
| 16 | VOMCH1FIFORD_L | VHBA5 | Digital Ground |
| 17 | VOMCH1FIFOOE_L | Digital Ground | GRN0 |
| 18 | Digital Ground | VHBIOD0 | GRN1 |
| 19 | VOMCH0ACQFIELD | VHBIOD1 | GRN2 |
| 20 | VOMCH1ACQFIELD | VHBIOD2 | GRN3 |
| 21 | Digital Ground | VHBIOD3 | Digital Ground |
| 22 | PKTDATAIN0 | VHBIOD4 | RED0 |
| 23 | PKTDATAIN1 | VHBIOD5 | RED1 |
| 24 | PKTDATAIN2 | VHBIOD6 | RED2 |
| 25 | PKTDARAIN3 | VHBIOD7 | RED3 |
| 26 | PKTDATAIN4 | VHBD8 | RED4 |
| 27 | PKTDATAIN5 | VHBD9 | RED5 |
| 28 | PKTDATAIN6 | VHBD10 | RED6 |
| 29 | PKTDATAIN7 | VHBD11 | RED7 |
| 30 | Digital Ground | VHBD12 | Digital Ground |
| 31 | VOMCH3ACQFIELD | VHDB13 | GRN4 |
| 32 | VOMCH2ACQFIELD | VHBD14 | GRN5 |
| 33 | Digital Ground | VHBD15 | GRN6 |
| 34 | VOMCH3FIFOOE_L | Digital Ground | GRN7 |
| 35 | VOMCH3FIFORD_L | VHBA6 | Digital Ground |
| 36 | Digital Ground | VHBA7 | BLU4 |
| 37 | COMCH2FIFOOE_L | VHBA8 | BLU5 |

TABLE 4-continued

| | Pin Definition for VOM Interface Connectors | | |
|---|---|---|---|
| Pin Number | VOM Interface J1 | VOM Interface J2 | VOM Interface J3 |
| 38 | VOMCH@FIFORD_L | VHBA9 | BLU6 |
| 39 | Digital Ground | VCC | BLU7 |
| 40 | VOMCH3ACQPKTWR_L | VCC | Digital Ground |
| 41 | VOMCH2ACQPKTWR_L | VCC | VOMSYSCLK |
| 42 | Digital Ground | VCC | Digital Ground |
| 43 | VOMCH3ACQVRST_L | VCC* | VOMAVID |
| 44 | VOMCH3ACQHRST_L | VCC* | Digital Ground* |
| 45 | VOMCH2ACQVRST_L | Digital Ground* | VOMCAMVDRIVE |
| 46 | VOMCH2ACQHRST_L | VME − 12VDC | VOMCAMHDRIVE |
| 47 | Digital Ground* | VME − 12VDC | Digital Ground* |
| 48 | VOMCH3ACQCLK | Digital Ground* | VOMCAMCSYNC_L |
| 49 | Digital Ground* | VME + 12VDC | Digital Ground* |
| 50 | VOMCH2ACQCLK | VME + 12VDC | VOMINT_L* |

5. Software Reference

This section provides programming models for the various video acquisition and display resources. It also discusses how these resources are accessed via the Host Bus. The final section provides a detailed description of the internal resource configuration registers.

5.1 Host Bus Interface

This section provides an overview of the video module Host Bus address mapping. The various Host Bus data transfers protocols supported by the video module are also discussed.

5.1.1 Host Bus Addressing

As noted in the Host Bus Specification, the most significant nibble (bits 28 through 31) of the address are used to select between the various types of add-in modules. The video sub-system is fixed at the following address:

HBA(31:28)=000.1 b

In addition, HBA(27:26) are also decoded by the video hardware. This allows a 4800 based vision system to contain up to four video modules. Due to the multiplexing of address and data information on the Host Bus, the video processor loads the necessary address bits into a register when the cycle start signal (HBSTART_L) is active the values of HBA(31:28) and HBA(27:26) are correct. This internal video module address, henceforth referred to as the Host Bus Video Address (HBVA), is 26 bits wide. Table 5 contains the Host Bus base address for each of the four (4) possible video boards.

TABLE 5

| Host Bus Address Allocation | |
|---|---|
| HBA(31:0) | Address Space |
| 1000 0000$_h$ | Video Board 1 Base Address |
| 1400 0000$_h$ | Video Board 2 Base Address |
| 1800 0000$_h$ | Video Board 3 Base Address |
| 1C00 0000$_h$ | Video Board Base Address |

Table 6 shows how the Host Bus address is mapped for an individual video module. The Host Bus address space is divided into four 16 MByte blocks. As shown in the table HBA(25:24) are used to determine which 16 MByte block is being accessed; configuration registers, ADMEM, or AEMEM. The upper 16 MByte block of address space is reserved for the potential addition of a second bank of AEMEM.

TABLE 6

| Video Board Address Allocation | | |
|---|---|---|
| Starting Address | Video Address Source | Size (Bytes) |
| Base + 0 | Base Board Control Registers | 256 |
| Base + 100$_h$ | VOM control registers | 256 |
| Base + 0100 0000$_h$ | ADMEM Bank 0 | 512K |
| Base + 0108 0000$_h$ | ADMEM Bank 1 | 512K |
| Base + 0110 0000$_h$ | ADMEM Bank 2 | 512K |
| Base + 0118 0000$_h$ | ADMEM Bank 3 | 512K |
| Base + 0200 0000$_h$ | AEMEM | 0, 4, 8, or 16 M |
| Base + 0300 0000$_h$ | reserved | 16 M |

5.1.2 Host Bus Transfer Types

The video module supports both normal and burst mode read or write Host Bus transfers. In addition, any register or memory location can be accessed in either byte, word, or long word mode. The current value of the "transfer size bits", HBTSIZE(1:0), determines whether or not the values for HBVA(1:0) factor into the current cycle. Table 7 shows the four possible read or write transfer modes.

TABLE 7

| Host Bus Transfer Size Bits | | |
|---|---|---|
| HBTSIZE(1:0) | Host Bus Cycle Type | Bytes Transferred |
| 00 | Long Word | 4 |
| 01 | Byte | 1 |
| 10 | Word | 2 |
| 11 | Burst | 16 |

Table 8 illustrates how the Host Bus transfer modes are processed by the video module.

TABLE 8

| Transfer Type | HBVA(1:0) | Byte 0 Bits(31:24) | Byte 0 Bits(31:24) | Byte 0 Bits(31:24) | Byte Bits(31: |
|---|---|---|---|---|---|
| Byte Write | 00 | Write | | | |
| | 01 | | Write | | |
| | 10 | | | Write | |
| | 11 | | | | Write |
| Word Write | 00 | Write | Write | | |
| | 10 | | | Write | Write |
| Long Word Write | 00 | Write | Write | Write | Write |
| Burst Write | 00 | Write | Write | Write | Write |
| Byte Read | 00 | Read | | | |
| | 01 | | Read | | |
| | 10 | | | Read | |
| | 11 | | | | Read |
| Word Read | 00 | Read | Read | | |
| | 10 | | | Read | Read |
| Lond Word Read | 00 | Read | Read | Read | Read |
| Burst Read | 00 | Read | Read | Read | Read |

5.1.3 Host Bus Performance

Transfer rates between the CPU and either ADMEM or AEMEM, via the Host Bus, are not constant. ADMEM and AEMEM share all available memory resources. Therefore the following memory cycles are mutually exclusive:

Host Bus read, write, burst read, or burst write video acquisition burst write video display read transfer refresh While the impact of refresh and display read transfer cycles on the performance of the Host Bus with respect to ADMEM and AEMEM is negligible, the number of video burst write cycles will increase as the aggregate normalized video acquisition clock rate increases. Therefore, the transfer rate between the CPU and either ADMEM or AEMEM is directly affected by any amount of video acquisition.

NOTE

The following table does has not been updated to reflect enhancements to the design which should improve non-burst read cycles times. This table will be completed after results are obtained from actual testing.

TABLE 9

| | | ADMEM and AEMEM Host Bus Transfer Rates | | | | |
|---|---|---|---|---|---|---|
| Video Format | Host Bus Clock | Active Video Channels | Read | Burst Read | Write | Burst Write |
| RS-170 Narrow | 25 MHz | 0 | 14.3 MB/s | 26.7 MB/s | | |
| | | 1 | 12.5 MB/s | 25.3 MB/s | | |
| | | 2 | 10.8 MB/s | 21.8 MB/s | | |
| | | 3 | 9.0 MB/s | 21.1 MB/s | | |
| | | 4 | 7.3 MB/s | 20.8 MB/s | | |
| | 40 MHz | 0 | 20.0 MB/s | 35.5 MB/s | | |
| | | 1 | 17.5 MB/s | 31.8 MB/s | | |
| | | 2 | 15.0 MB/s | 27.8 MB/s | | |
| | | 3 | 12.6 MB/s | 24.1 MB/s | | |
| | | 4 | 10.0 MB/s | 22.3 MB/s | | |
| RS-170 Wide | 25 MHz | 0 | 14.3 MB/s | 26.7 MB/s | | |
| | | 1 | 12.6 MB/s | 24.8 MB/s | | |
| | | 2 | 10.3 MB/s | 20.8 MB/s | | |
| | | 3 | 8.1 MB/s | 19.8 MB/s | | |
| | | 4 | N/A | N/A | | |
| | 40 MHz | 0 | 20.0 MB/s | 35.5 MB/s | | |
| | | 1 | 16.9 MB/s | 30.8 MB/s | | |
| | | 2 | 13.7 MB/s | 26.1 MB/s | | |
| | | 3 | 10.6 MB/s | 21.3 MB/s | | |
| | | 4 | N/A | N/A | | |
| CCIR Narrow | 25 MHz | 0 | | | | |
| | | 1 | | | | |
| | | 2 | | | | |
| | | 3 | | | | |
| | | 4 | | | | |
| | 40 MHz | 0 | | | | |

TABLE 9-continued

ADMEM and AEMEM Host Bus Transfer Rates

| Video Format | Host Bus Clock | Active Video Channels | Read | Burst Read | Write | Burst Write |
|---|---|---|---|---|---|---|
| | | 1 | | | | |
| | | 2 | | | | |
| | | 3 | | | | |
| | | 4 | | | | |
| CCIR Wide | 25 MHz | 0 | | | | |
| | | 1 | 11.6 MB/s | | | |
| | | 2 | 9.3 MB/s | 21.4 MB/s | | |
| | | 3 | | | | |
| | | 4 | N/A | N/A | | |
| | 40 MHz | 0 | | | | |
| | | 1 | | | | |
| | | 2 | | | | |
| | | 3 | | | | |
| | | 4 | N/A | N/A | | |

5.2 Programming Models

This section provides programmer reference models for three key components of the 4800 video subsystem. The models contain sufficient detail to allow those responsible for providing lower level software interfaces to understand the relationships between the configuration registers and video system performance.

5.2.1 ADMEM

Figure 2:
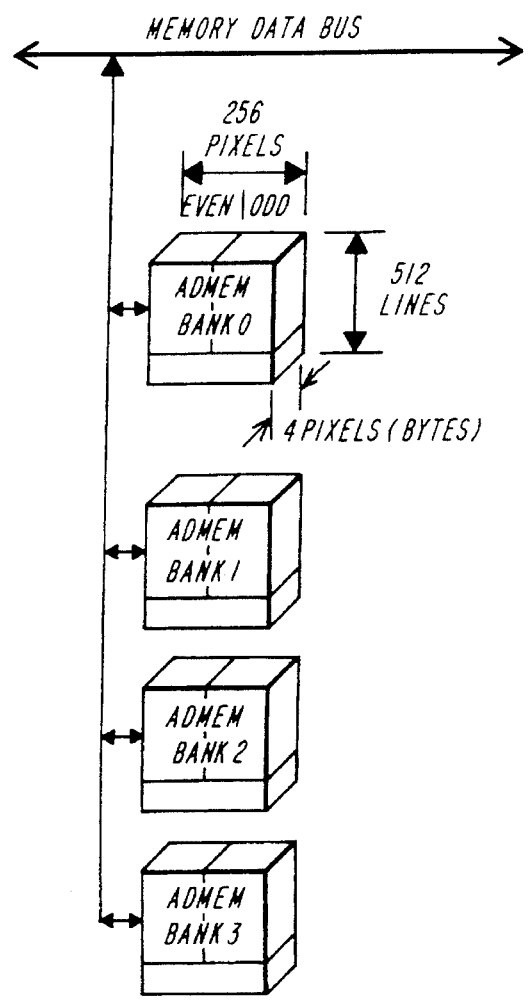
FIG. 2 illustrates an acquisition and display memory (ADMEM) software model according to the present invention.

FIG. 2 contains an illustration of the acquisition and display memory software model. The acquisition and display memory (ADMEM) is implemented using video DRAM (VRAM) technology and is comprised four banks, Bank0, Bank1, Bank2, and Bank 3. Two configurations are possible. A 1.0 MByte ADMEM only requires Banks 0 and 1 to be populated FIG. 2 illustrates an Acquisition and Display Memory (ADMEM) Software Model.

while the 2.0 MByte version needs all four (4) banks. The video acquisition and Host Bus access data path is 32 bits (i.e. a 68040 long word) and is capable of accessing four pixel locations on any memory cycle.

Within ADMEM, the natural organization of each bank is a 1024 pixel (256 pixels wide×4 pixels deep) by 512 line matrix. As shown in the figure, each bank of ADMEM is a three dimensional structure. The total capacity of any single bank is 512 KBytes ((256×4 pixels/line)×512 lines)), enough to hold two (2) normal, one (1) wide, or eight (8) RS-170 or CCIR images. Large format Images which contain more than 512 lines will be acquired by automatically placing lines in the next higher bank (i.e. Bank1 if the acquisition began using Bank0).

From the perspective of the host bus, ADMEM is seen as a two-dimensional matrix. This is because the use of VRAMs dictates that ADMEM have a rigid row and column structure. Table 10 illustrates how the Host Bus address is mapped into physical ADMEM addresses.

TABLE 10

| Host Bus ADMEM Address Mapping | | | |
|---|---|---|---|
| HBA(20:19) | HBA(18:10) | HBA(9:2) | HBA(1:0) |
| Bank Select | Row Address | Column Address | Byte Address |

Multiple image formats can be acquired using ADMEM. For example, ADMEM could be used to acquire a 512 pixel per line RS-170 image in conjunction with a 1024 pixel by 1024 line large format image.

Image Allocation Constraints

The acquisition logic requires that all image lines begin at an address that is 0 mod 32. The length of each line must also be 0 mod 32. The display logic has additional constraints documented in a later section

5.2.2 AEMEM

Figure 3:
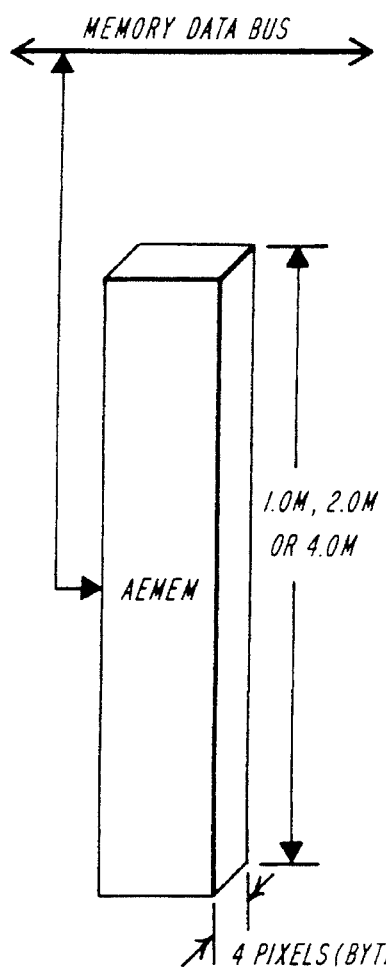
FIG. 3 illustrates an acquisition expansion memory (AEMEM) software model according to the present invention.

As shown in FIG. 3, AEMEM is organized as a linear array which is either 1.0M, 2.0M, or 4.0M addresses long and 4 bytes deep. Each address can therefore contain four (4) pixels. This memory structure allows the last four pixels of line "n" and the first four pixels of line "n+1" to be located at consecutive memory locations. In addition, the end of one image and the beginning of another image can also occupy adjacent memory addresses. This feature allows the available amount of AEMEM to be used very efficiently. Through proper buffer management, the boundaries of multiple images of a similar format or multiple images acquired using different formats can occupy adjacent memory addresses. Table 11 illustrates how the Host Bus address is mapped into physical AEMEM addresses

TABLE 11

| Host Bus AEMEM Address Mapping | | |
|---|---|---|
| HBA(23,21:12) | HBA(22,11:2) | HBA(1:0) |
| Row Address | Column Address | Byte Address |

FIG. 3 illustrates an Acquisition Expansion Memory (AEMEM) Software Model.

Image Allocation Constraints

The acquisition logic requires that all image lines begin at an address that is 0 mod 32. The length of each line must also be 0 mod 32. The display logic has additional constraints documented in a later section.

5.2.3 Image Acquisition

This section discusses all aspects of video acquisition. These include selecting between available video resources, address generation (cip_buffer control), and acquisition timing.

5.2.3.1 Acquisition Resources

Figure 4:
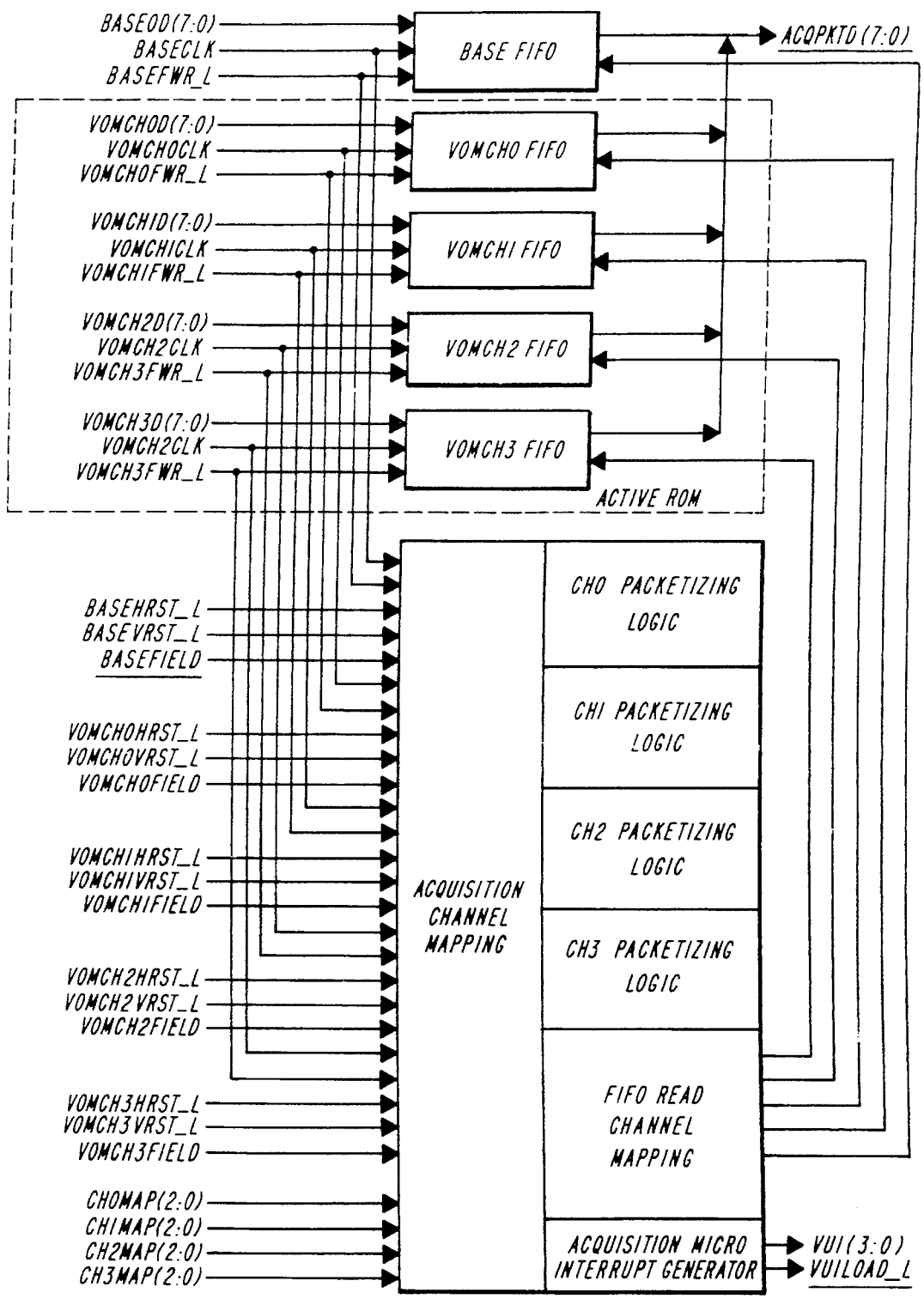
FIG. 4 illustrates an acquisition video resource model according to the present invention.

FIG. 4 contains the software resource model for the 4800 acquisition section. The model is comprised of five components; Acquisition Channel Mapping, FIFO Read Channel Mapping, CH0 to CH3 Packetizing Logic, Acquisition Micro Interrupt Generator, and data rate matching FIFOs. The model contains five (5) FIFOs since this is the maximum allowable. Actual deployment systems will contain between one and five FIFOs. The Base FIFO will always be present while the VOM FIFOs are optional. As noted previously, the FIFOs are used to rate match the video data rate for a particular channel with the internal 40 MByte/s packet data rate. The Acquisition Channel Mapping is used to map determine which of the five possible data sources is currently active. The 4800 allows up to four channels of video to be active simultaneously. Each of the four available channels is mapped to one of the five available sources via a "channel mapping" register.. This register allows the four video channels to be connected to any of the five available video inputs.

Once the mapping is complete, the video acquisition control signals (e.g. BASECLK, BASEFWR_L, BASEHRST_L, BASEVRST_L, and BASEFIELD) are passed to the proper channel (CH0, CH1, CH2, or CH3) of Packetizing Logic. The FIFO write control (e.g. BASEFWR_L) is used by the Packetizing Logic to control a counter used to determine when a packet of video data (i.e. 32 pixels) is present of the corresponding FIFO. As long as at least one packet of data is available within a FIFO, the Packetizing Logic will read the FIFO and copy the packet into the Video Pixel Buffer. A small state machine monitors the internal "packet available" signals which emanate from each channel of Packetizing Logic to determine which channel should be serviced next. When multiple channels are active, each is serviced in a round-robin fashion.

Near the end of the transfer of a packet into the Video Pixel Buffer, an acquisition micro interrupt is issued. The horizontal and vertical timing marks (e.g. BASEHRST_L and BASEVRST_L) are used to determine whether the current packet is the start of a new field (or frame), the beginning of a new line, or the continuation of the current line. For interlaced acquisitions, the field indicator (e.g. BASEFIELD) is used to determine which field is currently active.

The interrupt is comprised of a vector, VUI(3:0), plus a validation signal, VUILOAD_L. This vector is loaded into the memory Address Generator whenever VUILOAD_L is a logic zero. The vector contains two fields, VTYPE(1:0) and VCH(1:0). The VCH field is used by the Address Generator to determine the channel to which the packet belongs. The VUITYPE field tells the Address Generator how the address should be calculated. The possible packet "types" are:

Packet is the start of a new frame (for non-interlaced acquisitions) or the beginning of an even or odd field (for interlaced acquisitions).

Packet is the start of a new line within the current frame of field.

Packet is a continuation of the current line.

Figure 5:
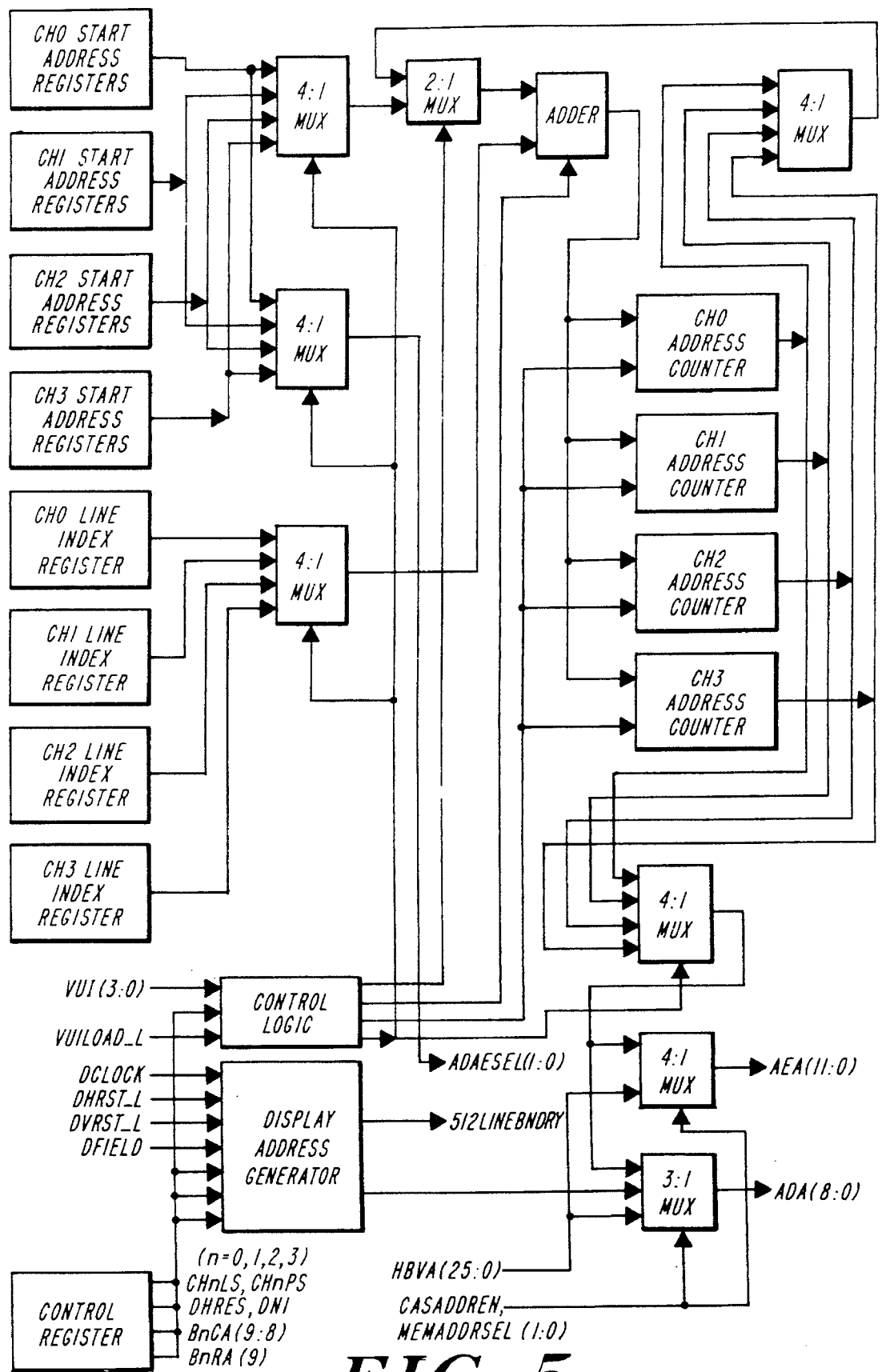
FIG. 5 illustrates a memory address generator model according to the present invention.

FIG. 4 illustrates an Acquisition Video Resource Model 5.2.3.2 Acquisition Address Generator FIG. 5 contains the software model for the memory Address Generator. This logic performs three major functions. First, it generates unique addresses for up to four video channels. Second, it maps the linear Host Bus address into the proper format required to access either ADMEM or AEMEM. Third, it generates the display addresses required during ADMEM read transfer cycles. Regardless of the current memory cycle, Two address are required, a row (i.e RAS) address is always followed by a column (i.e. CAS) address. Generating these two addresses is accomplished via the CASADDR input. When this signal is low the appropriate RAS address is output, when it is high the CAS address is provided.

The four (4) acquisition channels each contain three (3) address parameter registers plus an implied address counter (AC). The three parameters are used by the address generator to determine the starting address for:

Start of new even field packet type

Start of new odd field packet type

Start of new line packet type

All packets are written to written to either ADMEM or AEMEM starting at the current value of AC. The additional page mode addresses required during video burst write cycles are generated by incrementing or decrementing AC by the packet size (32 bytes). The address parameters are:

SE—Start of even field (location of first four pixels of the first even line)

SO—Start of odd field (location of first four pixels of the first odd line)

LI—Line increment (distance between the last four pixels of the current line and the first four pixels of the next line within the same field)

Table 12 illustrates the calculation of the packet start address, AC. At the end of a video burst write cycle, AC will have the value:

$$AC \leftarrow AC \pm 32$$

Therefore "same line" packet types simply use the current value of AC as the packet start address.

TABLE 12

| Start Of Packet Address Calculation | |
|---|---|
| Packet Type Identifier | Packet Start Address |
| New even Field | AC ← SE |
| New odd Field | AC ← SO |
| New Line | AC ← AC +/− LI |
| Same Line | AC |

FIG. 5 illustrates Memory Address Generator Model

NOTE

This section documents the acquire channel programming in terms of byte addresses. There are actually alignment restrictions—everything has to be at least long word aligned and most of the quantities must be 32 byte aligned. The register definition section treats the issues in more detail.

NOTE

Interlaced half-resolution acquires are treated as non-interlaced for purposes of acquisition 5.2.3.2.1 Image Acquisition Using ADMEM Images acquired into ADMEM must obey the alignment and 1024 byte row update restrictions of the display address generator in order to be properly displayed. Table 13 shows the necessary values for SE, SO, and LI required when acquiring into ADMEM. In this table, "HA" refers to the number of active pixels per line for the image being acquired.

TABLE 13

| ADMEM Acquisition Address Parameter Programming | | | |
|---|---|---|---|
| Acquisition Format | SE | SO | LI |
| Interlaced | Start | Start + 1024 | 2048-HA |
| Non Interlaced | Start | Don't Care | 1024-HA |

In order to maximize the number of images which can be acquired into any bank of ADMEM, three (3) bits of the address; 8, 9, and 18; are uniquely generated for each bank. During the acquisition of a single line of pixels, the low 10 bits of the address (column address plus byte select) effectively increment one pixel at a time. There is no carry out of the high bit of column address (9) during this process. Therefore, in order for pixel addresses within a row to be sequential:

Images with HA up to 256 pixels should start at an address of 0 mod 256

Images with HA>256 and up to 512 pixels should start at an address of 0 mod 512

Images with HA>512 and up to 1024 pixels should start at an address of 0 mod 1024

The term "line" rather than "row" is used in this discussion to emphasize that lines correspond to acquired video lines only while the term "row" refers to a specific VRAM row address.

As shown in Table 14, a single 1024 pixel by 512 line bank within ADMEM can be segmented into four (4) equal horizontal regions and two (2) equal vertical regions. This allows a single bank of ADMEM to hold two normal, one wide, or eight half resolution RS-170 or CCIR images.

TABLE 14

| ADMEM Acquisition Address Mapping | | | | |
|---|---|---|---|---|
| ADA18 | ADA(17:10) | ADA(9) | ADA(8) | ADA(7:0) |
| BNKnRA(9) | row address | BNKnCA(9) | BNKnCA(8) | column address |

NOTE

In order for images to be displayed, the "column address" field in Table 14 must be set to 0.

Figure 6:
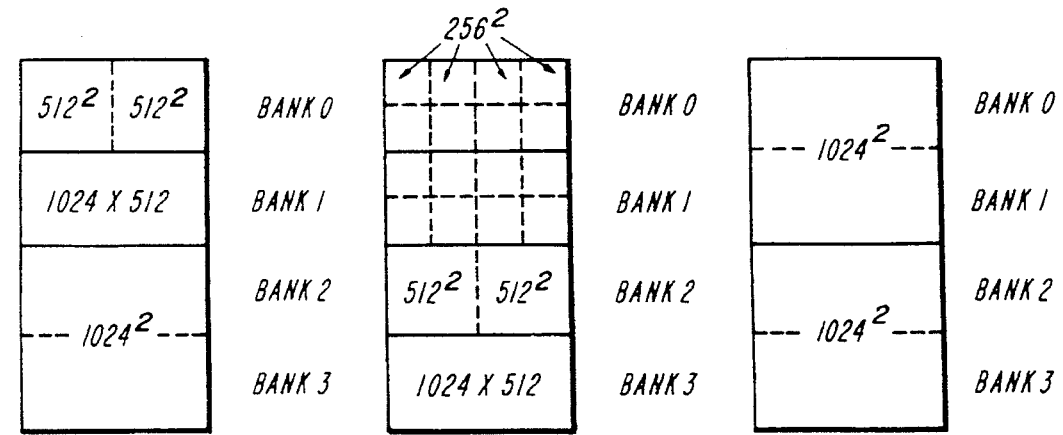
FIG. 6 illustrates examples of ADMEM image buffers according to the present invention.

FIG. 6 contains some examples of the type of image buffers which can be created within ADMEM.

FIG. 6 illustrates Examples Of ADMEM Image Buffers.

5.2.3.2.2 Image Acquisition Using AEMEM

AEMEM is organized as a linear array which is either 4M, 8M, or 16M bytes deep. Table 18 shows the necessary values for SE, SO, and LI required when acquiring into AEMEM. In this table, "HA" refers to the number of active pixels per line for the image being acquired. The acquisition address mapping is highlighted in Table 16.

TABLE 15

| AEMEM Acquisition Address Parameter Programming | | | |
|---|---|---|---|
| Acquisition Format | SE | SO | LI |
| Interlaced | Start | Start + HA | HA |
| Non Interlaced | Start | Don't Care | |

TABLE 16

| AEMEM Acquisition Address Mapping | | |
|---|---|---|
| HBA(23,21:12) | HBA(22,11:2) | HBA(1:0) |
| Row Address | Column Address | Byte Address |

Figure 7:
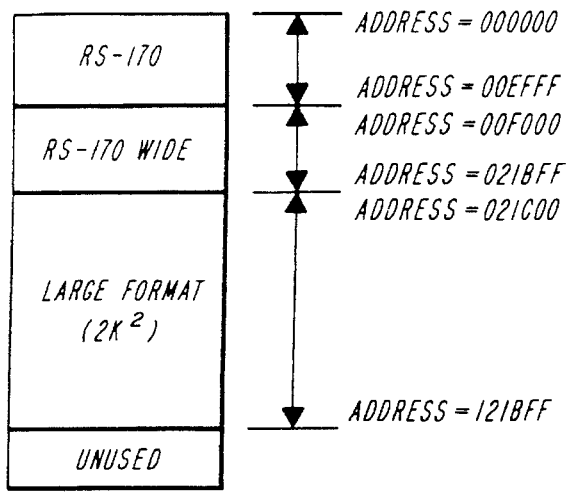
FIG. 7 illustrates examples of AEMEM image buffers according to the present invention.

FIG. 7 illustrates the flexibility of defining image buffers within AEMEM. In this figure, three different image formats were acquired. Since each location within AEMEM holds four (4) pixels, the total amount of memory space required is:

$$Malloc_{AEMEM} = (Active\ Pixels \times Active\ Lines)/4$$

FIG. 7 illustrates Examples Of AEMEM Image Buffers.

Using this formula number of memory address required for the three sample images are 61.440K, 76.800K, and 1048.576K respectively.

5.2.3.2.3 Creating Circular Buffers WIthin ADMEM Or AEMEM

When performing inspection of "web" type materials using line scan cameras, there is no clear delineation of "frame times". Data is constantly being streamed in, one line at a time. Without a clearly defined "frame size", images acquired into either ADMEM or AEMEM would start acquiring at SA and continue on until the end of the memory was reached, at which point the address would roll over to zero. This presents two problems. First the only viable value for SA in either ADMEM or AEMEM would be zero. Second, the entire memory is required to support a single camera. A 4800 system with both ADMEM and AEMEM installed could only support two channels of simultaneous acquisition.

To better support these applications it would be to our advantage if the software could create "circular" (or "ring") buffers of arbitrary size within either ADMEM or AEMEM. By creating four such buffers a 4800 based vision system performing web inspection could utilize all four acquisition channels if necessary. To create these buffers, the current pointers residing in the Address Counters need to be reloaded with the initial start pointers, CHOSA through CH3SA, respectively.

In order to do this the VOM interfacing with the line scan camera(s) need only supply a vertical reset every N lines. This results in an N line ring buffer of data. The VOM could also generate alternate even and odd vertical resets every N lines. This results in a ping-pong between 2N line buffers. The latter mode of operation would require that the VOM "synthesize" a field bit and that the values of SE and SE would be separated by N lines.

5.2.3.3 Acquisition Timing Generator

Figure 8:
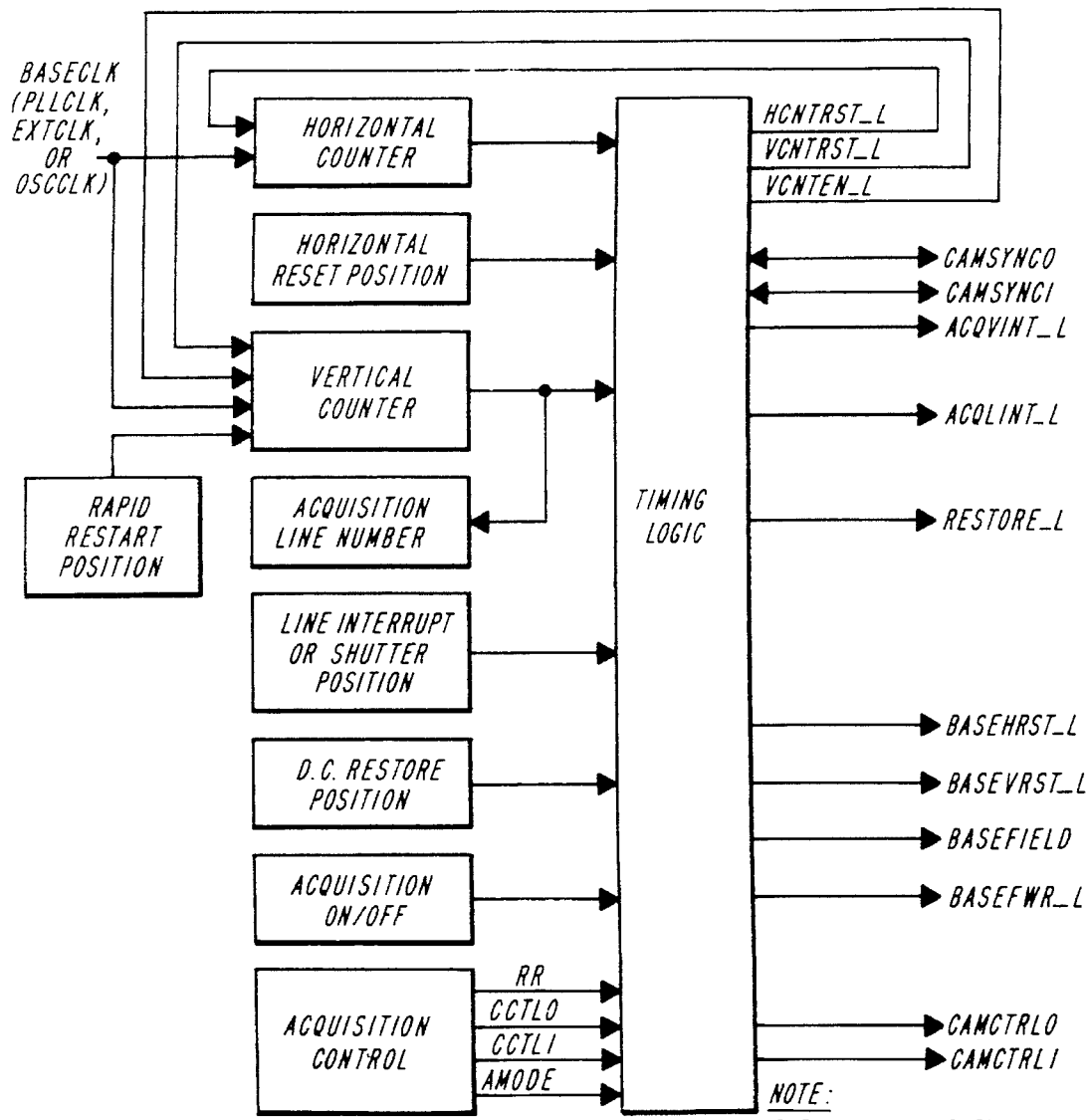
FIG. 8 illustrates an acquisition timing generator model constructed according to the present invention.

FIG. 8 contains a block diagram of the RS-170/CCIR Acquisition Timing generator. The logic is a superset of the timing generators implemented on current VMEBus products. The additional capabilities include timing reset to support true asynchronous acquires; a second, user definable line interrupt; and hardware Area-Of-Interest. The addition of the hardware AOI logic will allow the timing generator to support a wide variety of standard and non-standard area scan cameras. The Acquisition Timing Generator will be implemented using Xilinx FPGA technology. The goal is to have three (3) basic configuration files; RS-170, CCIR, and non-standard.

Timing is derived from horizontal and vertical counters which are clocked by the base board pixel clock (BASECLK). Making these counters 11 bits covers all of the standard video formats and should provide the range necessary to support cameras whose resolution, including blanking, is 2048 pixels by 2048 lines. The position of the horizontal and vertical counter reset signals (HCNTRST_L and VCNTRST_L), in conjunction with the frequency of BASECLK, determine the acquisition format (RS-170, CCIR, or non-standard). The output of the vertical counter is available to the CPU via a read-only data port (Acquisition Line Number). The vertical counter can be loaded with the current value of the Rapid Restart Position register. This capability is required to support "rapid restart" style asynchronous camera acquisitions.

Two bi-directional camera synchronization signals, CAMSYNC0 and CAMSYNC 1 are provided. In genlock mode, these signals can be used to provide separate horizontal and FIG. 8 illustrates an Acquisition Timing Generator Model Vertical synchronization signals or a composite synchronization signal to the camera(s). In external timing mode, these inputs allow an RS-170 or CCIR compatible camera provide horizontal and vertical or composite synchronization timing to the 4800. Also in external timing mode, a non-standard camera can provide some type of horizontal and vertical timing information via these signals. In general, these cameras will also provide a pixel clock which will be used to drive BASECLK. Two additional camera control signals, CAMCTRL0 and CAMCTRL1, can be toggled via the Acquisition Control register.

A vertical interrupt signal, ACQVINT_L, will occur at the beginning of every vertical blank. This is a key timing mark which should be used to synchronize various acquisition functions. The position of this interrupt is fixed. A second "line" interrupt, ACQLINT_L, is also provided. This interrupt will occur whenever the output of the Vertical Counter matches the value stored in the Line Interrupt Position register. When rapid restart acquisitions are being performed, the logic used to generate ACQLINT_L also generates a shutter pulse.

The position of the D.C. restoration pulse, RESTORE_L, can be adjusted via the D.C. Restore Position Register. Whenever the output of the Horizontal Counter matches the value stored in the D.C. Restore Position Register the RESTORE_L signal will be generated. This feature will allow the position of the RESTORE_L pulse to be adjusted from its' nominal position to support particular camera.

The outputs of the horizontal and vertical counters are decoded to generate the four timing signals, BASEHRST_L, BASEVRST_L, BASEFIELD, and BASEFIFOWR_L, required to control the base board packetizing logic and FIFO. The horizontal (line) reset, BASEHRST_L, occurs near the end of each horizontal blanking interval. The vertical (field) reset, BASEVHST_L, occurs during the last horizontal blank in the vertical blanking period and is synchronous with BASEHRST_L. Data is loaded into the packetizing FIFO whenever BASEFIFOWR_L is active. Even fields are denoted by a low on BASEFIELD while the odd field is active whenever BASEFIELD is high.

The Acquisition Control register is used to selected some basic capabilities. An acquire will be performed whenever the ACQ bit is high (logic 1). To acquire a half resolution image, ACQ will be high for only one field and the AMODE bit must be set. With AMODE high, each scan line will be sub-sampled by a factor of two. The RR ("rapid reset") control bit is used to reset the vertical timing to the line number contained in the Rapid Restart Position register. Although this bit can be set at any time, the reset will not occur until the end of the current scan line (i.e. the next horizontal blank). This new feature is intended to broaden Cognex's support for asynchronous acquisitions.

5.2.4 Image Display

This section discusses all aspects of video display. These include selecting between available ADMEM buffer resources, address generation, and display.

5.2.4.1 Display Resources

Figure 9:
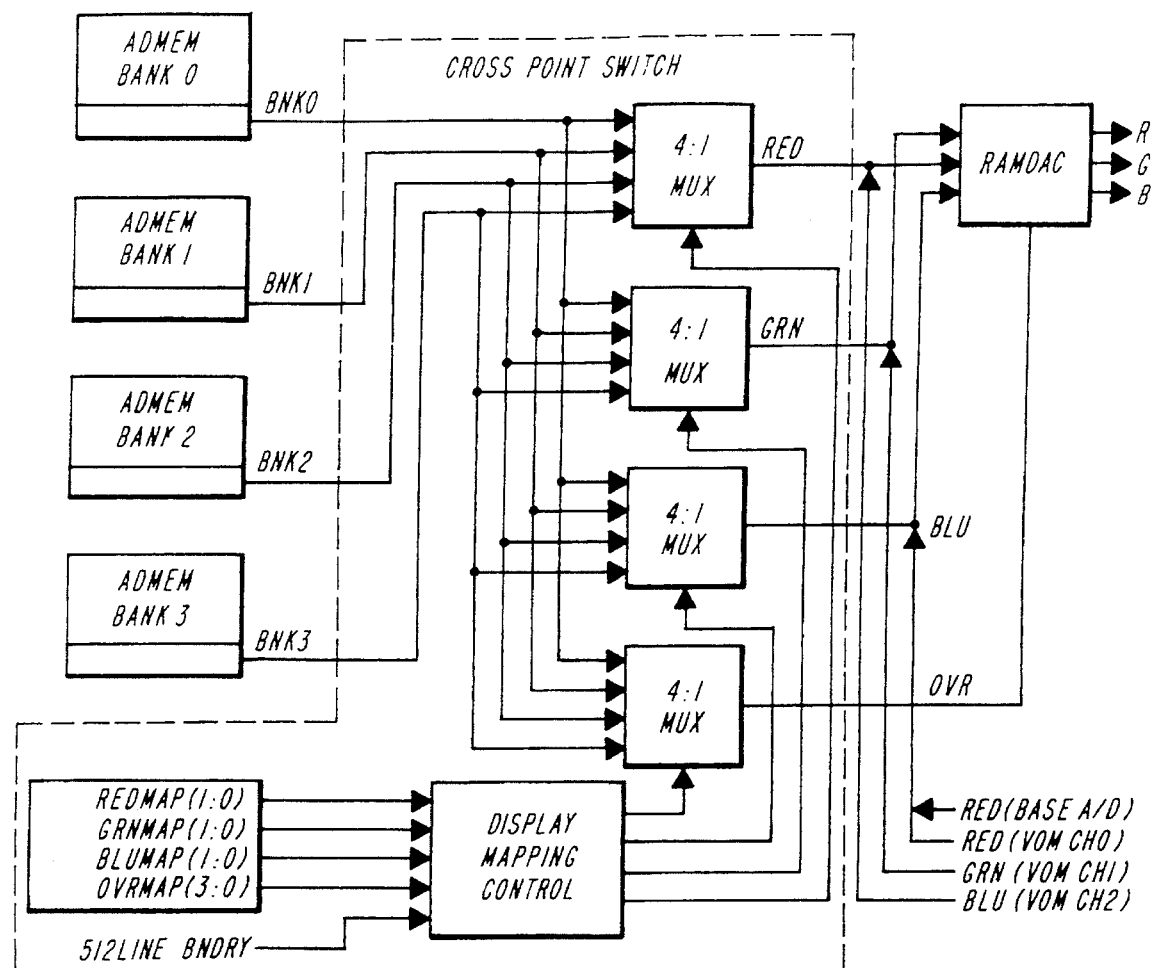
FIG. 9 illustrates a display resource software model according to the present invention.

FIG. 9 contains the programming model for the display section. The four banks of ADMEM are read out simultaneously. The Cross Point Switch allows any of the four banks to drive each of the RED, GRN (green), BLU (blue), or OVR (overlay) inputs of the RAMDAC. This feature allows ADMEM to support monochrome, pseudo-color, or full color displays, plus a graphics overlay, for display resolutions up to and including VGA. When displaying is SVGA mode, ADMEM can support only monochrome or pseudo-color outputs in conjunction with a graphics overlay plane.

Displaying monochrome or pseudo-color images plus an overlay, or full color images with or without an overlay, requires the extraction of pixels from multiple banks of ADMEM.

FIG. 9 illustrates a Display Resource Software Model

For monochrome or pseudo-color, it is not possible to display an image plus an overlay from the same bank. For true-color, the three different color planes and the overlay must reside in the four separate banks.

The Cross Point Switch drives the RED, GRN, BLU, and OVR inputs to the RAMDAC from four-to-one (4:1) multiplexers. The data paths through these multiplexers are controlled by the REDMAP, GRNMAP, BLUMAP, and OVRMAP configuration registers. This arrangement allows the source of data for the RED, GRN, BLU, and OVR channels to be specified independent of one another.

The cross-point switch also has a special mode supporting SVGA display. During lines 512 to 599 of an SVGA display, 512LINEBNDRY is asserted by the display address generator. This is effectively OR'ed into REDMAP[0], BLUMAP[0], GRMMAP[0], and OVRMAP[0]. This allows an SVGA image or overlay to be allocated in any pair of banks.

With the exception of supporting the display of half resolution images, the display section does not provide any hardware support for arbitrary image scaling (i.e. pixel replication or sub-sampling) in either the horizontal or vertical direction. Nor does it provide hardware assisted "roaming" (i.e. panning and scrolling) through an image whose acquisition resolution may exceed the display resolution. An example of this would be a 1024 pixel by 1024 line image acquired from a line scan sensor being viewed using an RS-170 display format. However, the reader should note that each 512 pixel by 512 line block of this image (assuming it is monochrome) could be viewed simply by selecting a different quadrant for the source for display.

In real time display mode, the RED, GRN, and BLU outputs of the CPS are tri-stated and RAMDAC data is sourced from either the baseboard digitizer, VOM digitizer(s), or both. The internal data multiplexing of the RAMDAC allows monochrome, pseudo-color, or full color modes to be supported when using real-time data.

5.2.4.2 Display Address Generator

The display address generator is illustrated in FIG. 5 (Memory Address Generator Model). It is controlled by the display timing generator (if installed) or by the acquisition timing generator. It has the ability to generate interlaced or non-interlaced addresses for use during ADMEM display read cycle transfers. It also generates the 512LINEBNDRY signal which is used to dynamically switch to the next higher bank of ADMEM when using SVGA display timing.

Within each back, a display start address allows any buffer within a given bank to be selected for display. Each bank has its' own start address, enhancing the flexibility of ADMEM display capabilities. Refer to FIG. 6 for some examples of ADMEM image buffers.

Non-interlaced display modes support up to 512 display lines per bank, with larger images supported by the cross point switch dynamic switching between banks.

Interlaced mode modes support up to 512 display lines in a frame (256 per field). The row number starts at 0 in the even field and 1 in the odd field, and increments by 2 from one line to the next within a field.

5.2.4.2.1 Image Display Using ADMEM

The serial ports of all four banks of ADMEM are active simultaneously. During the display of a single line of pixels, the low 10 bits of the address (column address plus byte select) effectively increment one pixel at a time as the display is scanned left to right. There is no carry out of the high bit of column address (9) during this process. Therefore, in order for pixel addresses within a row to be sequential:

- Images with HA up to 256 pixels should start at an address of 0 mod 256
- Images with HA>256 and up to 512 pixels should start at an address of 0 mod 512
- Images with HA>512 and up to 1024 pixels should start at an address of 0 mod 1024

The term "line" rather than "row" is used in this discussion to emphasize that lines correspond to "lines" of the display while the term "row" would refer to a specific VRAM row address. Display lines are numbered sequentially, beginning with the topmost one appearing on the display.

TABLE 17

| | ADMEM Display Address Mapping | | | |
|---|---|---|---|---|
| ADA18 | ADA(17:10) | ADA(9) | ADA(8) | ADA(7:0) |
| BNKnRA(9) | row address | BNKnCA(9) | BNKnCA(8) | column address |

NOTE

In order for images to be displayed, the "column address" field in Table 14 must be set to 0.

Once again refer to FIG. 1 for some examples of the type of image buffers which can be created within ADMEM for display.

5.2.4.2.2 Image Display Using AEMEM

Images residing in AEMEM can not be displayed. They must first be copied into ADMEM.

5.2.4.3 Display Timing Generator

Figure 10:
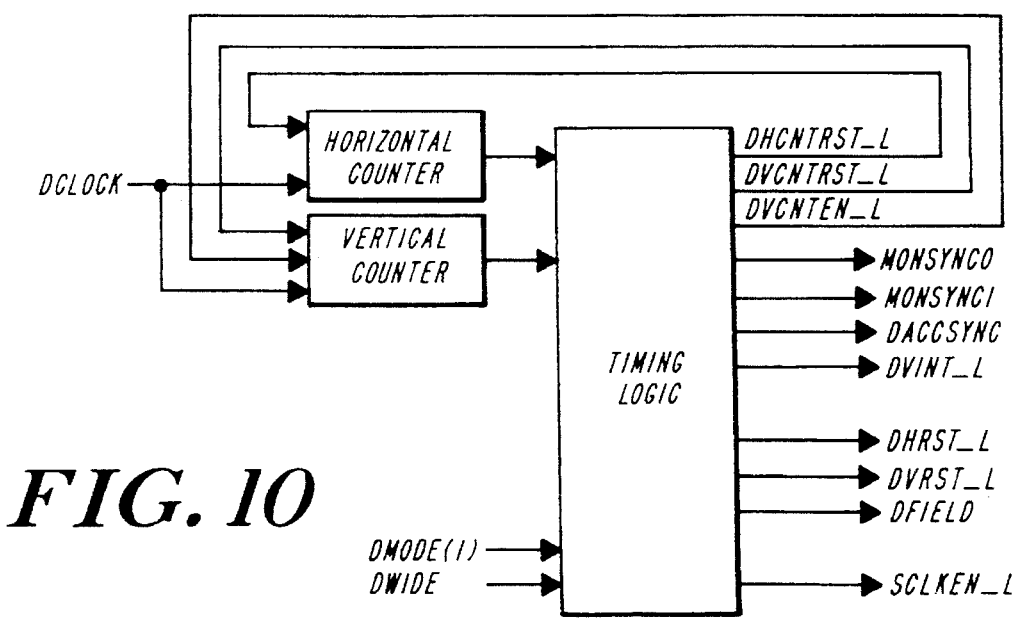
FIG. 10 illustrates a display timing generator software model according to the present invention.

FIG. 10 contains a block diagram of the optional Display Timing Generator. The Display Timing Generator will be implemented using Xilinx FPGA technology. The goal is to have four (4) configuration files; RS-170, CCIR, VGA, and SVGA. A control bit (DWIDE) will determine whether the line width in RS-170, CCIR, or VGA is 512 or 640 pixels. In the absence of this function, the display timing will be dictated by the Acquisition Timing Generator.

With the Display Timing Generator option installed, a second vertical interrupt, DVINT_L, will be generated at the beginning of each display vertical blank. The DHRST_L, DVRST_L, and DFIELD outputs are used to control the display address generator. Two outputs, MONSYNC0 and MONSYNC1, can be used to provide horizontal and vertical or composite synchronization for the display. The DAC-SYNC signal provides composite synchronization information to the RAMDAC. The SCLKEN_L signal is used by the memory timing to generate the VRAM serial port clock. FIG. 10 illustrates a Display Timing Generator Software Model

5.2.5 ADMEM Row Address Table (RAT)

Table 18 illustrates the mapping between the Host Bus address and ADMEM. This table shows how the Host Bus can be used to access sub-regions within ADMEM using ADRA(9) and ADCA(9:8).

TABLE 18

| | Detailed Host Bus ADMEM Address Mapping | | | | |
|---|---|---|---|---|---|
| HBA(20:19) | HBA(18) | HBA(17:10) | HBA(9) | HBA(8) | HBA(7:0) |
| Bank Select | ADRA(9) | Row Address | ADCA(9) | ADCA(8) | Column Address |

As shown in Table 17, a single 1024 pixel by 512 line bank within ADMEM can be segmented into four (4) equal horizontal regions and two (2) equal vertical regions. This allows a single bank of ADMEM to hold two normal, one wide, or eight half resolution RS-170 or CCIR images.

All images residing in ADMEM can be supported by subsets of a single row address table (RAT). This RAT should start at the address of the start of ADMEM, and increment by 1024 per row for a total of 2048 rows. Individual images can be addressed by means of an X_OFFSET and Y_OFFSET:

image->xoffset=X_OFFSET image->rat=& RAT[Y_OFFSET]

The only exception is that to address the individual fields of an interlaced full-resolution image (e.g. caq_even and caq_odd) a RAT with a double row update of 2048 is needed. Note that 1024 wide×512 high images (or a subset, like 640×480) exactly correspond to physical banks of ADMEM.

Figure 11:
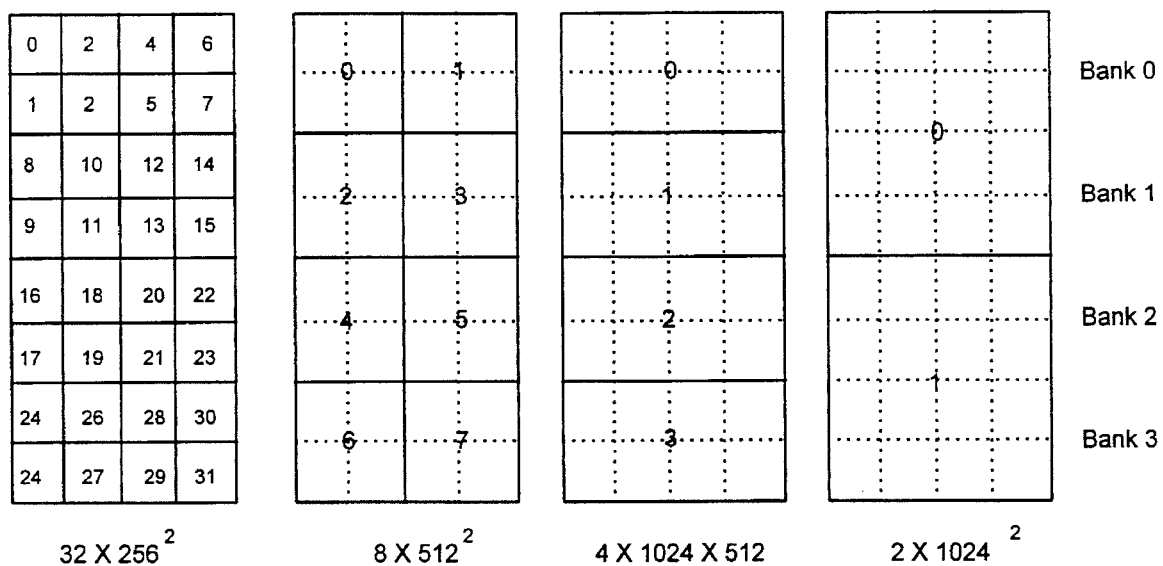
FIG. 11 illustrates an ADMEM RAT buffer allocation system according to the present invention.

Table 19 illustrates the RAT necessary to access any image buffer which might reside in ADMEM. FIG. 11 shows the corresponding image buffer locations within ADMEM. FIG. 11 illustrates an ADMEM RAT Buffer Allocation

TABLE 19

ADMEM Row Address Table (RAT)

| $256^2$ | $512^2$ | 1024×512 | $1024^2$ | ADCA(9:8) | ADRA(9) | X_OFFSET | Y_OFFSET |
|---|---|---|---|---|---|---|---|
| 0 | 0 | 0 | 0 | 00 | 0 | 0 | 0 |
| 1 | | | | 00 | 1 | 0 | 100 |
| 2 | | | | 01 | 0 | 100h | 0 |
| 3 | | | | 01 | 1 | 100h | 100 |
| 4 | 1 | | | 10 | 0 | 200h | 0 |
| 5 | | | | 10 | 1 | 200h | 100h |
| 6 | | | | 11 | 0 | 300h | 0 |
| 7 | | | | 11 | 1 | 300h | 100h |
| 8 | 2 | 1 | | 00 | 0 | 0 | 200h |
| 9 | | | | 00 | 1 | 0 | 300h |
| 10 | | | | 01 | 0 | 100h | 200h |
| 11 | | | | 01 | 1 | 100h | 300h |
| 12 | 3 | | | 10 | 0 | 200h | 200h |
| 13 | | | | 10 | 1 | 200h | 300h |
| 14 | | | | 11 | 0 | 300h | 200h |
| 15 | | | | 11 | 1 | 300h | 300h |
| 16 | 4 | 2 | 1 | 00 | 0 | 0 | 400h |
| 17 | | | | 00 | 1 | 0 | 500h |
| 18 | | | | 01 | 0 | 100h | 400h |
| 19 | | | | 01 | 1 | 100h | 500h |
| 20 | 5 | | | 10 | 0 | 200h | 400h |
| 21 | | | | 10 | 1 | 200h | 500h |
| 22 | | | | 11 | 0 | 300h | 400h |
| 23 | | | | 11 | 1 | 300h | 500h |
| 24 | 6 | 3 | | 00 | 0 | 0 | 600h |
| 25 | | | | 00 | 1 | 0 | 700h |
| 26 | | | | 01 | 0 | 100h | 600h |
| 27 | | | | 01 | 1 | 100h | 700h |
| 28 | 7 | | | 10 | 0 | 200h | 600h |
| 28 | | | | 10 | 1 | 200h | 700h |
| 30 | | | | 11 | 0 | 300h | 600h |
| 31 | | | | 11 | 1 | 300h | 700h |

5.3 Video Module Configuration Register Map

Table 20 contains the register map for the video module. As noted earlier, the first 256 bytes are reserved for base board registers while the upper 256 bytes are set aside for VOM registers. This table details those registers which reside on the base board. VOM specific register mapping will be covered in the individual VOM software references. The following shorthand notation is used to distinguish between the types of Host Bus access supported for a particular register.

"RO" is used to denote a "read only" register.

"WO" is used to denote a "write only" register.

"RW" is used to denote a "read or write" register.

TABLE 20

Video Configuration Register Map

| HBVA(9:0) | Location | Video Function | Register Name | Type |
|---|---|---|---|---|
| 000$_h$ | Base | Configuration | Identification & Revision | RO |
| 004$_h$ | Base | Packetizing Logic | Acquisition Packet Packing Control | RW |
| 008$_h$ | Base | Packetizing Logic | Acquisition CHO Soume Select | RW |
| 00C$_h$ | Base | Packetizing Logic | Acquisition Error | RW |
| 010$_h$ | Base | Acquisition | Diagnostic | RW |
| 014$_h$ | Base | Address Generator | Display Control | RW |
| 018$_h$ | Base | Address Generator | Display Start Address | RW |
| 01C$_h$ | Base | Address Generator | Acquisition Address Control | RW |
| 020$_h$ | Base | Address Generator | CH0 Start Address Even Low | RW |
| 024$_h$ | Base | Address Generator | CH1 Start Address Even Low | RW |
| 028$_h$ | Base | Address Generator | CH2 Start Address Even Low | RW |
| 02C$_h$ | Base | Address Generator | CH3 Start Address Even Low | RW |
| 030$_h$ | Base | Address Generator | CH0 Start Address Even High | RW |
| 034$_h$ | Base | Address Generator | CH1 Start Address Even High | RW |
| 038$_h$ | Base | Address Generator | CH2 Start Address Even High | RW |
| 03C$_h$ | Base | Address Generator | CH3 Start Address Even High | RW |
| 040$_h$ | Base | Address Generator | CH0 Start Address Odd Low | RW |
| 044$_h$ | Base | Address Generator | CH1 Start Address Odd Low | RW |
| 048$_h$ | Base | Address Generator | CH2 Start Address Odd Low | RW |
| 04C$_h$ | Base | Address Generator | CH3 Start Address Odd Low | RW |
| 050$_h$ | Base | Address Generator | CH0 Start Address Odd High | RW |
| 054$_h$ | Base | Address Generator | CH1 Start Address Odd High | RW |
| 058$_h$ | Base | Address Generator | CH2 Start Address Odd High | RW |
| 05C$_h$ | Base | Address Generator | CH3 Start Address Odd *Egh | RW |
| 060$_h$ | Base | Address Generator | CH0 Line Index | RW |
| 064$_h$ | Base | Address Generator | CH1 Line Index | RW |
| 068$_h$ | Base | Address Generator | CH2 Line Index | RW |
| 06C$_h$ | Base | Address Generator | CH3 Line Index | RW |
| 070$_h$ | Base | Display | RAMDAC Overlay Write Address | RW |
| 074$_h$ | Base | Display | RAMDAC Overlay Data Port | RW |
| 078$_h$ | Base | Display | RAMDAC Command | RW |
| 07C$_h$ | Base | Display | RAMDAC Overlay Read Address | RW |
| 080$_h$ | Base | Display | RAMDAC RAM Write Address | RW |
| 084$_h$ | Base | Display | RAMDAC RAM Data Port | RW |
| 088$_h$ | Base | Display | RAMDAC Pixel Mask | RW |
| 08C$_h$ | Base | Display | RAMDAC RAM Read Address | RW |
| 090$_h$ | Base | Display | Cross Point Switch Control | RW |
| 094$_h$ | Base | Acquisition & Display | Acquisition and Display Clock Frequency Select | WO |
| 098$_h$ | Base | Acquisition & Display | Interrupt Enable Mask | RW |
| 09C$_h$ | Base | Acquisition & Display | Interrupt Status | RO |
| 0A0$_h$ | Base | Acquisition | Digitizer Write & Read Address | RW |
| 0A4$_h$ | Base | Acquisition | Digitizer RAM Data Port | RW |
| 0A8$_h$ | Base | Acquisition | Digitizer REF and Command Data Port | RW |
| 0AC$_h$ | Base | Acquisition Timing | D.C. Restore Position | RW |
| 0B0$_h$ | Base | Acquisition Timing | Acquisition Timing Control | RW |
| 0B4$_h$ | Base | Acquisition Timing | Acquisition On/Off Control | RW |
| 0B8$_h$ | Base | Acquisition Timing | Acquisition Camera Control | RW |
| 0BC$_h$ | Base | Acquisition Timing | Rapid Restart Position | RW |
| 0C0$_h$ | Base | Acquisition Timing | Line Interrupt Position | RW |
| 0C4$_h$ | Base | Acquisition Timing | Horizontal Frequency Adjustment | RW |
| 0C8$_h$ | Base | Acquisition Timing | Acquisition Line Number | RO |
| 0CC$_h$ | Base | Display Timing | Display Timing Control | RW |
| 0D0$_h$ | Base | Display | Real-Time Display Data Path Control | RW |
| 0D4$_h$ | Base | Display Timing | Display Line Number | RO |
| 0D8$_h$ | Base | Xilinx Programming | Xilinx Configuration Control & Status | RW |
| 0DC$_h$ | Base | Xilinx Programming | PKTCNTL Xilinx Data Port | WO |
| 0E0$_h$ | Base | Xilinx Programming | AHADDRGEN Xilinx Data Port | WO |
| 0E4$_h$ | Base | Xilinx Programming | ADADDRGEN Xilinx Data Port | WO |
| 0E8$_h$ | Base | Xilinx Programming | ACQTIMING Xilinx Data Port | WO |
| 0EC$_h$ | Base | Xilinx Programming | DPLYTIMING Xilinx Data Port | WO |
| 0F0$_h$-0FC$_h$ | Base | | | |
| 100$_h$ | VOM | Configuration | Identification & Revision | RO |
| 104$_h$-1FC$_h$ | VOM | Configuration | VOM Specific | |

5.4 Register Description

This section will describe each of the video base board registers in detail.

5.4.1 Identification & Revision (HBVA=BA+000$_h$, RO)

This 16-bit register is divided into two 4-bit fields, ID(3:0) and REV(3:0). The identification field, ID, will be used to distinguish between different types of video base boards, should additional versions be required in the future. The revision field, REV, will contain indicate the current revision level of the base board. This field will be capable of being updated, allowing a module which has been legally updated via the ECO process to have its' revision number reflect the current functionality.

| FIG. 12: Baseboard Identification and Revision Register | | | | | | | |
|---|---|---|---|---|---|---|---|
| HBVA(23:0) = BA + 000$_h$ | | | | | | | |
| Bit 31 | Bit 30 | Bit 29 | Bit 28 | Bit 27 | Bit 26 | Bit 25 | Bit 24 |
| REV3 | REV2 | REV1 | REV0 | ID3 | ID2 | ID1 | ID0 |

The current values for these two fields are:
ID(3:0)=0001
REV(3:0)=1010 (Revision A) or 0001(Revision 1.0 and 2.0 prototypes)

5.4.2 Acquisition Packet Packing Control (HBVA=BA+004$_h$, RW)

This lower 4 bits of this register, CH(3:0)DIR, control the method used to "pack" 8 bit pixels into 32 long words. The available packing schemes are big endian (i.e. Motorola) and little endian (i.e. Intel). This feature allows the video memory architecture to be compatible with either standard. In addition, it is used to allow data acquired using reverse horizontal scanning (i.e right to left rather than left to right) to be properly packed into long words. Bits 4 through 7 are indeterminate and should be masked during read operations.

| FIG. 13: Acquisition Packing Control Register | | | | | | | |
|---|---|---|---|---|---|---|---|
| HBVA(23:0) = BA + 004$_h$ | | | | | | | |
| Bit31 | Bit 30 | Bit 29 | Bit 28 | Bit 27 | Bit 26 | Bit 25 | Bit 24 |
| Unused | Unused | Unused | Unused | CH3DIR | CH2DIR | CH1DIR | CH0DIR |

FIG. 14 and FIG. 15 illustrate the two packing schemes. Table 21 shows how each channel can be set to either packing scheme.

| | FIG. 14: Big-Endian Pixel Packing | | |
|---|---|---|---|
| MENM(31:24) | MEMD(23:16) | MEMD(15:8) | MEMD(7:0) |
| Pixel (N) | Pixel (N+1) | Pixel (N+2) | Pixel (N+3) |

| | FIG. 15: Little-Endian Pixel Packing | | |
|---|---|---|---|
| MEMD(31:24) | MEMD(23:16) | MEMD(15:8) | MEMD(7:0) |
| Pixel (N+3) | Pixel (N+2) | Pixel (N+1) | Pixel (N) |

TABLE 21

| Pixel Packing Control (CH3DIR, CH2DIR, CH1DIR, and CH0DIR) | |
|---|---|
| CHnDIR | Pixel Packing |
| 0 | Big Endian |
| 1 | Little Endian |

5.4.3 Acquisition CH0 Source Select (HBVA=BA+008$_h$, RW)

Bit 4, CH0SEL is used to determine whether or not acquisition channel 0 is being controlled by the base board video timing or by channel 3 of a video option module. Bit 7, CH0RES, is used to inform the packet timing whether a full or half resolution acquire is intended. In half resolution, every other pixel in a given line is loaded into memory. Note that this bit only controls the packetizing logic. In order to perform a half resolution acquire parameters in the acquisition timing logic and the acquisition address generator must also be set correctly.

| FIG. 16: Acquisition CH0 Source Select Register | | | | | | | |
|---|---|---|---|---|---|---|---|
| HBVA(23:0) = BA + 008$_h$ | | | | | | | |
| Bit 31 | Bit 30 | Bit 29 | Bit 28 | Bit 27 | Bit 26 | Bit 25 | Bit 24 |
| CH0RES | Unused | Unused | CH0SEL | Unused | Unused | Unused | Unused |

Bits 0 through 3 and 5 through 6 are indeterminate and should be masked during read operations.

TABLE 22

| Acquisition Channel 0 Video Timing Source Select (CH0SEL) | |
|---|---|
| CH0SEL | Channel 0 Timing Source |
| 0 | Base Video |
| 1 | VOM Channel 3 |

TABLE 23

| Acquisition Channel 0 Video Timing Source Select (CH0SEL) | |
|---|---|
| CH0RES | Channel 0 Resolution |
| 0 | Full |
| 1 | Half |

5.4.4 Acquisition Error (HBVA=BA+00C$_h$, RW)

Bits 5 and 6 are used to by the built-in overran error checking logic. Bit 6, ERR, will be set high (logic 1) whenever any acquisition channel overruns. An overrun is defined by the maximum number of packets which can be held in the acquisition FIFOs, which is 7. This condition should only occur if the aggregate normalized video bandwidth exceeds the 40 MHz specification. The ERR bit is enabled whenever CLRERR is low. Once an error has occurred, ERR will remain high (logic 1) until CLRERR is written to a logic 1, at which time ERR will be reset low (logic 0). The ERR bit is read-only while. Bits 0 through 4 and bit 7 are indeterminate and should be masked during read operations.

| FIG. 17: Acquisition Error Register | | | | | | | |
|---|---|---|---|---|---|---|---|
| HBVA(23:0) = BA + 00C$_h$ | | | | | | | |
| Bit 31 | Bit 30 | Bit 29 | Bit 28 | Bit 27 | Bit 26 | Bit 25 | Bit 24 |
| Unused | ERR | CLRERR | Unused | Unused | Unused | Unused | Unused |

5.4.5 Diagnostic (HBVA=BA+010$_h$, RW)

This register controls some special diagnostic functions. The LPBACK (loop-back) bit can be used in conjunction with the Real-Time Display Data Path Control register (BA+0D0) to allow the RED(7:0) output of the display cross point switch to be connected to the baseboard packetizing logic. This path will enable the diagnostics to perform more sophisticated acquisition testing. For example a synthetic data pattern written into ADMEM Bank0 could be acquired into ADMEM Bank1, Bank2, or Bank3. Diagnostic loop back mode is enabled by setting LPBACK high with RTRED and RTREDSEL both low. The last two bits are located in the Real-Time Display Data Path Control register (BA+0D0).

THE FUSEOK bit is designed to monitor the output of the 12 VDV camera power fuse. When this bit is a logic 1, the fuse is operational and power is being supplied to the camera. A logic zero reading for the FUSEOK bit indicates that the fuse is blown.

| FIG. 18: Diagnostic Register | | | | | | | |
|---|---|---|---|---|---|---|---|
| HBVA(23:0) = BA + 010$_h$ | | | | | | | |
| Bit 31 | Bit 30 | Bit 29 | Bit 28 | Bit 27 | Bit 26 | Bit 25 | Bit 24 |
| Unused | Unused | Unused | Unused | Unused | Unused | FUSEOK | LPBACK |

5.4.6 Display Control (HBVA=BA+014$_h$, RW)

Two bits, DHRES and DNI are used to configure the display timing and addressing for normal or half resolution and interlaced- or non-interlaced respectively. DHRES is used by the memory timing generator and causes pixels to be replicated twice (×2 horizontal zoom) when the DHRES bit. DNI affects the calculation of the display line address. When DNI is zero (interlaced) the address increments by 2 and the least significant address is the current field. When DNI is one the address increments by 1 and the field is a don't care. The functionality of these bits is described in Table 24.

FIG. 19: Display Control Register

HBVA(23:0) = BA + 014$_h$

| Bit 31 | Bit 30 | Bit 29 | Bit 28 | Bit 27 | Bit 26 | Bit 25 | Bit 24 |
|---|---|---|---|---|---|---|---|
| Unused | Unused | Unused | Unused | Unused | Unused | Unused | Unused |
| Bit 23 | Bit 22 | Bit 21 | Bit 20 | Bit 19 | Bit 18 | Bit 17 | Bit 16 |
| Unused | Unused | DHRES | DNI | Unused | Unused | Unused | Unused |

TABLE 24

Display Interlace Mode and Resolution Select (DNI, DHRES)

| DNI | DHRES | Display Mode |
|---|---|---|
| 0 | 0 | interlaced, full resolution |
| 0 | 1 | interlaced half resolution |
| 1 | 0 | non-interlaced full resolution |
| 1 | 1 | non-interlaced half resolution |

5.4.7 Display Start Address (HBVA=BA+018$_h$, RW)

Bits 0 thru 11 of this register control the display start address on a bank by bank basis by allowing the 2 most significant column (CA) and the most significant row (RA) addresses to be preset. This feature allows either of 2 normal (i.e. 512 pixel wide) images to be selected for display on a per bank basis. One of up to 8 half resolution images could also be selected. SInce each bank can be controlled independently, normal width or half resolution full color images need not reside within the same area for all banks.

FIG. 20: Display Start Address Register

HBVA(23:0) = BA + 018$_h$

| Bit 31 | Bit 30 | Bit 29 | Bit 28 | Bit 27 | Bit 26 | Bit 25 | Bit 24 |
|---|---|---|---|---|---|---|---|
| B2CA9 | B2CA8 | B1RA18 | B1CA9 | B1CA8 | B0RA18 | B0CA9 | B0CA8 |
| Bit 23 | Bit 22 | Bit 21 | Bit 20 | Bit 19 | Bit 18 | Bit 17 | Bit 16 |
| Unused | Unused | Unused | Unused | B3RA18 | B3CA9 | B3CA8 | B2RA18 |

5.4.8 Acquisition Address Generator Control (HBVA=BA+01C$_h$, RW)

The register is comprised of two fields, CH(3:0)PS and CH(3:0)LS, which control the "direction" of AEMEM and ADMEM addresses during acquisition.

FIG. 21: Acquisition Address Control Register

HBVA(23:0) = BA + 01C$_h$

| Bit 31 | Bit 30 | Bit 29 | Bit 28 | Bit 27 | Bit 26 | Bit 25 | Bit 24 |
|---|---|---|---|---|---|---|---|
| CH3LS | CH2LS | CH1LS | CH0LS | CH3PS | CH2PS | CH1PS | CH0PS |

Four "directions" are supported allowing either memory to support the following image scanning formats:

left to right/top to bottom (incrementing x/incrementing y)

right to left/top to bottom (decrementing x/incrementing y)

left to right/bottom to top (incrementing x/decrementing y)

right to left/bottom to top (decrementing x/decrementing y)

where the first (left to right/top to bottom) supports the typical RS-170/CCIR raster image. The "PS" (pixel scan) bits control the direction of the scanning for within any line while the "LS" (line scan) bits determine the direction of subsequent lines. The pixel and line scan mode can be set on a per channel basis. Table 25 summarizes the impact of these bits on each channel's acquisition address.

TABLE 25

| Acquisition Address Scan Mode Control (CHnLS, CHnPS) | | |
| --- | --- | --- |
| CHnLS | CHnPS | Addressing Mode |
| 0 | 0 | incrementing x, incrementing y |
| 0 | 1 | decrementing x, incrementing y |
| 1 | 0 | incrementing x, decrementing y |
| 1 | 1 | decrementing x, decrementing y |

5.4.9 CH0 Start Address Even Low (HBVA=BA+020h, RW)

This register holds the low word (i.e. bits 0 thru 15) of the even field start address for acquisition channel 0. The complete starting address is determined by concatenating this register with the CH0 Start Address Even High register.

| FIG. 22: Acquisition Channel 0 Memory Start Address Register (Even/Low) | | | | | | | |
| --- | --- | --- | --- | --- | --- | --- | --- |
| HBVA(23:0) = BA + 020$_h$ | | | | | | | |
| Bit 31 | Bit 30 | Bit 29 | Bit 28 | Bit 27 | Bit 26 | Bit 25 | Bit 24 |
| C0SE15 | C0SE14 | C0SE13 | C0SE12 | C0SE11 | C0SE10 | C0SE9 | C0SE8 |
| Bit 23 | Bit 22 | Bit 21 | Bit 20 | Bit 19 | Bit 18 | Bit 17 | Bit 16 |
| C0SE7 | C0SE6 | C0SE5 | 0 | 0 | 0 | 0 | 0 |

5.4.10 CH1 Start Address Even Low (HBVA=BA+024$_h$, RW)

This register holds the low word (i.e. bits 0 thru 15) of the even field start address for acquisition channel 1. The complete starting address is determined by concatenating this register with the CH1 Start Address Even High register.

| FIG. 23: Acquisition Channel 1 Memory Start Address Register (Even/Low) | | | | | | | |
| --- | --- | --- | --- | --- | --- | --- | --- |
| HBVA(23:0) = BA + 024$_h$ | | | | | | | |
| Bit 31 | Bit 30 | Bit 29 | Bit 28 | Bit 27 | Bit 26 | Bit 25 | Bit 24 |
| C1SE15 | C1SE14 | C1SE13 | C1SE12 | C1SE11 | C1SE10 | C1SE9 | C1SE8 |
| Bit 23 | Bit 22 | Bit 21 | Bit 20 | Bit 19 | Bit 18 | Bit 17 | Bit 16 |
| C1SE7 | C1SE6 | C1SE5 | 0 | 0 | 0 | 0 | 0 |

5.4.11 CH2 Start Address Even Low (HBVA=BA+028$_h$, RW)

This register holds the low word (i.e. bits 0 thru 15) of the even field start address for acquisition channel 2. The complete starting address is determined by concatenating this register with the CH2 Start Address Even High register.

| FIG. 24: Acquisition Channel 2 Memory Start Address Register (Even/Low) | | | | | | | |
| --- | --- | --- | --- | --- | --- | --- | --- |
| HBVA(23:0) = BA + 028$_h$ | | | | | | | |
| Bit 31 | Bit 30 | Bit 29 | Bit 28 | Bit 27 | Bit 26 | Bit 25 | Bit 24 |
| C2SE15 | C2SE14 | C2SE13 | C2SE12 | C2SE11 | C2SE10 | C2SE9 | C2SE8 |
| Bit 23 | Bit 22 | Bit 21 | Bit 20 | Bit 19 | Bit 18 | Bit 17 | Bit 16 |
| C2SE7 | C2SE6 | C2SE5 | 0 | 0 | 0 | 0 | 0 |

5.4.12 CH3 Start Address Even Low (HBVA=BA+02C$_h$, RW)

This register holds the low word (i.e. bits 0 thru 15) of the even field start address for acquisition channel 3. The complete starting address is determined by concatenating this register with the CH3 Start Address Even High register.

FIG. 25: Acquisition Channel 3 Memory Start Address Register (Even/Low)

HBVA(23:0) = BA + 02C$_h$

| Bit 31 | Bit 30 | Bit 29 | Bit 28 | Bit 27 | Bit 26 | Bit 25 | Bit 24 |
|---|---|---|---|---|---|---|---|
| C3SE15 | C3SE14 | C3SE13 | C3SE12 | C3SE11 | C3SE10 | C3SE9 | C3SE8 |
| Bit 23 | Bit 22 | Bit 21 | Bit 20 | Bit 19 | Bit 18 | Bit 17 | Bit 16 |
| C3SE7 | C3SE6 | C3SE5 | 0 | 0 | 0 | 0 | 0 |

5.4.13 CH0 Start Address Even High (HBVA=BA+030$_h$, RW)

This register holds the high word (i.e. bits 16 thru 25) of the even field start address for acquisition channel 0. The complete starting address is determined by concatenating this register with the CH0 Start Address Even Low register.

FIG. 26: Acquisition Channel 0 Memory Start Address Register (Even/High)

HBVA(23:0) = BA + 030$_h$

| Bit 31 | Bit 30 | Bit 29 | Bit 28 | Bit 27 | Bit 26 | Bit 25 | Bit 24 |
|---|---|---|---|---|---|---|---|
| 0 | 0 | 0 | 0 | 0 | 0 | C0SE25 | C0SE24 |
| Bit 24 | Bit 23 | Bit 22 | Bit 21 | Bit 20 | Bit 19 | Bit 18 | Bit 17 |
| C0SE23 | C0SE22 | C0SE21 | C0SE20 | C0SE19 | C0SE18 | C0SE17 | C0SE16 |

5.4.14 CH1 Start Address Even High (HBVA=BA+034$_h$, RW)

This register holds the high word (i.e. bits 16 thru 25) of the even field start address for acquisition channel 1. The complete starting address is determined by concatenating this register with the CH1 Start Address Even Low register.

HBVA(23:0)=BA+034$_h$

FIG. 27: Acquisition Channel 1 Memory Start Address Register (Even/High)

| Bit 31 | Bit 30 | Bit 29 | Bit 28 | Bit 27 | Bit 26 | Bit 25 | Bit 24 |
|---|---|---|---|---|---|---|---|
| 0 | 0 | 0 | 0 | 0 | 0 | C1SE25 | C1SE24 |
| Bit 24 | Bit 23 | Bit 22 | Bit 21 | Bit 20 | Bit 19 | Bit 18 | Bit 17 |
| C1SE23 | C1SE22 | C1SE21 | C1SE20 | C1SE19 | C1SE18 | C1SE17 | C1SE16 |

5.4.15 CH2 Start Address Even High (HBVA—BA+038$_h$, RW)

This register holds the high word (i.e. bits 16 thru 25) of the even field start address for acquisition channel 20. The complete starting address is determined by concatenating this register with the CH2 Start Address Even Low register.

FIG. 28: Acquisition Channel 2 Memory Start Address Register (Even/High)

HBVA(23:0) = BA + 038$_h$

| Bit 31 | Bit 30 | Bit 29 | Bit 28 | Bit 27 | Bit 26 | Bit 25 | Bit 24 |
|---|---|---|---|---|---|---|---|
| 0 | 0 | 0 | 0 | 0 | 0 | C2SE25 | C2SE24 |
| Bit 24 | Bit 23 | Bit 22 | Bit 21 | Bit 20 | Bit 19 | Bit 18 | Bit 17 |
| C2SE23 | C2SE22 | C2SE21 | C2SE20 | C2SE19 | C2SE18 | C2SE17 | C2SE16 |

5.4.16 CH3 Start Address Even High (HBVA=BA+03C$_h$, RW)

This register holds the high word (i.e. bits 16 thru 25) of the even field start address for acquisition channel 3. The complete starting address is determined by concatenating this register with the CH3 Start Address Even Low register.

FIG. 29: Acquisition Channel 3 Memory Start Address Register (Even/High)

HBVA(23:0) = BA + 03C$_h$

| Bit 31 | Bit 30 | Bit 29 | Bit 28 | Bit 27 | Bit 26 | Bit 25 | Bit 24 |
|---|---|---|---|---|---|---|---|
| 0 | 0 | 0 | 0 | 0 | 0 | C3SE25 | C3SE24 |
| Bit 24 | Bit 23 | Bit 22 | Bit 21 | Bit 20 | Bit 19 | Bit 18 | Bit 17 |
| C3SE23 | C3SE22 | C3SE21 | C3SE20 | C3SE19 | C3SE18 | C3SE17 | C3SE16 |

5.4.17 CH0 Start Address Odd Low (HBVA=BA+040$_h$,RW)

This register holds the low word (i.e. bits 0 thru 15) of the odd field start address for acquisition channel 0. The complete starting address is determined by concatenating this register with the CH0 Start Address Odd High register.

FIG. 30: Acquisition Channel 0 Memory Start Address Register (Odd/Low)

HBVA(23:0) = BA + 040$_h$

| Bit 31 | Bit 30 | Bit 29 | Bit 28 | Bit 27 | Bit 26 | Bit 25 | Bit 24 |
|---|---|---|---|---|---|---|---|
| C0SO15 | C0SO14 | POSO13 | C0SO12 | C0SO11 | C0SO10 | C0SO9 | C0SO8 |
| Bit 23 | Bit 22 | Bit 21 | Bit 20 | Bit 19 | Bit 18 | Bit 17 | Bit 16 |
| C0SO7 | C0SO6 | C0SO5 | 0 | 0 | 0 | 0 | 0 |

5.4.18 CH1 Start Address Odd Low (HBVA=BA+044$_h$, RW)

This register holds the low word (i.e. bits 0 thru 15) of the odd field start address for acquisition channel 1. The complete starting address is determined by concatenating this register with the CH1 Start Address Odd High register.

FIG. 31: Acquisition Channel 1 Memory Start Address Register (Odd/Low)

HBVA(23:0) = BA + 044$_h$

| Bit 31 | Bit 30 | Bit 29 | Bit 28 | Bit 27 | Bit 26 | Bit 25 | Bit 24 |
|---|---|---|---|---|---|---|---|
| C1SO15 | C1SO14 | C1SO13 | C1SO12 | C1SO11 | C1SO10 | C1SO9 | C1SO8 |
| Bit 23 | Bit 22 | Bit 21 | Bit 20 | Bit 19 | Bit 18 | Bit 17 | Bit 16 |
| C1SO7 | C1SO6 | C1SO5 | 0 | 0 | 0 | 0 | 0 |

5.4.19 CH2 Start Address Odd Low (HBVA=BA+048$_h$, RW)

This register holds the low word (i.e. bits 0 thru 15) of the odd field start address for acquisition channel 2. The complete starting address is determined by concatenating this register with the CH2 Start Address Odd High register.

| FIG. 32: Acquisition Channel 2 Memory Start Address Register (Odd/Low) | | | | | | | |
|---|---|---|---|---|---|---|---|
| HBVA(23:0) = BA + 048$_h$ | | | | | | | |
| Bit 31 | Bit 30 | Bit 29 | Bit 28 | Bit 27 | Bit 26 | Bit 25 | Bit 24 |
| C2SO15 | C2SO14 | C2SO13 | C2SO12 | C2SO11 | C2SO10 | C2SO9 | C2SO8 |
| Bit 23 | Bit 22 | Bit 21 | Bit 20 | Bit 19 | Bit 18 | Bit 17 | Bit 16 |
| C2SO7 | C2SO6 | C2SO5 | 0 | 0 | 0 | 0 | 0 |

5.4.20 CH3 Start Address Odd Low (HBVA=BA+04Ch, RW)

This register holds the low word (i.e. bits 0 thru 15) of the odd field start address for acquisition channel 3. The complete starting address is determined by concatenating this register with the CH3 Start Address Odd High register.

| FIG. 33: Acquisition Channel 3 Memory Start Address Register (Odd/Low) | | | | | | | |
|---|---|---|---|---|---|---|---|
| HBVA(23:0) = BA + 04C$_h$ | | | | | | | |
| Bit 31 | Bit 30 | Bit 29 | Bit 28 | Bit 27 | Bit 26 | Bit 25 | Bit 24 |
| C3SO15 | C3SO14 | C3SO13 | C3SO12 | C3SO11 | C3SO10 | C3SO9 | C3SO8 |
| Bit 23 | Bit 22 | Bit 21 | Bit 20 | Bit 19 | Bit 18 | Bit 17 | Bit 16 |
| C3SO7 | C3SO6 | C3SO5 | 0 | 0 | 0 | 0 | 0 |

5.4.21 CH0 Start Address Odd High (HBVA=BA+050$_h$, RW)

This register holds the high word (i.e. bits 16 thru 25) of the odd field start address for acquisition channel 0. The complete starting address is determined by concatenating this register with the CH0 Start Address Odd Low register.

| FIG. 34: Acquisition Channel 0 Memory Start Address Register (Odd/High) | | | | | | | |
|---|---|---|---|---|---|---|---|
| HBVA(23:0) = BA + 050$_h$ | | | | | | | |
| Bit 31 | Bit 30 | Bit 29 | Bit 28 | Bit 27 | Bit 26 | Bit 25 | Bit 24 |
| 0 | 0 | 0 | 0 | 0 | 0 | C0SO25 | C0SO24 |
| Bit 23 | Bit 22 | Bit 21 | Bit 20 | Bit 19 | Bit 18 | Bit 17 | Bit 16 |
| C0SO23 | C0SO22 | C0SO21 | C0SO20 | C0SO19 | C0SO18 | C0SO17 | C0SO16 |

5.4.22 CH1 Start Address Odd High (HBVA=BA+054$_h$, RW)

This register holds the high word (i.e. bits 16 thru 25) of the odd field start address for acquisition channel 1. The complete starting address is determined by concatenating this register with the CH1 Start Address Odd Low register.

FIG. 35: Acquisition Channel 1 Memory Start Address Register (Odd/High)

HBVA(23:0) = BA + 054$_h$

| Bit 31 | Bit 30 | Bit 29 | Bit 28 | Bit 27 | Bit 26 | Bit 25 | Bit 24 |
|---|---|---|---|---|---|---|---|
| 0 | 0 | 0 | 0 | 0 | 0 | C1SO25 | C1SO24 |
| Bit 23 | Bit 22 | Bit 21 | Bit 20 | Bit 19 | Bit 18 | Bit 17 | Bit 16 |
| C1SO23 | C1SO22 | C1SO21 | C1SO20 | C1SO19 | C1SO18 | C1SO17 | C1SO16 |

5.4.23 CH2 Start Address Odd High (HBVA=BA+058$_h$ RW)

This register holds the high word (i.e. bits 16 thru 25) of the odd field start address for acquisition channel 2. The complete starting address is determined by concatenating this register with the CH2 Start Address Odd Low register.

FIG. 36: Acquisition Channel 2 Memory Start Address Register (Odd/High)

HBVA(23:0) = BA + 058$_h$

| Bit 31 | Bit 30 | Bit 29 | Bit 28 | Bit 27 | Bit 26 | Bit 25 | Bit 24 |
|---|---|---|---|---|---|---|---|
| 0 | 0 | 0 | 0 | 0 | 0 | C2SO25 | C2SO24 |
| Bit 23 | Bit 22 | Bit 21 | Bit 20 | Bit 19 | Bit 18 | Bit 17 | Bit 16 |
| C2SO23 | C2SO22 | C2SO21 | C2SO20 | C2SO19 | C2SO18 | C2SO17 | C2SO16 |

5.4.24 CH3 Start Address Odd High (HBVA=BA+05C$_h$, RW)

This register holds the high word (i.e. bits 16 thru 25) of the odd field start address for acquisition channel 3. The complete starting address is determined by concatenating this register with the CH3 Start Address Odd Low register.

FIG. 37: Acquisition Channel 3 Memory Start Address Register (Odd/High)

HBVA(23:0) = BA + 05C$_h$

| Bit 31 | Bit 30 | Bit 29 | Bit 28 | Bit 27 | Bit 26 | Bit 25 | Bit 24 |
|---|---|---|---|---|---|---|---|
| 0 | 0 | 0 | 0 | 0 | 0 | C3SO25 | C3SO24 |
| Bit 23 | Bit 22 | Bit 21 | Bit 20 | Bit 19 | Bit 18 | Bit 17 | Bit 16 |
| C3SO23 | C3SO22 | C3SO21 | C3SO20 | C3SO19 | C3SO18 | C3SO17 | C3SO16 |

5.4.25 CH0 Line Index (HBVA=BA+060$_h$ RW)

This register is used to specify the line index parameter required by the Address Generator for channel 0.

5.4.26 CH1 Line Index (HBVA=BA+064$_h$, RW)

This register is used to specify the line index parameters required by the Address Generator for channel 1.

FIG. 38: Acquisition Channel 0 Line Index Register

HBVA(23:0) = BA + 060$_h$

| Bit 31 | Bit 30 | Bit 29 | Bit 28 | Bit 27 | Bit 26 | Bit 25 | Bit 24 |
|---|---|---|---|---|---|---|---|
| Unused | Unused | Unused | Unused | C0LI11 | C0LI10 | C0LI9 | C0LI8 |
| Bit 23 | Bit 22 | Bit 21 | Bit 20 | Bit 19 | Bit 18 | Bit 17 | Bit 16 |
| C0LI7 | C0LI6 | C0LI5 | 0 | 0 | 0 | 0 | 0 |

FIG. 39: Acquisition Channel 1 Line Index Register

HBVA(23:0) = BA + 064$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| Unused | Unused | Unused | Unused | C1LI11 | C1LI10 | C1LI9  | C1LI8  |
| Bit 23 | Bit 22 | Bit 21 | Bit 20 | Bit 19 | Bit 18 | Bit 17 | Bit 16 |
| C1LI7  | C1LI6  | C1LI5  | 0      | 0      | 0      | 0      | 0      |

5.4.27 CH2 Line Index (HBVA=BA+068$_h$, RW)

This register is used to specify the line index parameters required by the Address Generator for channel 2.

FIG. 40: Acquisition Channel 2 Line Index Register

HBVA(23:0) = BA + 068$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| Unused | Unused | Unused | Unused | C2LI11 | C2LI10 | C2LI9  | C2LI8  |
| Bit 23 | Bit 22 | Bit 21 | Bit 20 | Bit 19 | Bit 18 | Bit 17 | Bit 16 |
| C2LI7  | C2LI6  | C2LI5  | 0      | 0      | 0      | 0      | 0      |

5.4.28 CH3 Line Index (HBVA=BA+06C$_h$, RW)

This register is used to specify the line index parameters required by the Address Generator for channel 3.

FIG. 41: Acquisition Channel 3 Line Index Register

HBVA(23:0) = BA + 06C$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| Unused | Unused | Unused | Unused | C3LI11 | C3LI10 | C3LI9  | C3LI8  |
| Bit 23 | Bit 22 | Bit 21 | Bit 20 | Bit 19 | Bit 18 | Bit 17 | Bit 16 |
| C3LI7  | C3LI6  | C3LI5  | 0      | 0      | 0      | 0      | 0      |

NOTE

The 4800 uses the same RAMDAC currently supported on the 4400 product, the Brooktree BT473. Therefore, when reading Sections 5.4.29 through 5.4.36 keep in mind that the lower level software drivers already exist.

5.4.29 RAMDAC Overlay Write Address (HBVA=BA+070$_h$ RW)

This 4-bit register specifies the next overlay location to be loaded. For each write to this register, three writes to the overlay data port are required, one each for the red, green, and blue overlays. When updating multiple overlay table locations, this register need only be loaded with first location to be changed. It will automatically increment after the third write to overlay data port. When performing the write cycles to the overlay data port, keep in mind that the order should be red data, followed by green data, followed by blue data.

FIG. 42: RAMDAC Overlay Write Address Register

HBVA(23:0) = BA + 070$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| Unused | Unused | Unused | Unused | OWA3   | OWA2   | OWA1   | OWA0   |

TABLE 26

| RAMDAC OWA(3:0) Bits | |
|---|---|
| OWA(3:0) | Overlay Selected |
| 0 | Reserved |
| 1 | Overlay Color 1 |
| 2 | Overlay Color 2 |
| . | . |
| . | . |
| . | . |
| $D_h$ | Overlay Color 13 |
| $E_h$ | Overlay Color 14 |
| $F_h$ | Overlay Color 15 |

5.4.30 RAMDAC Overlay Data Port (HBVA=BA+$074_h$, RW)

This 8-bit data port is used to write to or read from the overlay planes. For each write to the overlay write address register, three write cycles to this data port are required, one each for the red, green, and blue planes. When writing to multiple overlay planes, this data port can be used to load all the necessary data once the starting address has been loaded into the overlay write address register.

FIG. 43: RAMDAC Overlay Data Por

HBVA(23:0) = BA + $074_h$

| Bit 21 | Bit 30 | Bit 29 | Bit 28 | Bit 27 | Bit 26 | Bit 25 | Bit 24 |
|---|---|---|---|---|---|---|---|
| RRA7 | RRA6 | RRA5 | RRA4 | RRA3 | RRA2 | RRA1 | RRA0 |

For each write to overlay read address register, three read cycles to this data port are required, one each for the red, green, and blue RAMs. When reading from multiple overlay planes, this data port can be used to access all the necessary data once the starting address has been loaded into the overlay read address register.

5.4.31 RAMDAC Command (HBVA=BA $078_h$, RW)

This register is used to configure the RAMDAC. Bit 3 is not used but should be set to zero. Graphic overlays are enabled by setting bit 2, OVREN, high. They are disabled whenever OVREN is low. The other bit fields, S, RES, BLNPED, and CLRM(1:0) are described in Table 27, Table 28, and Table 29.

FIG. 44: RAMDAC Command Register

HBVA(23:0) = BA + $078_h$

| Bit 31 | Bit 30 | Bit 29 | Bit 28 | Bit 27 | Bit 26 | Bit 25 | Bit 24 |
|---|---|---|---|---|---|---|---|
| CLRM1 | CLRM0 | BLNPED | RES | 0 | OVREN | S1 | S0 |

TABLE 27

| RAMDAC RES Bit | |
|---|---|
| RES | RAMDAC Resolution |
| 0 | 6 bits |
| 1 | 8 bits |

TABLE 28

| RAMDAC BLNPED Bit | |
|---|---|
| BLNPED | Blanking Pedestal Level |
| 0 | 0.0 IRE |
| 1 | 7.5 IRE |

TABLE 29

| RAMDAC CLRM(1:0) Bits | | |
|---|---|---|
| S(1:0) | CLRM(1:0) | Color Mode |
| 0 | 0 | 24 bit RGB W/LUT |
| 1 | 1 | 24 bit RGB w/o LUT |
| 2 | 0 | 8 bit pseudo color (R) |
|  | 1 | 8 bit pseudo color (G) |
|  | 2 | 8 bit pseudo color (B) |
|  | 3 | reserved |
| 3 | 0–3 | reserved (reduced resolution color bypass modes) |

5.4.32 RAMDAC Overlay Read Address (HBVA=BA+$07C_h$, RW)

This 4-bit register specifies the next overlay location to be read. For each write to this register, three reads of the overlay data port are required, one each for the red, green, and blue overlays. When accessing multiple overlay table locations, this register need only be loaded with first location. It will automatically increment after the third read of the overlay data port. When performing the read cycles of the overlay data port, keep in mind that the order will be red data, followed by green data, followed by blue data.

FIG. 45: RAMDAC Overlay Read Address Register

HBVA(23:0) = BA + 07C$_h$

| Bit 31 | Bit 30 | Bit 29 | Bit 28 | Bit 27 | Bit 26 | Bit 25 | Bit 24 |
|---|---|---|---|---|---|---|---|
| Unused | Unused | Unused | Unused | ORA3 | ORA2 | ORA1 | ORA0 |

TABLE 30
RAMDAC ORA(3:0) Bits

| ORA(3:0) | Overlay Selected |
|---|---|
| 0 | Reserved |
| 1 | Overlay Color 1 |
| 2 | Overlay Color 2 |
| . | . |
| . | . |
| . | . |
| D$_h$ | Overlay Color 13 |
| E$_h$ | Overlay Color 14 |
| F$_h$ | Overlay Color 15 |

5.4.33 RAMDAC RAM Write Address (HBVA=BA+080$_h$, RW)

This 8-bit register specifies the next color palette RAM address to be loaded. For each write to this register, three writes to the color palette data port are required, one each for the red, green, and blue RAMs. When updating large blocks of the color palette RAMs, this register need only be loaded with the first location to be changed. It will automatically increment after the third write to the color palette RAMs. When performing the write cycles to the color palette RAMs, keep in mind that the order should be red data, followed by green data, followed by blue data.

large blocks of the color palette RAMs, this data port can be used to load all the necessary data once the starting address has been loaded into the RAM write address register.

FIG. 46: RAMDAC Color Palette RAM Write Address Register

HBVA(23:0) = BA + 080$_h$

| Bit 31 | Bit 30 | Bit 29 | Bit 28 | Bit 27 | Bit 26 | Bit 25 | Bit 24 |
|---|---|---|---|---|---|---|---|
| RWA7 | RWA6 | RWA5 | RWA4 | RWA3 | RWA2 | RWA1 | RWA0 |

TABLE 31
RAMDAC RWA(7:0) Bits

| RWA(7:0) | Color Palette Selected |
|---|---|
| 00$_h$ | RGB Address 0 |
| 01$_h$ | RGB Address 1 |
| 02$_h$ | RGB Address 2 |
| . | . |
| . | . |
| . | . |
| FD$_h$ | RGB Address 253 |
| FE$_h$ | RGB Address 254 |
| FF$_h$ | RGB Address 255 |

5.4.34 RAMDAC RAM Data Port (HBVA=BA+084$_h$, RW)

This 8-bit data port is used to write to or read from the color palette RAMs. For each write to RAM write address register, three write cycles to this data port are required, one each for the red, green, and blue RAMs. When writing to

FIG. 47: RAMDAC Color Pallette RAM Data Port

HBVA(23:0) = BA + 084$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| RRD7 | RRD6 | RRD5 | RRD4 | RRD3 | RRD2 | RRD1 | RRD0 |

For each write to RAM read address register, three read cycles to this data port are required, one each for the red, green, and blue RAMs. When reading from large blocks of the color palette RAMs, this data port can be used to access all the necessary data once the starting address has been loaded into the RAM read address register.

5.4.35 RAMDAC Pixel Mask (HBVA=BA+088$_h$, RW)

This 8-bit register allows each individual bit entering the RAMDAC via the RED, GRN, and BLU data buses to be mask. The contents of this register are bit-wise ANDed

FIG. 48: RAMDAC Color Pallette Pixel Mask Register

HBVA(23:0) = BA + 088$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| RPM7 | RPM6 | RPM5 | RPM4 | RPM3 | RPM2 | RPM1 | RPM0 | with the data contained on the RED, GRN, and BLU data paths. The bit plane is enable if the cognizant bit in the pixel mask register is set (i.e. a logic 1). The mask contained in this register is applied to all three RAMDAC color input channels simultaneously. To enable full resolution (i.e. all 8 bits enables) this register must be set to FFh.

5.4.36 RAMDAC RAM Read Address (HBVA=BA+08C$_h$, RW)

This 8-bit register specifies the next color palette RAM address to be read. For each write to this register, three read cycles of the color palette data port are required, one each for the red, green, and blue RAMs. When reading large blocks of the color palette RAMs, this register need only be loaded with the first location. It will automatically increment after the third read to the color palette RAMs. When performing the read cycles of the color palette RAMs, keep in mind that the order will be red data, followed by green data, followed by blue data.

FIG. 49: RAMDAC Color Palette RAM Read Address Register

HBVA(23:0) = BA + 08C$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| RRA7 | RRA6 | RRA5 | RRA4 | RRA3 | RRA2 | RRA1 | RRA0 |

TABLE 32

RAMDAC RRA(7:0) Bits

| RRA(7:0) | Color Palette Selected |
|----------|------------------------|
| 00$_h$ | RGB Address 0 |
| 01$_h$ | RGB Address 1 |
| 02$_h$ | RGB Address 2 |
| . | . |
| . | . |
| . | . |
| FD$_h$ | RGB Address 253 |
| FE$_h$ | RGB Address 254 |
| FF$_h$ | RGB Address 255 |

5.4.37 Data Path and Overlay Control (HBVA=BA+090$_h$, RW)

This register controls the cross point switch (CPS) which is used to map the RED, GRN, BLU, and OVR RAMDAC input ports to the various banks of ADMEM. when displaying stored images. For real-time displays (also refer to the Real-Time Control and the RAMDAC Command Registers) the CPS is used to select which bank will provide the graphic overlay if one is desired. It is comprised of four bit fields; RED(1:0), GRN(1:0), BLU(1:0), and OVR(3:0).

| FIG. 50: Display Data Path and Overlay Control Register | | | | | | | |
|---|---|---|---|---|---|---|---|
| HBVA(23:0) = BA + 090$_h$ | | | | | | | |
| Bit 31 | Bit 30 | Bit 29 | Bit 28 | Bit 27 | Bit 26 | Bit 25 | Bit 24 |
| OVR1 | OVR0 | BLU1 | BLU0 | GRN1 | GRN0 | RED1 | RED0 |

To configure the Cross Point Switch for either a monochrome or pseudo-color display, the values selected for REDM(1:0), GRNM(1:0), and BLUM(1:0) will be identical. Conversely, a full color display will require unique values for REDM(1:0), GRNM(1:0), and BLUM(1:0).

5.4.38 Acquisition and Display Clock Frequency Select (HBVA=BA+094$_h$, WO)

The 4800 contains two programmable oscillators. One is used to generate the acquisition pixel clock (BASEACQCLK) when the video board is driving the camera while the other synthesizes the optional display pixel clock, DPLYCLK. If the optional display timing generator is not present, then DPLYCLK is sourced by BASEACQCLK and configuring the second oscillator is not required. BASEACQCLK must be configured regardless of whether or not the video timing is running in PLL or genlock.

The frequency of each oscillator is set via a 22-bit control word which is programmed using a serial protocol. As shown in the register description, the oscillators share a common data line (DATA) but have individual write enables (ACLKEN and DCLKEN). In order to program either oscillator the respective enable bit must be low. Each bit in the 22-bit control word requires a Host Bus register write cycle. Table 33 shows the four frequencies required by the 4800 and their respective 22-bit data words The CLKREF bit can be used to switch the oscillator to a stable 14.31818 Mhz reference frequency during programming. To invoke this capability, simply write a zero to this location for the first 22 program cycles followed by a one during a 23rd write cycle. Both ACLKEN and DCLKEN must be high during the 23rd write cycle. This technique will insure that the output of the oscillator does not glitch during programming. Note that setting CLKREF low switches both BASEACQCLK and DPLYCLK to the reference frequency, regardless of which one is actually being programmed.

| FIG. 51: Acquisition and Display Clock Frequency Select Register | | | | | | | |
|---|---|---|---|---|---|---|---|
| HBVA(23:0) = BA + 094$_h$ | | | | | | | |
| Bit 31 | Bit 30 | Bit 29 | Bit 28 | Bit 27 | Bit 26 | Bit 25 | Bit 24 |
| Unused | Unused | Unused | Unused | CLKREF | DCLKEN | ACLKEN | DATA |

TABLE 33

BASEACQCLK and DPLYCLK Oscillator Frequencies

| Video Format | Frequency (Mhz) | DATA (hex) |
|---|---|---|
| RS-170 | 12.348 | 0BA543 |
| CCIR | 14.75 | 120D1F |
| VGA | 25.000 | 0B5CBD |
| SVGA | 36.000 | 1EACA1 |

5.4.39 Interrupt Enable Mask (HBVA=BA+098$_h$, RW)

This register allows each of the 4 sources of video interrupts to be disable. The 4800 video will generator an interrupt whenever one of the following conditions exists:

Acquisition vertical interrupt occurs AND AVIEN is set to a logic 1

Acquisition line interrupt occurs begins AND ALIEN is set to a logic 1

Display vertical interrupt occurs AND DVIEN is set to a logic 1

VOM interrupt occurs AND VOMIEN is set to a logic 1

| FIG. 52: Interrupt Enable Mask Register | | | | | | | |
|---|---|---|---|---|---|---|---|
| HBVA(23:0) = BA + 098$_h$ | | | | | | | |
| Bit 31 | Bit 30 | Bit 29 | Bit 28 | Bit 27 | Bit 26 | Bit 25 | Bit 24 |
| Unused | Unused | Unused | Unused | VOMIEN | DVIEN | ALIEN | AVIEN |

5.4.40 Interrupt Status (HBVA=BA+09C$_h$, RW)

The Interrupt Status register contains four bits; AVINT, ALINT, DVINT, and VOMINT. When AVINT is high (logic 1), the acquisition vertical interrupt has occurred. Similarly, when ALINT is high, the acquisition line interrupt has been generated. The DVINT bit denotes the generation of the display vertical interrupt. When VOMINT is high, the interrupt was generated by the installed VOM. These bits are cleared by writing a one to the bit position corresponding to the interrupt. This scheme implements a "reset interrupt on resource acknowledge" methodology.

| FIG. 53: Interrupt Status Register |
| --- |

HBVA(23:0) = BA + 09C$_h$

| Bit 31 | Bit 30 | Bit 29 | Bit 28 | Bit 27 | Bit 26 | Bit 25 | Bit 24 |
| --- | --- | --- | --- | --- | --- | --- | --- |
| Unused | Unused | Unused | Unused | VOMIEN | DVIEN | ALINT | AVINT |

NOTE

The 4800 uses the same RAMDAC currently supported on the 4100 product, the Brooktree BT252.

5.4.41 Digitizer Write and Read Address (HBVA=BA+0A0$_h$, RW)

This 8-bit register is used to specify the internal look-up-table RAM address or configuration registers to be either written to or read from. To read or write the RAM, the address of the first location to be accessed is stored in this register. Data will be updated whenever a write cycle to the Digitizer RAM Data Port is performed. The address will automatically increment after each write cycle to the data port. SImilarly, the RAM can be checked by performing a read cycle to the Digitizer RAM Data Port. Again, this address register will automatically increment after each read cycle of the data port.

To alter the gain of the digitizer or to update the internal control register, the correct pointer must first be loaded into this address register. The corresponding gain or control register can then be accessed by performing a read or write cycle to the Digitizer Gain and Control Data Port. Table 34 summarizes the legal values for this register when used in conjunction with the RAM or Gain and Control Data Ports.

5.4.42 Digitizer RAM Data Port (HBVA=BA+0A4$_h$, RW)

This 8-bit data port is used to write to or read from the digitizer look-up-table RAM. When reading from or writing to large blocks of the digitizer RAM, this data port can be used to transfer all the necessary data once the starting address has been loaded into the Digitizer Write and Read Address register.

| FIG. 55: Digitizer RAM Data Port |
| --- |

HBVA(23:0) = BA + 0A4$_h$

| Bit 31 | Bit 30 | Bit 29 | Bit 28 | Bit 27 | Bit 26 | Bit 25 | Bit 24 |
| --- | --- | --- | --- | --- | --- | --- | --- |
| DRD7 | DRD6 | DRD5 | DRD4 | DRD3 | DRD2 | DRD1 | DRD0 |

5.4.43 Digitizer Reference and Command Data Port (HBVA=BA+0A8h, RW)

This 8-bit data port is used to write to or read from the three internal digitizer configuration registers; Command, A/D Reference Max, and A/D Reference Min as illustrated in Table 34.

| FIG. 54: Digitizer Read and Write Address Register |
| --- |

HBVA(23:0) = BA + 0A0$_h$

| Bit 31 | Bit 30 | Bit 29 | Bit 28 | Bit 27 | Bit 26 | Bit 25 | Bit 24 |
| --- | --- | --- | --- | --- | --- | --- | --- |
| DRWA7 | DRWA6 | DRWA5 | DRWA4 | DRWA3 | DRWA2 | DRWA1 | DRWA0 |

TABLE 34

| Digitizer DRWA(7:0) Bits | | |
| --- | --- | --- |
| Data Pore Accessed | DRWA(7:0) | Read or Write |
| RAM | 00$_h$ | RGB Address 0 |
|  | 01$_h$ | RGB Address 1 |
| RAM | 02$_h$ | RGB Address 2 |
| . | . | . |
| . | . | . |
| . | . | . |
| RAM | FD$_h$ | RGB Address 253 |
|  | FE$_h$ | RGB Address 254 |
|  | FF$_h$ | RGB Address 255 |
| Gain and Control | 00$_h$ | Command Register |
|  | 01$_h$ | A/D Reference Max |
|  | 02$_h$ | A/D Reference Min |

| FIG. 56: Digitizer REF and Command Data Port | | | | | | | |
|---|---|---|---|---|---|---|---|
| HBVA(23:0) = BA + 0A8$_h$ | | | | | | | |
| Bit 31 | Bit 30 | Bit 29 | Bit 28 | Bit 27 | Bit 26 | Bit 25 | Bit 24 |
| DGCD7 | DGCD6 | DGCD5 | DGCD4 | DGCD3 | DCCD2 | DGCD1 | DGCD0 |

Table 35 illustrates the mapping between the bits in this data port and the digitizer's internal Command Register. The register is comprised of three fields; CSDL(1:0), SYNCCSEL(1:0), and A/DSEL(1:0). The CSDL(1:0) field is used to set a threshold for extracting the synchronization information from the composite video waveform. The remaining two fields determine which of the four video sources is used as the input to the synchronization extraction logic and the A/D converter respectively.

Table 36 and Table 37 illustrate the mapping between the bits in this data port and the digitizer's internal A/D Reference Max and Min registers. These registers control the reference voltages at the top (Max) and bottom (Min) of the flash A/D converter's resistor ladder network. They have a minimum value of 0.0 volts and a maximum value of 1.2 volts. The step size for both references is 19 millivolts. The digitizer converts signals in the range:

$$VREF_{min \leq V_{camera} \leq VREFmax}$$

where Vcamera is the signal on either Camera 0, Camera 1, Camera 2, or Camera 3. The "gain" of the Vcamera signal can be adjusted by lowering the value of VREFmax. The black reference, and hence the level, of the Vcamera signal can be adjusted by raising the value of VREFmin.

The output of the A/D converter will range between 00h (Vcamera$\leq$/=VREFmin) and FFh (Vcamera$\geq$/=VREFmax). The linearity and accuracy of the A/D converter are impacted by the difference between VREFmax and VREFmin. For example, the linearity and signal to noise (S/N) performance of the A/D converter will degrade by about a factor of 2 if the delta (VREFmax–VREFmin) is reduced from 1.2 volts to 0.6 volts. The nominal settings are:

VREFmax=1.2 VDC

VREFmin=0.0 VDC

TABLE 35

Digitizer Command Register

| Data Port Bit(s) | Command Register Bit(s) | Value | Function |
|---|---|---|---|
| DGCD(1:0) | Unused | 0 | Program to 0 |
| DGCD(3:2) | CSDL(1:0) | 0 | Sync Detect Level = 50mv |
|  |  | 1 | Sync Detect Level = 75mv |
|  |  | 2 | Sync Detect Level = 100mv |
|  |  | 3 | Sync Detect Level = 125mv |
| DGCD(7:6) | SYNCSEL(1:0) | 0 | Sync on Camera 0 |
|  |  | 1 | Sync on Camera 1 |
|  |  | 2 | Synch on Camera 2 |
|  |  | 3 | Sync on Camera 3 |
| DGCD(7:6) | A/DSEL(1:0) | 0 | Digitize Camera 0 |
|  |  | 1 | Digitize Camera 1 |
|  |  | 2 | Digitize Camera 2 |
|  |  | 3 | Digitize Camera 3 |

TABLE 36

Digitizer Reference Max Register

| Data Port Bit(s) | Command Register Bit(s) | Value | Function |
|---|---|---|---|
| DRD(1:0) | Unused | 0 | Program to 0 |
| DRD(7:3) | ADREFMX(5:0) | 00$_h$ | VREF$_{MAX}$ = 0.000V |
|  |  | 01$_h$ | VREF$_{MAX}$ = 0.0019V |
|  |  | 02$_h$ | VREF$_{MAX}$ = 0.0038V |
|  |  | 03$_h$ | VREF$_{MAX}$ = 0.0057V |
| DRD(7:3) | ADREFMIN(5:0) | . | . |
|  |  | . | . |
|  |  | . | . |
|  |  | 3C$_h$ | VREF$_{MAX}$ = 1.143V |
|  |  | 3D$_h$ | VREF$_{MAX}$ = 1.162V |
|  |  | 3E$_h$ | VREF$_{MAX}$ = 1.181V |
|  |  | 3F$_h$ | VREF$_{MAX}$ = 1.200V |

TABLE 37

| | Digitizer Reference Min Register | | |
|---|---|---|---|
| Data Port Bit(s) | Command Register Bit(s) | Value | Function |
| DRD(1:0) | Unused | 0 | Program to 0 |
| DRD(7:3) | ADREFMN(5:0) | $00_h$ | $VREF_{MIN} = 0.000V$ |
| | | $01_h$ | $VREF_{MIN} = 0.0019V$ |
| | | $02_h$ | $VREF_{MIN} = 0.0038V$ |
| | | $03_h$ | $VREF_{MIN} = 0.0057V$ |
| DRD(7:3) | ADREFMIN(5:0) | . | . |
| | | . | . |
| | | . | . |
| | | $3C_h$ | $VREF_{MIN} = 1.143V$ |
| | | $3D_h$ | $VREF_{MIN} = 1.162V$ |
| | | $3E_h$ | $VREF_{MIN} = 1.181V$ |
| | | $3F_h$ | $VREF_{MIN} = 1.200V$ |

5.4.44 D.C. Restore Position (HBVA=BA+0AC$_h$, RW)

This register is used to specify the position within the horizontal blank of the sample pulse (RESTORE_L) used to perform D.C. restoration. The value of the horizontal counter is reset to zero at the beginning of every blank. The value entered into this register will specify the position of the RESTORE_L pulse.

NOTE

The location of the D.C. restoration is currently fixed in hardware. This register is only for future use.

TABLE 38

| Acquisition EXTCLK and PLLON Bits | | |
|---|---|---|
| EXTCLK | PLLON | Base Acquire Clock Source |
| 0 | 0 | Programmable oscillator |
| | 1 | Phase-lock-loop |
| 1 | 0 | External camera clock input |
| | 1 | External camera clock input |

| FIG. 57: D.C. Restore Position Register | | | | | | | |
|---|---|---|---|---|---|---|---|
| HBVA(23:0) = BA + 0AC$_h$ | | | | | | | |
| Bit 31 | Bit 30 | Bit 29 | Bit 28 | Bit 27 | Bit 26 | Bit 25 | Bit 24 |
| Unused | Unused | Unused | Unused | Unused | Unused | Unused | DCRP8 |
| Bit 23 | Bit 22 | Bit 21 | Bit 20 | Bit 19 | Bit 18 | Bit 17 | Bit 16 |
| DCRP7 | DCRP6 | DCRP5 | DCRP4 | DCRP3 | DCRP2 | DCRP1 | DCRP0 |

5.4.45 Acquisition Timing Control (HBVA=BA+0B0$_h$, RW)

This register is used to define acquisition timing clock reference and mode. Two bits, PLLON and EXTCLK are used to determine the source of the acquisition pixel clock reference.

| FIG. 58: Acquisition Timing Control Register | | | | | | | |
|---|---|---|---|---|---|---|---|
| HBVA(23:0) = BA + 0B0$_h$ | | | | | | | |
| Bit 31 | Bit 30 | Bit 29 | Bit 28 | Bit 27 | Bit 26 | Bit 25 | Bit 24 |
| Unused | Unused | Unused | SYNC | AWIDE | AHRES | EXTCLK | PLLON |

As shown in Table 38, there are three possible clock sources. When the 4800 is providing the video timebase (i.e. RS-170 or CCIR) then the clock is generated internally using a programmable oscillator (refer to the Pixel Cock Frequency Register). The PLLON bit is set whenever the timing is to be derived from the camera's composite video timing using the synchronization detector and separator in conjunction with the phase-lock-loop. Finally, if the camera provides a pixel clock signal, it may be used by setting EXTCLK high.

The horizontal resolution, that is the number of pixels digitized during the horizontal active interval, is controlled by two bits, AWIDE and AHRES. AWIDE selects between a "normal" width of 512 pixels per line and a "wide" width of 640 pixels or 768 pixels at RS-170 or CCIR respectively.

The determines whether every pixel, or every second pixel is loaded into the base packetizing FIFO.

NOTE

In earlier versions of the specification, AWIDE and AHRES were referred to as AM(1:0)

In order to perform a half resolution acquisition, AHRES is set high and the ACQ bit located in the Acquisition On/Off Register is held high for a single field. The generates an image which is sub-sampled by ½ in both the horizontal and vertical directions. WHen performing half resolution acquires CHnSAO should be set to the same value as CHnSAE.

TABLE 39

| Acquisition AHRES and AWIDE Bits | | |
|---|---|---|
| AHRES | AWIDE | Acquisition Mode |
| 0 | 0 | Normal, full resolution |
| 0 | 1 | Wide, full resolution |
| 1 | 0 | Normal, half resolution |
| 1 | 1 | Wide, half resolution |

The video section can accept external horizontal and vertical drive (HDRIVE and VDRIVE) from either a VOM or via the camera connectors. In addition a composite synchronization signal (CSYNC) can be sourced from either the BT252 located on the base board or from a VOM. The SYNC bit is used to determine the source of the external video synchronization timing signals.

TABLE 40

| Acquisition External SYNC source Control Bit | |
|---|---|
| SYNC | External Sync Source |
| 0 | VOMEXTHDRIVE, VOMEXTVDRIVE, VOMCAMSYNC |
| 1 | EXTHDRIVE, EXTVDRIVE, BASECAMSYNC |

5.4.46 Acquisition On/Off Control (HBVA=BA+0B4$_h$, RW)

The ACQ bit is used to enable and disable acquires using the base video channel. Data is written into the base channel FIFO during the active portion of the video timing (as defined by horizontal and vertical blanking intervals) whenever ACQ is high.

| FIG. 59: Acquisition On/Off Control Register | | | | | | | |
|---|---|---|---|---|---|---|---|
| HBVA(23:0) = BA + 0B4$_h$ | | | | | | | |
| Bit 31 | Bit 30 | Bit 29 | Bit 28 | Bit 27 | Bit 26 | Bit 25 | Bit 24 |
| Unused | Unused | Unused | Unused | Unused | Unused | Unused | ACQ |

5.4.47 Acquisition Camera Control (HBVA=BA+0B8$_h$, RW)

This register is used to control advanced features which may not be supported by all cameras. RREN (rapid restart enable) and RRMODE(1:0) (rapid reset mode), along with the Rapid Restart Position Register (RRPOS) are used to control "rapid restarting" of the video timing. Currently, two operating modes are supported; immediate mode and one-shot mode. Regardless of the mode, the Rapid Restart Position Register must contain the desired line number prior to invoking the actual restart.

Immediate Mode

An immediate rapid restart cycle is invoked using the following steps:

1. RRPOS=restart line number
2. RRMODE(1:0)=00
3. RREN=1 followed by RREN=0 on successive host bus write cycles At the beginning of the next horizontal blank, the vertical timing is restarted as follows:

VERCNT=PRPOS

FIELD=RRFIELD

The vertical timing increments from this position in accordance with the video standard currently running (e.g. RS-170 or CCIR)

One-Shot Mode

A one-shot rapid restart cycle is performed as follows:

1. RRPOS=restart line number
2. RRMODE(1:0)=01
3. RREN=1

At the beginning of the next horizontal blank, the vertical timing is restarted as follows:

VERCNT=RRPOS

FIELD=RRFIELD

However, unlike the immediate mode, the vertical timing remains "frozen" at this position until the acquisition software releases the RREN bit.

4. RREN=0

The vertical timing now increments from this position in accordance with the video standard currently running (e.g. RS-170 or CCIR)

NOTE

RRMODE(1:0)=00 can also be used to implement "one-shot" timing, however the vertical timing remains frozen for 1 extra line (63.5 us for RS-170) after RREN is reset low, adding to the acquisition latency.

| FIG. 60: Acquisition Control Register | | | | | | | |
|---|---|---|---|---|---|---|---|
| HBVA(23:0) = BA + 0B8$_h$ | | | | | | | |
| Bit 31 | Bit 30 | Bit 29 | Bit 28 | Bit 27 | Bit 26 | Bit 25 | Bit 24 |
| CCTL1 | LINTFLD | SHTRLVL | SHTRFLD | SHTREN | RRMODE1 | RRMODE0 | RREN |

The effect of the shutter control bits, SHTRFLD, SHTRLVL, and SHTREN, is summarized in Table 41. The actual shutter pulse is common to all four cameras which can be connected to the baseboard and is output on the CAMnCNTL0 (n=0, 1, 2, and 3) lines. The width of the shutter pulse is equal to that of the horizontal drive (HDRIVE) signal. Normally when the shutter in conjunction with either immediate or one-shot rapid restart acquisitions, the value of LIPOS will be:

LIPOS=RRPOS+1

Control Register. In order to minimize the recovery time for the camera, this process is performed synchronous to the horizontal timing.

TABLE 41

Shutter Enable, Level, and Field Control Bits

| SHTREN | SHTRLVL | SHTRFLD | Shutter (CAMCNTL0) Operation |
| --- | --- | --- | --- |
| 0 | X | X | Shutter disabled |
| 1 | 0 | 0 | Shutter = = 0 @ LIPOS = = VERCNT |
| 1 | 0 | 1 | Shutter = = 0 @ LIPOS = = VERCNT & LIFLD = = FIELD |
| 1 | 1 | 0 | Shutter = = 1 @ LIPOS = = VERCNT |
| 1 | 1 | 1 | Shutter = = 1 @ LIPOS = = VERCNT & LIFLD = = FIELD |

The effect of the line interrupt field select bit, LIFLD, is presented in Table 42. The actual interrupt occurs at the beginning of the scan line. The interrupt is always generated, even during shutter operation. This interrupt can be disabled by setting the ALIEN bit in the Interrupt Mask Register (BA+098) low.

TABLE 42

Line Interrupt Field Control Bits

| LINTFLD | Acquisition Line Interrupt Operation |
| --- | --- |
| 0 | ALINT = = 0 @ LIPOS = VERCNT |
| 1 | ALINT = = 0 @ LIPOS = = VERCNT & LIFLD = = FIELD |

The CCTL1 bit directly controls the CAMnCNTL 1 (n=0. 1. 2. and 3) outputs of the video boards. This bit allows the software to have direct control over a camera control signal for future use.

5.4.48 Rapid Restart Position (HBVA=BA+0BC$_h$, RW)

| FIG. 61: Rapid Restart Position Register | | | | | | | |
| --- | --- | --- | --- | --- | --- | --- | --- |
| HBVA(23:0) = BA + 0BC$_h$ | | | | | | | |
| Bit 31 | Bit 30 | Bit 29 | Bit 28 | Bit 27 | Bit 26 | Bit 25 | Bit 24 |
| Unused | Unused | Unused | Unused | Unused | Unused | RRFLD | RRP8 |
| Bit 23 | Bit 22 | Bit 21 | Bit 20 | Bit 19 | Bit 18 | Bit 17 | Bit 16 |
| RRP7 | RRP6 | RRP5 | RRP4 | RRP3 | RRP2 | RRP1 | RRP0 |

During a rapid reset, the vertical counter contained with the Acquisition Timing Generator is loaded with the value contained in this register. Once the load is complete:

VERCNT(8:0)=RRP(8:0)

AFIELD=RRFLD and the acquisition timing continues from this vertical position. A rapid reset is initiated using the Acquisition 5.4.49 Line Interrupt Position (HBVA=BA+0C0$_h$, RW)

This register is used to generate an interrupt at a specific acquisition line number. The acquisition line interrupt (ACQLINT_L) signal will become active when: LIP(8:0)= VERCNT(8:0)&&(LINTFLD||(LIFLD=AFIELD))

FIG. 62: Line Interrupt Position Register

HBVA(23:0) = BA + 0C0$_h$

| Bit 31 | Bit 30 | Bit 29 | Bit 28 | Bit 27 | Bit 26 | Bit 25 | Bit 24 |
|---|---|---|---|---|---|---|---|
| Unused | Unused | Unused | Unused | Unused | Unused | LIFLD | LIP8 |
| Bit 23 | Bit 22 | Bit 21 | Bit 20 | Bit 19 | Bit 18 | Bit 17 | Bit 16 |
| LIP7 | LIP6 | LIP5 | LIP4 | LIP3 | LIP2 | LIP1 | LIP0 |

This register can also be used to generate a camera shutter pulse. A shutter pulse will be output on CAMnCNTL0 (n=0, 1, 2, 3) whenever

SHTREN&&(LIP(8:0)=(VERCNT(8:0)&&(SHTRFLD||(LIFLD= AFIELD)))

5.4.50 Horizontal Frequency Adjustment (HBVA=BA+ 0C4$_h$, RW)

This register is used to modify the line frequency of CAMHDRIVE in order to adjust the effective pixel size when the 4800 is driving the camera. The nominal setting for this register is 6 (set automatically during configuration or reset) for RS-170. The register supports a range of 0 through 15 providing the ability to scale camera pixels by −1.6% to +2.3%.

FIG. 63: Horizontal Frequency Adjustment Register

HBVA(23:0) = BA + 0C4$_h$

| Bit 31 | Bit 30 | Bit 29 | Bit 28 | Bit 27 | Bit 26 | Bit 25 | Bit 24 |
|---|---|---|---|---|---|---|---|
| Unused | Unused | Unused | Unused | HFA3 | HFA2 | HFA1 | HFA0 |

5.4.51 Acquisition Line Number (HBVA=BA+0C8h, RO)

This read-only data port allows the current acquisition scan line number to be determined.

FIG. 64: Acquisition Line Number Register

HBVA(23:0) = BA + 0C8$_h$

| Bit 31 | Bit 30 | Bit 29 | Bit 28 | Bit 27 | Bit 26 | Bit 25 | Bit 24 |
|---|---|---|---|---|---|---|---|
| Unused | Unused | Unused | Unused | Unused | Unused | AFIELD | AVCNT8 |
| Bit 23 | Bit 22 | Bit 21 | Bit 20 | Bit 19 | Bit 19 | Bit 17 | Bit 16 |
| AVCNT7 | AVCNT6 | AVCNT5 | AVCNT4 | AVCNT3 | AVCNT2 | AVCNT1 | AVCNT0 |

Table 43 shows the relationship between these bits and the video acquisition timing for the RS-170 format. AVCNT resets to 0 at the beginning of vertical sync. In the RS-170 standard each field is 262½ lines long, giving a 525 line frame. Note that the AFIELD:AVCNT register actually goes through 526 states. The last AVCNT in the even field (AFIELD=0,AVCNT=262) and the first one in the odd field (AFIELD=1,AVCNT=0) are each ½ line long, forming a single video line.

NOTE

The vertical blank preceding the even field is 22 lines long and the vertical blank preceding the odd field is 23 lines long. This means that the 1st active line of the interlaced video image is even field line 0 (caq_image->rat[0]=caq_even->rat[0]), and the 2nd line is odd field line 0. This is different from some (all?) previous Cognex platforms

NOTE

This register may be read incorrectly if it is changing while being read. It should always be read twice in rapid succession, and the results discarded if they are not the same.

TABLE 43

Example of Acquisition AFIELD and AVCNT Bits For RS-170

| AFIELD | AVCNT(8:0)$_{10}$ | Video Data | Video Information |
|---|---|---|---|
| 0 | 0 -> 18 | Blank | Start of even field |
| 0 | 19 -> 258 | Active Even | Active region of even field |
| 0 | 259 -> 262 | Blank | End of even field |
| 1 | 0 -> 19 | Blank | Start of Odd field |
| 1 | 20 -> 259 | Active Odd | Active region of odd field |

TABLE 43-continued

| Example of Acquisition AFIELD and AVCNT Bits For RS-170 | | | |
|---|---|---|---|
| AFIELD | AVCNT(8:0)$_{10}$ | Video Data | Video Information |
| 1 | 260 -> 262 | Blank | End of odd field |

5.4.52 Display Control (HBVA=BA+0CC$_h$, RW)

This register, located in the display timing generator controls two display functions. DWIDTH selects between normal (logic 0 and wide (logic 1) display formats. DTIN can be used to select the display timing generator (logic 0) or the acquisition timing generator (logic 1) as the source of the display timing.

| FIG. 65: Display Control Register | | | | | | | |
|---|---|---|---|---|---|---|---|
| HBVA(23:0) = BA + 0CC$_h$ | | | | | | | |
| Bit 31 | Bit 30 | Bit 29 | Bit 28 | Bit 27 | Bit 26 | Bit 25 | Bit 24 |
| 1 | 0 | 1 | 0 | 0 | 0 | DTIN | DWIDTH |
| Bit 23 | Bit 22 | Bit 21 | Bit 20 | Bit 19 | Bit 19 | Bit 17 | Bit 16 |
| 1 | 0 | 1 | 0 | 1 | 0 | 1 | 0 |

If the DPLYTIMING Xilinx is not installed, a pull-up resistor of DTIN (Display Timing INstalled) automatically selects the, ACQTIMING Xilinx as the sole source of display timing. As an alternate method of determining whether or not the display timing generator is available, this register can be read after attempting to load the Xilinx. The unused bits in this register are hard-wired with the bit pattern shown.

5.4.53 Real-Time Display Data Path Control (HBVA=BA+0D0$_h$, RW)

This register control is used in conjunction with the CPS mapping register to select stored or real-time video data on a per-color basis. This register affects the source of data entering the RAMDAC (BT473). Three bits, RTRED, RTGRN, and RTBLU select either real-time (logic 1) or ADMEM (logic 0) data for display on each of the red, green, and blue RAMDAC data inputs. Real-time green and blue data is sourced by VOM channels 1 and 2 while real-time red data can come from the baseboard digitizer (RTSEL=0) or VOM channel 0 (RTSEL=1). Overlay data is always driven from ADMEM. Also refer to the Diagnostic Register (BA= 010) to see how RTRED and RTRSEL work in conjunction with the, LPBACK bit to establish a special diagnostic test path. Refer to Table 21 for a complete description of the RTRED, RTRSEL, and LPBACK bits. The LPBACK bit is located in the Diagnostic Register at address offset 010 hex.

| FIG. 66: Real-Time Display Data Path Control Register | | | | | | | |
|---|---|---|---|---|---|---|---|
| HBVA(23:0) = BA + 0D0$_h$ | | | | | | | |
| Bit 31 | Bit 30 | Bit 29 | Bit 28 | Bit 27 | Bit 26 | Bit 25 | Bit 24 |
| Unused | Unused | Unused | Unused | RTRSEL | RTBLU | RTGRN | RTRED |

TABLE 44

| LPBACK, RTRED, and RTRSEL Data Path Control Bits | | | | | |
|---|---|---|---|---|---|
| SYRESET_L | LPBACK | RTRED | RTRSEL | Data Path Enabled | Display |
| 0 | 0 | 0 | 1 | CPS(RED) -> BT473(RED) | ADMEM |
| 1 | 0 | 0 | 0 | ILLEGAL SETTING* | — |
| 1 | 0 | 0 | 1 | CPS(RED) -> BT473(RED) | ADMEM |
| 1 | 0 | 1 | 0 | BT252 -> BT473(RED) | Real-Time |
| 1 | 0 | 1 | 1 | VOM(RED) -> BT473(RED) | Real-Time |
| 1 | 1 | 0 | 0 | CPS(RED) -> Base FIFO | Loop Back |
| 1 | 1 | 0 | 1 | CPS(RED) -> BT473(RED) | ADMEM |
| 1 | 1 | 1 | 0 | VOM(RED) -> Base FIFO | Loop Back |
| 1 | 1 | 1 | 1 | VOM(RED) -> BT473(RED) | Real Time |

*NOTE-ILLEGAL SETTING!

The RTRED and RTRSEL bits should never be simultaneously set low. This condition must be avoided by software. There is no built-in hardware interlock which prevents this combination from being set. If RTRED and RTRSEL are both low, then both the CPS and the real-time data paths are enable to the BT473 red input, causing the tri-state buffers used to clash. Therefore when enabling the CPS(RED) -> Base FIFO diagnostic loop back data path, the LPBACK bit located in the Diagnostic Register (BA+010 hex) should be written high first, followed by writing RTRSEL and RTRED to zero.

5.4.54 Display Line Number (HBVA=BA+0D4$_h$, RO)

This read-only data port allows the current display scan line number to be determined.

| FIG. 67: Display Line Number Register | | | | | | | |
|---|---|---|---|---|---|---|---|
| HBVA(23:0) = BA + 0D4$_h$ | | | | | | | |
| Bit 31 | Bit 30 | Bit 29 | Bit 28 | Bit 27 | Bit 26 | Bit 25 | Bit 24 |
| Unused | Unused | Unused | Unused | Unused | Unused | DFIELD | DVCNT8 |
| Bit 23 | Bit 22 | Bit 21 | Bit 20 | Bit 19 | Bit 18 | Bit 17 | Bit 16 |
| DVCNT7 | DVCNT6 | DVCNT5 | DVCNT4 | DVCNT3 | DVCNT2 | DVCNT1 | DVCNT0 |

The relationship between these bits and the video acquisition timing for the RS-170 format is illustrated in Table 45. Because of the odd number (525) of total lines required to meet the RS-170 standard, each vertical blank is comprised of twenty-two full lines plus a single half line. AVCNT resets to 0 at the beginning of vertical sync. Not that this table will differ slightly for CCIR while for VGA the field indicator, DFIELD, will be replaced by another count bit, DVCNT9

NOTE

The vertical blank preceding the even field is 22 lines long and the vertical blank preceding the odd field is 23 lines long. This means that the 1st active line of the interlaced video image is even field line 0 (caq_image->rat[0]=caq_even->rat[0]), and the 2nd line is odd field line 0. This is different from some (all?) previous Cognex platforms

NOTE

This register may be read incorrectly if it is changing while being read. It should always be read twice in rapid succession, and the results discarded if they are not the same.

TABLE 45

| Example of Display DFIELD and DVCNT Bits for RS-170 | | | |
|---|---|---|---|
| AFIELD | AVCNT(8:0)$_{10}$ | Video Data | Video Information |
| 0 | 0 -> 18 | Blank | Start of even field |
| 0 | 19 -> 258 | Active Even | Active region of even field |
| 0 | 259 -> 262 | Blank | End of even field |
| 1 | 0 -> 19 | Blank | Start of Odd field |
| 1 | 20 -> 259 | Active Odd | Active region of odd field |
| 1 | 260 -> 262 | Blank | End of odd field |

5.4.55 Xilinx Configuration Control and Status (HBVA=BA+0D8$_h$, RW)

This least significant three bits of this register are used to initiate a program (or reprogram) cycle for the Xilinx components. The three program bits; MPGM, APGM, and DPGM, are all forced low during a system reset or power-on reset. The MPGM bit is associated with the PKTCNTL (packet control), AHADDRGEN (acquisition and host address generator), and DADDRGEN (display address generator) Xilinxs. The APGM and DPGM bits controls the ACQTIMING (acquisition timing) and DPLYTIMING (optional display timing) Xilinxs respectively. Each Xilinx has a unique "done" bit to signify whether it is in the rest state (logic 0) or has been successfully programmed (logic 1). These bits, PDONE, AHDONE, DADONE, ATDONE, and DTDONE are associated with the PKTCNTL, AHADDRGEN, DADDRGEN, ACQTIMING, and DPLYTIMING Xilinxs respectively.

| FIG. 68: Xilinx Configuration Control and Status | | | | | | | |
|---|---|---|---|---|---|---|---|
| HBVA(23:0) = BA + 0D$_h$ | | | | | | | |
| Bit 31 | Bit 30 | Bit 29 | Bit 28 | Bit 27 | Bit 26 | Bit 25 | Bit 24 |
| DTDONE | ATDONE | DADONE | AHDONE | PDONE | DPGM | APGM | MPGM |

To reprogram any part(s):

1. Set the appropriate program bit low (logic 0) for at least 300 us. The corresponding done bit(s) will read back 0 once the reset is complete.
2. Set the program bit high
3. Wait at least 500 us
4. Commence programming with successive write cycles no closer than 20 us (this time is required to insure that the Xllinx has completely serialized the previous word and stored it in configuration memory)

The "xxDONE" bits are read-only while the "xPGM" bits are read-write.

5.4.56 PKTCNTL Xilinx Data Port (HBVA=BA+0DC$_h$, WO)

The packet control Xilinx is programmed through this data port. Note that special software is required to configure any Xilinx FPGA device since an internal timing loop is required.

| FIG. 69: PKTCNTL Xilinx Data Port | | | | | | | |
|---|---|---|---|---|---|---|---|
| HBVA(23:0) = BA + 0DC$_h$ | | | | | | | |
| Bit 31 | Bit 30 | Bit 29 | Bit 28 | Bit 27 | Bit 26 | Bit 25 | Bit 24 |
| D7 | D6 | D5 | D4 | D3 | D2 | D1 | D0 |

5.4.57 AHADDRGEN Xilinx Data Port (HBVA=BA+0E0$_h$, WO)

The acquisition and host address generator Xilinx is programmed through this data port. Note that special software is required to configure any Xilinx FPGA device since an internal timing loop is required.

HBVA(23:0)=BA+0E0$_h$

| FIG. 70: AHADDRGEN Xilinx Data Port | | | | | | | |
|---|---|---|---|---|---|---|---|
| Bit 31 | Bit 30 | Bit 29 | Bit 28 | Bit 27 | Bit 26 | Bit 25 | Bit 24 |
| D7 | D6 | D5 | D4 | D3 | D2 | D1 | D0 |

5.4.58 DADDRGEN Xilinx Data Port (HBVA=BA+0E4$_h$, WO)

The display address generator Xilinx is programmed through this data port. Note that special software is required to configure any Xilinx FPGA device since an internal timing loop is required.

| FIG. 71: DADDRGEN Xilinx Data Port | | | | | | | |
|---|---|---|---|---|---|---|---|
| HBVA(23:0) = BA + 0E4$_h$ | | | | | | | |
| Bit 31 | Bit 30 | Bit 29 | Bit 28 | Bit 27 | Bit 26 | Bit 25 | Bit 24 |
| D7 | D6 | D5 | D4 | D3 | D2 | D1 | D0 |

5.4.59 ACQTIMING Xilinx Data Port (HBVA=BA+0E8$_h$, WO)

The acquisition timing generator Xilinx is programmed through this data port. Note that special software is required to configure any Xilinx FPGA device since an internal timing loop is required.

| FIG. 72: ACQTIMING Xilinx Data Port | | | | | | | |
|---|---|---|---|---|---|---|---|
| HBVA(23:0) = BA + 0E8$_h$ | | | | | | | |
| Bit 31 | Bit 30 | Bit 29 | Bit 28 | Bit 27 | Bit 26 | Bit 25 | Bit 24 |
| D7 | D6 | D5 | D4 | D3 | D2 | D1 | D0 |

5.4.59 ACQTIMING Xilinx Data Port (HBVA=BA+0E8h, WO)

The acquisition timing generator Xilinx is programmed through this data port. Note that special software is required to configure any Xilinx FPGA device since an internal timing loop is required.

FIG. 73: DPLYTIMING Xilinx Data Port

HBVA(23:0) = BA + 0EC$_h$

| Bit 31 | Bit 30 | Bit 29 | Bit 28 | Bit 27 | Bit 26 | Bit 25 | Bit 24 |
|---|---|---|---|---|---|---|---|
| D7 | D6 | D5 | D4 | D3 | D2 | D1 | D0 |

5.4.61 VOM Identification & Revision (HBVA=BA+100$_h$, RO)

This 16-bit register is divided into two 4-bit fields, VID(3:0) and VREV(3:0). The identification field, VID, will allow software to determine the specific VOM installed on a given base board. Four bits allows for a maximum of sixteen (16) types of VOMs. Since this byte of the host bus has pull up resistors, reading this register with no VOM installed will yield a value of FF hex.

The VREV field is used to indicate the current revision of the installed VOM. This field can be updated. This will allow a module which has been legally updated via the ECO process to have its' revision number reflect current functionality. The other byte can be used to determine the presence of any installed VOM. This byte will be hard-coded to read A5H for all VOM designs. If no VOM is installed this byte will return a value of FFH.

NOTE

Specific VOM designs may contain special identification or status registers which will allow software to further assess the capabilities and/or current configuration of the module.

FIG. 74: VOM Identification and Revision Register

HBVA(23:0) = BA + 100$_h$ – BA + 1FC$_h$

| Bit 31 | Bit 30 | Bit 29 | Bit 28 | Bit 27 | Bit 26 | Bit 25 | Bit 24 |
|---|---|---|---|---|---|---|---|
| VREV3 | VREV2 | VREV1 | VREV0 | VID3 | VID2 | VID1 | VID0 |
| Bit 23 | Bit 22 | Bit 21 | Bit 20 | Bit 19 | Bit 18 | Bit 17 | Bit 16 |
| 1 | 0 | 1 | 0 | 0 | 1 | 0 | 1 |

5.4.62 VOM Specific (HBVA=BA+104h–BA+01FC$_h$, RW)

These registers are unique for each VOM design and will be detailed in their respective engineering specifications. Their maximum width is sixteen (16) bits.

FIG. 75: VOM Register

HBVA(23:0) = BA + 100$_h$ – BA + 01FC$_h$

| Bit 31 | Bit 30 | Bit 29 | Bit 28 | Bit 27 | Bit 26 | Bit 25 | Bit 24 |
|---|---|---|---|---|---|---|---|
| T.B.D | T.B.D | T.B.D | T.B.D | T.B.D | T.B.D | T.B.D | T.B.D |
| Bit 23 | Bit 22 | Bit 21 | Bit 20 | Bit 19 | Bit 18 | Bit 17 | Bit 16 |
| T.B.D | T.B.D | T.B.D | T.B.D | T.B.D | T.B.D | T.B.D | T.B.D |

6. Xilinx Programs

This section briefly lists the various Xilinx code required for the various operating modes of the 4800 video subsystem. The Xilinx's are divided into three classes:

The Base Class is required at all times, regardless of acquisition or display format The Acquisition Class contains those files which affect the acquisition timing and will most likely be application dependent.

The Display Class contains those files which affect the display timing and will most likely be application dependent.

In all cases a portion of the ".C" file name contains a "ROUTEnn" field. Since most Xilinx designs require multiple routes, this number just represents the number of the route that completed 100% and met the timing requirements.

6.1 Base Class Xilinx Code

This class is comprised of three (3) designs.

1. Acquisition Packet Timing Controller filename=XPKTCNTL_ROUTEnn.C
2. Acquisition and Host Bus Address Generator filename= XAHADDRGEN_ROUTEnn.C
3. Display Address Generator filename=XDADDRGEN_ROUTEnn.C 6.2 Acquisition Class Xilinx Code The acquisition class is broken into two sub-classes. Files that support rapid reset contain an "_RR_" field and only operate in Genlock mode (i.e. the 4800 drives the camera with HDRIVE and VDRIVE). Files that support both Genlock and PLL (phase lock loop) modes but NOT rapid reset have a "_PLL_" field.

1. RS-170 (60 HZ 2:1, interlaced) timing filename= XACQ_RS170_RR_ROUTEnn.C    filename= XACQ_RS170_PLL_ROUTEnn.C 2. CCIR (50 HZ, 2:1 interlaced) timing filename= XACQ_CCIR_RR_ROUTEnn.C filename=XACQ_CCIR_PLL_ROUTEnn.C
3. Other acquisition timing modes may be developed as required 6.3 Display Class Xilinx Code Four different display formats are presently supported. This timing generator is also optional and is not required for basic video operations.

1. RS-170 (60 HZ 2:1, interlaced) timing filename= XDPLY_RS170_ROUTEnn.C
2. CCIR (50 HZ, 2:1 interlaced) timing filename=XDPLY_CCIR_ROUTEnn.C
3. VGA (60 HZ, non-interlaced) timing filename=XDPLY_VGA_ROUTEnn.C
4. SVGA (60 HZ, non-interlaced) timing filename=XDPLY_SVGA_ROUTEnn.C A further understanding of the invention may be obtained by reference to the appendix filed herewith.

In accordance with the above description, the invention attains the objects set forth.

It is further intended that all matter and the description and drawings be interpreted as illustrative and not in a limiting sense. That is, while various embodiments of the invention have been described in detail, other alterations which will be apparent to those skilled in the art are intended to be embraced within the spirit and scope of the invention.

IN THE UNITED STATES PATENT AND TRADEMARK OFFICE

APPENDIX TO

United States Patent Application for

METHODS AND APPARATUS FOR
VIDEO ACQUISITION

Inventors:
DAVID R. KING
ROBERT WOLFF

Cognex 4800 Video (VM17B)
Engineering Specification
Revision A
Part Number 9012-0039

*Cognex 4800 Video (VM17B)*

COGNEX CONFIDENTIAL

This document contains information proprietary to Cognex Corporation, Needham, MA. The information is not to be used in any way, disclosed to others, or reproduced in whole or in part, except as expressly authorized by Cognex. Any reproduction of this document must include this notice.

*Engineering Specification*

*Revision A*

Author: David R. King

The software described in this document is furnished under license and may be used or copied only in accordance with the terms of such license and with the inclusion of the copyright notice shown on this page. Neither the software, this document, nor any copies thereof may be provided to or otherwise made available to anyone other than the licensee. Title to and ownership of this software remains with Cognex Corporation or its licensor.

Cognex Corporation assumes no responsibility for the use or reliability of its software on equipment that is not supplied by Cognex Corporation. Cognex Corporation makes no warranties, either express or implied, regarding the described software, its merchantability or its fitness for any particular purpose.

The information in this document is subject to change without notice and should not be construed as a commitment by Cognex Corporation. Cognex Corporation is not responsible for any errors that may be present in either this document or the associated software.

<div style="text-align:center;">

Copyright©1991
Cognex Corporation
All Rights Reserved
Printed in U.S.A.

</div>

This document may not be copied in whole or in part, nor transferred to any other media or language without the written permission of Cognex Corporation.

The following are trademarks of Cognex Corporation:

| | | |
|---|---|---|
| COGNEX logo | COGNEX 1500 | COGNEX 2000 |
| COGNEX 3000 | COGNEX 4000 | On-Sight |

*The following are registered trademarks of Cognex Corporation:*

| | | |
|---|---|---|
| DataMan | CHECKPOINT | COGNEX, Vision for Industry |

*The following are trademarks or registered trademarks of the associated company:*

UNIX: AT&T
Epsilon, Lugaru: Lugaru Software, Ltd.
Mcrotec: Microtec Research, Inc.
MS-DOS: Microsoft Corp.
IBM: International Business Machines Corp.
Sun, Sun-2, Sun-3, Sun-4, Sun Workstation: Sun Microsystems, Inc.
NuBus: Texas Instruments
MacTrac, MicroSpeed: MicroSpeed, Inc.
Apple, Macintosh, Apple Desktop Bus: Apple Computer, Inc.
VMEbus, Motorola, MC68000, MC 68020, MC68030,MC68881,MC68882: Motorola, Inc.
DEC: Digital Equipment Corportation

*Cognex Corporation serves its customers from the following locations:*

| *Eastern U.S:* | *Western U.S:* |
|---|---|
| 15 Crawford Street | 883 North Shoreline Boulevard, |
| Needham, Massachusetts 02194 | Suite C-100 |
| Phone: 617-449-6030 | Mountain View, CA 94041 |
| Telex: 948022 | Phone: 415-969-4182 |
| Fax: 617-449-4013 | Fax: 415-969-4818 |
| | |
| *Europe:* | *Japan:* |
| Dingolfinger Straße2 | Towa Komagome Building 6F |
| D-8000 München 80 | 5-4-7 Honkomagome, Bunkyo-ku |
| West Germany | Tokyo 113, Japan |
| Phone: 011-49-89-4050-95 | Phone: 011-81-3-5395-4791 |
| Fax: 011-49-89-4056-16 | Fax: 011-81-3-5395-4695 |

Cognex 4800 Video (VM17B) — Table of Contents

1. Scope .................................................................................................................................. 1
2. Architecture ........................................................................................................................ 2
3. Features .............................................................................................................................. 4
   3.1 Video Memory .............................................................................................................. 4
   3.2 Video Acquisition ......................................................................................................... 6
   3.3 Video Display ............................................................................................................. 11
   3.4 Host Bus Interface ..................................................................................................... 12
   3.5 Video Option Modules ............................................................................................... 14
4. Physical Description ....................................................................................................... 17
   4.1 Base Board ................................................................................................................. 17
       4.1.1 Camera Interface ................................................................................................ 17
       4.1.2 Display Interface ................................................................................................ 18
   4.2 Video Option Modules ............................................................................................... 18
5. Software Reference ......................................................................................................... 21
   5.1 Host Bus Interface ..................................................................................................... 21
       5.1.1 Host Bus Addressing .......................................................................................... 21
       5.1.2 Host Bus Transfer Types ................................................................................... 22
       5.1.3 Host Bus Performance ....................................................................................... 23
   5.2 Programming Models ................................................................................................ 25
       5.2.1 ADMEM ................................................................................................................ 25
       5.2.2 AEMEM ................................................................................................................ 27
       5.2.3 Image Acquisition ............................................................................................... 29
           5.2.3.1 Acquisition Resources ................................................................................ 29
           5.2.3.2 Acquisition Address Generator .................................................................. 31
               5.2.3.2.1 Image Acquisition Using ADMEM ...................................................... 33
               5.2.3.2.2 Image Acquisition Using AEMEM ...................................................... 34
               5.2.3.2.3 Creating Circular Buffers Within ADMEM Or AEMEM .................... 36
           5.2.3.3 Acquisition Timing Generator .................................................................... 36
       5.2.4 Image Display ..................................................................................................... 38
           5.2.4.1 Display Resources ...................................................................................... 38
           5.2.4.2 Display Address Generator ........................................................................ 40
               5.2.4.2.1 Image Display Using ADMEM ............................................................ 40
               5.2.4.2.2 Image Display Using AEMEM ............................................................ 41
           5.2.4.3 Display Timing Generator .......................................................................... 41
       5.2.5 ADMEM Row Address Table (RAT) ................................................................... 42
   5.3 Video Module Configuration Register Map ............................................................. 45
   5.4 Register Description .................................................................................................. 47
       5.4.1 Identification & Revision (HBVA = BA + 000h, RO) ......................................... 47
       5.4.2 Acquisition Packet Packing Control (HBVA = BA + 004h, RW) ..................... 47
       5.4.3 Acquisition CH0 Source Select (HBVA = BA + 008h, RW) .............................. 48
       5.4.4 Acquisition Error (HBVA = BA + 00Ch, RW) ..................................................... 49
       5.4.5 Diagnostic (HBVA = BA + 010h, RW) ................................................................ 50
       5.4.6 Display Control (HBVA = BA +014h, RW) ........................................................ 50

Cognex 4800 Video (VM17B)        *Table of Contents*

| | |
|---|---|
| 5.4.7 Display Start Address (HBVA = BA +018h, RW) | 51 |
| 5.4.8 Acquisition Address Generator Control (HBVA = BA + 01Ch, RW) | 51 |
| 5.4.9 CH0 Start Address Even Low (HBVA = BA + 020h, RW) | 52 |
| 5.4.10 CH1 Start Address Even Low (HBVA = 000024h, RW) | 53 |
| 5.4.11 CH2 Start Address Even Low (HBVA = BA +028h, RW) | 53 |
| 5.4.12 CH3 Start Address Even Low (HBVA = BA + 02Ch, RW) | 53 |
| 5.4.13 CH0 Start Address Even High (HBVA = BA + 030h, RW) | 54 |
| 5.4.14 CH1 Start Address Even High (HBVA = BA + 034h, RW) | 54 |
| 5.4.15 CH2 Start Address Even High (HBVA = BA + 038h, RW) | 55 |
| 5.4.16 CH3 Start Address Even High (HBVA = BA + 03Ch, RW) | 55 |
| 5.4.17 CH0 Start Address Odd Low (HBVA = BA + 040h, RW) | 55 |
| 5.4.18 CH1 Start Address Odd Low (HBVA = BA + 044h, RW) | 56 |
| 5.4.19 CH2 Start Address Odd Low (HBVA = BA + 048h, RW) | 56 |
| 5.4.20 CH3 Start Address Odd Low (HBVA = BA + 04Ch, RW) | 57 |
| 5.4.21 CH0 Start Address Odd High (HBVA = BA + 050h, RW) | 57 |
| 5.4.22 CH1 Start Address Odd High (HBVA = BA + 054h, RW) | 57 |
| 5.4.23 CH2 Start Address Odd High (HBVA = BA + 058h, RW) | 58 |
| 5.4.24 CH3 Start Address Odd High (HBVA = BA + 05Ch, RW) | 58 |
| 5.4.25 CH0 Line Index (HBVA = BA + 060h, RW) | 59 |
| 5.4.26 CH1 Line Index (HBVA = BA + 064h, RW) | 59 |
| 5.4.27 CH2 Line Index (HBVA = BA + 068h, RW) | 59 |
| 5.4.28 CH3 Line Index (HBVA = BA + 06Ch, RW) | 60 |
| 5.4.29 RAMDAC Overlay Write Address (HBVA = BA + 070h, RW) | 60 |
| 5.4.30 RAMDAC Overlay Data Port (HBVA = BA + 074h, RW) | 61 |
| 5.4.31 RAMDAC Command (HBVA = BA 078h, RW) | 61 |
| 5.4.32 RAMDAC Overlay Read Address (HBVA = BA + 07Ch, RW) | 63 |
| 5.4.33 RAMDAC RAM Write Address (HBVA = BA + 080h, RW) | 63 |
| 5.4.34 RAMDAC RAM Data Port (HBVA = BA + 084h, RW) | 64 |
| 5.4.35 RAMDAC Pixel Mask (HBVA = BA + 088h, RW) | 65 |
| 5.4.36 RAMDAC RAM Read Address (HBVA = BA + 08Ch, RW) | 65 |
| 5.4.37 Data Path and Overlay Control (HBVA = BA + 090h, RW) | 66 |
| 5.4.38 Acquisition and Display Clock Frequency Select (HBVA = BA + 094h, WO) | 66 |
| 5.4.39 Interrupt Enable Mask (HBVA = BA + 098h, RW) | 67 |
| 5.4.40 Interrupt Status (HBVA = BA + 09Ch, RW) | 68 |
| 5.4.41 Digitizer Write and Read Address (HBVA = BA + 0A0h, RW) | 68 |
| 5.4.42 Digitizer RAM Data Port (HBVA = BA + 0A4h, RW) | 69 |
| 5.4.43 Digitizer Reference and Command Data Port (HBVA = BA + 0A8h, RW) | 70 |
| 5.4.44 D.C. Restore Position (HBVA = BA + 0ACh, RW) | 72 |
| 5.4.45 Acquisition Timing Control (HBVA = BA + 0B0h, RW) | 73 |
| 5.4.46 Acquisition On/Off Control (HBVA = BA + 0B4h, RW) | 74 |
| 5.4.47 Acquisition Camera Control (HBVA = BA + 0B8h, RW) | 75 |
| 5.4.48 Rapid Restart Position (HBVA = BA + 0BCh, RW) | 77 |
| 5.4.49 Line Interrupt Position (HBVA = BA + 0C0h, RW) | 77 |
| 5.4.50 Horizontal Frequency Adjustment (HBVA = BA + 0C4h, RW) | 78 |

*Cognex 4800 Video (VM17B)*            *Table of Contents*

5.4.51 Acquisition Line Number (HBVA = BA + 0C8h, RO) .......................................... 78
    5.4.52 Display Control (HBVA = BA + 0CCh, RW) ....................................................... 79
    5.4.53 Real-Time Display Data Path Control (HBVA = BA + 0D0h, RW) ....................... 80
    5.4.54 Display Line Number (HBVA = BA + 0D4h, RO) ................................................ 81
    5.4.55 Xilinx Configuration Control and Status (HBVA = BA + 0D8h, RW) ................... 82
    5.4.56 PKTCNTL Xilinx Data Port (HBVA = BA + 0DCh, WO) ...................................... 83
    5.4.57 AHADDRGEN Xilinx Data Port (HBVA = BA + 0E0h, WO) ................................ 83
    5.4.58 DADDRGEN Xilinx Data Port (HBVA = BA + 0E4h, WO) ................................... 83
    5.4.59 ACQTIMING Xilinx Data Port (HBVA = BA + 0E8h, WO) ................................... 84
    5.4.60 DPLYTIMING Xilinx Data Port (HBVA = BA + 0ECh, WO) ................................. 84
    5.4.61 VOM Identification & Revision (HBVA = BA + 100h, RO) ................................... 84
    5.4.62 VOM Specific (HBVA = BA + 104h - BA + 01FCh, RW) ..................................... 85

6. Xilinx Programs ............................................................................................................. 86
  6.1 Base Class Xilinx Code ................................................................................................ 86
  6.2 Acquisition Class Xilinx Code ...................................................................................... 86
  6.3 Display Class Xilinx Code ............................................................................................ 87

*Cognex 4800 Video (VM17B)*  *List of Figures*

Figure 1: Acquisition and Display Top Level Block Diagram ....................................................... 3
Figure 2: Acquisition and Display Memory (ADMEM) Software Model ...................................... 26
Figure 3: Acquisition Expansion Memory (AEMEM) Software Model ......................................... 28
Figure 4: Acquisition Video Resource Model............................................................................... 30
Figure 5: Memory Address Generator Model .............................................................................. 32
Figure 6: Examples Of ADMEM Image Buffers........................................................................... 34
Figure 7: Examples Of AEMEM Image Buffers........................................................................... 35
Figure 8: Acquisition Timing Generator Model............................................................................ 37
Figure 9: Display Resource Software Model............................................................................... 39
Figure 10: Display Timing Generator Software Model................................................................ 42
Figure 11: ADMEM RAT Buffer Allocation................................................................................... 43
Figure 12: Baseboard Identification and Revision Register ....................................................... 47
Figure 13: Acquisition Packing Control Register ........................................................................ 48
Figure 14: Big-Endian Pixel Packing........................................................................................... 48
Figure 15: Little-Endian Pixel Packing ........................................................................................ 48
Figure 16: Acquisition CH0 Source Select Register ................................................................... 49
Figure 17: Acquisition Error Register........................................................................................... 49
Figure 18: Diagnostic Register .................................................................................................... 50
Figure 19: Display Control Register............................................................................................. 50
Figure 20: Display Start Address Register.................................................................................. 51
Figure 21: Acquisition Address Control Register........................................................................ 51
Figure 22: Acquisition Channel 0 Memory Start Address Register (Even/Low) ........................ 52
Figure 23: Acquisition Channel 1 Memory Start Address Register (Even/Low) ........................ 53
Figure 24: Acquisition Channel 2 Memory Start Address Register (Even/Low) ........................ 53
Figure 25: Acquisition Channel 3 Memory Start Address Register (Even/Low) ........................ 54
Figure 26: Acquisition Channel 0 Memory Start Address Register (Even/High) ....................... 54
Figure 27: Acquisition Channel 1 Memory Start Address Register (Even/High) ....................... 54
Figure 28: Acquisition Channel 2 Memory Start Address Register (Even/High) ....................... 55
Figure 29: Acquisition Channel 3 Memory Start Address Register (Even/High) ....................... 55
Figure 30: Acquisition Channel 0 Memory Start Address Register (Odd/Low).......................... 56
Figure 31: Acquisition Channel 1 Memory Start Address Register (Odd/Low).......................... 56
Figure 32: Acquisition Channel 2 Memory Start Address Register (Odd/Low).......................... 56
Figure 33: Acquisition Channel 3 Memory Start Address Register (Odd/Low).......................... 57
Figure 34: Acquisition Channel 0 Memory Start Address Register (Odd/High)......................... 57
Figure 35: Acquisition Channel 1 Memory Start Address Register (Odd/High)......................... 58
Figure 36: Acquisition Channel 2 Memory Start Address Register (Odd/High)......................... 58

Cognex 4800 Video (VM17B)  *List of Figures*

Figure 37: Acquisition Channel 3 Memory Start Address Register (Odd/High) .......................... 58
Figure 38: Acquisition Channel 0 Line Index Register............................................................. 59
Figure 39: Acquisition Channel 1 Line Index Register............................................................. 59
Figure 40: Acquisition Channel 2 Line Index Register............................................................. 59
Figure 41: Acquisition Channel 3 Line Index Register............................................................. 60
Figure 42: RAMDAC Overlay Write Address Register ............................................................. 60
Figure 43: RAMDAC Overlay Data Port.................................................................................. 61
Figure 44: RAMDAC Command Register ............................................................................... 62
Figure 45: RAMDAC Overlay Read Address Register............................................................. 63
Figure 46: RAMDAC Color Palette RAM Write Address Register............................................. 64
Figure 47: RAMDAC Color Palette RAM Data Port.................................................................. 64
Figure 48: RAMDAC Color Palette Pixel Mask Register .......................................................... 65
Figure 49: RAMDAC Color Palette RAM Read Address Register............................................. 65
Figure 50: Display Data Path and Overlay Control Register..................................................... 66
Figure 51: Acquisition and Display Clock Frequency Select Register ...................................... 67
Figure 52: Interrupt Enable Mask Register ............................................................................. 68
Figure 53: Interrupt Status Register........................................................................................ 68
Figure 54: Digitizer Read and Write Address Register............................................................. 69
Figure 55: Digitizer RAM Data Port......................................................................................... 69
Figure 56: Digitizer REF and Command Data Port .................................................................. 70
Figure 57: D.C. Restore Position Register .............................................................................. 72
Figure 58: Acquisition Timing Control Register ....................................................................... 73
Figure 59: Acquisition On/Off Control Register........................................................................ 74
Figure 60: Acquisition Control Register................................................................................... 75
Figure 61: Rapid Restart Position Register ............................................................................. 77
Figure 62: Line Interrupt Position Register.............................................................................. 78
Figure 63: Horizontal Frequency Adjustment Register ............................................................ 78
Figure 64: Acquisition Line Number Register.......................................................................... 78
Figure 65: Display Control Register........................................................................................ 79
Figure 66: Real-Time Display Data Path Control Register....................................................... 80
Figure 67: Display Line Number Register............................................................................... 81
Figure 68: Xilinx Configuration Control and Status ................................................................. 82
Figure 69: PKTCNTL Xilinx Data Port..................................................................................... 83
Figure 70: AHADDRGEN Xilinx Data Port.............................................................................. 83
Figure 71: DADDRGEN Xilinx Data Port ................................................................................ 83
Figure 72: ACQTIMING Xilinx Data Port ................................................................................ 84

*Cognex 4800 Video (VM17B)*            *List of Figures*

Figure 73: DPLYTIMING Xilinx Data Port .................................................................................. 84
Figure 74: VOM Identification and Revision Register .............................................................. 85
Figure 75: VOM Register........................................................................................................... 85

*Cognex 4800 Video (VM17A)*  *List of Tables*

Table 1: Effective Pixel Rates For Typical Video Formats............................................................. 8
Table 2: Pin Definition For Camera Connectors (J4 and J5) ....................................................... 17
Table 3: Pin Definition For Display Connector (J6) ................................................................... 18
Table 4: Pin Definition For VOM Interface Connectors .............................................................. 18
Table 5: Host Bus Address Allocation ....................................................................................... 21
Table 6: Video Board Address Allocation .................................................................................. 22
Table 7: Host Bus Transfer Size Bits ......................................................................................... 22
Table 8: Host Bus Transfer Modes ............................................................................................ 23
Table 9: ADMEM and AEMEM Host Bus Transfer Rates ............................................................ 24
Table 10: Host Bus ADMEM Address Mapping ......................................................................... 27
Table 11: Host Bus AEMEM Address Mapping .......................................................................... 27
Table 12: Start Of Packet Address Calculation .......................................................................... 31
Table 13: ADMEM Acquisition Address Parameter Programming .............................................. 33
Table 14: ADMEM Acquisition Address Mapping ...................................................................... 34
Table 15: AEMEM Acquisition Address Parameter Programming .............................................. 35
Table 16: AEMEM Acquisition Address Mapping ...................................................................... 35
Table 17: ADMEM Display Address Mapping ........................................................................... 41
Table 18: Detailed Host Bus ADMEM Address Mapping ........................................................... 42
Table 19: ADMEM Row Address Table (RAT) ........................................................................... 44
Table 20: Video Configuration Register Map ............................................................................. 45
Table 21: Pixel Packing Control (CH3DIR, CH2DIR, CH1DIR, and CH0DIR) ............................. 48
Table 22: Acquisition Channel 0 Video Timing Source Select (CH0SEL) .................................... 49
Table 23: Acquisition Channel 0 Video Timing Source Select (CH0SEL) .................................... 49
Table 24: Display Interlace Mode and Resolution Select (DNI, DHRES) .................................... 51
Table 25: Acquisition Address Scan Mode Control (CHnLS, CHnPS) ........................................ 52
Table 26: RAMDAC OWA(3:0) Bits ........................................................................................... 61
Table 27: RAMDAC RES Bit ...................................................................................................... 62
Table 28: RAMDAC BLNPED Bit ............................................................................................... 62
Table 29: RAMDAC CLRM(1:0) Bits .......................................................................................... 62
Table 30: RAMDAC ORA(3:0) Bits ............................................................................................. 63
Table 31: RAMDAC RWA(7:0) Bits ............................................................................................ 64
Table 32: RAMDAC RRA(7:0) Bits ............................................................................................. 65
Table 33: BASEACQCLK and DPLYCLK Oscillator Frequencies ................................................ 67
Table 34: Digitizer DRWA(7:0) Bits ............................................................................................ 69
Table 35: Digitizer Command Register ...................................................................................... 70
Table 36: Digitizer Reference Max Register .............................................................................. 71

*Cognex 4800 Video (VM17A)*  *List of Tables*

Table 37: Digitizer Reference Min Register ............................................................................. 72
Table 38: Acquisition EXTCLK and PLLON Bits ...................................................................... 73
Table 39: Acquisition AHRES and AWIDE Bits........................................................................ 74
Table 40: Acquisition External SYNC source Control Bit............................................................ 74
Table 41: Shutter Enable, Level, and Field Control Bits ............................................................ 76
Table 42: Line Interrupt Field Control Bits ............................................................................... 77
Table 43: Example of Acquisition AFIELD and AVCNT Bits For RS-170................................... 79
Table 44: LPBACK, RTRED, and RTRSEL Data Path Control Bits............................................ 80
Table 45: Example of Display DFIELD and DVCNT Bits For RS-170........................................ 82

*Cognex 4800 Video (VM17B)*     *Engineering Specification*

1. Scope

This specification will discuss the video acquisition and display capabilities of the 4800. The 4800 is intended to support a superset of the 4400 video capabilities. In some cases this requires an additional Video Option Module (VOM). Some examples would include:

- The 4400 supports simultaneous acquisition of 4 channels. The 4800 base board supports only a single acquisition channel. Additional RS-170 or CCIR (normal or wide) or full color capabilities require a multi-channel VOM.

- The 4400 digital video connector can be used for taking input from a Megaplus camera. A very simple passive VOM could be used to connect a Megaplus to the 4800.

- The 4400 digital video connector can also be used to connect to the LSO-1000. We could design a fairly simple LSO1 VOM that would allow the 4800 to connect to the LSO-1000. It would consist single FIFO plus some simple control logic. The maximum image size would be limited by the LSO-1000 to 4096 pixels by 4096 lines. Typically, it would be paired with an AEMEM of 4 MBytes or more. While it would also be possible to do software assisted acquires with this setup, the 4800 architecture is intended to eliminate this mode of operation.

- In the long term, line scan capabilities will be integrated into the 4800 family via an LSO2 VOM. This module will provide a superset of the LSO-1000 capabilities.

NOTE

*Note: We are not currently committed to any VOM design. The initial 4800 application on turret mounters will not require a VOM. Follow-on applications will require some kind of line scan VOM.*

*Cognex 4800 Video (VM17B)*  *Engineering Specification*

2. Architecture

Since 4800 based vision systems are intended to address a broad scope of OEM (i.e SMD) and end-user (i.e. Checkpoint) applications, the video acquisition and display capabilities must extend beyond those currently available on existing Cognex products. The list of desirable new features includes:

- Support for multiple acquisition formats within a single system (e.g. non-standard and either RS-170 or CCIR).

- Support for independent acquisition and display time bases.

- Support for "rapid reset" of acquisition timing.

- Simultaneous acquisition into and display from different areas of memory regardless of acquisition and display formats.

- Support for non-destructive graphics overlays.

- Full color display support for "wide" formats (640 pixels by 480 lines and 768 pixels by 512 lines).

- Optional non-standard image acquisition (line scan, large format and fast frame area scan).

- Optional full color image acquisition with color space conversion.

- Optional non-interlaced display support (VGA and SVGA).

- Support for monochrome and full color real-time display with graphic overlays

Figure 1 contains a top level block diagram of the acquisition and display module. It is comprised of eleven (11) basic functional blocks plus three (3) optional elements. The basic functions include the Host Bus interface for communicating with the host processor; an acquisition RS-170/CCIR timing generator coupled with a basic 1 of 4 RS-170/CCIR acquisition channel; the video packetizing control and timing which supports a maximum of four (4) active video channels; host and video pixel buffers which are necessary to support burst mode read and write cycles to and from ADMEM and AEMEM; the memory timing generator processes all requests for access to ADMEM and AEMEM and also controls the VRAM serial ports; the memory address generator calculates the required video addresses and maps ADMEM and AEMEM into their respective Host Bus address spaces; the cross point switch allows each of the red, green, blue, and overlay inputs into the RAMDAC to be sourced from any bank of ADMEM.

The optional elements include a separate display timing generator to support either a second RS-170/CCIR timebase or VGA or SVGA and a video option module (VOM). The use of various option modules allows the video acquisition capabilities of the 4800 to be customized for a particular application. The second RS-170/CCIR timing generator allows a stable display timebase to be maintained even if the acquisition timing is being interrupted (i.e. using rapid reset for low latency image acquisitions). This timing generator can also be used to support either VGA or SVGA non-interlaced display formats. These extend the display capabilities beyond those currently available with any Cognex VMEBus product.

Revision A  Modified 3/23/94

Cognex 4800 Video (VM17B)            *Engineering Specification*
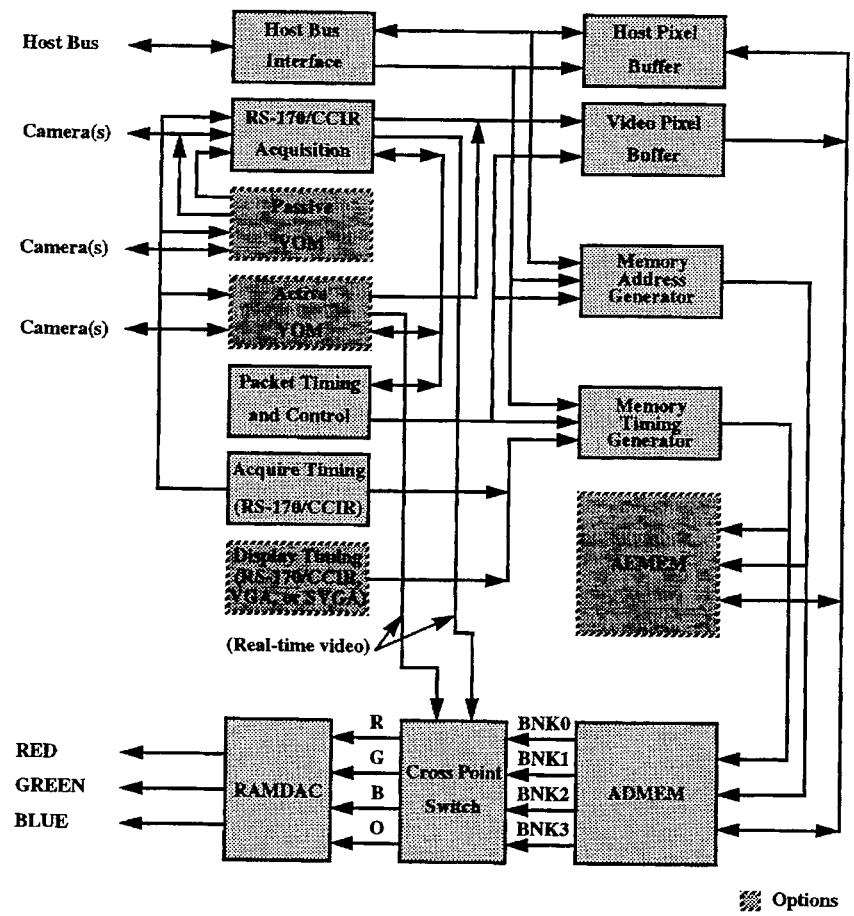
*Figure 1: Acquisition and Display Top Level Block Diagram*

*Cognex 4800 Video (VM17B)*     *Engineering Specification*

3. Features

This section will summarize the basic features of each major element of the 4800 video acquisition and display sub-system.

3.1 Video Memory

ADMEM is used to acquire and display images using the same or different video timing. It supports multiple formats which allow standard or large format images to be captured and displayed. Images residing in ADMEM can be accessed by the host processor using either normal or burst mode Host Bus cycles. Burst mode read cycles facilitate high-speed data transfers during image analysis.

AEMEM allows images of any arbitrary format to be acquired. Images residing in this memory can be accessed by the host processor using normal or burst mode Host Bus cycles. Burst mode read cycles facilitate high-speed data transfers during image analysis. In order to view an image (or part of an image) which is stored in AEMEM, it must first be copied into ADMEM under host processor control. The performance of this image copying operation can be optimized by performing burst mode read cycles from AEMEM followed by burst mode write cycles to ADMEM.

As illustrated in the top level block diagram, ADMEM and AEMEM share all memory resources. These include acquisition and host address and timing; video data; and host data. This means that access to ADMEM or AEMEM cycles must be shared between the host processor, video acquisition, refresh, and video refresh read transfers.

- ADMEM

Up to 2.0 MBytes of VRAM.

32 bit (4 pixel) long word data structure compatible with Motorola big-endian format.

Organized as four (4) 1024 pixel by 512 line banks. Each bank is capable of storing 512 KBytes and requires four (4) 128 KByte x 8 bit VRAMs.

While the design allows 1, 2, 3, or 4 banks to be populated, a reasonable alternative would be to support either 2 banks (1.0 MByte) or 4 banks (2.0 MBytes).

Time multiplexed multiple port operation allows host read and write cycles to be interleaved with video acquisition write, memory refresh, and read transfer cycles.

VRAM serial ports are used to support continuous display refresh regardless of acquisition format or status.

Supports both normal and burst mode Host Bus read and write cycles.

Supports acquisition of multiple image formats:

Revision A     Modified 3/23/94

Cognex 4800 Video (VM17B)　　　　Engineering Specification

RS-170 and CCIR Narrow 1.0 MByte configuration allows up to four (4) images to be stored. However, the memory organization allows only two of these images to be accessed at any time for display purposes. This limits the supportable display options to monochrome or pseudo-color plus a non-destructive graphic overlay using RS-170, CCIR, or VGA timing. A special 512 pixel by 480 line VGA display mode will be implemented by extending the horizontal blank by 64 pixels at the start and end of each active scan line.

2.0 MByte configuration allows up to eight (8) images to be stored. A maximum of four images are now simultaneously accessible for display. This configuration supports monochrome, pseudo-color, or full color display with non-destructive graphic overlays using RS-170, CCIR, or VGA timing. A special 512 pixel by 480 line VGA display mode will be implemented by extending the horizontal blank by 64 pixels at the start and end of each active scan line.

RS-170 Wide and CCIR Wide 1.0 MByte configuration allows two (2) images to be stored. Display options include monochrome or pseudo-color plus a non-destructive graphic overlay using RS-170, CCIR, or VGA timing.

2.0 MByte configuration allows up to four (4) images to be stored. Display options include monochrome, pseudo-color, or full color with non-destructive graphic overlays using RS-170, CCIR, or VGA timing.

Half Resolution RS-170 and CCIR (Narrow or Wide)

1.0 MByte configuration allows up to sixteen (16) images to be stored. However, the memory organization allows only two of these images to be accessed at any time for display purposes. This limits the supportable display options to monochrome or pseudo-color plus a non-destructive graphic overlay using RS-170 or CCIR timing.

2.0 MByte configuration allows up to thirty-two (32) images to be stored. This configuration supports monochrome, pseudo-color, or full color display with non-destructive graphic overlays using RS-170 or CCIR timing

NOTE

*When displaying half resolution images, the contents of the graphic overlay will also be pixel and field replicated. This must be taken into account when using overlays in conjunction with a half resolution display.*

NOTE

*While it is theoretically possible to utilize either VGA or SVGA timing to display half resolution images, the applications which usually work with this reduced resolution do not necessarily require a flicker-free non-interlaced display format.*

Part Number 9012-0039　　　　Cognex Confidential

*Cognex 4800 Video (VM17B)*     *Engineering Specification*

<u>Large Format</u>

1.0 MByte configuration allows a single (1) large format image of up to 1024 pixels by 1024 lines to be stored. Supports monochrome and pseudo-color display using either RS-170, RS-170 Wide, CCIR, CCIR Wide, VGA, or SVGA timing. No overlays are supported.

2.0 MByte configuration allows a maximum of two (2) large format images of up to 1024 pixels by 1024 lines to be stored. Supports monochrome and pseudo-color display using either RS-170, RS-170 Wide, CCIR, CCIR Wide, VGA, or SVGA timing. If overlays are required then only a single image can be stored.

- AEMEM (Optional)

4.0, 8.0, or 16.0 MBytes of DRAM 32 bit (4 pixel) long word data structure compatible with Motorola big-endian format.

Implemented using a single 1M, 2M, or 4M by 32 bit (4 byte) SIMM.

1.0 MByte SIMM yields the 4.0 MByte configuration.

2.0 MByte SIMM yields the 8.0 MByte configuration.

4.0 MByte SIMM yields the 16.0 MByte configuration.

Time multiplexed multiple port operation allows host read and write cycles to be interleaved with video acquisition write, and memory refresh cycles.

Supports both normal and burst mode Host Bus read and write cycles.

Image buffer configuration is defined by software and allows dense packing of images regardless of horizontal and vertical resolution.

3.2 Video Acquisition

In order to support multiple acquisition channels, incoming video streams are first assembled into video packets. A 4800 video packet is comprised of 32 pixels. Video packets are then transferred to the Video Pixel Buffer using a 40.0 MHz clock. The time required to transfer a packet is 800 nanoseconds (ns). Once a complete packet has been placed in the pixel buffer, the Packet Timing and Control logic issues a video micro interrupt to the Address Generator and a video burst write cycle request to the Timing Generator. Upon receipt of the video burst write cycle request, the Timing Generator will copy the packet from the Video Pixel Buffer into either ADMEM or AEMEM as soon as the current memory cycle if any) is complete. The duration of a video burst write memory cycle is 500 ns. Therefore, even with an aggregate video bandwidth of 40MHz, there will be a 300ns window between each successive video burst write cycle during which a refresh, video refresh read transfer, or Host Bus normal or burst mode memory cycle can be executed.

Cognex 4800 Video (VM17B)　　　　　　　*Engineering Specification*

Software has to manage a number of resources on the 4800 in order to perform an acquire. The various control registers for all the resources must be set up consistently. The available resources include:

1. Video source

The baseboard has a single A/D converter proceeded by a 4:1 analog multiplexer as a source of video data. There can be multiple sources associated with a VOM.

2. Timebase

The baseboard has a single acquisition timing generator associated with the video source. Pixels are written into a FIFO during the active video interval when acquisition is enabled. A simple VOM may use the baseboard timing, a more complex one would have its own timebase.

3. FIFO

All video data must go through a packetizing FIFO prior to being written into either AD-MEM or AEMEM. There is a single FIFO on the baseboard. A VOM may contain up to four (4) FIFOs.

4. Channel

The output of a FIFO must be assigned to a channel to actually acquire the data. These are specialized DMA channels that control where in memory the data is written. There are a total of four (4) channels available. Depending upon the aggregate video data rate, one (1) to four (4) channels may be active simultaneously.

Although there can be up to five (5) FIFOs available as data sources (assuming 4 on the VOM plus the one on the baseboard), the Packet Timing and Control logic only supports a maximum of four (4) simultaneous channels. The aggregate normalized video bandwidth can not exceed 40MHz. For any channel, the data being written into a FIFO from a video source is allowed to get ahead of the data being read out and written to memory, as long as the channel catches up by the end of the next horizontal blank interval. The normalized pixel clock rate can be determined by multiplying the number of active pixels per line times the line rate.

$$PCLK_{eff} = \text{Active Pixels} \times \text{Line Rate}$$

For example, an RS-170 video line is comprised of 512 active pixels and 266 blank pixels and has a clock rate of 12.2535 MHz (15.750 KHz line rate). The normalized pixel rate is 8.06 MHz (512 x 15.75 KHz), allowing up to 4 simultaneous acquisition DMA channels. Note that neither the vertical blanking time or the number of active vertical lines enter into the calculation. This is because the FIFOs are only large enough to hold a portion of a single video line. Table 1 illustrates the effective pixel clock rates for some typical acquisition formats.

Part Number 9012-0039　　　　　Cognex Confidential

*Cognex 4800 Video (VM17B)*                    *Engineering Specification*

| Format | Line Rate (KHz) | Pixel Rate (MHz) | Active Pixels/Line | Effective Pixel Rate (MHz) | Total Active Channels |
|---|---|---|---|---|---|
| RS-170 Narrow | 15.750 | 12.2535 | 512 | 8.06 | 4 |
| RS-170 Wide | 15.750 | 12.2535 | 640 | 10.08 | 3 |
| CCIR Narrow | 15.625 | 14.7384 | 512 | 7.99 | 4 |
| CCIR Wide | 15.625 | 14.7384 | 768 | 11.99 | 3 |
| YD2048 Line Scan | 4.762 | 10.0000 | 2000 | 9.52 | 4 |
| FT2048 Line Scan | 9.524 | 20.0000 | 2000 | 19.05 | 2 |

*Table 1: Effective Pixel Rates For Typical Video Formats*

However, this effective pixel rate computation is not necessarily enough. Even if the 4800 supports the average rate it must also never get so far behind as to overflow the FIFO or fail to empty the FIFO before the end of the next horizontal blank. Proper operation of each acquisition channel is guaranteed if:

The aggregate BURST rate < 40 MHz

-or-

The aggregate Burst rate > 40 MHz but the Effective rate < 40 MHz (See NOTE below)

Acquisition is impossible if:

The aggregate EFFECTIVE rate > 40 MHz.

NOTE

*High aggregate effective rate acquires coupled with long lines (e.g. line scan, MegaPlus) must be analyzed in more detail to determine whether operation is guaranteed under all circumstances.*

Since the Video Option Module can support a maximum of four (4) acquisition channels, the total number of channels, including the Base acquisition input, is five (5). The Packet

*Cognex 4800 Video (VM17B)*               *Engineering Specification* timing and Control logic supports a maximum of four (4) simultaneous channels so long as the aggregate normalized video bandwidth does not exceed 40MHz. The term "normalized" simply refers to the actual video pixel clock rate scaled by the number of active pixels per line divided by the total number of pixels per line. For example, an RS-170 video line is comprised of 512 active pixels and 266 blank pixels and has a clock rate of 12.25 MHz. Without normalization, the maximum number of concurrent acquisition channels would appear to be three (40.0/12.23 = 3.27). However, since the normalized pixel rate is only 8.06 MHz (12.25 x (512/778)), the maximum number of concurrent acquisition channels is actually 4.0 (40.0/8.06 = 4.96).

Determining which of the five (5) possible acquisition channels is currently in use is controlled by the mapping logic contained within the Packet Timing and Control. Simply put, the mapping logic allows any four of the five possible video sources to be active at any one time.

An important feature of the 4800 video acquisition is its' ability to support concurrent acquisitions of multiple video formats. This means that a standard RS-170 Wide acquisition could be overlapped with a line scan acquisition using an LSO style VOM. Although simple, this example highlights the power of this video acquisition architecture. In the extreme case, all four channels could be acquiring using different video formats and pixel clock rates.

The 4800 will support three acquisition timing modes; genlock, phase lock, and external. In genlock mode the 4800 derives the RS-170 or CCIR video timing using an internal crystal to provide the pixel clock. Horizontal and vertical drive signals (BASEHDRIVE_L and BASEVDRIVE_L) can be used to synchronize camera(s) connected to either the base video input and/or a VOM. Two time bases are supported, 60 Hz RS-170 and 50 Hz CCIR. Each will require that a unique program be loaded into the Xilinx based acquisition timing generator. However, switching between normal (512 pixels per line) or wide (640 or 768 pixels per line at 60 or 50 Hz respectively) will be software selectable. The 4800 will use a programmable oscillator to derive the various acquisition pixel clock frequencies.

In genlock mode, the 4800 will also support "rapid reset" of the acquisition timing generator and camera. This feature will allow cameras which support this feature to be coupled with the 4800 in situations where the latency from a "part in position" command or external trigger until the acquisition commences must be minimized. Upon receipt of a reset command, the acquisition timing generator will be reset to a user-definable vertical line number at the end of the current scan line. This method will maintain the stability of the horizontal timing while achieving a worst case latency of one line time from the assertion of the "rapid reset" reset command.

In phase lock mode, the timing generator is synchronized to the camera source using a phase-lock-loop. The input to the phase lock loop is a composite synchronization signal which is either stripped from the incoming analog video or taken as an external input. The 4800 will contain a single phase-lock loop (PLL) circuit which will be located on the baseboard. The composite synchronization signal required to bring the PLL into lock can be obtained from the base board video channel or from a VOM. Two time bases are supported, 60 Hz RS-170 and 50 Hz CCIR. Each will require that a unique program be loaded into the Xilinx based acquisition timing generator. However, switching between normal (512 pixels per line) or wide (640 or 768 pixels per line at 60 or 50 Hz respectively) will be selected via software. The pixel clock frequency will be derived from the voltage controlled oscillator (VCO) contained within the phase-lock-loop.

Part Number 9012-0039          Cognex Confidential

Cognex 4800 Video (VM17B) Engineering Specification

External timing mode requires that the camera provide horizontal and vertical drive. In this mode the camera can also provide a pixel clock or use the programmable oscillator to generate a pixel clock. A third acquisition timing generator Xilinx program will use the horizontal and vertical drive signals together with hardware area-of-interest techniques to determine the active video region. The external horizontal and vertical timing signals and the pixel clock (if supplied by the camera) can be taken from either a sensor attached to the base video connector or from a VOM. If the video signal level output by the camera is compatible with the analog to digital (A/D) converter used on the baseboard, then the camera can be attached directly to the base acquisition input connector. However, if the video signal level is too different, or if the camera outputs digital data, a "passive" VOM (discussed later) will be required.

The 4800 acquisition logic will support both full and half resolution formats. In half resolution mode the image will be comprised of every other pixel of whichever field (odd or even) is active after the acquire command is issued by the CPU.

The baseboard acquisition channel, referred to as BASE, contains a single video digitizer plus a 4:1 analog multiplexer. This channel can therefore acquire from one of four area scan cameras in any of the three timing modes in either full or half resolution. Support for area-scan cameras with non-standard video signal levels or digital video outputs can be achieved by adding a passive VOM.

In summary, the acquisition capabilities include:

- A maximum of four (4) acquisition channels so long as the aggregate normalized video rate does not exceed 40 MHz.

- Channel allocation is software controlled.

- Base video acquisition capability is a single channel sourced from a maximum of four (4) cameras.

- Normal and half resolution acquisition modes are supported. Half resolution images are defined to consist of only a single field (2:1 vertical sub-sampling) and every other pixel within a scan line (2:1 horizontal sub-sampling).

- Analog video is digitized to eight (8) bits (256 grey levels.

- Input look-up-table is provided for BASE video channel.

- Three timing modes are supported:

In genlock mode the 4800 is the master timing source to which all cameras must be slaved.

In phase lock mode the current camera (or an external composite synchronization waveform) is the master timing source to which the 4800 acquisition timing generator must be slaved. The pixel clock is derived via a VCO.

In external mode the camera directly controls the 4800 acquisition timing generator by providing horizontal and vertical drive signals. The pixel clock can come from either the camera or the internal programmable oscillator.

- "Rapid reset" of acquisition timing is supported when operating in genlock mode.

Revision A Modified 3/23/94

*Cognex 4800 Video (VM17B)*                       *Engineering Specification*

- Genlock mode horizontal and vertical drive signals can be used to synchronize camera(s) connected to the base video input and/or a VOM.

- Composite synchronization waveform required for phase lock mode can be obtained from the BASE video channel or a VOM.

- External mode horizontal and vertical drive signals together with an external pixel clock (if supplied by the camera) can be obtained from the BASE video camera connector or the VOM camera connector.

- Area-scan camera with either non-standard video signal levels or digital video can be supported using a passive VOM.

3.3 Video Display

Any images to be viewed must reside within ADMEM. For display purposes, ADMEM is viewed as being four banks of memory, with each bank being capable of providing a maximum of 1024 pixels and 512 lines. The actual resolution is determined by either the acquisition RS-170/CCIR or optional display (RS-170/CCIR, VGA, or SVGA) timing generator. A programmable oscillator will be used to derive the various display pixel clock frequencies. Each display resolution will require a different program to be loaded into the Xilinx based display timing generator.

The format (i.e monochrome/pseudo-color or full color) of the display together with the presence or absence of any graphic overlays is controlled via software, which determines the connectivity of the Cross Point Switch. The Cross Point Switch allows any bank of ADMEM to be connected to either the Red, Green, Blue, or OVR (overlay) inputs of the RAMDAC. The OVR bus is only a nibble wide. Since serial data sourced by ADMEM is byte wide, the upper nibble (bits 4 to 7) is not used. The graphics "blink" function can be supported by updating the RAMDACs look-up-tables during vertical blank (as is currently done on the 4400).

Since the maximum size of ADMEM is 2.0 MBytes, support for full color (i.e. 24 bit RGB) displays are limited to RS-170, RS-170 Wide, CCIR, CCIR Wide, and VGA. SVGA (800 pixels by 600 lines) can only be used to display monochrome, pseudo-color, or reduced resolution (e.g. 4-2-2 RGB) images. Since the generation of the reduced resolution RGB image in done using the CPU, any algorithm may be used. ADMEM based graphic overlays are supported for any of these modes.

As mentioned earlier, a special VGA mode will be created to allow standard (512 pixel per line) images to be viewed. This mode will extend the horizontal blanking interval by 64 pixels at the beginning and end of each line. This will "center" the 512 pixel line within the nominal VGA active horizontal region.

VGA or SVGA can be used to combine menu and status icons and/or text with images which were acquired using any horizontal and vertical resolution. This can be done by using a dedicated graphics overlay plane to switch between video and graphics, requiring the CPU to update a single buffer within ADMEM whenever the overlay needs to be updated.

When operating with either RS-170, CCIR or VGA timing, images acquired using half resolution will be properly displayed. Pixel and line replication will be used to "fill in" the missing

*Cognex 4800 Video (VM17B)*               *Engineering Specification* data in both the horizontal and vertical directions. This function will support both standard (512 pixels per line) or wide (640 pixels per line at 60 Hz or 768 pixels per line at 50 Hz) image formats. When displaying half resolution images, any data residing in a graphic overlay buffer will also be pixel and line replicated. This must be taken into account when using graphic overlays in conjunction with the display of half resolution images.

The 4800 also supports monochrome and full-color display of real time data. Real time data is displayed without first being written into ADMEM, bypassing the memory altogether. Real time display mode requires the display and acquisition timing to be synchronous and in systems which do not contain the optional display timing generator, this will always be the case. However, in those configurations where a display timing generator is available, a method of synchronizing the acquisition and display timing is required. This is accomplished by "turning off" the display timing generator via software. Once the display timing generator is off, the 4800 automatically derives the display timing using the acquisition timing generator, guaranteeing lock. The 4800 also allows graphic overlays contained within ADMEM to be merged with real time display data.

In summary, the display capabilities include:

- Supports display of full or half resolution images.

- RS-170 or RS-170 Wide monochrome, pseudo color, or full color (24 bit RGB) with independent graphic overlays.

- CCIR or CCIR Wide monochrome, pseudo color, or full color (24 bit RGB) with independent graphic overlays.

- VGA used to display RS-170 Wide monochrome, pseudo color, or full color (24 bit RGB) with independent graphic overlays.

- Reduced horizontal resolution VGA used to display RS-170 monochrome, pseudo color, or full color (24 bit RGB) with independent graphic overlays.

- SVGA used to display RS-170 or RS-170 Wide monochrome, pseudo color, or reduced resolution (i.e. 4-2-2 RGB) full color with independent graphic overlays used to implement text and graphics for menus and status. A single SVGA image requires two (2) banks of ADMEM (0:1 or 2:3).

- SUpports monochrome or full color real time display of video data

- Graphic overlays can be driven directly from ADMEM and merged with either real time or stored images.

- Display format is determined by the current program residing in the display timing generator Xilinx together with the pixel frequency selected using a programmable oscillator. If no optional timing generator is present, then the display format equals that currently selected for the acquisition timing (i.e either RS-170 or CCIR).

3.4 Host Bus Interface

The Host Bus Interface allows the video acquisition and display module to communicate with the host processor without requiring any VMEBus bandwidth. A maximum of four (4)

*Cognex 4800 Video (VM17B)*            *Engineering Specification* video modules can be resident on the Host Bus. This requires that each video board contain a two (2) position DIP switch which is used to map each video module into a distinct portion of the host bus video address space.

All configuration registers, even those residing on a Video Option Module, are programmed via the Host Bus using normal (i.e. single read or write) cycles. Burst read and write operations are not supported for configuration registers. This also includes any static RAM (SRAM) used to implement point transform look-up-tables. All look-up-tables will be accessed using an address pointer register plus a data port. The address pointer register will automatically increment after any read or write cycle.

ADMEM and AEMEM support both normal and burst mode read and write cycles. Supporting normal read cycles allows pixel data from ADMEM or AEMEM to be streamed by Cognex's proprietary vision co-processors; VC1 (and its' replacement VC3) and VC2. This feature will be useful in applications were image analysis must be overlapped with acquisition. Burst read and write cycles are useful when large quantities of data must be moved from either ADMEM or AEMEM into main (host processor) memory or when copying a new display image from either main memory or AEMEM into ADMEM. Burst mode write access to ADMEM is also useful when updating graphic overlay information.

As illustrated in the top level block diagram, ADMEM and AEMEM share all memory resources address, timing, and data resources. This means that ADMEM or AEMEM cycles must be shared between the host processor, video acquisition, refresh, and video refresh read transfers. The net effect is that the amount of memory bandwidth available for read or write operations by the host processor is very dependent upon the amount of video bandwidth necessary to service any concurrent active acquisition channels. This subject will be covered in greater detail in a later section.

At a minimum, the video module will interrupt the host processor at the beginning of every vertical blank time for the acquisition and display timing generators. Additional interrupts may be provided to support key base board or Video Option Module timing marks. An interrupt vector will be provided during a Host Bus interrupt acknowledge cycle. A read-only status register will provide additional information about the pending video interrtpt(s). All interrupts will be level sensitive and be of the release on register access (RORA) variety. The interrupt generator will properly handle interrupts from multiple sources to insure that no timing marks are missed.

In summary, the capabilities of the Host Bus Interface are:

- Configuration registers support only normal read or write Host Bus cycles.

- Look-up-tables are accessed using an address pointer register coupled with a bi-directional data port and support only normal Host Bus read or write cycles.

- ADMEM and AEMEM support both normal and burst mode read or write cycles.

- The performance of read or write operations involving either ADMEM or AEMEM is a function of the amount of memory bandwidth required to support any currently active video acquisition channel(s).

- The video module and all Video Option Modules will contain a read-only identification register which will contain the module type, revision number, and installed op-

*Cognex 4800 Video (VM17B)*          *Engineering Specification* tions (where applicable). This register will always be located at Host Bus address offset zero for either a base board or VOM.

- The video module will provide acquisition and display video timing RORA interrupts to the host processor. A read-only interrupt vector plus an interrupt status register will also be provided.

3.5 Video Option Modules

As previously mentioned, additional video acquisition capabilities will be offered via video option modules. Two types of VOMs will be supported, active and passive. Active VOMs will contain on-board video timing, analog-to-digital (A/D) converters, and data packetizing first-in first-out memories (FIFOs). An example of this type of VOM would include the line scan option (LSO).

A passive VOM merely performs video data translation. Its' analog output conforms to that required by the video A/D converter located on the baseboard. Alternatively, a digital output path can be connected directly to the packetizing FIFO located on the baseboard. This digital path can be used to support digital output cameras or to allow a video signal which cannot easily be formatted to baseboard A/D specification to be digitized on the VOM. These types of VOMs will be used to interface with area-scan cameras whose timing can be supported via the acquisition timing generator which resides on the baseboard, but whose video data (either analog or digital) does not directly conform to the requirements for a direct connection to either the A/D converter or packetizing FIFO.

All VOMs will share a common interface for access via the Host Bus. Address, timing, and data information will be provided by the Host Bus Interface located on the video baseboard. The VOM Host Bus interface will include:

- Sixteen (16) bits of Host Bus Data; HBD(31:16)

- Host Bus read and write enables; HBWREN_L, and HBRDEN_L;

- Host Bus byte 0 and 1 enables; HBB0EN_L and HBB1EN_L.

- Eight (8) bits of registered Host Bus address; HBA(9:2).

- VOMs can have a maximum of sixty-four (128) word-wide (16 bit) registers which reside from HBA(9:0) = $100_h$ to HBA(9:0) = $1FC_h$.

Connections between the camera(s) and a VOM will be made through a high density 44 pin D-Sub style connector. The specific pinout for this connector will be determined by the functionality of the VOM. The connector will attach directly to the VOM and fit within a designated opening in the video module from panel. In no VOM is present, this opening will be sealed with a filler plate.

A common video interface, henceforth referred to as the VOM Video Bus, will be used between all VOM designs and the main video board. This interface will support a maximum a four (4) channels of video data, limiting a single VOM to four (4) parallel acquisition channels. This number was selected based upon two requirements. The first is a high frame area-scan camera being developed by EG&G reticon which segments a 512 pixel by 512 line CCD into four 128 pixel by 512 line sub-sensors for video output. High frame rates are Revision A          Modified 3/23/94

Cognex 4800 Video (VM17B)  *Engineering Specification* achieved by outputting simultaneously from each 128 pixel segment, required that the digitizer support four (4) parallel video channels. The second is a high speed line scan camera available from Dalsa. This camera segments a 2048 pixel sensor into either eight (8) 256 pixel segments or four (4) 512 pixel segments. Again, in order to support this camera a minimum of four (4) parallel video channels are required.

The VOM Video Bus interface will support acquisition clock rates up to 20 MHz and will include:

Active VOM

- A single 8-bit wide data path, PKTDATA(7:0), which contains data destined for the video pixel buffer (VPB).

- Three 8-bit data paths; RED(7:0), GRN(7:0), and BLUD(7:0) which are used to allow real time display of VOM data. Alternatively, RED(7:0) can be sourced via the baseboard digitizer.

- Four video acquisition clocks; VOMCH0CLK, VOMCH1CLK, VOMCH2CLK, and VOMCH3CLK, which can be derived from internal VOM timing or be obtained directly from the camera(s).

- Four video acquisition horizontal reset signals; VOMCH0HRST_L, VOMCH1HRST_L, VOMCH2HRST_L, and VOMCH3HRST_L.

- Four video acquisition vertical reset signals; VOMCH0VRST_L, VOMCH1VRST_L, VOMCH2VRST_L, and VOMCH3VRST_L.

- Four acquisition field indication signals; VOMCH0FIELD, VOMCH1FIELD, VOMCH2FIELD, and VOMCH3FIELD.

- Four acquisition FIFO write control signals; VOMCH0FIFOWR_L, VOMCH1FIFOWR_L, VOMCH2FIFOWR_L, and VOMCH3FIFOWR_L.

- A single composite synchronization output signal which can be used to control the phase-lock-loop located on the baseboard in phase lock mode; VOMCSYNC_L.

- One set of horizontal and vertical drive output signals which can be used to control the acquisition timing generator located on the video baseboard in external timing mode; VOMHDRIVE_L and VOMVDRIVE_L.

- A single composite synchronization input signal which can be used to control the camera(s) in genlock mode; BASECSYNC_L.

- One set of horizontal and vertical drive input signals which can be used to control the camera(s) in either genlock or external timing mode; BASEHDRIVE_L and BASEDRIVE_L.

- A single RORA interrupt

*Cognex 4800 Video (VM17B)*     *Engineering Specification*

Passive VOM

- A single analog video path; VOMAVID.

- A single 8-bit digital data path for driving the input of the packetizing FIFO located on the baseboard; VOMDVID(7:0).

- A single video acquisition clock; VOMCLK, which can be obtained from the acquisition timing generator located on the base board or be obtained directly from the camera(s).

- An acquisition horizontal reset signal; VOMHRST_L.

- An acquisition vertical reset signal; VOMVRST_L.

- An acquisition field indication signal; VOMFIELD.

- An acquisition FIFO write control signal; VOMFIFOWR_L.

- A single composite synchronization output signal which can be used to control the phase-lock-loop located on the baseboard in phase lock mode; VOMCSYNC_L.

- One set of horizontal and vertical drive output signals which can be used to control the acquisition timing generator located on the video baseboard in external timing mode; VOMHDRIVE_L and VOMVDRIVE_L.

- A single composite synchronization input signal which can be used to control the camera(s) in genlock mode; BASECSYNC_L.

- One set of horizontal and vertical drive input signals which can be used to control the camera(s) in either genlock or external timing mode; BASEHDRIVE_L and BASEDRIVE_L.

Mapping logic contained within the Acquisition Packet Timing and Control section will allow any active VOM video channel(s) to be combined with the baseboard video channel. When using a Passive VOM, multiplexers located on the base board will determine the data and timing sources for the packetizing logic. Analog video from a Passive VOM will be digitized using the A/D converter located on the base board whereas digital video data will be supplied directly to the packetizing FIFO. With a Passive VOM, the mapping logic located within the Packet Timing and Control logic will always be selecting the base board as the source of all acquisition data and timing.

Revision A     Modified 3/23/94

Cognex 4800 Video (VM17B)          *Engineering Specification*

4. Physical Description

4.1 Base Board

The base module conforms to the VMEBus 6U standard (9.187 inches by 6.299 inches). Although 96 pin DIN P1 and P2 connector s provided for physical mating with the VMEBus backplane, only power (+5, +12, and -12 VDC) and ground (GND) are used.

The video acquisition and display card also has a 96 pin DIN press fit P3 connector for implementing the Host Bus. A pair of 15 pin D-Sub connectors will be used to connect the base board video acquisition circuit with up to four cameras. A 9 pin D-Sub connector will be used for connecting the display. High-density mezzanine bus connectors will be used to implement the VOM Host Bus and the VOM Video Bus interfaces.

4.1.1 Camera Interface

The pin definitions for the camera connectors is provided in Table 2.

| Pin Number | Camera 1 and 2 (J5) | Pin Number | Camera 3 and 4 (J4) |
|---|---|---|---|
| 1 | EXTPIXCLK | 1 | ANALOG GROUND |
| 2 | CAM2HDRIVE | 2 | CAM4HDRIVE |
| 3 | CAM2CNTRL1 | 3 | CAM4CNTRL1 |
| 4 | CAM1HDRIVE_L | 4 | CAM3HDRIVE_L |
| 5 | CAM1CNTRL0 | 5 | CAM3CNTRL0 |
| 6 | ANALOG GROUND | 6 | ANALOG GROUND |
| 7 | CAM2CNTRL0 | 7 | CAM4CNTRL0 |
| 8 | +12 VDC | 8 | +12 VDC |
| 9 | CAM1CNTRL1 | 9 | CAM3CNTRL1 |
| 10 | CAM2VDRIVE_L | 10 | CAM4VDRIVE_L |
| 11 | ANALOG GROUND | 11 | ANALOG GROUND |
| 12 | CAM1VDRIVE_L | 12 | CAM3VDRIVE_L |
| 13 | CAM1VIDEO | 13 | CAM3VIDEO |
| 14 | CAM2VIDEO | 14 | CAM4VIDEO |
| 15 | EXTHDRIVE_L | 15 | EXTVDRIVE_L |

*Table 2: Pin Definition For Camera Connectors (J4 and J5)*

Part Number 9012-0039      Cognex Confidential

Cognex 4800 Video (VM17B)              Engineering Specification

*4.1.2 Display Interface*

The pin definition for the display connector is provided in Table 2.

| Pin Number | LSO1 VOM Input | Pin Number | LSO1 VOM Input |
|---|---|---|---|
| 1 | RED | 6 | ANALOG GROUND |
| 2 | GREEN | 7 | ANALOG GROUND |
| 3 | BLUE | 8 | ANALOG GROUND |
| 4 | HDRIVE_L | 9 | ANALOG GROUND |
| 5 | VDRIVE_L | | ANALOG GROUND |

*Table 3: Pin Definition For Display Connector (J6)*

*4.2 Video Option Modules*

Each video option module will be approximately 3.5 inches by 8.9 inches. High-density mezzanine bus connectors will be used to implement the VOM Host Bus Interface and the VOM Video Bus. These connectors are labeled J1, J2 and J3. External camera connections will be made using a 44 pin high density D-Sub style connector located on the VOM. Table 4 contains the pinout for this interface. Those signals required to support the LSO1 VOM are marked with an asterisk (*).

| Pin Number | VOM Interface J1 | VOM Interface J2 | VOM Interface J3 |
|---|---|---|---|
| 1 | VOMCH0ACQCLK | VIDEORST_L | BASEACQCLK |
| 2 | Digital Ground | HBWREN_L | Digital Ground |
| 3 | VOMCH1ACQCLK | HBRDEN_L | BASEACQCSYNC_L |
| 4 | Digital Ground | BYTE0EN_L | Digital Ground |
| 5 | VOMCH0ACQHRST_L | BYTE1EN_L | BASEACQHDRIVE |
| 6 | VOMCH0ACQVRST_L | HBXCVREN_L | BASEACQVDRIVE |
| 7 | VOMCH1ACQHRST_L | HBXCVRDIR | Digital Ground |
| 8 | VOMCH1ACQVRST_L | REALTIMERED | BASEACQHSYNC |
| 9 | Digital Ground | REALTIMEGRN | BASEACQCLAMP |
| 10 | VOMCH0ACQPKTWR_L | REALTIMEBLU | Digital Ground |

*Table 4: Pin Definition For VOM Interface Connectors*

Revision A                                        Modified 3/23/94

Cognex 4800 Video (VM17B)　　　　　　*Engineering Specification*

| Pin Number | VOM Interface J1 | VOM Interface J2 | VOM Interface J3 |
|---|---|---|---|
| 11 | VOMCH1ACQPKTWR_L | REALTIMEREDSEL | Digital Ground |
| 12 | Digital Ground | Digital Ground | BLU0 |
| 13 | VOMCH0FIFORD_L | VHBA2 | BLU1 |
| 14 | VOMCH0FIFOOE_L | VHBA3 | BLU2 |
| 15 | Digital Ground | VHBA4 | BLU2 |
| 16 | VOMCH1FIFORD_L | VHBA5 | Digital Ground |
| 17 | VOMCH1FIFOOE_L | Digital Ground | GRN0 |
| 18 | Digital Ground | VHBIOD0 | GRN1 |
| 19 | VOMCH0ACQFIELD | VHBIOD1 | GRN2 |
| 20 | VOMCH1ACQFIELD | VHBIOD2 | GRN3 |
| 21 | Digital Ground | VHBIOD3 | Digital Ground |
| 22 | PKTDATAIN0 | VHBIOD4 | RED0 |
| 23 | PKTDATAIN1 | VHBIOD5 | RED1 |
| 24 | PKTDATAIN2 | VHBIOD6 | RED2 |
| 25 | PKTDARAIN3 | VHBIOD7 | RED3 |
| 26 | PKTDATAIN4 | VHBD8 | RED4 |
| 27 | PKTDATAIN5 | VHBD9 | RED5 |
| 28 | PKTDATAIN6 | VHBD10 | RED6 |
| 29 | PKTDATAIN7 | VHBD11 | RED7 |
| 30 | Digital Ground | VHBD12 | Digital Ground |
| 31 | VOMCH3ACQFIELD | VHBD13 | GRN4 |
| 32 | VOMCH2ACQFIELD | VHBD14 | GRN5 |
| 33 | Digital Ground | VHBD15 | GRN6 |
| 34 | VOMCH3FIFOOE_L | Digital Ground | GRN7 |
| 35 | VOMCH3FIFORD_L | VHBA6 | Digital Ground |
| 36 | Digital Ground | VHBA7 | BLU4 |
| 37 | VOMCH2FIFOOE_L | VHBA8 | BLU5 |
| 38 | VOMCH@FIFORD_L | VHBA9 | BLU6 |
| 39 | Digital Ground | VCC | BLU7 |
| 40 | VOMCH3ACQPKTWR_L | VCC | Digital Ground |
| 41 | VOMCH2ACQPKTWR_L | VCC | VOMSYSCLK |

*Table 4: Pin Definition For VOM Interface Connectors*

Part Number 9012-0039　　　　Cognex Confidential

*Cognex 4800 Video (VM17B)*    *Engineering Specification*

| Pin Number | VOM Interface J1 | VOM Interface J2 | VOM Interface J3 |
|---|---|---|---|
| 42 | Digital Ground | VCC | Digital Ground |
| 43 | VOMCH3ACQVRST_L | VCC* | VOMAVID |
| 44 | VOMCH3ACQHRST_L | VCC* | Digital Ground* |
| 45 | VOMCH2ACQVRST_L | Digital Ground* | VOMCAMVDRIVE |
| 46 | VOMCH2ACQHRST_L | VME -12VDC | VOMCAMHDRIVE |
| 47 | Digital Ground* | VME -12VDC | Digital Ground* |
| 48 | VOMCH3ACQCLK | Digital Ground* | VOMCAMCSYNC_L |
| 49 | Digital Ground* | VME +12VDC | Digital Ground* |
| 50 | VOMCH2ACQCLK | VME +12VDC | VOMINT_L* |

*Table 4: Pin Definition For VOM Interface Connectors*

Revision A    Modified 3/23/94

*Cognex 4800 Video (VM17B)*          *Engineering Specification*

5. Software Reference

This section provides programming models for the various video acquisition and display resources. It also discusses how these resources are accessed via the Host Bus. The final section provides a detailed description of the internal resource configuration registers.

5.1 Host Bus Interface

This section provides an overview of the video module Host Bus address mapping. The various Host Bus data transfers protocols supported by the video module are also discussed.

5.1.1 Host Bus Addressing

As noted in the Host Bus Specification, the most significant nibble (bits 28 through 31) of the address are used to select between the various types of add-in modules. The video sub-system is fixed at the following address:

$$HBA(31:28) = 0001_b$$

In addition, HBA(27:26) are also decoded by the video hardware. This allows a 4800 based vision system to contain up to four video modules. Due to the multiplexing of address and data information on the Host Bus, the video processor loads the necessary address bits into a register when the cycle start signal (HBSTART_L) is active the values of HBA(31:28) and HBA(27:26) are correct. This internal video module address, henceforth referred to as the Host Bus Video Address (HBVA), is 26 bits wide. Table 5 contains the Host Bus base address for each of the four (4) possible video boards.

| HBA(31:0) | Address Space |
|---|---|
| 1000 0000$_h$ | Video Board 1 Base Address |
| 1400 0000$_h$ | Video Board 2 Base Address |
| 1800 0000$_h$ | Video Board 3 Base Address |
| 1C00 0000$_h$ | Video Board 4 Base Address |

*Table 5: Host Bus Address Allocation*

Table 6 shows how the Host Bus address is mapped for an individual video module. The Host Bus address space is divided into four 16 MByte blocks. As shown in the table HBA(25:24) are used to determine which 16 MByte block is being accessed; configuration registers, ADMEM, or AEMEM. The upper 16 MByte block of address space is reserved for the potential addition of a second bank of AEMEM.

Part Number 9012-0039          Cognex Confidential

*Cognex 4800 Video (VM17B)*  *Engineering Specification*

| Starting Address | Video Address Source | Size (Bytes) |
|---|---|---|
| Base + 0 | Base Board Control Registers | 256 |
| Base + 100$_h$ | VOM control registers | 256 |
| Base + 0100 0000$_h$ | ADMEM Bank 0 | 512 K |
| Base + 0108 0000$_h$ | ADMEM Bank 1 | 512 K |
| Base + 0110 0000$_h$ | ADMEM Bank 2 | 512 K |
| Base + 0118 0000$_h$ | ADMEM Bank 3 | 512 K |
| Base + 0200 0000$_h$ | AEMEM | 0, 4, 8, or 16 M |
| Base + 0300 0000$_h$ | reserved | 16 M |

*Table 6: Video Board Address Allocation*

5.1.2 Host Bus Transfer Types

The video module supports both normal and burst mode read or write Host Bus transfers. In addition, any register or memory location can be accessed in either byte, word, or long word mode. The current value of the "transfer size bits", HBTSIZE(1:0), determines whether or not the values for HBVA(1:0) factor into the current cycle. Table 7 shows the four possible read or write transfer modes.

| HBTSIZE(1:0) | Host Bus Cycle Type | Bytes Transferred |
|---|---|---|
| 00 | Long Word | 4 |
| 01 | Byte | 1 |
| 10 | Word | 2 |
| 11 | Burst | 16 |

*Table 7: Host Bus Transfer Size Bits*

Table 8 illustrates how the Host Bus transfer modes are processed by the video module.

Revision A          Modified 3/23/94

Cognex 4800 Video (VM17B)               Engineering Specification

| Transfer Type | HBVA(1:0) | Byte 0 Bits(31:24) | Byte 0 Bits(31:24) | Byte 0 Bits(31:24) | Byte 0 Bits(31:24) |
|---|---|---|---|---|---|
| Byte Write | 00 | Write | | | |
| | 01 | | Write | | |
| | 10 | | | Write | |
| | 11 | | | | Write |
| Word Write | 00 | Write | Write | | |
| | 10 | | | Write | Write |
| Long Word Write | 00 | Write | Write | Write | Write |
| Burst Write | 00 | Write | Write | Write | Write |
| Byte Read | 00 | Read | | | |
| | 01 | | Read | | |
| | 10 | | | Read | |
| | 11 | | | | Read |
| Word Read | 00 | Read | Read | | |
| | 10 | | | Read | Read |
| Long Word Read | 00 | Read | Read | Read | Read |
| Burst Read | 00 | Read | Read | Read | Read |

*Table 8: Host Bus Transfer Modes*

5.1.3 Host Bus Performance

Transfer rates between the CPU and either ADMEM or AEMEM, via the Host Bus, are not constant. ADMEM and AEMEM share all available memory resources. Therefore the following memory cycles are mutually exclusive:

- Host Bus read, write, burst read, or burst write
- video acquisition burst write
- video display read transfer
- refresh Part Number 9012-0039          Cognex Confidential

*Cognex 4800 Video (VM17B)*                  *Engineering Specification*

While the impact of refresh and display read transfer cycles on the performance of the Host Bus with respect to ADMEM and AEMEM is negligible, the number of video burst write cycles will increase as the aggregate normalized video acquisition clock rate increases. Therefore, the transfer rate between the CPU and either ADMEM or AEMEM is directly affected by any amount of video acquisition.

NOTE

*The following table does has not been updated to reflect enhancements to the design which should improve non-burst read cycles times. This table will be completed after results are obtained from actual testing.*

| Video Format | Host Bus Clock | Active Video Channels | Read | Burst Read | Write | Burst Write |
|---|---|---|---|---|---|---|
| RS-170 Narrow | 25 MHz | 0 | 14.3 MB/s | 26.7 MB/s | | |
| | | 1 | 12.5 MB/s | 25.3 MB/s | | |
| | | 2 | 10.8 MB/s | 21.8 MB/s | | |
| | | 3 | 9.0 MB/s | 21.1 MB/s | | |
| | | 4 | 7.3 MB/s | 20.8 MB/s | | |
| | 40 MHz | 0 | 20.0 MB/s | 35.5 MB/s | | |
| | | 1 | 17.5 MB/s | 31.8 MB/s | | |
| | | 2 | 15.0 MB/s | 27.8 MB/s | | |
| | | 3 | 12.6 MB/s | 24.1 MB/s | | |
| | | 4 | 10.0 MB/s | 22.3 MB/s | | |
| RS-170 Wide | 25 MHz | 0 | 14.3 MB/s | 26.7 MB/s | | |
| | | 1 | 12.6 MB/s | 24.8 MB/s | | |
| | | 2 | 10.3 MB/s | 20.8 MB/s | | |
| | | 3 | 8.1 MB/s | 19.8 MB/s | | |
| | | 4 | N/A | N/A | | |
| | 40 MHz | 0 | 20.0 MB/s | 35.5 MB/s | | |
| | | 1 | 16.9 MB/s | 30.8 MB/s | | |
| | | 2 | 13.7 MB/s | 26.1 MB/s | | |
| | | 3 | 10.6 MB/s | 21.3 MB/s | | |
| | | 4 | N/A | N/A | | |

*Table 9: ADMEM and AEMEM Host Bus Transfer Rates*

Cognex 4800 Video (VM17B)     *Engineering Specification*

| Video Format | Host Bus Clock | Active Video Channels | Read | Burst Read | Write | Burst Write |
|---|---|---|---|---|---|---|
| CCIR Narrow | 25 MHz | 0 | | | | |
| | | 1 | | | | |
| | | 2 | | | | |
| | | 3 | | | | |
| | | 4 | | | | |
| | 40 MHz | 0 | | | | |
| | | 1 | | | | |
| | | 2 | | | | |
| | | 3 | | | | |
| | | 4 | | | | |
| CCIR Wide | 25 MHz | 0 | | | | |
| | | 1 | 11.6 MB/s | | | |
| | | 2 | 9.3 MB/s | 21.4 MB/s | | |
| | | 3 | | | | |
| | | 4 | N/A | N/A | | |
| | 40 MHz | 0 | | | | |
| | | 1 | | | | |
| | | 2 | | | | |
| | | 3 | | | | |
| | | 4 | N/A | N/A | | |

*Table 9: ADMEM and AEMEM Host Bus Transfer Rates*

5.2 Programming Models

This section provides programmer reference models for three key components of the 4800 video subsystem. The models contain sufficient detail to allow those responsible for providing lower level software interfaces to understand the relationships between the configuration registers and video system performance.

5.2.1 ADMEM

Figure 2 contains an illustration of the acquisition and display memory software model. The acquisition and display memory (ADMEM) is implemented using video DRAM (VRAM) technology and is comprised four banks, Bank0, Bank1, Bank2, and Bank 3. Two configurations are possible. A 1.0 MByte ADMEM only requires Banks 0 and 1 to be populated Part Number 9012-0039     Cognex Confidential

Cognex 4800 Video (VM17B)　　　　　*Engineering Specification*
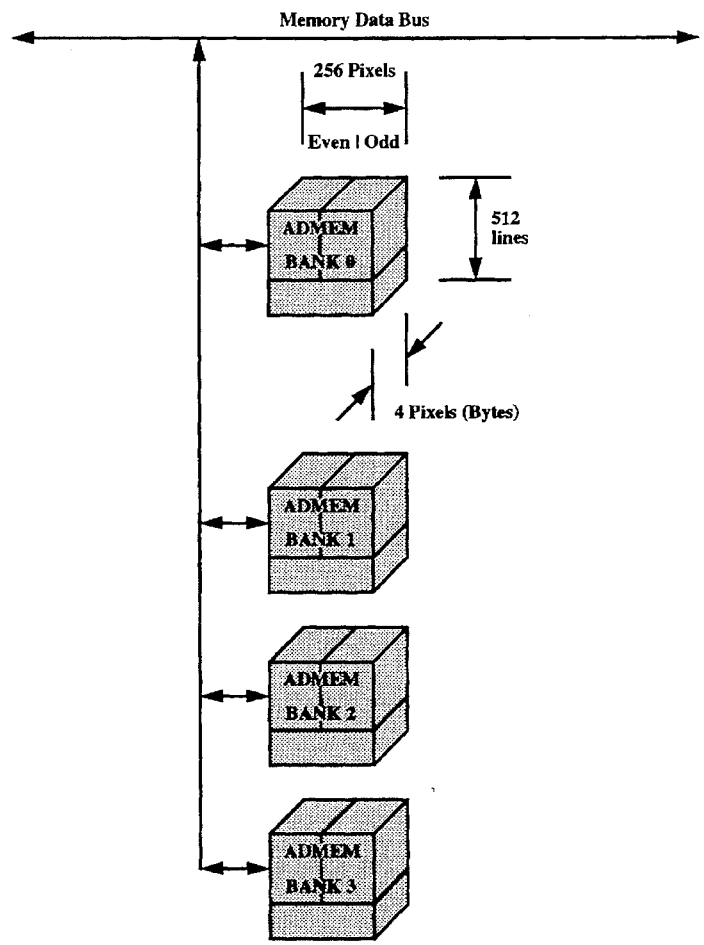
*Figure 2: Acquisition and Display Memory (ADMEM) Software Model*
while the 2.0MByte version needs all four (4) banks. The video acquisition and Host Bus access data path is 32 bits (i.e. a 68040 long word) and is capable of accessing four pixel locations on any memory cycle.
Revision A　　　　　Modified 3/23/94

Cognex 4800 Video (VM17B)    Engineering Specification

Within ADMEM, the natural organization of each bank is a 1024 pixel (256 pixels wide x 4 pixels deep) by 512 line matrix. As shown in the figure, each bank of ADMEM is a three dimensional structure. The total capacity of any single bank is 512 KBytes ((256 x 4 pixels/line) x 512 lines)), enough to hold two (2) normal, one (1) wide, or eight (8) RS-170 or CCIR images. Large format Images which contain more than 512 lines will be acquired by automatically placing lines in the next higher bank (i.e. Bank1 if the acquisition began using Bank0).

From the perspective of the host bus, ADMEM is seen as a two-dimensional matrix. This is because the use of VRAMs dictates that ADMEM have a rigid row and column structure. Table 10 illustrates how the Host Bus address is mapped into physical ADMEM addresses.

| HBA(20:19) | HBA(18:10) | HBA(9:2) | HBA(1:0) |
|---|---|---|---|
| Bank Select | Row Address | Column Address | Byte Address |

*Table 10: Host Bus ADMEM Address Mapping*

Multiple image formats can be acquired using ADMEM. For example, ADMEM could be used to acquire a 512 pixel per line RS-170 image in conjunction with a 1024 pixel by 1024 line large format image.

Image Allocation Constraints

*The acquisition logic requires that all image lines begin at an address that is 0 mod 32. The length of each line must also be 0 mod 32. The display logic has additional constraints documented in a later section.*

5.2.2 AEMEM

As shown in Figure 3, AEMEM is organized as a linear array which is either 1.0M, 2.0M, or 4.0M addresses long and 4 bytes deep. Each address can therefore contain four (4) pixels. This memory structure allows the last four pixels of line "n" and the first four pixels of line "n+1" to be located at consecutive memory locations. In addition, the end of one image and the beginning of another image can also occupy adjacent memory addresses. This feature allows the available amount of AEMEM to be used very efficiently. Through proper buffer management, the boundaries of multiple images of a similar format or multiple images acquired using different formats can occupy adjacent memory addresses.Table 11 illustrates how the Host Bus address is mapped into physical AEMEM addresses

| HBA(23,21:12) | HBA(22,11:2) | HBA(1:0) |
|---|---|---|
| Row Address | Column Address | Byte Address |

*Table 11: Host Bus AEMEM Address Mapping*

Part Number 9012-0039    Cognex Confidential

Cognex 4800 Video (VM17B)          Engineering Specification
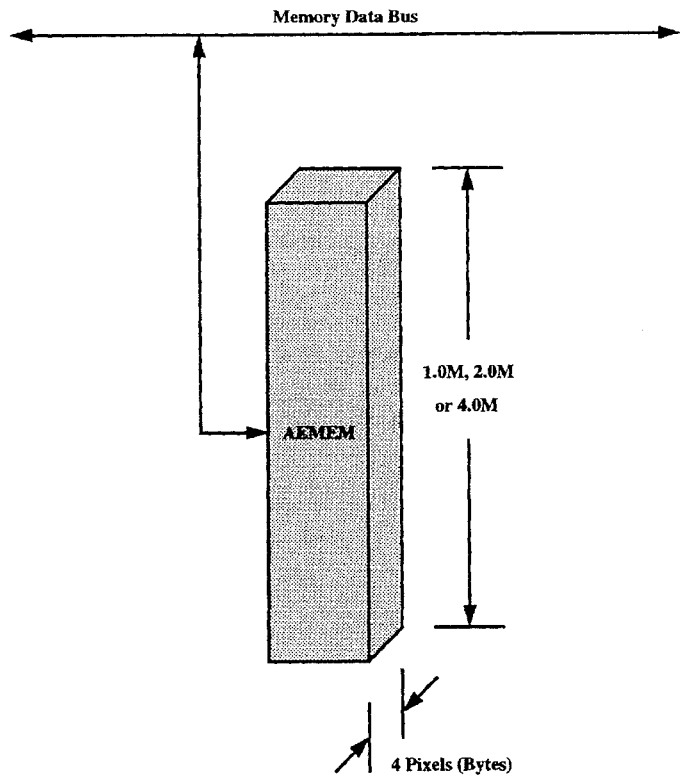
*Figure 3: Acquisition Expansion Memory (AEMEM) Software Model*
Image Allocation Constraints
The acquisition logic requires that all image lines begin at an address that is 0 mod 32. The length of each line must also be 0 mod 32. The display logic has additional constraints documented in a later section.

*Cognex 4800 Video (VM17B)*          *Engineering Specification*

5.2.3 Image Acquisition

This section discusses all aspects of video acquisition. These include selecting between available video resources, address generation (cip_buffer control), and acquisition timing.

5.2.3.1 Acquisition Resources

Figure 4 contains the software resource model for the 4800 acquisition section. The model is comprised of five components; Acquisition Channel Mapping, FIFO Read Channel Mapping, CH0 to CH3 Packetizing Logic, Acquisition Micro Interrupt Generator, and data rate matching FIFOs. The model contains five (5) FIFOs since this is the maximum allowable. Actual deployment systems will contain between one and five FIFOs. The Base FIFO will always be present while the VOM FIFOs are optional. As noted previously, the FIFOs are used to rate match the video data rate for a particular channel with the internal 40 MByte/s packet data rate. The Acquisition Channel Mapping is used to map determine which of the five possible data sources is currently active. The 4800 allows up to four channels of video to be active simultaneously. Each of the four available channels is mapped to one of the five available sources via a "channel mapping" register. This register allows the four video channels to be connected to any of the five available video inputs.

Once the mapping is complete, the video acquisition control signals (e.g. BASECLK, BASEFWR_L, BASEHRST_L, BASEVRST_L, and BASEFIELD) are passed to the proper channel (CH0, CH1, CH2, or CH3) of Packetizing Logic. The FIFO write control (e.g. BASEFWR_L) is used by the Packetizing Logic to control a counter used to determine when a packet of video data (i.e. 32 pixels) is present of the corresponding FIFO. As long as at least one packet of data is available within a FIFO, the Packetizing Logic will read the FIFO and copy the packet into the Video Pixel Buffer. A small state machine monitors the internal "packet available" signals which emanate from each channel of Packetizing Logic to determine which channel should be serviced next. When multiple channels are active, each is serviced in a round-robin fashion.

Near the end of the transfer of a packet into the Video Pixel Buffer, an acquisition micro interrupt is issued. The horizontal and vertical timing marks (e.g. BASEHRST_L and BASEVRST_L) are used to determine whether the current packet is the start of a new field (or frame), the beginning of a new line, or the continuation of the current line. For interlaced acquisitions, the field indicator (e.g. BASEFIELD) is used to determine which field is currently active.

The interrupt is comprised of a vector, VUI(3:0), plus a validation signal, VUILOAD_L. This vector is loaded into the memory Address Generator whenever VUILOAD_L is a logic zero. The vector contains two fields, VTYPE(1:0) and VCH(1:0). The VCH field is used by the Address Generator to determine the channel to which the packet belongs. The VUITYPE field tells the Address Generator how the address should be calculated. The possible packet "types" are:

- Packet is the start of a new frame (for non-interlaced acquisitions) or the beginning of an even or odd field (for interlaced acquisitions).

- Packet is the start of a new line within the current frame of field.

- Packet is a continuation of the current line.

Part Number 9012-0039          Cognex Confidential

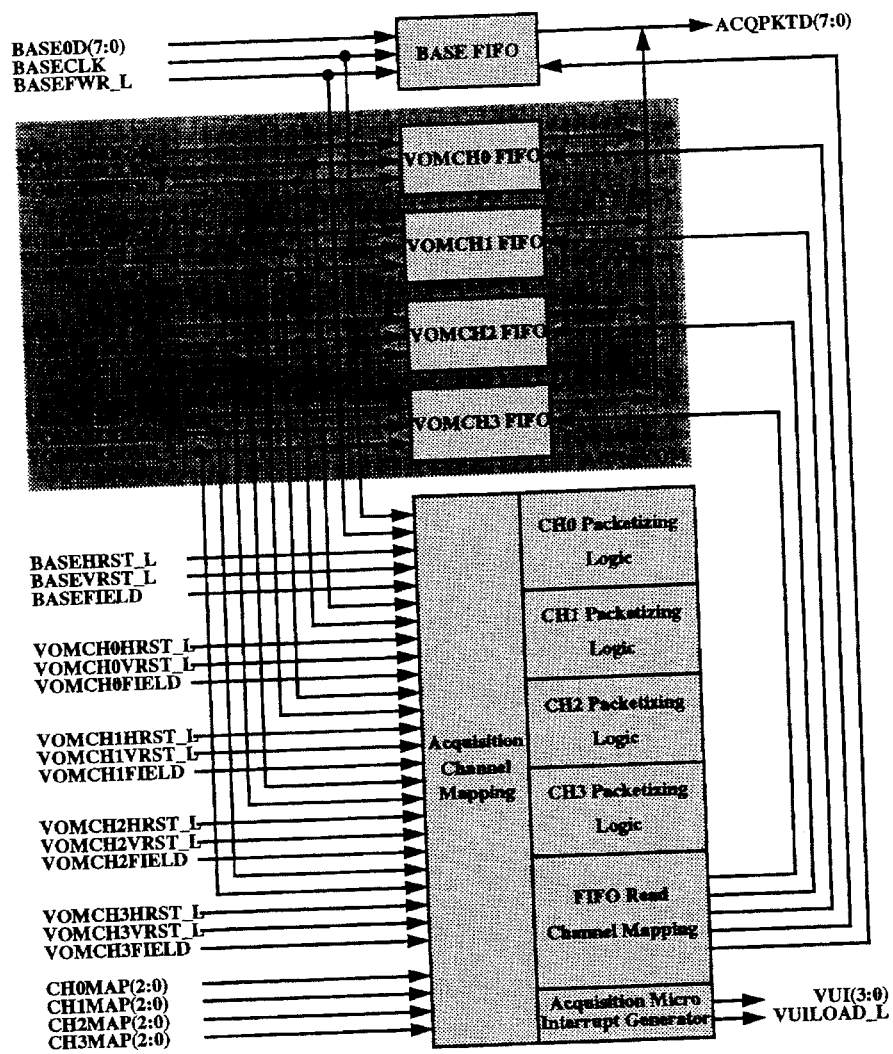
Figure 4: Acquisition Video Resource Model

Cognex 4800 Video (VM17B)  *Engineering Specification*

*5.2.3.2 Acquisition Address Generator*

Figure 5 contains the software model for the memory Address Generator. This logic performs three major functions. First, it generates unique addresses for up to four video channels. Second, it maps the linear Host Bus address into the proper format required to access either ADMEM or AEMEM. Third, it generates the display addresses required during ADMEM read transfer cycles. Regardless of the current memory cycle. Two address are required, a row (i.e RAS) address is always followed by a column (i.e. CAS) address. Generating these two addresses is accomplished via the CASADDR input. When this signal is low the appropriate RAS address is output, when it is high the CAS address is provided.

The four (4) acquisition channels each contain three (3) address parameter registers plus an implied address counter (AC). The three parameters are used by the address generator to determine the starting address for:

- Start of new even field packet type
- Start of new odd field packet type
- Start of new line packet type All packets are written to written to either ADMEM or AEMEM starting at the current value of AC. The additional page mode addresses required during video burst write cycles are generated by incrementing or decrementing AC by the packet size (32 bytes). The address parameters are:

- SE - Start of even field (location of first four pixels of the first even line)
- SO - Start of odd field (location of first four pixels of the first odd line)
- LI - Line increment (distance between the last four pixels of the current line and the first four pixels of the next line within the same field)

Table 12 illustrates the calculation of the packet start address, AC. At the end of a video burst write cycle, AC will have the value:

$$AC <- AC +/- 32$$

Therefore "same line" packet types simply use the current value of AC as the packet start address.

| Packet Type Identifier | Packet Start Address |
|---|---|
| New even Field | AC <- SE |
| New odd Field | AC <- SO |
| New Line | AC <- AC +/- LI |
| Same Line | AC |

*Table 12: Start Of Packet Address Calculation*

*Cognex 4800 Video (VM17B)* Engineering Specification
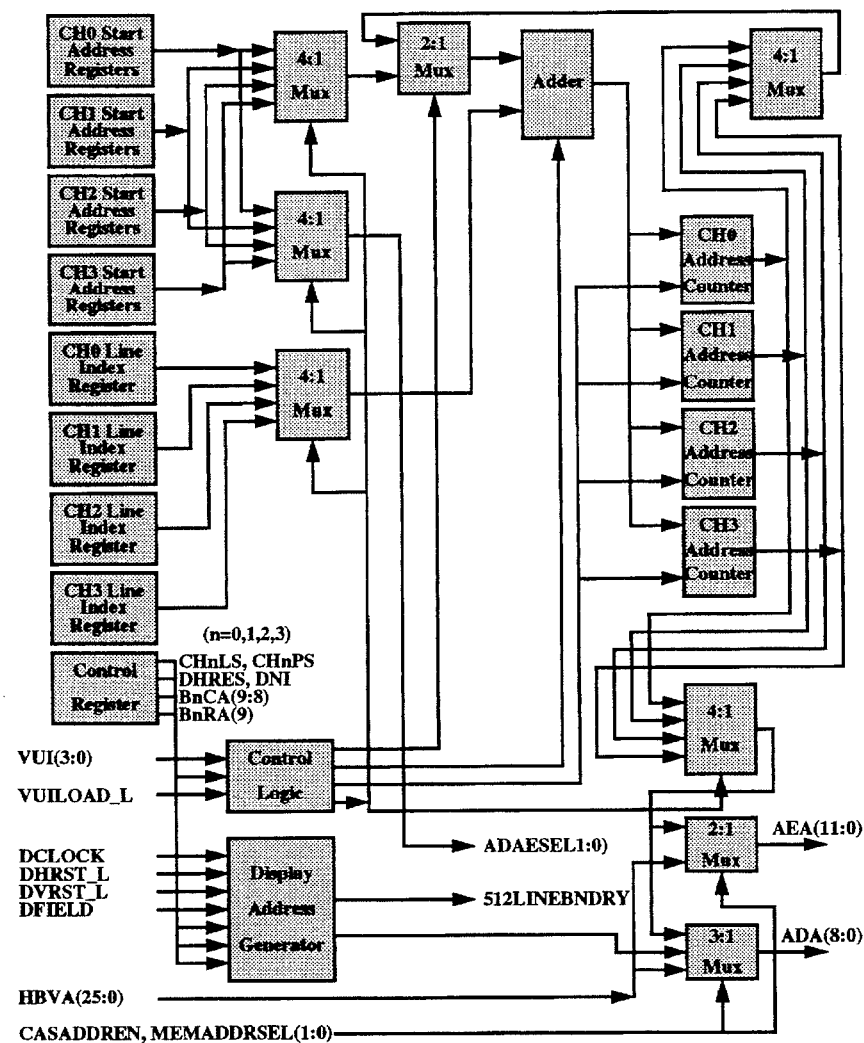
*Figure 5: Memory Address Generator Model*
Revision A                    Modified 3/23/94

Cognex 4800 Video (VM17B)     Engineering Specification

NOTE

*This section documents the acquire channel programming in terms of byte addresses. There are actually alignment restrictions - everything has to be at least long word aligned and most of the quantities must be 32 byte aligned. The register definition section treats the issues in more detail.*

NOTE

*Interlaced half-resolution acquires are treated as non-interlaced for purposes of acquisition*

5.2.3.2.1 Image Acquisition Using ADMEM

Images acquired into ADMEM must obey the alignment and 1024 byte row update restrictions of the display address generator in order to be properly displayed. Table 13 shows the necessary values for SE, SO, and LI required when acquiring into ADMEM. In this table, "HA" refers to the number of active pixels per line for the image being acquired.

| Acquisition Format | SE | SO | LI |
|---|---|---|---|
| Interlaced | Start | Start + 1024 | 2048 - HA |
| Non Interlaced | Start | Don't Care | 1024 - HA |

*Table 13: ADMEM Acquisition Address Parameter Programming*

In order to maximize the number of images which can be acquired into any bank of ADMEM, three (3) bits of the address; 8, 9, and 18; are uniquely generated for each bank. During the acquisition of a single line of pixels, the low 10 bits of the address (column address plus byte select) effectively increment one pixel at a time. There is no carry out of the high bit of column address (9) during this process. Therefore, in order for pixel addresses within a row to be sequential:

- Images with HA up to 256 pixels should start at an address of 0 mod 256

- Images with HA > 256 and up to 512 pixels should start at an address of 0 mod 512

- Images with HA > 512 and up to 1024 pixels should start at an address of 0 mod 1024

The term "line" rather than "row" is used in this discussion to emphasize that lines correspond to acquired video lines only while the term "row" refers to a specific VRAM row address.

As shown in Table 14, a single 1024 pixel by 512 line bank within ADMEM can be segmented into four (4) equal horizontal regions and two (2) equal vertical regions. This allows a single bank of ADMEM to hold two normal, one wide, or eight half resolution RS-170 or CCIR images.

Cognex 4800 Video (VM17B)　　　　　　　　Engineering Specification

| ADA18 | ADA(17:10) | ADA(9) | ADA(8) | ADA(7:0) |
|---|---|---|---|---|
| BNKnRA(9) | row address | BNKnCA(9) | BNKnCA(8) | column address |

*Table 14: ADMEM Acquisition Address Mapping*

NOTE

*In order for images to be displayed, the "column address" field in Table 14 must be set to 0.*

Figure 6 contains some examples of the type of image buffers which can be created within ADMEM.

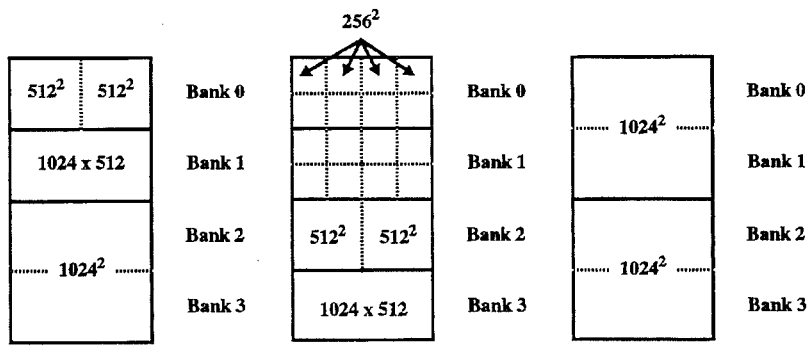

*Figure 6: Examples Of ADMEM Image Buffers*

5.2.3.2.2 Image Acquisition Using AEMEM

AEMEM is organized as a linear array which is either 4M, 8M, or 16M bytes deep. Table 18 shows the necessary values for SE, SO, and LI required when acquiring into AEMEM. In this table, "HA" refers to the number of active pixels per line for the image being acquired. The acquisition address mapping is highlighted in Table 16.

Cognex 4800 Video (VM17B)     Engineering Specification

| Acquisition Format | SE | SO | LI |
|---|---|---|---|
| Interlaced | Start | Start + HA | HA |
| Non Interlaced | Start | Don't Care | 0 |

*Table 15: AEMEM Acquisition Address Parameter Programming*

| HBA(23,21:12) | HBA(22,11:2) | HBA(1:0) |
|---|---|---|
| Row Address | Column Address | Byte Address |

*Table 16: AEMEM Acquisition Address Mapping*

Figure 7 illustrates the flexibility of defining image buffers within AEMEM. In this figure, three different image formats were acquired. Since each location within AEMEM holds four (4) pixels, the total amount of memory space required is:

$$Malloc_{AEMEM} = (Active\ Pixels \times Active\ Lines) / 4$$

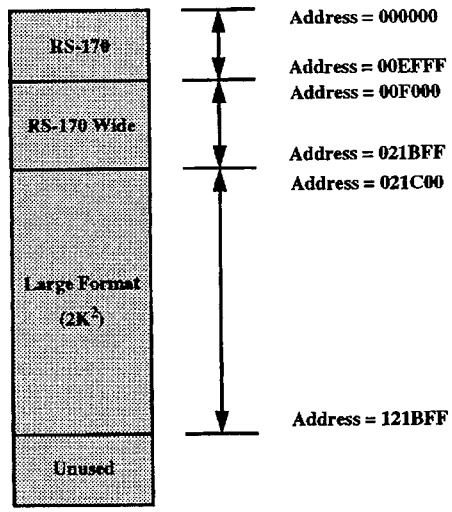

*Figure 7: Examples Of AEMEM Image Buffers*

*Cognex 4800 Video (VM17B)*　　　　　　　　　*Engineering Specification*

Using this formula number of memory address required for the three sample images are 61.440K, 76.800 K, and 1048.576K respectively.

5.2.3.2.3 Creating Circular Buffers Within ADMEM Or AEMEM

When performing inspection of "web" type materials using line scan cameras, there is no clear delineation of "frame times". Data is constantly being streamed in, one line at a time. Without a clearly defined "frame size", images acquired into either ADMEM or AEMEM would start acquiring at SA and continue on until the end of the memory was reached, at which point the address would roll over to zero. This presents two problems. First the only viable value for SA in either ADMEM or AEMEM would be zero. Second, the entire memory is required to support a single camera. A 4800 system with both ADMEM and AEMEM installed could only support two channels of simultaneous acquisition.

To better support these applications it would be to our advantage if the software could create "circular" (or "ring") buffers of arbitrary size within either ADMEM or AEMEM. By creating four such buffers a 4800 based vision system performing web inspection could utilize all four acquisition channels if necessary. To create these buffers, the current pointers residing in the Address Counters need to be re-loaded with the initial start pointers, CH0SA through CH3SA, respectively.

In order to do this the VOM interfacing with the line scan camera(s) need only supply a vertical reset every N lines. This results in an N line ring buffer of data. The VOM could also generate alternate even and odd vertical resets every N lines. This results in a ping-pong between 2 N line buffers. The latter mode of operation would require that the VOM "synthesize" a field bit and that the values of SE and SE would be separated by N lines.

5.2.3.3 Acquisition Timing Generator

Figure 8 contains a block diagram of the RS-170/CCIR Acquisition Timing generator. The logic is a superset of the timing generators implemented on current VMEBus products. The additional capabilities include timing reset to support true asynchronous acquires; a second, user definable line interrupt; and hardware Area-Of-Interest. The addition of the hardware AOI logic will allow the timing generator to support a wide variety of standard and non-standard area scan cameras. The Acquisition Timing Generator will be implemented using Xilinx FPGA technology. The goal is to have three (3) basic configuration files; RS-170, CCIR, and non-standard.

Timing is derived from horizontal and vertical counters which are clocked by the base board pixel clock (BASECLK). Making these counters 11 bits covers all of the standard video formats and should provide the range necessary to support cameras whose resolution, including blanking, is 2048 pixels by 2048 lines. The position of the horizontal and vertical counter reset signals (HCNTRST_L and VCNTRST_L), in conjunction with the frequency of BASECLK, determine the acquisition format (RS-170, CCIR, or non-standard). The output of the vertical counter is available to the CPU via a read-only data port (Acquisition Line Number). The vertical counter can be loaded with the current value of the Rapid Restart Position register. This capability is required to support "rapid restart" style asynchronous camera acquisitions.

Two bi-directional camera synchronization signals, CAMSYNC0 and CAMSYNC1 are provided. In genlock mode, these signals can be used to provide separate horizontal and

Cognex 4800 Video (VM17B)      *Engineering Specification*

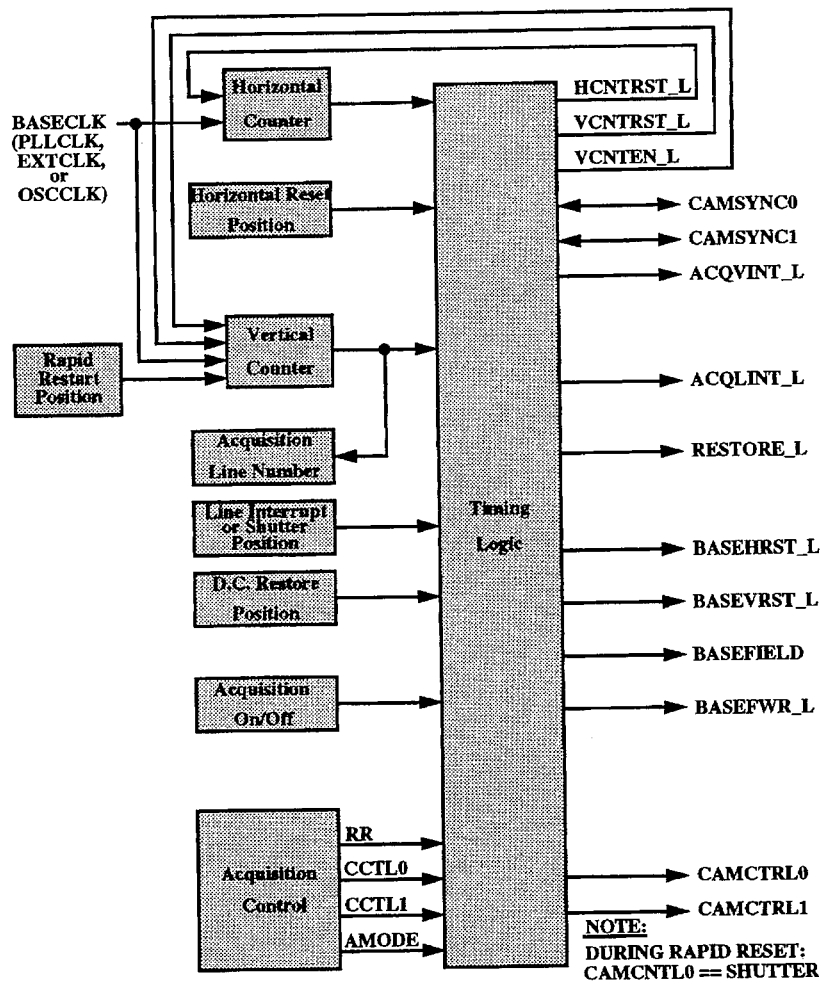

*Figure 8: Acquisition Timing Generator Model* vertical synchronization signals or a composite synchronization signal to the camera(s). In external timing mode, these inputs allow an RS-170 or CCIR compatible camera provide horizontal and vertical or composite synchronization timing to the 4800. Also in external timing mode, a non-standard camera can provide some type of horizontal and vertical timing information via these signals. In general, these cameras will also provide a pixel clock

*Cognex 4800 Video (VM17B)*       *Engineering Specification* which will be used to drive BASECLK. Two additional camera control signals, CAMCTRL0 and CAMCTRL1, can be toggled via the Acquisition Control register.

A vertical interrupt signal, ACQVINT_L, will occur at the beginning of every vertical blank. This is a key timing mark which should be used to synchronize various acquisition functions. The position of this interrupt is fixed. A second "line" interrupt, ACQLINT_L, is also provided. This interrupt will occur whenever the output of the Vertical Counter matches the value stored in the Line Interrupt Position register. WHen rapid restart acquisitions are being performed, the logic used to generate ACQLINT_L also generates a shutter pulse.

The position of the D.C. restoration pulse, RESTORE_L, can be adjusted via the D.C. Restore Position Register. Whenever the output of the Horizontal Counter matches the value stored in the D.C. Restore Position Register the RESTORE_L signal will be generated. This feature will allow the position of the RESTORE_L pulse to be adjusted from its' nominal position to support particular camera.

The outputs of the horizontal and vertical counters are decoded to generate the four timing signals, BASEHRST_L, BASEVRST_L, BASEFIELD, and BASEFIFOWR_L, required to control the base board packetizing logic and FIFO. The horizontal (line) reset, BASEHRST_L, occurs near the end of each horizontal blanking interval. The vertical (field) reset, BASEVHST_L, occurs during the last horizontal blank in the vertical blanking period and is synchronous with BASEHRST_L. Data is loaded into the packetizing FIFO whenever BASEFIFOWR_L is active. Even fields are denoted by a low on BASEFIELD while the odd field is active whenever BASEFIELD is high.

The Acquisition Control register is used to selected some basic capabilities. An acquire will be performed whenever the ACQ bit is high (logic 1). To acquire a half resolution image, ACQ will be high for only one field and the AMODE bit must be set. With AMODE high, each scan line will be sub-sampled by a factor of two. The RR ("rapid reset") control bit is used to reset the vertical timing to the line number contained in the Rapid Restart Position register. Although this bit can be set at any time, the reset will not occur until the end of the current scan line (i.e. the next horizontal blank). This new feature is intended to broaden Cognex's support for asynchronous acquisitions.

5.2.4 Image Display

This section discusses all aspects of video display. These include selecting between available ADMEM buffer resources, address generation, and display.

5.2.4.1 Display Resources

Figure 9 contains the programming model for the display section. The four banks of ADMEM are read out simultaneously. The Cross Point Switch allows any of the four banks to drive each of the RED, GRN (green), BLU (blue), or OVR (overlay) inputs of the RAMDAC. This feature allows ADMEM to support monochrome, pseudo-color, or full color displays, plus a graphics overlay, for display resolutions up to and including VGA. When displaying is SVGA mode, ADMEM can support only monochrome or pseudo-color outputs in conjunction with a graphics overlay plane.

Displaying monochrome or pseudo-color images plus an overlay, or full color images with or without an overlay, requires the extraction of pixels from multiple banks of ADMEM.

Cognex 4800 Video (VM17B)   *Engineering Specification*

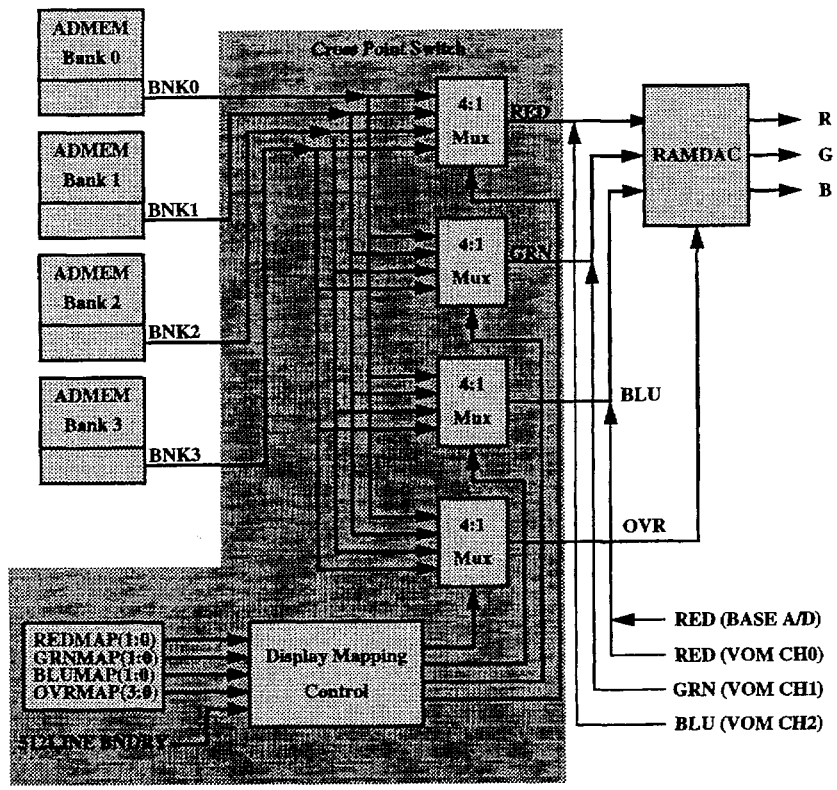

*Figure 9: Display Resource Software Model*

For monochrome or pseudo-color, it is not possible to display an image plus an overlay from the same bank. For true-color, the three different color planes and the overlay must reside in the four separate banks.

The Cross Point Switch drives the RED, GRN, BLU, and OVR inputs to the RAMDAC from four-to-one (4:1) multiplexers. The data paths through these multiplexers are controlled by the REDMAP, GRNMAP, BLUMAP, and OVRMAP configuration registers. This arrangement allows the source of data for the RED, GRN, BLU, and OVR channels to be specified independent of one another.

Part Number 9012-0039   Cognex Confidential

*Cognex 4800 Video (VM17B)*               *Engineering Specification*

The cross-point switch also has a special mode supporting SVGA display. During lines 512 to 599 of an SVGA display, 512LINEBNDRY is asserted by the display address generator. This is effectively OR'ed into REDMAP[0], BLUMAP[0], GRMMAP[0], and OVRMAP[0]. This allows an SVGA image or overlay to be allocated in any pair of banks.

With the exception of supporting the display of half resolution images, the display section does not provide any hardware support for arbitrary image scaling (i.e. pixel replication or sub-sampling) in either the horizontal or vertical direction. Nor does it provide hardware assisted "roaming" (i.e. panning and scrolling) through an image whose acquisition resolution may exceed the display resolution. An example of this would be a 1024 pixel by 1024 line image acquired from a line scan sensor being viewed using an RS-170 display format. However, the reader should note that each 512 pixel by 512 line block of this image (assuming it is monochrome) could be viewed simply by selecting a different quadrant for the source for display.'

In real time display mode, the RED, GRN, and BLU outputs of the CPS are tri-stated and RAMDAC data is sourced from either the baseboard digitizer, VOM digitizer(s), or both. The internal data multiplexing of the RAMDAC allows monochrome, pseudo-color, or full color modes to be supported when using real-time data.

5.2.4.2 Display Address Generator

The display address generator is illustrated in Figure 5 (Memory Address Generator Model). It is controlled by the display timing generator (if installed) or by the acquisition timing generator. It has the ability to generate interlaced or non-interlaced addresses for use during ADMEM display read cycle transfers. It also generates the 512LINEBNDRY signal which is used to dynamically switch to the next higher bank of ADMEM when using SVGA display timing.

Within each back, a display start address allows any buffer within a given bank to be selected for display. Each bank has its' own start address, enhancing the flexibility of ADMEM display capabilities. Refer to figure 6 for some examples of ADMEM image buffers.

Non-interlaced display modes support up to 512 display lines per bank, with larger images supported by the cross point switch dynamic switching between banks.

Interlaced mode modes support up to 512 display lines in a frame (256 per field). The row number starts at 0 in the even field and 1 in the odd field, and increments by 2 from one line to the next within a field.

5.2.4.2.1 Image Display Using ADMEM

The serial ports of all four banks of ADMEM are active simultaneously. During the display of a single line of pixels, the low 10 bits of the address (column address plus byte select) effectively increment one pixel at a time as the display is scanned left to right. There is no carry out of the high bit of column address (9) during this process. Therefore, in order for pixel addresses within a row to be sequential:

- Images with HA up to 256 pixels should start at an address of 0 mod 256

- Images with HA > 256 and up to 512 pixels should start at an address of 0 mod 512

Cognex 4800 Video (VM17B)            Engineering Specification

- Images with HA > 512 and up to 1024 pixels should start at an address of 0 mod 1024

The term "line" rather than "row" is used in this discussion to emphasize that lines correspond to "lines" of the display while the term "row" would refer to a specific VRAM row address. Display lines are numbered sequentially, beginning with the topmost one appearing on the display.

As shown in Table 17, a single 1024 pixel by 512 line bank within ADMEM can be segmented into four (4) equal horizontal regions and two (2) equal vertical regions. This allows a single bank of ADMEM to hold two normal, one wide, or eight half resolution RS-170 or CCIR images.

| ADA18 | ADA(17:10) | ADA(9) | ADA(8) | ADA(7:0) |
|---|---|---|---|---|
| BNKnRA(9) | row address | BNKnCA(9) | BNKnCA(8) | column address |

*Table 17: ADMEM Display Address Mapping*

NOTE

*In order for images to be displayed, the "column address" field in Table 14 must be set to 0.*

Once again refer to Figure 1 for some examples of the type of image buffers which can be created within ADMEM for display.

5.2.4.2.2 Image Display Using AEMEM

Images residing in AEMEM can not be displayed. They must first be copied into ADMEM.

5.2.4.3 Display Timing Generator

Figure 10 contains a block diagram of the optional Display Timing Generator. The Display Timing Generator will be implemented using Xilinx FPGA technology. The goal is to have four (4) configuration files; RS-170, CCIR, VGA, and SVGA. A control bit (DWIDE) will determine whether the line width in RS-170, CCIR, or VGA is 512 or 640 pixels. In the absence of this function, the display timing will be dictated by the Acquisition Timing Generator.

With the Display Timing Generator option installed, a second vertical interrupt, DVINT_L, will be generated at the beginning of each display vertical blank. The DHRST_L, DVRST_L, and DFIELD outputs are used to control the display address generator. Two outputs, MONSYNC0 and MONSYNC1, can be used to provide horizontal and vertical or composite syn- Part Number 9012-0039        Cognex Confidential

Cognex 4800 Video (VM17B)   Engineering Specification chronization for the display. The DACSYNC signal provides composite synchronization information to the RAMDAC. The SCLKEN_L signal is used by the memory timing to generate the VRAM serial port clock.

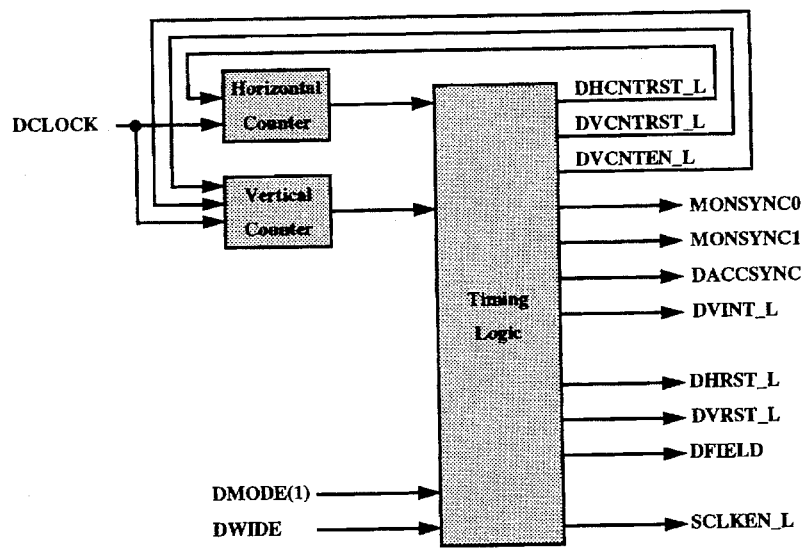

*Figure 10: Display Timing Generator Software Model*

5.2.5 ADMEM Row Address Table (RAT)

Table 18 illustrates the mapping between the Host Bus address and ADMEM. This table shows how the Host Bus can be used to access sub-regions within ADMEM using ADRA(9) and ADCA(9:8).

| HBA(20:19) | HBA(18) | HBA(17:10) | HBA(9) | HBA(8) | HBA(7:0) |
|---|---|---|---|---|---|
| Bank Select | ADRA(9) | Row Address | ADCA(9) | ADCA(8) | Column Address |

*Table 18: Detailed Host Bus ADMEM Address Mapping*

Cognex 4800 Video (VM17B)     Engineering Specification

All images residing in ADMEM can be supported by subsets of a single row address table (RAT). This RAT should start at the address of the start of ADMEM, and increment by 1024 per row for a total of 2048 rows. Individual images can be addressed by means of an X_OFFSET and Y_OFFSET:

```
image -> xoffset = X_OFFSET image -> rat = & RAT[Y_OFFSET]
```

The only exception is that to address the individual fields of an interlaced full-resolution image (e.g. caq_even and caq_odd) a RAT with a double row update of 2048 is needed. Note that 1024 wide x 512 high images (or a subset, like 640 x 480) exactly correspond to physical banks of ADMEM.

Table 19 illustrates the RAT necessary to access any image buffer which might reside in ADMEM. Figure 11 shows the corresponding image buffer locations within ADMEM.

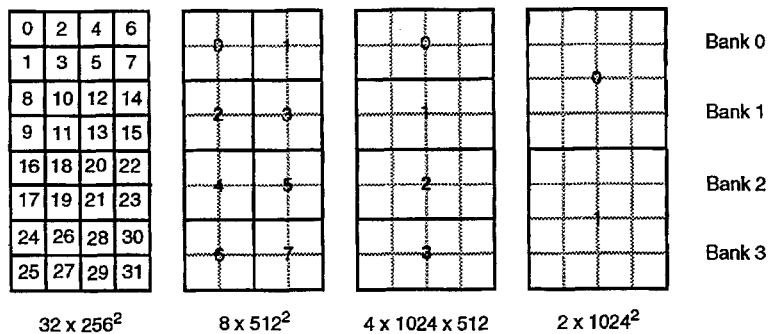

*Figure 11: ADMEM RAT Buffer Allocation*

Cognex 4800 Video (VM17B)     Engineering Specification

| 256² | 512² | 1024x512 | 1024² | ADCA(9:8) | ADRA(9) | X_OFFSET | Y_OFFSET |
|---|---|---|---|---|---|---|---|
| 0 | 0 | 0 | 0 | 0 0 | 0 | 0 | 0 |
| 1 | | | | 0 0 | 1 | 0 | 100 |
| 2 | | | | 0 1 | 0 | 100h | 0 |
| 3 | | | | 0 1 | 1 | 100h | 100 |
| 4 | 1 | | | 1 0 | 0 | 200h | 0 |
| 5 | | | | 1 0 | 1 | 200h | 100h |
| 6 | | | | 1 1 | 0 | 300h | 0 |
| 7 | | | | 1 1 | 1 | 300h | 100h |
| 8 | 2 | 1 | | 0 0 | 0 | 0 | 200h |
| 9 | | | | 0 0 | 1 | 0 | 300h |
| 10 | | | | 0 1 | 0 | 100h | 200h |
| 11 | | | | 0 1 | 1 | 100h | 300h |
| 12 | 3 | | | 1 0 | 0 | 200h | 200h |
| 13 | | | | 1 0 | 1 | 200h | 300h |
| 14 | | | | 1 1 | 0 | 300h | 200h |
| 15 | | | | 1 1 | 1 | 300h | 300h |
| 16 | 4 | 2 | 1 | 0 0 | 0 | 0 | 400h |
| 17 | | | | 0 0 | 1 | 0 | 500h |
| 18 | | | | 0 1 | 0 | 100h | 400h |
| 19 | | | | 0 1 | 1 | 100h | 500h |
| 20 | 5 | | | 1 0 | 0 | 200h | 400h |
| 21 | | | | 1 0 | 1 | 200h | 500h |
| 22 | | | | 1 1 | 0 | 300h | 400h |
| 23 | | | | 1 1 | 1 | 300h | 500h |
| 24 | 6 | 3 | | 0 0 | 0 | 0 | 600h |
| 25 | | | | 0 0 | 1 | 0 | 700h |
| 26 | | | | 0 1 | 0 | 100h | 600h |
| 27 | | | | 0 1 | 1 | 100h | 700h |
| 28 | 7 | | | 1 0 | 0 | 200h | 600h |
| 29 | | | | 1 0 | 1 | 200h | 700h |
| 30 | | | | 1 1 | 0 | 300h | 600h |
| 31 | | | | 1 1 | 1 | 300h | 700h |

*Table 19: ADMEM Row Address Table (RAT)*

Revision A                                          Modified 3/23/94

Cognex 4800 Video (VM17B)   Engineering Specification

5.3 Video Module Configuration Register Map

Table 20 contains the register map for the video module. As noted earlier, the first 256 bytes are reserved for base board registers while the upper 256 bytes are set aside for VOM registers. This table details those registers which reside on the base board. VOM specific register mapping will be covered in the individual VOM software references. The following shorthand notation is used to distinguish between the types of Host Bus access supported for a particular register.

- "RO" is used to denote a "read only" register.
- "WO" is used to denote a "write only" register.
- "RW" is used to denote a "read or write" register.

| HBVA(9:0) | Location | Video Function | Register Name | Type |
|---|---|---|---|---|
| $000_h$ | Base | Configuration | Identification & Revision | RO |
| $004_h$ | Base | Packetizing Logic | Acquisition Packet Packing Control | RW |
| $008_h$ | Base | Packetizing Logic | Acquisition CH0 Source Select | RW |
| $00C_h$ | Base | Packetizing Logic | Acquisition Error | RW |
| $010_h$ | Base | Acquisition | Diagnostic | RW |
| $014_h$ | Base | Address Generator | Display Control | RW |
| $018_h$ | Base | Address Generator | Display Start Address | RW |
| $01C_h$ | Base | Address Generator | Acquisition Address Control | RW |
| $020_h$ | Base | Address Generator | CH0 Start Address Even Low | RW |
| $024_h$ | Base | Address Generator | CH1 Start Address Even Low | RW |
| $028_h$ | Base | Address Generator | CH2 Start Address Even Low | RW |
| $02C_h$ | Base | Address Generator | CH3 Start Address Even Low | RW |
| $030_h$ | Base | Address Generator | CH0 Start Address Even High | RW |
| $034_h$ | Base | Address Generator | CH1 Start Address Even High | RW |
| $038_h$ | Base | Address Generator | CH2 Start Address Even High | RW |
| $03C_h$ | Base | Address Generator | CH3 Start Address Even High | RW |
| $040_h$ | Base | Address Generator | CH0 Start Address Odd Low | RW |
| $044_h$ | Base | Address Generator | CH1 Start Address Odd Low | RW |
| $048_h$ | Base | Address Generator | CH2 Start Address Odd Low | RW |
| $04C_h$ | Base | Address Generator | CH3 Start Address Odd Low | RW |
| $050_h$ | Base | Address Generator | CH0 Start Address Odd High | RW |

*Table 20: Video Configuration Register Map*

Cognex 4800 Video (VM17B)          Engineering Specification

| HBVA(9:0) | Location | Video Function | Register Name | Type |
|---|---|---|---|---|
| $054_h$ | Base | Address Generator | CH1 Start Address Odd High | RW |
| $058_h$ | Base | Address Generator | CH2 Start Address Odd High | RW |
| $05C_h$ | Base | Address Generator | CH3 Start Address Odd High | RW |
| $060_h$ | Base | Address Generator | CH0 Line Index | RW |
| $064_h$ | Base | Address Generator | CH1 Line Index | RW |
| $068_h$ | Base | Address Generator | CH2 Line Index | RW |
| $06C_h$ | Base | Address Generator | CH3 Line Index | RW |
| $070_h$ | Base | Display | RAMDAC Overlay Write Address | RW |
| $074_h$ | Base | Display | RAMDAC Overlay Data Port | RW |
| $078_h$ | Base | Display | RAMDAC Command | RW |
| $07C_h$ | Base | Display | RAMDAC Overlay Read Address | RW |
| $080_h$ | Base | Display | RAMDAC RAM Write Address | RW |
| $084_h$ | Base | Display | RAMDAC RAM Data Port | RW |
| $088_h$ | Base | Display | RAMDAC Pixel Mask | RW |
| $08C_h$ | Base | Display | RAMDAC RAM Read Address | RW |
| $090_h$ | Base | Display | Cross Point Switch Control | RW |
| $094_h$ | Base | Acquisition & Display | Acquisition and Display Clock Frequency Select | WO |
| $098_h$ | Base | Acquisition & Display | Interrupt Enable Mask | RW |
| $09C_h$ | Base | Acquisition & Display | Interrupt Status | RO |
| $0A0_h$ | Base | Acquisition | Digitizer Write & Read Address | RW |
| $0A4_h$ | Base | Acquisition | Digitizer RAM Data Port | RW |
| $0A8_h$ | Base | Acquisition | Digitizer REF and Command Data Port | RW |
| $0AC_h$ | Base | Acquisition Timing | D.C. Restore Position | RW |
| $0B0_h$ | Base | Acquisition Timing | Acquisition Timing Control | RW |
| $0B4_h$ | Base | Acquisition Timing | Acquisition On/Off Control | RW |
| $0B8_h$ | Base | Acquisition Timing | Acquisition Camera Control | RW |
| $0BC_h$ | Base | Acquisition Timing | Rapid Restart Position | RW |
| $0C0_h$ | Base | Acquisition Timing | Line Interrupt Position | RW |
| $0C4_h$ | Base | Acquisition Timing | Horizontal Frequency Adjustment | RW |
| $0C8_h$ | Base | Acquisition Timing | Acquisition Line Number | RO |
| $0CC_h$ | Base | Display Timing | Display Timing Control | RW |
| $0D0_h$ | Base | Display | Real-Time Display Data Path Control | RW |
| $0D4_h$ | Base | Display Timing | Display Line Number | RO |

Table 20: *Video Configuration Register Map*

Revision A          Modified 3/23/94

Cognex 4800 Video (VM17B)          Engineering Specification

| HBVA(9:0) | Location | Video Function | Register Name | Type |
|---|---|---|---|---|
| 0D8$_h$ | Base | Xilinx Programming | Xilinx Configuration Control & Status | RW |
| 0DC$_h$ | Base | Xilinx Programming | PKTCNTL Xilinx Data Port | WO |
| 0E0$_h$ | Base | Xilinx Programming | AHADDRGEN Xilinx Data Port | WO |
| 0E4$_h$ | Base | Xilinx Programming | ADADDRGEN Xilinx Data Port | WO |
| 0E8$_h$ | Base | Xilinx Programming | ACQTIMING Xilinx Data Port | WO |
| 0EC$_h$ | Base | Xilinx Programming | DPLYTIMING Xilinx Data Port | WO |
| 0F0$_h$-0FC$_h$ | Base | | | |
| 100$_h$ | VOM | Configuration | Identification & Revision | RO |
| 104$_h$-1FC$_h$ | VOM | Configuration | VOM Specific | |

*Table 20: Video Configuration Register Map*

5.4 Register Description

This section will describe each of the video base board registers in detail.

5.4.1 Identification & Revision (HBVA = BA + 000$_h$, RO)

This 16-bit register is divided into two 4-bit fields, ID(3:0) and REV(3:0). The identification field, ID, will be used to distinguish between different types of video base boards, should additional versions be required in the future. The revision field, REV, will contain indicate the current revision level of the base board. This field will be capable of being updated, allowing a module which has been legally updated via the ECO process to have its' revision number reflect the current functionality.

HBVA(23:0) = BA + 000$_h$

| Bit 31 | Bit 30 | Bit 29 | Bit 28 | Bit 27 | Bit 26 | Bit 25 | Bit 24 |
|---|---|---|---|---|---|---|---|
| REV3 | REV2 | REV1 | REV0 | ID3 | ID2 | ID1 | ID0 |

*Figure 12: Baseboard Identification and Revision Register*

The current values for these two fields are:

- ID(3:0) = 0001

- REV(3:0) = 1010 (Revision A) or 0001(Revision 1.0 and 2.0 prototypes)

5.4.2 Acquisition Packet Packing Control (HBVA = BA + 004$_h$, RW)

This lower 4 bits of this register, CH(3:0)DIR, control the method used to "pack" 8 bit pixels into 32 long words. The available packing schemes are big endian (i.e. Motorola) and little endian (i.e. Intel). This feature allows the video memory architecture to be compatible with Part Number 9012-0039          Cognex Confidential

Cognex 4800 Video (VM17B)　　　　　　　　Engineering Specification either standard. In addition, it is used to allow data acquired using reverse horizontal scanning (i.e right to left rather than left to right) to be properly packed into long words. Bits 4 through 7 are indeterminate and should be masked during read operations.

HBVA(23:0) = BA + 004$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| Unused | Unused | Unused | Unused | CH3DIR | CH2DIR | CH1DIR | CH0DIR |

*Figure 13: Acquisition Packing Control Register*

Figure 14 and Figure 15 illustrate the two packing schemes. Table 21 shows how each channel can be set to either packing scheme.

| MEMD(31:24) | MEMD(23:16) | MEMD(15:8) | MEMD(7:0) |
|-------------|-------------|------------|-----------|
| Pixel (N)   | Pixel (N+1) | Pixel (N+2)| Pixel (N+3)|

*Figure 14: Big-Endian Pixel Packing*

| MEMD(31:24) | MEMD(23:16) | MEMD(15:8) | MEMD(7:0) |
|-------------|-------------|------------|-----------|
| Pixel (N+3) | Pixel (N+2) | Pixel (N+1)| Pixel (N) |

*Figure 15: Little-Endian Pixel Packing*

| CHnDIR | Pixel Packing |
|--------|---------------|
| 0      | Big Endian    |
| 1      | Little Endian |

*Table 21: Pixel Packing Control (CH3DIR, CH2DIR, CH1DIR, and CH0DIR)*

5.4.3 Acquisition CH0 Source Select (HBVA = BA + 008$_h$, RW)

Bit 4, CH0SEL is used to determine whether or not acquisition channel 0 is being controlled by the base board video timing or by channel 3 of a video option module. Bit 7, CH0RES, is used to inform the packet timing whether a full or half resolution acquire is intended. In half resolution, every other pixel in a given line is loaded into memory. Note that this bit only controls the packetizing logic. In order to perform a half resolution acquire parameters in the acquisition timing logic and the acquisition address generator must also be set correctly.

Cognex 4800 Video (VM17B)           *Engineering Specification*

HBVA(23:0) = BA + 008$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| CH0RES | Unused | Unused | CH0SEL | Unused | Unused | Unused | Unused |

*Figure 16: Acquisition CH0 Source Select Register*

Bits 0 through 3 and 5 through 6 are indeterminate and should be masked during read operations.

| CH0SEL | Channel 0 Timing Source |
|--------|-------------------------|
| 0 | Base Video |
| 1 | VOM Channel 3 |

*Table 22: Acquisition Channel 0 Video Timing Source Select (CH0SEL)*

| CH0RES | Channel 0 Resolution |
|--------|----------------------|
| 0 | Full |
| 1 | Half |

*Table 23: Acquisition Channel 0 Video Timing Source Select (CH0SEL)*

5.4.4 Acquisition Error (HBVA = BA + 00C$_h$, RW)

Bits 5 and 6 are used to by the built-in overrun error checking logic. Bit 6, ERR, will be set high (logic 1) whenever any acquisition channel overruns. An overrun is defined by the maximum number of packets which can be held in the acquisition FIFOs, which is 7. This condition should only occur if the aggregate normalized video bandwidth exceeds the 40MHz specification. The ERR bit is enabled whenever CLRERR is low. Once an error has occurred, ERR will remain high (logic 1) until CLRERR is written to a logic 1, at which time ERR will be reset low (logic 0). The ERR bit is read-only while. Bits 0 through 4 and bit 7 are indeterminate and should be masked during read operations.

HBVA(23:0) = BA + 00C$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| Unused | ERR | CLRERR | Unused | Unused | Unused | Unused | Unused |

*Figure 17: Acquisition Error Register*

Cognex 4800 Video (VM17B)  Engineering Specification

5.4.5 Diagnostic (HBVA = BA + 010$_h$, RW)

This register controls some special diagnostic functions. The LPBACK (loop-back) bit can be used in conjunction with the Real-Time Display Data Path Control register (BA + 0D0) to allow the RED(7:0) output of the display cross point switch to be connected to the baseboard packetizing logic. This path will enable the diagnostics to perform more sophisticated acquisition testing. For example a synthetic data pattern written into ADMEM Bank0 could be acquired into ADMEM Bank1, Bank2, or Bank3. Diagnostic loop back mode is enabled by setting LPBACK high with RTRED and RTREDSEL both low. The last two bits are located in the Real-Time Display Data Path Control register (BA + 0D0).

THE FUSEOK bit is designed to monitor the output of the 12 VDV camera power fuse. When this bit is a logic 1, the fuse is operational and power is being supplied to the camera. A logic zero reading for the FUSEOK bit indicates that the fuse is blown.

HBVA(23:0) = BA + 010$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| Unused | Unused | Unused | Unused | Unused | Unused | FUSEOK | LPBACK |

*Figure 18: Diagnostic Register*

5.4.6 Display Control (HBVA = BA +014$_h$, RW)

Two bits, DHRES and DNI are used to configure the display timing and addressing for normal or half resolution and interlaced or non-interlaced respectively. DHRES is used by the memory timing generator and causes pixels to be replicated twice (x2 horizontal zoom) when the DHRES bit. DNI affects the calculation of the display line address. When DNI is zero (interlaced) the address increments by 2 and the least significant address is the current field. When DNI is one the address increments by 1 and the field is a don't care. The functionality of these bits is described in Table 24.

HBVA(23:0) = BA + 014$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| Unused | Unused | Unused | Unused | Unused | Unused | Unused | Unused |
| Bit 23 | Bit 22 | Bit 21 | Bit 20 | Bit 19 | Bit 18 | Bit 17 | Bit 16 |
| Unused | Unused | DHRES | DNI | Unused | Unused | Unused | Unused |

*Figure 19: Display Control Register*

Cognex 4800 Video (VM17B)      Engineering Specification

| DNI | DHRES | Display Mode |
|---|---|---|
| 0 | 0 | interlaced, full resolution |
| 0 | 1 | interlaced half resolution |
| 1 | 0 | non-interlaced full resolution |
| 1 | 1 | non-interlaced half resolution |

*Table 24: Display Interlace Mode and Resolution Select (DNI, DHRES)*

5.4.7 Display Start Address (HBVA = BA +018$_h$, RW)

Bits 0 thru 11 of this register control the display start address on a bank by bank basis by allowing the 2 most significant column (CA) and the most significant row (RA) addresses to be preset. This feature allows either of 2 normal (i.e. 512 pixel wide) images to be selected for display on a per bank basis. One of up to 8 half resolution images could also be selected. Since each bank can be controlled independently, normal width or half resolution full color images need not reside within the same area for all banks.

HBVA(23:0) = BA + 018$_h$

| Bit 31 | Bit 30 | Bit 29 | Bit 28 | Bit 27 | Bit 26 | Bit 25 | Bit 24 |
|---|---|---|---|---|---|---|---|
| B2CA9 | B2CA8 | B1RA18 | B1CA9 | B1CA8 | B0RA18 | B0CA9 | B0CA8 |
| Bit 23 | Bit 22 | Bit 21 | Bit 20 | Bit 19 | Bit 18 | Bit 17 | Bit 16 |
| Unused | Unused | Unused | Unused | B3RA18 | B3CA9 | B3CA8 | B2RA18 |

*Figure 20: Display Start Address Register*

5.4.8 Acquisition Address Generator Control (HBVA = BA + 01C$_h$, RW)

The register is comprised of two fields, CH(3:0)PS and CH(3:0)LS, which control the "direction" of AEMEM and ADMEM addresses during acquisition.

HBVA(23:0) = BA + 01C$_h$

| Bit 31 | Bit 30 | Bit 29 | Bit 28 | Bit 27 | Bit 26 | Bit 25 | Bit 24 |
|---|---|---|---|---|---|---|---|
| CH3LS | CH2LS | CH1LS | CH0LS | CH3PS | CH2PS | CH1PS | CH0PS |

*Figure 21: Acquisition Address Control Register*

Part Number 9012-0039      Cognex Confidential

Cognex 4800 Video (VM17B)　　　　　　　　　　　　Engineering Specification

Four "directions" are supported allowing either memory to support the following image scanning formats:

- left to right/top to bottom (incrementing x/incrementing y)
- right to left/top to bottom (decrementing x/incrementing y)
- left to right/bottom to top (incrementing x/decrementing y)
- right to left/bottom to top (decrementing x/decrementing y)

where the first (left to right/top to bottom) supports the typical RS-170/CCIR raster image. The "PS" (pixel scan) bits control the direction of the scanning for within any line while the "LS" (line scan) bits determine the direction of subsequent lines. The pixel and line scan mode can be set on a per channel basis. Table 25 summarizes the impact of these bits on each channel's acquisition address.

| CHnLS | CHnPS | Addressing Mode |
|---|---|---|
| 0 | 0 | incrementing x, incrementing y |
| 0 | 1 | decrementing x, incrementing y |
| 1 | 0 | incrementing x, decrementing y |
| 1 | 1 | decrementing x, decrementing y |

*Table 25: Acquisition Address Scan Mode Control (CHnLS, CHnPS)*

5.4.9 CH0 Start Address Even Low (HBVA = BA + 020$_h$, RW)

This register holds the low word (i.e. bits 0 thru 15) of the even field start address for acquisition channel 0. The complete starting address is determined by concatenating this register with the CH0 Start Address Even High register.

HBVA(23:0) = BA + 020$_h$

| Bit 31 | Bit 30 | Bit 29 | Bit 28 | Bit 27 | Bit 26 | Bit 25 | Bit 24 |
|---|---|---|---|---|---|---|---|
| C0SE15 | C0SE14 | C0SE13 | C0SE12 | C0SE11 | C0SE10 | C0SE9 | C0SE8 |
| Bit 23 | Bit 22 | Bit 21 | Bit 20 | Bit 19 | Bit 18 | Bit 17 | Bit 16 |
| C0SE7 | C0SE6 | C0SE5 | 0 | 0 | 0 | 0 | 0 |

*Figure 22: Acquisition Channel 0 Memory Start Address Register (Even/Low)*

Cognex 4800 Video (VM17B)          Engineering Specification

*5.4.10 CH1 Start Address Even Low (HBVA = BA + 024$_h$, RW)*

This register holds the low word (i.e. bits 0 thru 15) of the even field start address for acquisition channel 1. The complete starting address is determined by concatenating this register with the CH1 Start Address Even High register.

HBVA(23:0) = BA + 024$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| C1SE15 | C1SE14 | C1SE13 | C1SE12 | C1SE11 | C1SE10 | C1SE9  | C1SE8  |
| Bit 23 | Bit 22 | Bit 21 | Bit 20 | Bit 19 | Bit 18 | Bit 17 | Bit 16 |
| C1SE7  | C1SE6  | C1SE5  | 0      | 0      | 0      | 0      | 0      |

*Figure 23: Acquisition Channel 1 Memory Start Address Register (Even/Low)*

*5.4.11 CH2 Start Address Even Low (HBVA = BA +028$_h$, RW)*

This register holds the low word (i.e. bits 0 thru 15) of the even field start address for acquisition channel 2. The complete starting address is determined by concatenating this register with the CH2 Start Address Even High register.

HBVA(23:0) = BA + 028$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| C2SE15 | C2SE14 | C2SE13 | C2SE12 | C2SE11 | C2SE10 | C2SE9  | C2SE8  |
| Bit 23 | Bit 22 | Bit 21 | Bit 20 | Bit 19 | Bit 18 | Bit 17 | Bit 16 |
| C2SE7  | C2SE6  | C2SE5  | 0      | 0      | 0      | 0      | 0      |

*Figure 24: Acquisition Channel 2 Memory Start Address Register (Even/Low)*

*5.4.12 CH3 Start Address Even Low (HBVA = BA + 02C$_h$, RW)*

This register holds the low word (i.e. bits 0 thru 15) of the even field start address for acquisition channel 3. The complete starting address is determined by concatenating this register with the CH3 Start Address Even High register.

*Cognex 4800 Video (VM17B)*  *Engineering Specification*

HBVA(23:0) = BA + 02C$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| C3SE15 | C3SE14 | C3SE13 | C3SE12 | C3SE11 | C3SE10 | C3SE9  | C3SE8  |
| Bit 23 | Bit 22 | Bit 21 | Bit 20 | Bit 19 | Bit 18 | Bit 17 | Bit 16 |
| C3SE7  | C3SE6  | C3SE5  | 0      | 0      | 0      | 0      | 0      |

*Figure 25: Acquisition Channel 3 Memory Start Address Register (Even/Low)*

5.4.13 CH0 Start Address Even High (HBVA = BA + 030$_h$, RW)

This register holds the high word (i.e. bits16 thru 25) of the even field start address for acquisition channel 0. The complete starting address is determined by concatenating this register with the CH0 Start Address Even Low register.

HBVA(23:0) = BA + 030$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| 0      | 0      | 0      | 0      | 0      | 0      | C0SE25 | C0SE24 |
| Bit 24 | Bit 23 | Bit 22 | Bit 21 | Bit 20 | Bit 19 | Bit 18 | Bit 17 |
| C0SE23 | C0SE22 | C0SE21 | C0SE20 | C0SE19 | C0SE18 | C0SE17 | C0SE16 |

*Figure 26: Acquisition Channel 0 Memory Start Address Register (Even/High)*

5.4.14 CH1 Start Address Even High (HBVA = BA + 034$_h$, RW)

This register holds the high word (i.e. bits16 thru 25) of the even field start address for acquisition channel 1. The complete starting address is determined by concatenating this register with the CH1 Start Address Even Low register.

HBVA(23:0) = BA + 034$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| 0      | 0      | 0      | 0      | 0      | 0      | C1SE25 | C1SE24 |
| Bit 24 | Bit 23 | Bit 22 | Bit 21 | Bit 20 | Bit 19 | Bit 18 | Bit 17 |
| C1SE23 | C1SE22 | C1SE21 | C1SE20 | C1SE19 | C1SE18 | C1SE17 | C1SE16 |

*Figure 27: Acquisition Channel 1 Memory Start Address Register (Even/High)*

Revision A  Modified 3/23/94

Cognex 4800 Video (VM17B)            Engineering Specification

5.4.15 CH2 Start Address Even High (HBVA = BA + 038$_h$, RW)

This register holds the high word (i.e. bits16 thru 25) of the even field start address for acquisition channel 20. The complete starting address is determined by concatenating this register with the CH2 Start Address Even Low register.

HBVA(23:0) = BA + 038$_h$

| Bit 31 | Bit 30 | Bit 29 | Bit 28 | Bit 27 | Bit 26 | Bit 25 | Bit 24 |
|---|---|---|---|---|---|---|---|
| 0 | 0 | 0 | 0 | 0 | 0 | C2SE25 | C2SE24 |

| Bit 24 | Bit 23 | Bit 22 | Bit 21 | Bit 20 | Bit 19 | Bit 18 | Bit 17 |
|---|---|---|---|---|---|---|---|
| C2SE23 | C2SE22 | C2SE21 | C2SE20 | C2SE19 | C2SE18 | C2SE17 | C2SE16 |

*Figure 28: Acquisition Channel 2 Memory Start Address Register (Even/High)*

5.4.16 CH3 Start Address Even High (HBVA = BA + 03C$_h$, RW)

This register holds the high word (i.e. bits16 thru 25) of the even field start address for acquisition channel 3. The complete starting address is determined by concatenating this register with the CH3 Start Address Even Low register.

HBVA(23:0) = BA + 03C$_h$

| Bit 31 | Bit 30 | Bit 29 | Bit 28 | Bit 27 | Bit 26 | Bit 25 | Bit 24 |
|---|---|---|---|---|---|---|---|
| 0 | 0 | 0 | 0 | 0 | 0 | C3SE25 | C3SE24 |

| Bit 24 | Bit 23 | Bit 22 | Bit 21 | Bit 20 | Bit 19 | Bit 18 | Bit 17 |
|---|---|---|---|---|---|---|---|
| C3SE23 | C3SE22 | C3SE21 | C3SE20 | C3SE19 | C3SE18 | C3SE17 | C3SE16 |

*Figure 29: Acquisition Channel 3 Memory Start Address Register (Even/High)*

5.4.17 CH0 Start Address Odd Low (HBVA = BA + 040$_h$, RW)

This register holds the low word (i.e. bits 0 thru 15) of the odd field start address for acquisition channel 0. The complete starting address is determined by concatenating this register with the CH0 Start Address Odd High register.

Cognex 4800 Video (VM17B)                  Engineering Specification

HBVA(23:0) = BA + 040$_h$

| Bit 31 | Bit 30 | Bit 29 | Bit 28 | Bit 27 | Bit 26 | Bit 25 | Bit 24 |
|---|---|---|---|---|---|---|---|
| C0SO15 | C0SO14 | C0SO13 | C0SO12 | C0SO11 | C0SO10 | C0SO9 | C0SO8 |
| Bit 23 | Bit 22 | Bit 21 | Bit 20 | Bit 19 | Bit 18 | Bit 17 | Bit 16 |
| C0SO7 | C0SO6 | C0SO5 | 0 | 0 | 0 | 0 | 0 |

*Figure 30: Acquisition Channel 0 Memory Start Address Register (Odd/Low)*

5.4.18 CH1 Start Address Odd Low (HBVA = BA + 044$_h$, RW)

This register holds the low word (i.e. bits 0 thru 15) of the odd field start address for acquisition channel 1. The complete starting address is determined by concatenating this register with the CH1 Start Address Odd High register.

HBVA(23:0) = BA + 044$_h$

| Bit 31 | Bit 30 | Bit 29 | Bit 28 | Bit 27 | Bit 26 | Bit 25 | Bit 24 |
|---|---|---|---|---|---|---|---|
| C1SO15 | C1SO14 | C1SO13 | C1SO12 | C1SO11 | C1SO10 | C1SO9 | C1SO8 |
| Bit 23 | Bit 22 | Bit 21 | Bit 20 | Bit 19 | Bit 18 | Bit 17 | Bit 16 |
| C1SO7 | C1SO6 | C1SO5 | 0 | 0 | 0 | 0 | 0 |

*Figure 31: Acquisition Channel 1 Memory Start Address Register (Odd/Low)*

5.4.19 CH2 Start Address Odd Low (HBVA = BA + 048$_h$, RW)

This register holds the low word (i.e. bits 0 thru 15) of the odd field start address for acquisition channel 2. The complete starting address is determined by concatenating this register with the CH2 Start Address Odd High register.

HBVA(23:0) = BA + 048$_h$

| Bit 31 | Bit 30 | Bit 29 | Bit 28 | Bit 27 | Bit 26 | Bit 25 | Bit 24 |
|---|---|---|---|---|---|---|---|
| C2SO15 | C2SO14 | C2SO13 | C2SO12 | C2SO11 | C2SO10 | C2SO9 | C2SO8 |
| Bit 23 | Bit 22 | Bit 21 | Bit 20 | Bit 19 | Bit 18 | Bit 17 | Bit 16 |
| C2SO7 | C2SO6 | C2SO5 | 0 | 0 | 0 | 0 | 0 |

*Figure 32: Acquisition Channel 2 Memory Start Address Register (Odd/Low)*

Cognex 4800 Video (VM17B)     Engineering Specification

*5.4.20 CH3 Start Address Odd Low (HBVA = BA + 04C$_h$, RW)*

This register holds the low word (i.e. bits 0 thru 15) of the odd field start address for acquisition channel 3. The complete starting address is determined by concatenating this register with the CH3 Start Address Odd High register.

HBVA(23:0) = BA + 04C$_h$

| Bit 31 | Bit 30 | Bit 29 | Bit 28 | Bit 27 | Bit 26 | Bit 25 | Bit 24 |
|---|---|---|---|---|---|---|---|
| C3SO15 | C3SO14 | C3SO13 | C3SO12 | C3SO11 | C3SO10 | C3SO9 | C3SO8 |
| Bit 23 | Bit 22 | Bit 21 | Bit 20 | Bit 19 | Bit 18 | Bit 17 | Bit 16 |
| C3SO7 | C3SO6 | C3SO5 | 0 | 0 | 0 | 0 | 0 |

*Figure 33: Acquisition Channel 3 Memory Start Address Register (Odd/Low)*

*5.4.21 CH0 Start Address Odd High (HBVA = BA + 050$_h$, RW)*

This register holds the high word (i.e. bits 16 thru 25) of the odd field start address for acquisition channel 0. The complete starting address is determined by concatenating this register with the CH0 Start Address Odd Low register.

HBVA(23:0) = BA + 050$_h$

| Bit 31 | Bit 30 | Bit 29 | Bit 28 | Bit 27 | Bit 26 | Bit 25 | Bit 24 |
|---|---|---|---|---|---|---|---|
| 0 | 0 | 0 | 0 | 0 | 0 | C0SO25 | C0SO24 |
| Bit 23 | Bit 22 | Bit 21 | Bit 20 | Bit 19 | Bit 18 | Bit 17 | Bit 16 |
| C0SO23 | C0SO22 | C0SO21 | C0SO20 | C0SO19 | C0SO18 | C0SO17 | C0SO16 |

*Figure 34: Acquisition Channel 0 Memory Start Address Register (Odd/High)*

*5.4.22 CH1 Start Address Odd High (HBVA = BA + 054$_h$, RW)*

This register holds the high word (i.e. bits 16 thru 25) of the odd field start address for acquisition channel 1. The complete starting address is determined by concatenating this register with the CH1 Start Address Odd Low register.

Cognex 4800 Video (VM17B)     Engineering Specification

HBVA(23:0) = BA + 054$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| 0 | 0 | 0 | 0 | 0 | 0 | C1SO25 | C1SO24 |
| Bit 23 | Bit 22 | Bit 21 | Bit 20 | Bit 19 | Bit 18 | Bit 17 | Bit 16 |
| C1SO23 | C1SO22 | C1SO21 | C1SO20 | C1SO19 | C1SO18 | C1SO17 | C1SO16 |

*Figure 35: Acquisition Channel 1 Memory Start Address Register (Odd/High)*

5.4.23 CH2 Start Address Odd High (HBVA = BA + 058$_h$, RW)

This register holds the high word (i.e. bits 16 thru 25) of the odd field start address for acquisition channel 2. The complete starting address is determined by concatenating this register with the CH2 Start Address Odd Low register.

HBVA(23:0) = BA + 058$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| 0 | 0 | 0 | 0 | 0 | 0 | C2SO25 | C2SO24 |
| Bit 23 | Bit 22 | Bit 21 | Bit 20 | Bit 19 | Bit 18 | Bit 17 | Bit 16 |
| C2SO23 | C2SO22 | C2SO21 | C2SO20 | C2SO19 | C2SO18 | C2SO17 | C2SO16 |

*Figure 36: Acquisition Channel 2 Memory Start Address Register (Odd/High)*

5.4.24 CH3 Start Address Odd High (HBVA = BA + 05C$_h$, RW)

This register holds the high word (i.e. bits 16 thru 25) of the odd field start address for acquisition channel 3. The complete starting address is determined by concatenating this register with the CH3 Start Address Odd Low register.

HBVA(23:0) = BA + 05C$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| 0 | 0 | 0 | 0 | 0 | 0 | C3SO25 | C3SO24 |
| Bit 23 | Bit 22 | Bit 21 | Bit 20 | Bit 19 | Bit 18 | Bit 17 | Bit 16 |
| C3SO23 | C3SO22 | C3SO21 | C3SO20 | C3SO19 | C3SO18 | C3SO17 | C3SO16 |

*Figure 37: Acquisition Channel 3 Memory Start Address Register (Odd/High)*

Cognex 4800 Video (VM17B)          *Engineering Specification*

5.4.25 CH0 Line Index (HBVA = BA + 060$_h$, RW)

This register is used to specify the line index parameter required by the Address Generator for channel 0.

HBVA(23:0) = BA + 060$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| Unused | Unused | Unused | Unused | C0LI11 | C0LI10 | C0LI9 | C0LI8 |
| Bit 23 | Bit 22 | Bit 21 | Bit 20 | Bit 19 | Bit 18 | Bit 17 | Bit 16 |
| C0LI7 | C0LI6 | C0LI5 | 0 | 0 | 0 | 0 | 0 |

*Figure 38: Acquisition Channel 0 Line Index Register*

5.4.26 CH1 Line Index (HBVA = BA + 064$_h$, RW)

This register is used to specify the line index parameters required by the Address Generator for channel 1.

HBVA(23:0) = BA + 064$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| Unused | Unused | Unused | Unused | C1LI11 | C1LI10 | C1LI9 | C1LI8 |
| Bit 23 | Bit 22 | Bit 21 | Bit 20 | Bit 19 | Bit 18 | Bit 17 | Bit 16 |
| C1LI7 | C1LI6 | C1LI5 | 0 | 0 | 0 | 0 | 0 |

*Figure 39: Acquisition Channel 1 Line Index Register*

5.4.27 CH2 Line Index (HBVA = BA + 068$_h$, RW)

This register is used to specify the line index parameters required by the Address Generator for channel 2.

HBVA(23:0) = BA + 068$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| Unused | Unused | Unused | Unused | C2LI11 | C2LI10 | C2LI9 | C2LI8 |
| Bit 23 | Bit 22 | Bit 21 | Bit 20 | Bit 19 | Bit 18 | Bit 17 | Bit 16 |
| C2LI7 | C2LI6 | C2LI5 | 0 | 0 | 0 | 0 | 0 |

*Figure 40: Acquisition Channel 2 Line Index Register*

Cognex 4800 Video (VM17B)               Engineering Specification

5.4.28 CH3 Line Index (HBVA = BA + 06C$_h$, RW)

This register is used to specify the line index parameters required by the Address Generator for channel 3.

HBVA(23:0) = BA + 06C$_h$

| Bit 31 | Bit 30 | Bit 29 | Bit 28 | Bit 27 | Bit 26 | Bit 25 | Bit 24 |
|---|---|---|---|---|---|---|---|
| Unused | Unused | Unused | Unused | C3LI11 | C3LI10 | C3LI9 | C3LI8 |
| Bit 23 | Bit 22 | Bit 21 | Bit 20 | Bit 19 | Bit 18 | Bit 17 | Bit 16 |
| C3LI7 | C3LI6 | C3LI5 | 0 | 0 | 0 | 0 | 0 |

*Figure 41: Acquisition Channel 3 Line Index Register*

NOTE

*The 4800 uses the same RAMDAC currently supported on the 4400 product, the Brooktree BT473. Therefore, when reading Sections 5.4.29 through 5.4.36 keep in mind that the lower level software drivers already exist.*

5.4.29 RAMDAC Overlay Write Address (HBVA = BA + 070$_h$, RW)

This 4-bit register specifies the next overlay location to be loaded. For each write to this register, three writes to the overlay data port are required, one each for the red, green, and blue overlays. When updating multiple overlay table locations, this register need only be loaded with first location to be changed. It will automatically increment after the third write to overlay data port. When performing the write cycles to the overlay data port, keep in mind that the order should be red data, followed by green data, followed by blue data.

HBVA(23:0) = BA + 070$_h$

| Bit 31 | Bit 30 | Bit 29 | Bit 28 | Bit 27 | Bit 26 | Bit 25 | Bit 24 |
|---|---|---|---|---|---|---|---|
| Unused | Unused | Unused | Unused | OWA3 | OWA2 | OWA1 | OWA0 |

*Figure 42: RAMDAC Overlay Write Address Register*

Cognex 4800 Video (VM17B)                Engineering Specification

| OWA(3:0) | Overlay Selected |
|---|---|
| 0 | Reserved |
| 1 | Overlay Color 1 |
| 2 | Overlay Color 2 |
| ⋮ | ⋮ |
| $D_h$ | Overlay Color 13 |
| $E_h$ | Overlay Color 14 |
| $F_h$ | Overlay Color 15 |

*Table 26: RAMDAC OWA(3:0) Bits*

5.4.30 RAMDAC Overlay Data Port (HBVA = BA + 074$_h$, RW)

This 8-bit data port is used to write to or read from the overlay planes. For each write to the overlay write address register, three write cycles to this data port are required, one each for the red, green, and blue planes. When writing to multiple overlay planes, this data port can be used to load all the necessary data once the starting address has been loaded into the overlay write address register.

HBVA(23:0) = BA + 074$_h$

| Bit 31 | Bit 30 | Bit 29 | Bit 28 | Bit 27 | Bit 26 | Bit 25 | Bit 24 |
|---|---|---|---|---|---|---|---|
| RRA7 | RRA6 | RRA5 | RRA4 | RRA3 | RRA2 | RRA1 | RRA0 |

*Figure 43: RAMDAC Overlay Data Port*

For each write to overlay read address register, three read cycles to this data port are required, one each for the red, green, and blue RAMs. When reading from multiple overlay planes, this data port can be used to access all the necessary data once the starting address has been loaded into the overlay read address register.

5.4.31 RAMDAC Command (HBVA = BA 078$_h$, RW)

This register is used to configure the RAMDAC. Bit 3 is not used but should be set to zero. Graphic overlays are enabled by setting bit 2, OVREN, high. They are disabled whenever OVREN is low. The other bit fields, S, RES, BLNPED, and CLRM(1:0) are described in Table 27, Table 28, and Table 29.

Part Number 9012-0039            Cognex Confidential

Cognex 4800 Video (VM17B)  Engineering Specification

HBVA(23:0) = BA + 078h

| Bit 31 | Bit 30 | Bit 29 | Bit 28 | Bit 27 | Bit 26 | Bit 25 | Bit 24 |
|--------|--------|--------|--------|--------|--------|--------|--------|
| CLRM1  | CLRM0  | BLNPED | RES    | 0      | OVREN  | S1     | S0     |

*Figure 44: RAMDAC Command Register*

| RES | RAMDAC Resolution |
|-----|-------------------|
| 0   | 6 bits            |
| 1   | 8 bits            |

*Table 27: RAMDAC RES Bit*

| BLNPED | Blanking Pedestal Level |
|--------|-------------------------|
| 0      | 0.0 IRE                 |
| 1      | 7.5 IRE                 |

*Table 28: RAMDAC BLNPED Bit*

| S(1:0) | CLRM(1:0) | Color Mode |
|--------|-----------|------------|
| 0      | 0         | 24 bit RGB w/ LUT |
| 1      | 1         | 24 bit RGB w/o LUT |
| 2      | 0         | 8 bit pseudo color (R) |
|        | 1         | 8 bit pseudo color (G) |
|        | 2         | 8 bit pseudo color (B) |
|        | 3         | reserved |
| 3      | 0 - 3     | reserved (reduced resolution color bypass modes) |

*Table 29: RAMDAC CLRM(1:0) Bits*

Cognex 4800 Video (VM17B)     Engineering Specification

5.4.32 RAMDAC Overlay Read Address (HBVA = BA + 07C$_h$, RW)

This 4-bit register specifies the next overlay location to be read. For each write to this register, three reads of the overlay data port are required, one each for the red, green, and blue overlays. When accessing multiple overlay table locations, this register need only be loaded with first location. It will automatically increment after the third read of the overlay data port. When performing the read cycles of the overlay data port, keep in mind that the order will be red data, followed by green data, followed by blue data.

HBVA(23:0) = BA + 07C$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| Unused | Unused | Unused | Unused | ORA3   | ORA2   | ORA1   | ORA0   |

*Figure 45: RAMDAC Overlay Read Address Register*

| ORA(3:0) | Overlay Selected |
|----------|------------------|
| 0        | Reserved         |
| 1        | Overlay Color 1  |
| 2        | Overlay Color 2  |
| ⋮        | ⋮                |
| D$_h$    | Overlay Color 13 |
| E$_h$    | Overlay Color 14 |
| F$_h$    | Overlay Color 15 |

*Table 30: RAMDAC ORA(3:0) Bits*

5.4.33 RAMDAC RAM Write Address (HBVA = BA + 080$_h$, RW)

This 8-bit register specifies the next color palette RAM address to be loaded. For each write to this register, three writes to the color palette data port are required, one each for the red, green, and blue RAMs. When updating large blocks of the color palette RAMs, this register need only be loaded with the first location to be changed. It will automatically increment after the third write to the color palette RAMs. When performing the write cycles to the color palette RAMs, keep in mind that the order should be red data, followed by green data, followed by blue data.

Part Number 9012-0039     Cognex Confidential

Cognex 4800 Video (VM17B)    Engineering Specification

HBVA(23:0) = BA + 080$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| RWA7 | RWA6 | RWA5 | RWA4 | RWA3 | RWA2 | RWA1 | RWA0 |

*Figure 46: RAMDAC Color Palette RAM Write Address Register*

| RWA(7:0) | Color Palette Selected |
|----------|------------------------|
| 00$_h$ | RGB Address 0 |
| 01$_h$ | RGB Address 1 |
| 02$_h$ | RGB Address 2 |
| . . | . . |
| FD$_h$ | RGB Address 253 |
| FE$_h$ | RGB Address 254 |
| FF$_h$ | RGB Address 255 |

*Table 31: RAMDAC RWA(7:0) Bits*

5.4.34 RAMDAC RAM Data Port (HBVA = BA + 084$_h$, RW)

This 8-bit data port is used to write to or read from the color palette RAMs. For each write to RAM write address register, three write cycles to this data port are required, one each for the red, green, and blue RAMs. When writing to large blocks of the color palette RAMs, this data port can be used to load all the necessary data once the starting address has been loaded into the RAM write address register.

HBVA(23:0) = BA + 084$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| RRD7 | RRD6 | RRD5 | RRD4 | RRD3 | RRD2 | RRD1 | RRD0 |

*Figure 47: RAMDAC Color Palette RAM Data Port*

For each write to RAM read address register, three read cycles to this data port are required, one each for the red, green, and blue RAMs. When reading from large blocks of the color palette RAMs, this data port can be used to access all the necessary data once the starting address has been loaded into the RAM read address register.

Revision A    Modified 3/23/94

Cognex 4800 Video (VM17B)     Engineering Specification

*5.4.35 RAMDAC Pixel Mask (HBVA = BA + 088$_h$, RW)*

This 8-bit register allows each individual bit entering the RAMDAC via the RED, GRN, and BLU data buses to be mask. The contents of this register are bit-wise ANDed HBVA(23:0) = BA + 088$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| RPM7   | RPM6   | RPM5   | RPM4   | RPM3   | RPM2   | RPM1   | RPM0   |

*Figure 48: RAMDAC Color Palette Pixel Mask Register* with the data contained on the RED, GRN, and BLU data paths. The bit plane is enable if the cognizant bit in the pixel mask register is set (i.e. a logic 1). The mask contained in this register is applied to all three RAMDAC color input channels simultaneously. To enable full resolution (i.e. all 8 bits enables) this register must be set to FF$_h$.

*5.4.36 RAMDAC RAM Read Address (HBVA = BA + 08C$_h$, RW)*

This 8-bit register specifies the next color palette RAM address to be read. For each write to this register, three read cycles of the color palette data port are required, one each for the red, green, and blue RAMs. When reading large blocks of the color palette RAMs, this register need only be loaded with the first location. It will automatically increment after the third read to the color palette RAMs. When performing the read cycles of the color palette RAMs, keep in mind that the order will be red data, followed by green data, followed by blue data.

HBVA(23:0) = BA + 08C$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| RRA7   | RRA6   | RRA5   | RRA4   | RRA3   | RRA2   | RRA1   | RRA0   |

*Figure 49: RAMDAC Color Palette RAM Read Address Register*

| RRA(7:0) | Color Palette Selected |
|----------|------------------------|
| 00$_h$   | RGB Address 0          |
| 01$_h$   | RGB Address 1          |

*Table 32: RAMDAC RRA(7:0) Bits*

Cognex 4800 Video (VM17B)     Engineering Specification

| RRA(7:0) | Color Palette Selected |
|---|---|
| 02$_h$ | RGB Address 2 |
| . . | . . |
| FD$_h$ | RGB Address 253 |
| FE$_h$ | RGB Address 254 |
| FF$_h$ | RGB Address 255 |

*Table 32: RAMDAC RRA(7:0) Bits*

5.4.37 Data Path and Overlay Control (HBVA = BA + 090$_h$, RW)

This register controls the cross point switch (CPS) which is used to map the RED, GRN, BLU, and OVR RAMDAC input ports to the various banks of ADMEM. when displaying stored images. For real-time displays (also refer to the Real-Time Control and the RAMDAC Command Registers) the CPS is used to select which bank will provide the graphic overlay if one is desired. It is comprised of four bit fields; RED(1:0), GRN(1:0), BLU(1:0), and OVR(3:0).

HBVA(23:0) = BA + 090$_h$

| Bit 31 | Bit 30 | Bit 29 | Bit 28 | Bit 27 | Bit 26 | Bit 25 | Bit 24 |
|---|---|---|---|---|---|---|---|
| OVR1 | OVR0 | BLU1 | BLU0 | GRN1 | GRN0 | RED1 | RED0 |

*Figure 50: Display Data Path and Overlay Control Register*

To configure the Cross Point Switch for either a monochrome or pseudo-color display, the values selected for REDM(1:0), GRNM(1:0), and BLUM(1:0) will be identical. Conversely, a full color display will require unique values for REDM(1:0), GRNM(1:0), and BLUM(1:0).

5.4.38 Acquisition and Display Clock Frequency Select (HBVA = BA + 094$_h$, WO)

The 4800 contains two programmable oscillators. One is used to generate the acquisition pixel clock (BASEACQCLK) when the video board is driving the camera while the other synthesizes the optional display pixel clock, DPLYCLK. If the optional display timing generator is not present, then DPLYCLK is sourced by BASEACQCLK and configuring the second oscillator is not required. BASEACQCLK must be configured regardless of whether or not the video timing is running in PLL or genlock.

Cognex 4800 Video (VM17B)   Engineering Specification

The frequency of each oscillator is set via a 22-bit control word which is programmed using a serial protocol. As shown in the register description, the oscillators share a common data line (DATA) but have individual write enables (ACLKEN and DCLKEN). In order to program either oscillator the respective enable bit must be low. Each bit in the 22-bit control word requires a Host Bus register write cycle. Table 33 shows the four frequencies required by the 4800 and their respective 22-bit data words The CLKREF bit can be used to switch the oscillator to a stable 14.31818 Mhz reference frequency during programming. To invoke this capability, simply write a zero to this location for the first 22 program cycles followed by a one during a 23rd write cycle. Both ACLKEN and DCLKEN must be high during the 23rd write cycle. This technique will insure that the output of the oscillator does not glitch during programming. Note that setting CLKREF low switches both BASEACQCLK and DPLYCLK to the reference frequency, regardless of which one is actually being programmed.

HBVA(23:0) = BA + 094$_h$

| Bit 31 | Bit 30 | Bit 29 | Bit 28 | Bit 27 | Bit 26 | Bit 25 | Bit 24 |
|---|---|---|---|---|---|---|---|
| Unused | Unused | Unused | Unused | CLKREF | DCLKEN | ACLKEN | DATA |

*Figure 51: Acquisition and Display Clock Frequency Select Register*

| Video Format | Frequency (Mhz) | DATA (hex) |
|---|---|---|
| RS-170 | 12.348 | 0BA543 |
| CCIR | 14.75 | 120D1F |
| VGA | 25.000 | 0B5CBD |
| SVGA | 36.000 | 1EACA1 |

*Table 33: BASEACQCLK and DPLYCLK Oscillator Frequencies*

5.4.39 Interrupt Enable Mask (HBVA = BA + 098$_h$, RW)

This register allows each of the 4 sources of video interrupts to be disable. The 4800 video will generator an interrupt whenever one of the following conditions exists:

- Acquisition vertical interrupt occurs AND AVIEN is set to a logic 1
- Acquisition line interrupt occurs begins AND ALIEN is set to a logic 1
- Display vertical interrupt occurs AND DVIEN is set to a logic 1
- VOM interrupt occurs AND VOMIEN is set to a logic 1

*Cognex 4800 Video (VM17B)*            *Engineering Specification*

HBVA(23:0) =BA + 098$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| Unused | Unused | Unused | Unused | VOMIEN | DVIEN  | ALIEN  | AVIEN  |

*Figure 52: Interrupt Enable Mask Register*

5.4.40 Interrupt Status (HBVA = BA + 09C$_h$, RW)

The Interrupt Status register contains four bits; AVINT, ALINT, DVINT, and VOMINT. When AVINT is high (logic 1), the acquisition vertical interrupt has occurred. Similarly, when ALINT is high, the acquisition line interrupt has been generated. The DVINT bit denotes the generation of the display vertical interrupt. When VOMINT is high, the interrupt was generated by the installed VOM. These bits are cleared by writing a one to the bit position corresponding to the interrupt. This scheme implements a "reset interrupt on resource acknowledge" methodology.

HBVA(23:0) = BA + 09C$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| Unused | Unused | Unused | Unused | VOMINT | DVINT  | ALINT  | AVINT  |

*Figure 53: Interrupt Status Register*

NOTE

*The 4800 uses the same RAMDAC currently supported on the 4100 product, the Brooktree BT252.*

5.4.41 Digitizer Write and Read Address (HBVA = BA + 0A0$_h$, RW)

This 8-bit register is used to specify the internal look-up-table RAM address or configuration registers to be either written to or read from. To read or write the RAM, the address of the first location to be accessed is stored in this register. Data will be updated whenever a write cycle to the Digitizer RAM Data Port is performed. The address will automatically increment after each write cycle to the data port. Similarly, the RAM can be checked by performing a read cycle to the Digitizer RAM Data Port. Again, this address register will automatically increment after each read cycle of the data port.

To alter the gain of the digitizer or to update the internal control register, the correct pointer must first be loaded into this address register. The corresponding gain or control register can then be accessed by performing a read or write cycle to the Digitizer Gain and Control Data Port. Table 34 summarizes the legal values for this register when used in conjunction with the RAM or Gain and Control Data Ports.

Cognex 4800 Video (VM17B)               *Engineering Specification*

HBVA(23:0) = BA + 0A0$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| DRWA7  | DRWA6  | DRWA5  | DRWA4  | DRWA3  | DRWA2  | DRWA1  | DRWA0  |

*Figure 54: Digitizer Read and Write Address Register*

| Data Port Accessed | DRWA(7:0) | Read or Write |
|--------------------|-----------|---------------|
| RAM                | 00$_h$    | RGB Address 0 |
|                    | 01$_h$    | RGB Address 1 |
| RAM                | 02$_h$    | RGB Address 2 |
| :                  | :         | :             |
| RAM                | FD$_h$    | RGB Address 253 |
|                    | FE$_h$    | RGB Address 254 |
|                    | FF$_h$    | RGB Address 255 |
| Gain and Control   | 00$_h$    | Command Register |
|                    | 01$_h$    | A/D Reference Max |
|                    | 02$_h$    | A/D Reference Min |

*Table 34: Digitizer DRWA(7:0) Bits*

5.4.42 Digitizer RAM Data Port (HBVA = BA + 0A4$_h$, RW)

This 8-bit data port is used to write to or read from the digitizer look-up-table RAM. When reading from or writing to large blocks of the digitizer RAM, this data port can be used to transfer all the necessary data once the starting address has been loaded into the Digitizer Write and Read Address register.

HBVA(23:0) = BA + 0A4$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| DRD7   | DRD6   | DRD5   | DRD4   | DRD3   | DRD2   | DRD1   | DRD0   |

*Figure 55: Digitizer RAM Data Port*

Part Number 9012-0039          Cognex Confidential

*Cognex 4800 Video (VM17B)*  *Engineering Specification*

5.4.43 Digitizer Reference and Command Data Port (HBVA = BA + 0A8$_h$, RW)

This 8-bit data port is used to write to or read from the three internal digitizer configuration registers; Command, A/D Reference Max, and A/D Reference Min as illustrated in Table 34.

HBVA(23:0) = BA + 0A8$_h$

| Bit 31 | Bit 30 | Bit 29 | Bit 28 | Bit 27 | Bit 26 | Bit 25 | Bit 24 |
|---|---|---|---|---|---|---|---|
| DGCD7 | DGCD6 | DGCD5 | DGCD4 | DGCD3 | DGCD2 | DGCD1 | DGCD0 |

*Figure 56: Digitizer REF and Command Data Port*

Table 35 illustrates the mapping between the bits in this data port and the digitizer's internal Command Register. The register is comprised of three fields; CSDL(1:0), SYNCCSEL(1:0), and A/DSEL(1:0). The CSDL(1:0) field is used to set a threshold for extracting the synchronization information from the composite video waveform. The remaining two fields determine which of the four video sources is used as the input to the synchronization extraction logic and the A/D converter respectively.

| Data Port Bit(s) | Command Register Bit(s) | Value | Function |
|---|---|---|---|
| DGCD(1:0) | Unused | 0 | Program to 0 |
| DGCD(3:2) | CSDL(1:0) | 0 | Sync Detect Level = 50mv |
| | | 1 | Sync Detect Level = 75mv |
| | | 2 | Sync Detect Level = 100mv |
| | | 3 | Sync Detect Level = 125mv |
| DGCD(7:6) | SYNCSEL(1:0) | 0 | Sync on Camera 0 |
| | | 1 | Sync on Camera 1 |
| | | 2 | Sync on Camera 2 |
| | | 3 | Sync on Camera 3 |
| DGCD(7:6) | A/DSEL(1:0) | 0 | Digitize Camera 0 |
| | | 1 | Digitize Camera 1 |
| | | 2 | Digitize Camera 2 |
| | | 3 | Digitize Camera 3 |

*Table 35: Digitizer Command Register*

*Cognex 4800 Video (VM17B)*             *Engineering Specification*

Table 36 and Table 37 illustrate the mapping between the bits in this data port and the digitizer's internal A/D Reference Max and Min registers. These registers control the reference voltages at the top (Max) and bottom (Min) of the flash A/D converter's resistor ladder network. They have a minimum value of 0.0 volts and a maximum value of 1.2 volts. The step size for both references is 19 millivolts. The digitizer converts signals in the range:

$$VREFmin \leq Vcamera \leq VREFmax$$

where *Vcamera* is the signal on either Camera 0, Camera 1, Camera 2, or Camera 3. The "gain" of the *Vcamera* signal can be adjusted by lowering the value of VREFmax. The black reference, and hence the level, of the *Vcamera* signal can be adjusted by raising the value of VREFmin.

The output of the A/D converter will range between $00_h$ (*Vcamera* </= *VREFmin*) and $FF_h$ (*Vcamera* >/= *VREFmax*). The linearity and accuracy of the A/D converter are impacted by the difference between *VREFmax* and *VREFmin*. For example, the linearity and signal to noise (S/N) performance of the A/D converter will degrade by about a factor of 2 if the delta (*VREFmax - VREFmin*) is reduced from 1.2 volts to 0.6 volts. The nominal settings are:

VREFmax = 1.2 VDC

*VREFmin* = 0.0 VDC

| Data Port Bit(s) | Command Register Bit(s) | Value | Function |
|---|---|---|---|
| DRD(1:0) | Unused | 0 | Program to 0 |
| DRD(7:3) | ADREFMX(5:0) | $00_h$ | $VREF_{MAX} = 0.000$ V |
| | | $01_h$ | $VREF_{MAX} = 0.0019$ V |
| | | $02_h$ | $VREF_{MAX} = 0.0038$ V |
| | | $03_h$ | $VREF_{MAX} = 0.0057$ V |
| | | . . | . . |
| | | $3C_h$ | $VREF_{MAX} = 1.143$ V |
| | | $3D_h$ | $VREF_{MAX} = 1.162$ V |
| | | $3E_h$ | $VREF_{MAX} = 1.181$ V |
| | | $3F_h$ | $VREF_{MAX} = 1.200$ V |

*Table 36: Digitizer Reference Max Register*

Part Number 9012-0039          Cognex Confidential

*Cognex 4800 Video (VM17B)*  *Engineering Specification*

| Data Port Bit(s) | Command Register Bit(s) | Value | Function |
|---|---|---|---|
| DRD(1:0) | Unused | 0 | Program to 0 |
| DRD(7:3) | ADREFMN(5:0) | $00_h$ | $VREF_{MIN} = 0.000$ V |
| | | $01_h$ | $VREF_{MIN} = 0.0019$V |
| | | $02_h$ | $VREF_{MIN} = 0.0038$ V |
| | | $03_h$ | $VREF_{MIN} = 0.0057$ V |
| DRD(7:3) | ADREFMIN(5:0) | . . | . . |
| | | $3C_h$ | $VREF_{MIN} = 1.143$ V |
| | | $3D_h$ | $VREF_{MIN} = 1.162$ V |
| | | $3E_h$ | $VREF_{MIN} = 1.181$ V |
| | | $3F_h$ | $VREF_{MIN} = 1.200$ V |

*Table 37: Digitizer Reference Min Register*

5.4.44 D.C. Restore Position (HBVA = BA + $0AC_h$, RW)

This register is used to specify the position within the horizontal blank of the sample pulse (RESTORE_L) used to perform D.C. restoration. The value of the horizontal counter is reset to zero at the beginning of every blank. The value entered into this register will specify the position of the RESTORE_L pulse.

NOTE

*The location of the D.C. restoration is currently fixed in hardware. This register is only for future use.*

HBVA(23:0) = BA + $0AC_h$

| Bit 31 | Bit 30 | Bit 29 | Bit 28 | Bit 27 | Bit 26 | Bit 25 | Bit 24 |
|---|---|---|---|---|---|---|---|
| Unused | Unused | Unused | Unused | Unused | Unused | Unused | DCRP8 |
| Bit 23 | Bit 22 | Bit 21 | Bit 20 | Bit 19 | Bit 18 | Bit 17 | Bit 16 |
| DCRP7 | DCRP6 | DCRP5 | DCRP4 | DCRP3 | DCRP2 | DCRP1 | DCRP0 |

*Figure 57: D.C. Restore Position Register*

Cognex 4800 Video (VM17B)　　　　　Engineering Specification 5.4.45 Acquisition Timing Control (HBVA = BA + 0B0$_h$, RW)

This register is used to define acquisition timing clock reference and mode. Two bits, PLLON and EXTCLK are used to determine the source of the acquisition pixel clock reference.

HBVA(23:0) = BA + 0B0$_h$

| Bit 31 | Bit 30 | Bit 29 | Bit 28 | Bit 27 | Bit 26 | Bit 25 | Bit 24 |
|---|---|---|---|---|---|---|---|
| Unused | Unused | Unused | SYNC | AWIDE | AHRES | EXTCLK | PLLON |

*Figure 58: Acquisition Timing Control Register*

As shown in Table 38, there are three possible clock sources. When the 4800 is providing the video timebase (i.e. RS-170 or CCIR) then the clock is generated internally using a programmable oscillator (refer to the Pixel Cock Frequency Register). The PLLON bit is set whenever the timing is to be derived from the camera's composite video timing using the synchronization detector and separator in conjunction with the phase-lock-loop. Finally, if the camera provides a pixel clock signal, it may be used by setting EXTCLK high.

| EXTCLK | PLLON | Base Acquire Clock Source |
|---|---|---|
| 0 | 0 | Programmable oscillator |
|   | 1 | Phase-lock-loop |
| 1 | 0 | External camera clock input |
|   | 1 | External camera clock input |

*Table 38: Acquisition EXTCLK and PLLON Bits*

The horizontal resolution, that is the number of pixels digitized during the horizontal active interval, is controlled by two bits, AWIDE and AHRES. AWIDE selects between a "normal" width of 512 pixels per line and a "wide" width of 640 pixels or 768 pixels at RS-170 or CCIR respectively. The determines whether every pixel, or every second pixel is loaded into the base packetizing FIFO.

NOTE

*In earlier versions of the specification, AWIDE and AHRES were referred to as AM(1:0)*

Part Number 9012-0039　　　　Cognex Confidential

Cognex 4800 Video (VM17B)    *Engineering Specification*

In order to perform a half resolution acquisition, AHRES is set high and the ACQ bit located in the Acquisition On/Off Register is held high for a single field. The generates an image which is sub-sampled by 1/2 in both the horizontal and vertical directions. WHen performing half resolution acquires CHnSAO should be set to the same value as CHnSAE.

| AHRES | AWIDE | Acquisition Mode |
|---|---|---|
| 0 | 0 | Normal, full resolution |
| 0 | 1 | Wide, full resolution |
| 1 | 0 | Normal, half resolution |
| 1 | 1 | Wide, Half resolution |

*Table 39: Acquisition AHRES and AWIDE Bits*

The video section can accept external horizontal and vertical drive (HDRIVE and VDRIVE) from either a VOM or via the camera connectors. In addition a composite synchronization signal (CSYNC) can be sourced from either the BT252 located on the base board or from a VOM. The SYNC bit is used to determine the source of the external video synchronization timing signals.

| SYNC | External Sync Source |
|---|---|
| 0 | VOMEXTHDRIVE, VOMEXTVDRIVE, VOMCAMCSYNC |
| 1 | EXTHDRIVE, EXTVDRIVE, BASECAMCSYNC |

*Table 40: Acquisition External SYNC source Control Bit*

5.4.46 Acquisition On/Off Control (HBVA = BA + 0B4$_h$, RW)

The ACQ bit is used to enable and disable acquires using the base video channel. Data is written into the base channel FIFO during the active portion of the video timing (as defined by horizontal and vertical blanking intervals) whenever ACQ is high.

HBVA(23:0) = BA + 0B4$_h$

| Bit 31 | Bit 30 | Bit 29 | Bit 28 | Bit 27 | Bit 26 | Bit 25 | Bit 24 |
|---|---|---|---|---|---|---|---|
| Unused | Unused | Unused | Unused | Unused | Unused | Unused | ACQ |

*Figure 59: Acquisition On/Off Control Register*

Cognex 4800 Video (VM17B)  Engineering Specification

5.4.47 Acquisition Camera Control (HBVA = BA + 0B8$_h$, RW)

This register is used to control advanced features which may not be supported by all cameras. RREN (rapid restart enable) and RRMODE(1:0) (rapid reset mode), along with the Rapid Restart Position Register (RRPOS) are used to control "rapid restarting" of the video timing. Currently, two operating modes are supported; immediate mode and one-shot mode. Regardless of the mode, the Rapid Restart Position Register must contain the desired line number prior to invoking the actual restart.

HBVA(23:0) = BA + 0B8$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| CCTL1  | LINTFLD | SHTRLVL | SHTRFLD | SHTREN | RRMODE1 | RRMODE0 | RREN |

*Figure 60: Acquisition Control Register*

Immediate Mode

An immediate rapid restart cycle is invoked using the following steps:

1. RRPOS == restart line number

2. RRMODE(1:0) == 00

3. RREN == 1 followed by RREN == 0 on successive host bus write cycles

At the beginning of the next horizontal blank, the vertical timing is restarted as follows:

VERCNT == RRPOS

FIELD == RRFIELD

The vertical timing increments from this position in accordance with the video standard currently running (e.g. RS-170 or CCIR)

One-Shot Mode

A one-shot rapid restart cycle is performed as follows:

1. RRPOS == restart line number

2. RRMODE(1:0) == 01

3. RREN == 1

At the beginning of the next horizontal blank, the vertical timing is restarted as follows:

VERCNT == RRPOS

Cognex 4800 Video (VM17B)     Engineering Specification

FIELD == RRFIELD

However, unlike the immediate mode, the vertical timing remains "frozen" at this position until the acquisition software releases the RREN bit.

4. RREN == 0

The vertical timing now increments from this position in accordance with the video standard currently running (e.g. RS-170 or CCIR)

NOTE

*RRMODE(1:0) = 00 can also be used to implement "one-shot" timing, however the vertical timing remains frozen for 1 extra line (63.5 us for RS-170) after RREN is reset low, adding to the acquisition latency.*

The effect of the shutter control bits, SHTRFLD, SHTRLVL, and SHTREN, is summarized in Table 41. The actual shutter pulse is common to all four cameras which can be connected to the baseboard and is output on the CAMnCNTL0 (n = 0, 1, 2, and 3) lines. The width of the shutter pulse is equal to that of the horizontal drive (HDRIVE) signal. Normally when the shutter in conjunction with either immediate or one-shot rapid restart acquisitions, the value of LIPOS will be:

LIPOS == RRPOS + 1

| SHTREN | SHTRLVL | SHTRFLD | Shutter (CAMCNTL0) Operation |
|---|---|---|---|
| 0 | X | X | Shutter disabled |
| 1 | 0 | 0 | Shutter == 0 @ LIPOS == VERCNT |
| 1 | 0 | 1 | Shutter == 0 @ LIPOS == VERCNT & LIFLD == FIELD |
| 1 | 1 | 0 | Shutter == 1 @ LIPOS == VERCNT |
| 1 | 1 | 1 | Shutter ==1 @ LIPOS == VERCNT & LIFLD == FIELD |

*Table 41: Shutter Enable, Level, and Field Control Bits*

The effect of the line interrupt field select bit, LIFLD, is presented in Table 42. The actual interrupt occurs at the beginning of the scan line. The interrupt is always generated, even during shutter operation. This interrupt can be disabled by setting the ALIEN bit in the Interrupt Mask Register (BA + 098) low.

Cognex 4800 Video (VM17B)     Engineering Specification

| LINTFLD | Acquisition Line Interrupt Operation |
|---------|--------------------------------------|
| 0 | ALINT == 0 @ LIPOS == VERCNT |
| 1 | ALINT == 0 @ LIPOS == VERCNT & LIFLD == FIELD |

*Table 42: Line Interrupt Field Control Bits*

The CCTL1 bit directly controls the CAMnCNTL1 (n = 0, 1, 2, and 3) outputs of the video boards. This bit allows the software to have direct control over a camera control signal for future use.

5.4.48 Rapid Restart Position (HBVA = BA + 0BC$_h$, RW)

During a rapid reset, the vertical counter contained with the Acquisition Timing Generator is loaded with the value contained in this register. Once the load is complete:

VERCNT(8:0) = RRP(8:0)
AFIELD = RRFLD and the acquisition timing continues from this vertical position. A rapid reset is initiated using the Acquisition Control Register. In order to minimize the recovery time for the camera, this process is performed synchronous to the horizontal timing.

HBVA(23:0) = BA + 0BC$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| Unused | Unused | Unused | Unused | Unused | Unused | RRFLD | RRP8 |

| Bit 23 | Bit 22 | Bit 21 | Bit 20 | Bit 19 | Bit 18 | Bit 17 | Bit 16 |
|--------|--------|--------|--------|--------|--------|--------|--------|
| RRP7 | RRP6 | RRP5 | RRP4 | RRP3 | RRP2 | RRP1 | RRP0 |

*Figure 61: Rapid Restart Position Register*

5.4.49 Line Interrupt Position (HBVA = BA + 0C0$_h$, RW)

This register is used to generate an interrupt at a specific acquisition line number. The acquisition line interrupt (ACQLINT_L) signal will become active when:

LIP(8:0) == VERCNT(8:0) && (LINTFLD || (LIFLD == AFIELD))

Cognex 4800 Video (VM17B)          Engineering Specification

HBVA(23:0) = BA + 0C0$_h$

| Bit 31 | Bit 30 | Bit 29 | Bit 28 | Bit 27 | Bit 26 | Bit 25 | Bit 24 |
|---|---|---|---|---|---|---|---|
| Unused | Unused | Unused | Unused | Unused | Unused | LIFLD | LIP8 |
| Bit 23 | Bit 22 | Bit 21 | Bit 20 | Bit 19 | Bit 18 | Bit 17 | Bit 16 |
| LIP7 | LIP6 | LIP5 | LIP4 | LIP3 | LIP2 | LIP1 | LIP0 |

*Figure 62: Line Interrupt Position Register*

This register can also be used to generate a camera shutter pulse. A shutter pulse will be output on CAMnCNTL0 (n = 0, 1, 2, 3) whenever

SHTREN && (LIP(8:0) == (VERCNT(8:0) && (SHTRFLD || (LIFLD == AFIELD)))

5.4.50 Horizontal Frequency Adjustment (HBVA = BA + 0C4$_h$, RW)

This register is used to modify the line frequency of CAMHDRIVE in order to adjust the effective pixel size when the 4800 is driving the camera. The nominal setting for this register is 6 (set automatically during configuration or reset) for RS-170. The register supports a range of 0 through 15 providing the ability to scale camera pixels by -1.6% to +2.3%.

HBVA(23:0) = BA + 0C4$_h$

| Bit 31 | Bit 30 | Bit 29 | Bit 28 | Bit 27 | Bit 26 | Bit 25 | Bit 24 |
|---|---|---|---|---|---|---|---|
| Unused | Unused | Unused | Unused | HFA3 | HFA2 | HFA1 | HFA0 |

*Figure 63: Horizontal Frequency Adjustment Register*

5.4.51 Acquisition Line Number (HBVA = BA + 0C8$_h$, RO)

This read-only data port allows the current acquisition scan line number to be determined.

HBVA(23:0) = BA + 0C8$_h$

| Bit 31 | Bit 30 | Bit 29 | Bit 28 | Bit 27 | Bit 26 | Bit 25 | Bit 24 |
|---|---|---|---|---|---|---|---|
| Unused | Unused | Unused | Unused | Unused | Unused | AFIELD | AVCNT8 |
| Bit 23 | Bit 22 | Bit 21 | Bit 20 | Bit 19 | Bit 18 | Bit 17 | Bit 16 |
| AVCNT7 | AVCNT6 | AVCNT5 | AVCNT4 | AVCNT3 | AVCNT2 | AVCNT1 | AVCNT0 |

*Figure 64: Acquisition Line Number Register*

Table 43 shows the relationship between these bits and the video acquisition timing for the RS-170 format. AVCNT resets to 0 at the beginning of vertical sync. In the RS-170 standard

Cognex 4800 Video (VM17B)             Engineering Specification each field is 262 1/2 lines long, giving a 525 line frame. Note that the AFIELD:AVCNT register actually goes through 526 states. The last AVCNT in the even field (AFIELD=0,-AVCNT=262) and the first one in the odd field (AFIELD=1,AVCNT=0) are each 1/2 line long, forming a single video line.

NOTE

*The vertical blank preceding the even field is 22 lines long and the vertical blank preceding the odd field is 23 lines long. This means that the 1st active line of the interlaced video image is even field line 0 (caq_image->rat[0] = caq_even->rat[0]), and the 2nd line is odd field line 0. This is different from some (all?) previous Cognex platforms*

NOTE

*This register may be read incorrectly if it is changing while being read. It should always be read twice in rapid succession, and the results discarded if they are not the same.*

| AFIELD | AVCNT(8:0)$_{10}$ | Video Data | Video Information |
|--------|-------------------|------------|-------------------|
| 0 | 0 -> 18 | Blank | Start of even field |
| 0 | 19 -> 258 | Active Even | Active region of even field |
| 0 | 259 -> 262 | Blank | End of even field |
| 1 | 0 -> 19 | Blank | Start of Odd field |
| 1 | 20 -> 259 | Active Odd | Active region of odd field |
| 1 | 260 -> 262 | Blank | End of odd field |

*Table 43: Example of Acquisition AFIELD and AVCNT Bits For RS-170*

5.4.52 Display Control (HBVA = BA + 0CC$_h$, RW)

This register, located in the display timing generator controls two display functions. DWIDTH selects between normal (logic 0 and wide (logic 1) display formats. DTIN can be used to select the display timing generator (logic 0) or the acquisition timing generator (logic 1) as the source of the display timing.

HBVA(23:0) = BA + 0CC$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| 1 | 0 | 1 | 0 | 0 | 0 | DTIN | DWIDTH |
| Bit 23 | Bit 22 | Bit 21 | Bit 20 | Bit 19 | Bit 18 | Bit 17 | Bit 16 |
| 1 | 0 | 1 | 0 | 1 | 0 | 1 | 0 |

*Figure 65: Display Control Register*

*Cognex 4800 Video (VM17B)*               *Engineering Specification*

If the DPLYTIMING Xilinx is not installed, a pull-up resistor of DTIN (Display Timing INstalled) automatically selects the ACQTIMING Xilinx as the sole source of display timing. As an alternate method of determining whether or not the display timing generator is available, this register can be read after attempting to load the Xilinx. The unused bits in this register are hard-wired with the bit pattern shown.

5.4.53 Real-Time Display Data Path Control (HBVA = BA + 0D0$_h$, RW)

This register control is used in conjunction with the CPS mapping register to select stored or real-time video data on a per-color basis. This register affects the source of data entering the RAMDAC (BT473). Three bits, RTRED, RTGRN, and RTBLU select either real-time (logic 1) or ADMEM (logic 0) data for display on each of the red, green, and blue RAMDAC data inputs. Real-time green and blue data is sourced by VOM channels 1 and 2 while real-time red data can come from the baseboard digitizer (RTSEL = 0) or VOM channel 0 (RTSEL = 1). Overlay data is always driven from ADMEM. Also refer to the Diagnostic Register (BA = 010) to see how RTRED and RTRSEL work in conjunction with the LPBACK bit to establish a special diagnostic test path. Refer to Table 21 for a complete description of the RTRED, RTRSEL, and LPBACK bits. The LPBACK bit is located in the Diagnostic Register at address offset 010 hex.

HBVA(23:0) = BA + 0D0$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| Unused | Unused | Unused | Unused | RTRSEL | RTBLU  | RTGRN  | RTRED  |

*Figure 66: Real-Time Display Data Path Control Register*

| SYSRESET_L | LPBACK | RTRED | RTRSEL | Data Path Enabled | Display |
|------------|--------|-------|--------|-------------------|---------|
| 0 | 0 | 0 | 1 | CPS(RED) -> BT473(RED) | ADMEM |
|   |   |   |   |                        |       |
| 1 | 0 | 0 | 0 | ILLEGAL SETTING *      | -     |
| 1 | 0 | 0 | 1 | CPS(RED) -> BT473(RED) | ADMEM |
| 1 | 0 | 1 | 0 | BT252 -> BT473(RED)    | Real-Time |
| 1 | 0 | 1 | 1 | VOM(RED) -> BT473(RED) | Real-Time |
| 1 | 1 | 0 | 0 | CPS(RED) -> Base FIFO  | Loop Back |
| 1 | 1 | 0 | 1 | CPS(RED) -> BT473(RED) | ADMEM |
| 1 | 1 | 1 | 0 | VOM(RED) -> Base FIFO  | Loop Back |
| 1 | 1 | 1 | 1 | VOM(RED) -> BT473(RED) | Real Time |

*Table 44: LPBACK, RTRED, and RTRSEL Data Path Control Bits*

Cognex 4800 Video (VM17B)          Engineering Specification

*NOTE - ILLEGAL SETTING!*

*The RTRED and RTRSEL bits should never be simultaneously set low. This condition must be avoided by software. There is no built-in hardware interlock which prevents this combination from being set. If RTRED and RTRSEL are both low, then both the CPS and the real-time data paths are enable to the BT473 red input, causing the tri-state buffers used to clash. Therefore when enabling the CPS(RED) -> Base FIFO diagnostic loop back data path, the LPBACK bit located in the Diagnostic Register (BA+010 hex) should be written high first, followed by writing RTRSEL and RTRED to zero.*

5.4.54 Display Line Number (HBVA = BA + 0D4$_h$, RO)

This read-only data port allows the current display scan line number to be determined.

HBVA(23:0) = BA + 0D4$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| Unused | Unused | Unused | Unused | Unused | Unused | DFIELD | DVCNT8 |
| Bit 23 | Bit 22 | Bit 21 | Bit 20 | Bit 19 | Bit 18 | Bit 17 | Bit 16 |
| DVCNT7 | DVCNT6 | DVCNT5 | DVCNT4 | DVCNT3 | DVCNT2 | DVCNT1 | DVCNT0 |

*Figure 67: Display Line Number Register*

The relationship between these bits and the video acquisition timing for the RS-170 format is illustrated in Table 45. Because of the odd number (525) of total lines required to meet the RS-170 standard, each vertical blank is comprised of twenty-two full lines plus a single half line. AVCNT resets to 0 at the beginning of vertical sync. Not that this table will differ slightly for CCIR while for VGA the field indicator, DFIELD, will be replaced by another count bit, DVCNT9

NOTE

*The vertical blank preceding the even field is 22 lines long and the vertical blank preceding the odd field is 23 lines long. This means that the 1st active line of the interlaced video image is even field line 0 (caq_image->rat[0] = caq_even->rat[0]), and the 2nd line is odd field line 0. This is different from some (all?) previous Cognex platforms*

NOTE

*This register may be read incorrectly if it is changing while being read. It should always be read twice in rapid succession, and the results discarded if they are not the same.*

Cognex 4800 Video (VM17B)　　　　　　　　Engineering Specification

| AFIELD | AVCNT(8:0)$_{10}$ | Video Data | Video Information |
|---|---|---|---|
| 0 | 0 -> 18 | Blank | Start of even field |
| 0 | 19 -> 258 | Active Even | Active region of even field |
| 0 | 259 -> 262 | Blank | End of even field |
| 1 | 0 -> 19 | Blank | Start of Odd field |
| 1 | 20 -> 259 | Active Odd | Active region of odd field |
| 1 | 260 -> 262 | Blank | End of odd field |

*Table 45: Example of Display DFIELD and DVCNT Bits For RS-170*

5.4.55 Xilinx Configuration Control and Status (HBVA = BA + 0D8$_h$, RW)

This least significant three bits of this register are used to initiate a program (or reprogram) cycle for the Xilinx components. The three program bits; MPGM, APGM, and DPGM, are all forced low during a system reset or power-on reset. The MPGM bit is associated with the PKTCNTL (packet control), AHADDRGEN (acquisition and host address generator), and DADDRGEN (display address generator) Xilinxs. The APGM and DPGM bits controls the ACQTIMING (acquisition timing) and DPLYTIMING (optional display timing) Xilinxs respectively. Each Xilinx has a unique "done" bit to signify whether it is in the rest state (logic 0) or has been successfully programmed (logic 1). These bits, PDONE, AHDONE, DADONE, ATDONE, and DTDONE are associated with the PKTCNTL, AHADDRGEN, DADDRGEN, ACQTIMING, and DPLYTIMING Xilinxs respectively.

HBVA(23:0) = BA + 0D8$_h$

| Bit 31 | Bit 30 | Bit 29 | Bit 28 | Bit 27 | Bit 26 | Bit 25 | Bit 24 |
|---|---|---|---|---|---|---|---|
| DTDONE | ATDONE | DADONE | AHDONE | PDONE | DPGM | APGM | MPGM |

*Figure 68: Xilinx Configuration Control and Status*

To reprogram any part(s):

1. Set the appropriate program bit low (logic 0) for at least 300 us. The corresponding done bit(s) will read back 0 once the reset is complete.

2. Set the program bit high

3. Wait at least 500 us

Cognex 4800 Video (VM17B)  Engineering Specification

4. Commence programming with successive write cycles no closer than 20us (this time is required to insure that the XIlinx has completely serialized the previous word and stored it in configuration memory)

The "xxDONE" bits are read-only while the "xPGM" bits are read-write.

5.4.56 PKTCNTL Xilinx Data Port (HBVA = BA + 0DC$_h$, WO)

The packet control Xilinx is programmed through this data port. Note that special software is required to configure any Xilinx FPGA device since an internal timing loop is required.

HBVA(23:0) = BA + 0DC$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| D7     | D6     | D5     | D4     | D3     | D2     | D1     | D0     |

*Figure 69: PKTCNTL Xilinx Data Port*

5.4.57 AHADDRGEN Xilinx Data Port (HBVA = BA + 0E0$_h$, WO)

The acquisition and host address generator Xilinx is programmed through this data port. Note that special software is required to configure any Xilinx FPGA device since an internal timing loop is required.

HBVA(23:0) = BA + 0E0$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| D7     | D6     | D5     | D4     | D3     | D2     | D1     | D0     |

*Figure 70: AHADDRGEN Xilinx Data Port*

5.4.58 DADDRGEN Xilinx Data Port (HBVA = BA + 0E4$_h$, WO)

The display address generator Xilinx is programmed through this data port. Note that special software is required to configure any Xilinx FPGA device since an internal timing loop is required.

HBVA(23:0) = BA + 0E4$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| D7     | D6     | D5     | D4     | D3     | D2     | D1     | D0     |

*Figure 71: DADDRGEN Xilinx Data Port*

Part Number 9012-0039    Cognex Confidential

Cognex 4800 Video (VM17B)　　　　　　　　　*Engineering Specification*

*5.4.59 ACQTIMING Xilinx Data Port (HBVA = BA + 0E8$_h$, WO)*

The acquisition timing generator Xilinx is programmed through this data port. Note that special software is required to configure any Xilinx FPGA device since an internal timing loop is required.

HBVA(23:0) = BA + 0E8$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| D7 | D6 | D5 | D4 | D3 | D2 | D1 | D0 |

*Figure 72: ACQTIMING Xilinx Data Port*

*5.4.60 DPLYTIMING Xilinx Data Port (HBVA = BA + 0EC$_h$, WO)*

The packet control Xilinx is programmed through this data port. Note that special software is required to configure any Xilinx FPGA device since an internal timing loop is required.

HBVA(23:0) = BA + 0EC$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| D7 | D6 | D5 | D4 | D3 | D2 | D1 | D0 |

*Figure 73: DPLYTIMING Xilinx Data Port*

*5.4.61 VOM Identification & Revision (HBVA = BA + 100$_h$, RO)*

This 16-bit register is divided into two 4-bit fields, VID(3:0) and VREV(3:0). The identification field, VID, will allow software to determine the specific VOM installed on a given base board. Four bits allows for a maximum of sixteen (16) types of VOMs. Since this byte of the host bus has pull up resistors, reading this register with no VOM installed will yield a value of FF hex.

The VREV field is used to indicate the current revision of the installed VOM. This field can be updated. This will allow a module which has been legally updated via the ECO process to have its' revision number reflect current functionality.

The other byte can be used to determine the presence of any installed VOM. This byte will be hard-coded to read A5$_H$ for all VOM designs. If no VOM is installed this byte will return a value of FF$_H$.

Revision A　　　　　　　　　Modified 3/23/94

Cognex 4800 Video (VM17B)     Engineering Specification

*NOTE*

*Specific VOM designs may contain special identification or status registers which will allow software to further assess the capabilities and/or current configuration of the module.*

HBVA(23:0) = BA + 100$_h$ - BA + 1FC$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| VREV3  | VREV2  | VREV1  | VREV0  | VID3   | VID2   | VID1   | VID0   |
| Bit 23 | Bit 22 | Bit 21 | Bit 20 | Bit 19 | Bit 18 | Bit 17 | Bit 16 |
| 1      | 0      | 1      | 0      | 0      | 1      | 0      | 1      |

*Figure 74: VOM Identification and Revision Register*

5.4.62 VOM Specific (HBVA = BA + 104$_h$ - BA + 01FC$_h$, RW)

These registers are unique for each VOM design and will be detailed in their respective engineering specifications. Their maximum width is sixteen (16) bits.

HBVA(23:0) = BA + 100$_h$ - BA + 1FC$_h$

| Bit 31 | Bit 30 | Bit 29 | Bit 28 | Bit 27 | Bit 26 | Bit 25 | Bit 24 |
|--------|--------|--------|--------|--------|--------|--------|--------|
| T.B.D  | T.B.D  | T.B.D  | T.B.D  | T.B.D  | T.B.D  | T.B.D  | T.B.D  |
| Bit 23 | Bit 22 | Bit 21 | Bit 20 | Bit 19 | Bit 18 | Bit 17 | Bit 16 |
| T.B.D  | T.B.D  | T.B.D  | T.B.D  | T.B.D  | T.B.D  | T.B.D  | T.B.D  |

*Figure 75: VOM Register*

*Cognex 4800 Video (VM17B)*     *Engineering Specification*

6. Xilinx Programs

This section briefly lists the various Xilinx code required for the various operating modes of the 4800 video sub-system. The Xilinx's are divided into three classes:

- The Base Class is required at all times, regardless of acquisition or display format
- The Acquisition Class contains those files which affect the acquisition timing and will most likely be application dependent.
- The Display Class contains those files which affect the display timing and will most likely be application dependent.

In all cases a portion of the ".C" file name contains a "ROUTE*nn*" field. Since most Xilinx designs require multiple routes, this number just represents the number of the route that completed 100% and met the timing requirements.

6.1 Base Class Xilinx Code

This class is comprised of three (3) designs.

1. Acquisition Packet Timing Controller filename = XPKTCNTL_ROUTE*nn*.C

2. Acquisition and Host Bus Address Generator filename = XAHADDRGEN_ROUTE*nn*.C

3. Display Address Generator filename = XDADDRGEN_ROUTE*nn*.C

6.2 Acquisition Class Xilinx Code

The acquisition class is broken into two sub-classes. Files that support rapid reset contain an "_RR_" field and only operate in Genlock mode (i.e. the 4800 drives the camera with HDRIVE and VDRIVE). Files that support both Genlock and PLL (phase lock loop) modes but *NOT* rapid reset have a "_PLL_" field.

1. RS-170 (60 HZ 2:1, interlaced) timing filename = XACQ_RS170_RR_ROUTE*nn*.C filename = XACQ_RS170_PLL_ROUTE*nn*.C 2. CCIR (50 HZ, 2:1 interlaced) timing filename = XACQ_CCIR_RR_ROUTE*nn*.C filename = XACQ_CCIR_PLL_ROUTE*nn*.C

Cognex 4800 Video (VM17B)     Engineering Specification

3. Other acquisition timing modes may be developed as required

6.3 Display Class Xilinx Code

Four different display formats are presently supported. This timing generator is also optional and is not required for basic video operations.

1. RS-170 (60 HZ 2:1, interlaced) timing filename = XDPLY_RS170_ROUTEnn.C

2. CCIR (50 HZ, 2:1 interlaced) timing filename = XDPLY_CCIR_ROUTEnn.C

3. VGA (60 HZ, non-interlaced) timing filename = XDPLY_VGA_ROUTEnn.C

4. SVGA (60 HZ, non-interlaced) timing filename = XDPLY_SVGA_ROUTEnn.C

Cognex 4800 Video (VM17B)  Engineering Specification

In view of the foregoing, what is claimed is:

1. Video data acquisition system for use in machine vision for generating video data packet signals representative of plural asynchronous video image signals received from respective video data sources that are asynchronous with one another, said system comprising
   A. camera interface means, coupled to said asynchronous video data sources, for digitally encoding each video signal and generating a pixel signal representative of video pixels thereof,
   B. plural buffer means, each coupled to said camera interface means and associated with a respective one of said video data sources, for storing pixel signals associated with that video data source,
   C. packet manager means, coupled to said camera interface means and to said plurality of buffer means, for generating said video data packet signal, said packet manager means including
      i) packet counter means for counting a respective number of video pixel signals stored in each said buffer means, and for generating a packet available signal associated with a respective buffer means and representative of that buffer means having stored therein at least a preselected number of pixel signals, and
      ii) output means, coupled to said packet counter means and to said buffer means, for responding to said packet available signal for reading from the buffer means associated therewith a plurality of pixel signals and for generating a video packet signal representing the pixels represented by that plurality of pixel signals.

2. Apparatus according to claim 1 wherein
   A. said camera interface further includes acquisition format means for generating format signals representative of video acquisition control signals associated with each one of said respective video image signals, and
   B. said packet manager means further includes reset means, responsive to a format signal indicative of an image boundary in the associated video image signal, for clearing at least said buffer means associated with that video image signal.

3. Apparatus according to claim 1 wherein said buffer means comprise dual-port memory means
   for storing in response to a write-control signal data at a first storage rate, and
   for generating in response to read-control signal data at a second storage rate.

4. Apparatus according to claim 1 further comprising virtual frame buffer means for addressably storing said video data packet signals.

5. Apparatus according to claim 4, wherein
   A. said camera interface further includes acquisition format means for generating format signals representative of video acquisition control signals associated with each one of said respective video image signals,
   B. video address generator means, coupled to said packet manager means, for generating a storage location signal representative of an address within said virtual frame buffer means at which to store a video packet signal,
   C. video address generator means includes channel mapping means for generating said storage location as a function of
      i) a channel number of video data source associated with said packet signal, and
      ii) said video acquisition control signal associated with said packet signal.

6. Apparatus according to claim 5, wherein said channel mapping means includes means for generating said storage location signals so as to effect storage of said video data packet signals as a plurality of respective video images.

7. Apparatus according to claim 6, wherein said video address generator means includes
   mapping means for generating said storage location signal to represent contiguous addresses associated with a respective one of said video data sources.

8. Apparatus according to claim 6, wherein said video address generator means includes
   mapping means for generating said storage location signal to represent logically adjacent addresses associated with a two or more respective ones said video data sources.

9. Apparatus according to claim 6 wherein said address generator means includes interlacing means for generating said storage location signal to represent logically alternating addresses associated with a respective one of said video data sources.

10. Apparatus for use in machine vision for generating a storage location signal representative of an address at which to store a video data packet signal representative of at least a portion of a video image signal received from a respective one of plural video data sources that are asynchronous with respect to one another, said apparatus comprising
    A. address storage means for storing a signal representative of a value associated with at least said respective one of said plural video data asynchronous sources,
    B. channel mapping means for generating said storage location signal as a function of
       i) a video acquisition control signal associated with said respective one of said plural video data sources, and
       ii) said value stores in said address storage means associated with said respective one of said plural video data.

11. Apparatus for use in machine vision for generating a storage location signal representative of an address at which to store a video data packet signal representative of at least a portion of a video image signal from a video data source, said apparatus comprising
    A. an address store comprising
       start-even address means for storing a signal representative of a start-even value associated with said video data source,
       ii) start-odd address means for storing a signal representative of a start-odd value associated with said video data source,
       iii) line-index means for storing a signal representative of a line-index value associated with said video data source,
    B. channel mapping means for generating said storage location signal as a function of
       i) a video acquisition control signal associated with the video source corresponding to said video packet signal, and
       ii) one or more of the values stored in said start-even address means, start-odd address means and line-index means associated with said video packet signal.

* * * * *